(12) United States Patent
Waelbroeck et al.

(10) Patent No.: US 8,412,617 B1
(45) Date of Patent: *Apr. 2, 2013

(54) METHODS AND SYSTEMS RELATED TO SECURITIES TRADING

(75) Inventors: Henri Waelbroeck, Scarsdale, NY (US);
Carla Gomes, New York, NY (US)

(73) Assignee: Alpha Vision Services, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/162,127

(22) Filed: Jun. 16, 2011

Related U.S. Application Data

(63) Continuation-in-part of application No. 13/083,711, filed on Apr. 11, 2011.

(60) Provisional application No. 61/322,637, filed on Apr. 9, 2010, provisional application No. 61/355,398, filed on Jun. 16, 2010.

(51) Int. Cl.
*G06Q 40/00* (2006.01)

(52) U.S. Cl. ......... 705/37; 705/36 R; 705/36 T; 705/39; 705/35

(58) Field of Classification Search .................... 705/37, 705/35 R, 36 T, 39, 35
See application file for complete search history.

(56) References Cited

U.S. PATENT DOCUMENTS

| | | | | |
|---|---|---|---|---|
| 6,999,943 B1 * | 2/2006 | Johnson et al. | ................. | 705/39 |
| 7,539,636 B2 * | 5/2009 | Madhavan et al. | .............. | 705/35 |
| 7,739,170 B2 * | 6/2010 | Noser et al. | ................... | 705/36 R |
| 7,818,246 B2 * | 10/2010 | Cushing et al. | .................. | 705/37 |
| 7,974,906 B2 * | 7/2011 | Madhavan et al. | .............. | 705/37 |
| 8,095,447 B2 * | 1/2012 | Stephens | ..................... | 705/36 R |
| 8,131,621 B1 * | 3/2012 | Gastineau et al. | .......... | 705/36 R |
| 8,140,427 B2 * | 3/2012 | Borkovec et al. | ............... | 705/37 |

* cited by examiner

*Primary Examiner* — Siegfried E. Chencinski
(74) *Attorney, Agent, or Firm* — Cowan, Liebowitz & Latman, P.C.; Steven D. Underwood

(57) ABSTRACT

One exemplary aspect comprises a method comprising: (a) receiving data describing an executed trading order in a market traded security and related trade execution data; (b) calculating components of execution costs associated with execution of the order; and (c) transmitting data sufficient to describe the components of execution costs. Other aspects comprise calculations of (1) cost effect of trade decision factors associated with execution of an order; (2) a decomposition of execution of an executed limit order into components related to algorithm performance and components related to trader-input parameters of the order; (3) components of implementation shortfall associated with execution of an order; (4) components of profit/loss associated with execution of an order; and (5) components of execution outcome associated with execution of an order. Other aspects and embodiments comprise related computer systems and software, as will be understood by those skilled in the art after reviewing the present description.

31 Claims, 63 Drawing Sheets

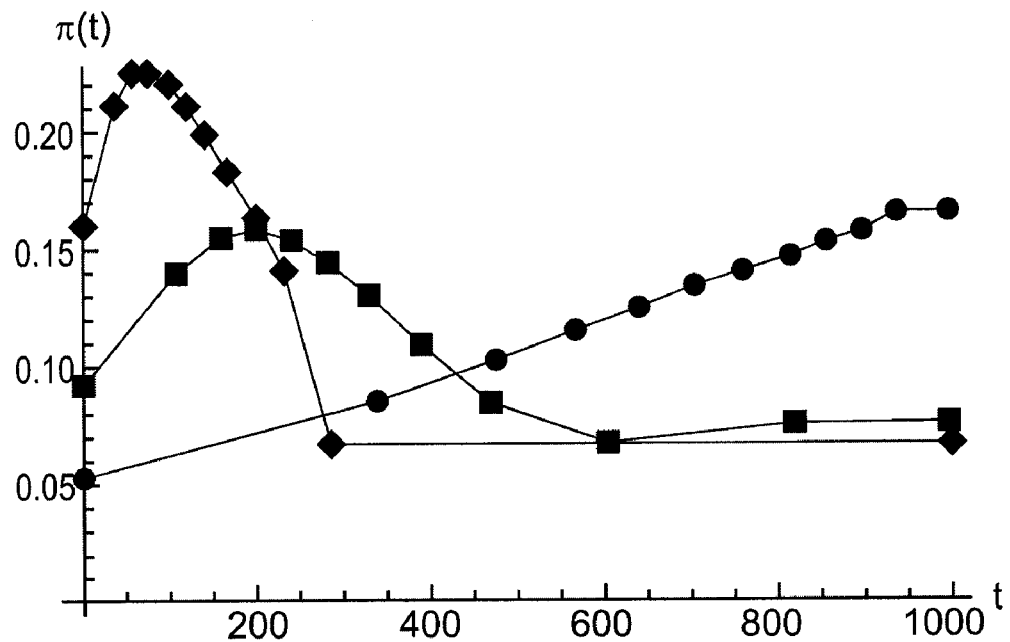
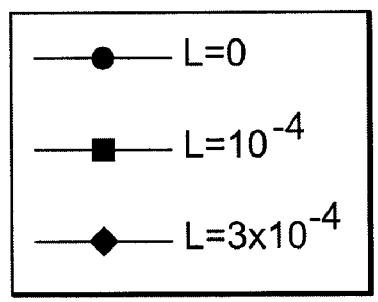
FIG. 13

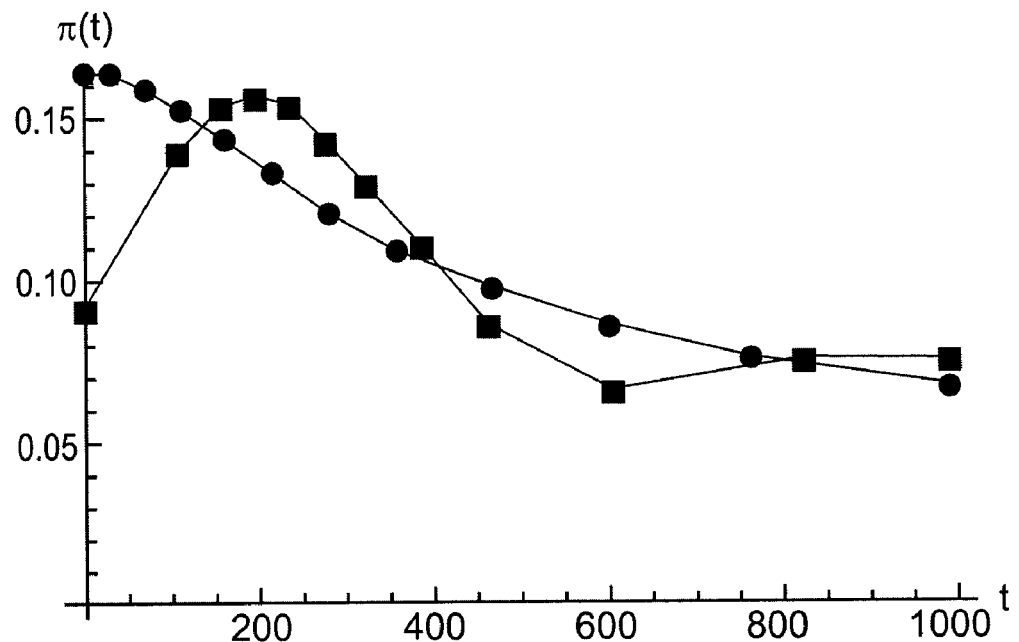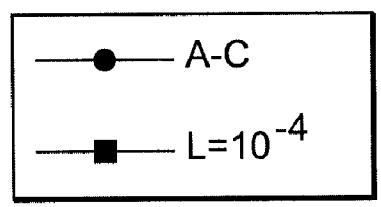
FIG. 14

Profile Factors

| PM | Portfolio Manager John Smith |
|---|---|
| Momentum | Strong (return from the open relative to sector = 87bps) |
| Trend | Reversal (overnight gap = -53bps) |

Impact free return

Impact free return (extended)

Profile Factors

| PM | Portfolio Manager John Smith |
|---|---|
| Momentum | Strong (return from the open relative to sector = 87bps) |
| Trend | Reversal (overnight gap = -53bps) |

Impact free return

Impact free return (extended)

Strategy Overview

| Strategy | PAL | Trader Intervention | Strategy |
|---|---|---|---|
| Munitions Manager | > 25% | Y/N | + Tactical |
| | 15 - 22% | Y/N | + Tactical |
| | 10 - 15% | Y/N | + Tactical |
| | < 10% | Y/N | Tactical |

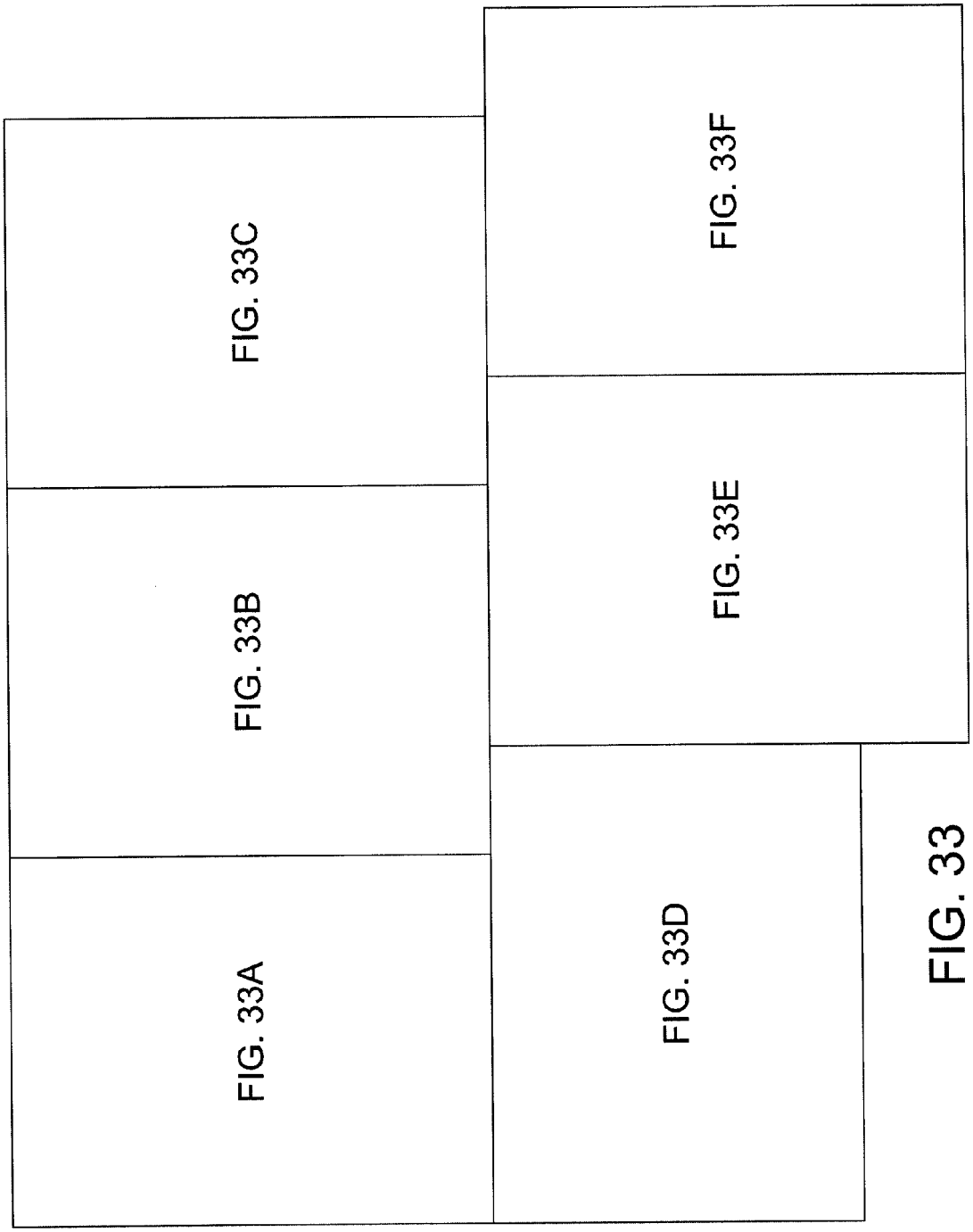

Progress Bar gives a visual indication of your progress working your order:
The blue portion is filled shares
The orange portion is active shares

Leaves shows the number of placed shares currently active in Pipeline

Pipeline Switch Board

| TRADE | SYMBOL | LIMIT | LEAVES | PROGRESS |
|---|---|---|---|---|
| OMS: TRADER1 | | | 124,910 | |
| B | ARE | MKT | 21,271 | 400@70.02 (85%) |
| S | BMR | MKT | 44,007 | 100@18.57 (52%) |
| B | CBSH | MKT | 28,476 | 80@38.78 (64%) |
| S | CELG | MKT | 15,500 | 300@57.00 (72%) |
| B | JNJ | MKT | 2,000 | 100@62.16 (97%) |
| S | SNI | MKT | 1,020 | 100@45.50 (64%) |
| B | T | MKT | 12,636 | 100@28.72 (85%) |

Buy and Sell buttons launch an order in the Block Market only

Search Bar allows the user to see current market data for symbols not on the Switch Board

SEARCH: MSFT
(800) 680-7473

| SYMBOL | BID |
|---|---|
| MSFT | 24.60 |

CANCEL ALL

FIG. 33A

Events shares important information about
how Pipeline is handling your order

Tactic displays the algorithmic style that is
active, with the tactical limit price when
applicable

| TACTIC | R G/L | U G/L | T G/L | CXL |
|---|---|---|---|---|
|  | -3 | 26 | 23 | X |
| Opportunist (69.95) | -1 | -5 | -6 | X |
| Peg (18.38) | -12 | 64 | 52 | X |
| Hidden (37.80) | 3 | -9 | 12 | X |
| Dark (56.91) | 13 | -3 | 10 | X |
| Passive (62.05) | -24 | 0 | -24 | X |
| Participate (45.60) | 13 | -3 | 10 | X |
| Stealth(28.69) | -27 | -2 | -29 | X |

Cancel cancels out of both the
Switching Engine and the Block
Market

R G/L, U G/L and T G/L track
implementation shortfall in Realized,
Unrealized and Total Gain / Loss. Based
on arrival price and displayed in basis
points

| FILLED | AVG PX | OMS TOTAL |
|---|---|---|
| 25,000 | 52.9872 | 1,000,000 |

COLUMNS                MENU ← Menu gives you access to
configuration screens

FIG. 33C

Contra Alert indicates that a large block contra is available now in Pipeline at the midpoint

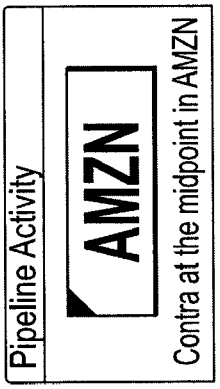

Contra at the midpoint in AMZN

Rate of Aggression allows you to choose a speed for the Switching Engine
  1. Trickle: 5-15%
  2. Moderate: 15-25%
  3. Aggressive: 25-40%

% of volume while order is live

Fast Forward sweeps across displayed and dark markets for virtually all liquidity at the current Best Bid/Offer (BBO). It continues to capture any liquidity that immediately refreshes at the same BBO until your order is completed, or the market stabilizes at a new BBO

Liquidity Alert indicates that a large block contra is assembled in Pipeline at the offer

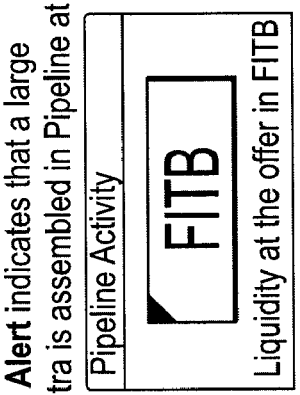

Liquidity at the offer in FITB

FIG. 33D

Filter hides orders that are no longer eligible for more fills on pipeline
Switching Matrix displays real-time strategies and markets chosen by the Switching Engine
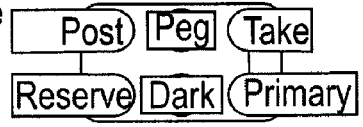
Gear button gives you drop-down access to all of your Alpha Pro strategies
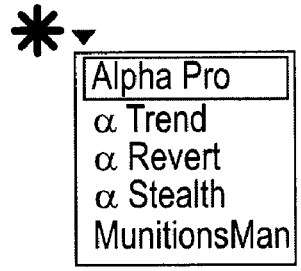
FIG. 33E

Block Color Descriptions

Pipeline uses different colors and patterns inside and around the blocks to give you information about orders in Pipeline.

| | | |
|---|---|---|
| Block with a black "dog-ear" in upper left hand corner | CSCO | A block with a black "dog-ear" indicates that it is a symbol pulled from your OMS |
| Orange block | EBAY | A symbol where there has been recent, reasonably priced order activity<br>Activity Alert: Block B/S order for EBAY in Pipeline |
| Block with solid green border | H | A symbol where you have an active buy order |
| Block with hashed green border | MOT | A symbol where you have a buy order that is limited away and is not executable at the midpoint |
| Block with solid red border | TX | A symbol where you have an active sell order |
| Block with hashed red border | ORCL | A symbol where you have a sell order that is limited away and is not executable at the midpoint |
| Yellow block | TWX | A symbol where there is a passive contra to your active order. Clicking on the yellow symbol displays you trade options with that contra<br>Activity Alert: Contra at the Offer in TWX |
| Black block - Contra Targeting | AMZN | A symbol where there is a possible block-sized contra party at the midpoint. Clicking on the black symbol displays your trade options with that contra<br>Activity Alert: Contra at Midpoint in AMZN |
| Yellow block - Liquidity Builder | FITB | A symbol where a large block can be assembled. Click on it to lock in a large block trade at the NBBO or better<br>Activity Alert: Liquidity at the Offer in FITB |
| Gray block with diagonal red hash | GM | A symbol where there is a discrepancy between the quantity Pipeline expected to find in your OMS and what it actually found. You can look at the Event Log for more detail or call the Help Desk at 1-800-680-PIPE (7473) |
| Blue block | TWX | There has been a recent cross in this symbol in the Block Market<br>Activity Alert: Block of TXW traded in Pipeline |
| Block with blue exclamation point | ! INTC | A symbol where you have an order with an Alert. When you see the Alert icon ( ! ), check the Alerts column in your Switch Board for further information on that order |

FIG. 34

Flat avg. shortfall is 46 bps; Sample size=738

Flat avg. shortfall is 44 bps; Sample size=696

Flat avg. shortfall is 45 bps; Sample size=532

Flat avg. shortfall is 43 bps; Sample size=599

Flat avg. shortfall is 11 bps; Sample size=1,227

Flat avg. shortfall is 6 bps; Sample size=1,404

Flat avg. shortfall is 8 bps; Sample size=1,477

Flat avg. shortfall is -4 bps; Sample size=1,444

METHODS AND SYSTEMS RELATED TO SECURITIES TRADING

CROSS-REFERENCE TO RELATED APPLICATIONS

The present application claims the benefit of U.S. Provisional Patent Application No. 61/355,398, filed Jun. 16, 2010, and is a CIP of U.S. patent application Ser. No. 13/083,711, filed Apr. 11, 2011, which claims priority to U.S. Provisional Patent Application No. 61/322,637, filed Apr. 9, 2010. The entire contents of the above-listed applications are incorporated by reference in their entirety into the present disclosure.

INTRODUCTION

As an increasing number of traders turn to post-trade transaction cost analysis (TCA) to measure the quality of their executions, there has been an explosion in the number of TCA product offerings within the financial services sector. However, to date, all of these TCA products have focused on an "after-the-fact" analysis of various measurements of the trading costs that can be attributed to a particular trade, group of trades, a trader, a firm, etc. In addition, historical TCA offerings have lacked sophistication, having been largely limited to benchmark comparisons with large groups of trades based on fairly generic criteria (for example, breaking down averages into buckets by trade size or listing). While these broad and generic comparisons are very common, more often than not they are at best not helpful and at worst counter-productive, as illustrated by the following examples:

- The variation in implementation shortfall (IS) performance of different traders on a desk is dominated by differences in their order flow. In contrast, the VWAP benchmark creates arbitrary incentives: it encourages risk-averse traders to spread smaller trades over the day regardless of the urgency of each trade, and for large trades creates an incentive to front-load the execution profile or use buying power to defend price levels to "game" the benchmark. Both practices increase average shortfalls.
- Evaluating algorithms based on IS favors algorithms that tend to be used with a tight limit (and therefore can only execute if the market is favorable); paradoxically, the use of tight limits is most common for less-trusted, aggressive algorithms where the trader feels the need for the limit as a safety protection. Vice-versa, the best and most trusted algorithms that traders prefer to use for difficult non-discretionary market orders will never end up at the top of an IS ranking in universe comparisons.
- Negotiated block crossing networks have zero shortfalls by definition but leave the trade unfilled when there is no natural contra; opportunistic algorithms and "aggressive in the money" strategies benefit from a similar selection bias. The practice of selectively executing the trades for which a natural contra is available is a great way to win a place at the top of broker rankings.
- Universe comparisons of institutional managers promotes the practice of canceling orders in the most difficult trades where the stock is running away, or increasing the size of easier trades. In cases where trade-day performance is correlated to long-term residual alpha, this practice damages the fund's information ratio.

And while TCA based on these ineffective and generic comparisons has become the norm, it is fundamentally limited in its scope because at its foundation it is a static, "backwards-looking," and often highly generic, not to mention one-dimensional, assessment of cost. As a result, even though traders are constantly required to make numerous decisions and weigh countless variables, all of which will have a dramatic impact on the quality and cost of an execution, this very basic and generic foundation of traditional TCA has neither accounted for all of these variables and decisions nor has it offered any tools that allow traders to better assess the impact of their choices or to understand the effect of their decisions in different situations.

For example, on a daily basis, traders need to choose between aggressive and opportunistic (less aggressive) trading strategies. Using the right limit price in relation to the information in a trade can enhance execution quality by selecting execution price points that are more attractive to a given target. Using more patient trading strategies can help reduce impact costs. But if the limit price or speed selection is too passive, it will delay the execution and result in substantial delays and opportunity costs. Other important variables include but are not limited to the optimal choice of algorithm, trading speed, trading venue, order size, time of order entry, time in force etc. Yet while the calculation behind traditional TCA products may penalize a trader for making the wrong choices in any of these selections, they offer no method for understanding the impact of a given choice or suggesting what would have been a better choice.

Furthermore, as explained in greater detail below, because traditional TCA products have neither leveraged the use of predictive analytics nor taken into account an analysis of what the market in a stock would have looked like had the trade or trades in question not occurred (e.g., whether the observed price movements were due to the trading activity associated with the trade in question or to exogenous market events), these static TCA offerings based on generic benchmark comparisons are often unhelpful if not counter-productive.

More specifically, the compromise between impact and opportunity costs requires an understanding of the urgency of the trade, or "short-term alpha." Post-trade analysis too often defines short-term alpha as the average realized returns from the start of trading, ignoring the fact that a large part of this return is caused by market impact from the trade in question. A trader who believes his orders have high urgency will tend to trade aggressively, which causes more impact and therefore reinforces the perception of short-term alpha. The urgency of a trade depends ultimately on the stock's expected performance without executing the trade—or the impact free price estimation.

What has been lacking in the prior art are one or more TCA tools that can help traders understand the costs associated with their trades in a way that decomposes the various components responsible for trade execution outcome, included but not limited to estimating the components of implementation shortfall, which includes but is not necessarily limited to alpha loss, an algorithm's impact, adverse selection and opportunistic savings; as well as the trade-offs associated with the speed of execution, participation rates and limit prices. At least some of such tools would preferably also be capable of adjusting (and reflecting this adjustment) the realized returns for the estimated impact of the execution in question. This adjustment is preferred in order to identify the correct compromise between impact and opportunity, because making the correct inferences entails being able to identify how the price of the stock would have behaved if no trade had taken place. Although not always required, if this step is not taken, the results of the analysis may be spurious, making one believe that the orders require more urgent execution than they actually do. One or more of these tools may also offer the ability to accurately estimate the hypothetical cost that would have been incurred had a different strategy been chosen.

By way of a specific example that shows how one or more exemplary embodiments provide improvements over the prior art, FIG. 36 shows an example of how to decide the optimal trading speed: is it the 20% participation rate that the customer has chosen or an alternative 10% participation rate? The y axis of FIG. 36 is Profit/(Loss) in basis points. The x axis is time. The customer chose a 20% participation rate, and one observes the P/(L) of 20%. The customer has a loss of 15 bps.

Would the customer have had a lower loss if he had picked a 10% participation rate? To answer that question entails simulating the P/(L) the customer would have gotten if the customer had picked the 10% participation rate.

And for that one may:

i) take the observed prices (curve with the triangles);

ii) subtract from observed prices the impact of the execution at 20% to see what the impact-free price is (see dotted curve for Alpha Loss);

iii) calculate the average impact-free price for the execution at 10% (still on the dotted curve for Alpha Loss, but going further to the right in time because an execution at 10% takes more time than an execution at 20%);

iv) to get the P/(L) at 10% one then needs to add to the impact-free price the impact of the execution at 10%

If one did not take impact into account, the only thing that one would notice is that 10% takes more time, and if the stock moves away the customer will incur more losses. If the impact is not taken into account, one will not see how much is saved in impact by lowering the speed. Indeed, in this particular case of FIG. 36, what the customer lost in terms of impact is more than compensated for by what he gains by getting the order done earlier. But the size of the cost and benefits could have been different and the only way to know is by calculating both.

Or, in other words, transaction cost analysis is based on historical data in which what is observed is to some extent affected by the customer's strategies. To make a good assessment of alternative strategies, one may wish to first subtract out the impact of those strategies to then be able to simulate accurately alternative strategies. This applies not only to speed and participation rate analysis but also to limit price analysis.

And finally, in addition to the improvements noted above, one or more exemplary embodiments described herein may also offer the ability to "mine" and analyze historical execution data in a way that actually helps traders interpret their execution data in a manner that is useful for future trade decisions.

Therefore, in order to address these and other limitations of existing TCA products, one or more exemplary embodiments change traditional transaction cost analysis from a static, backward-looking and generic benchmark comparison to a customized, interpretive and dynamic analysis that can analyze and decompose past trades in a way that reflects the range of variables that drive execution outcomes, educate traders as to how their decisions impacted execution outcome, offer specific guidance on how past trades and/or past trade-related decisions could have been improved, and, in some embodiments, using this analysis can either suggest or assign optimal trading strategies for new orders.

Certain exemplary embodiments not only analyze and decompose various components of the execution outcomes associated with a given trade (see, for example, the section herein entitled "Implementation Shortfall Decomposition for Market Orders), but also mine and analyze trade execution data in order to identify characteristics within the orders/trades being analyzed in the form of "trade profiles" that can then be used to classify and manage new orders.

In addition, certain exemplary embodiments also offer the ability to determine what would have been the most appropriate speed(s) and limit price(s) for a particular trade or trades through evaluations of the choices that were made and simulations of alternative choices that could have been made (for examples, see the sections herein entitled "Implementation Shortfall Decomposition for Market Orders," "Exemplary Analysis of Trade Profile," and "Exemplary Report Regarding Trade Profile and Execution Performance," in addition to FIGS. 44-56).

Certain embodiments also use this dynamic historical analysis and the identification of trade profiles in combination with the analysis of optimal execution speed and limit prices to aid in the identification of optimal trading strategies for new orders. Some embodiments may be used to automatically allocate trading strategies to trade profiles and carry out an execution plan (see, for example, U.S. patent application Ser. No. 13/070,852, filed Mar. 24, 2011, and incorporated herein by reference).

In certain exemplary embodiments, incoming orders are analyzed in light of current market conditions and historical patterns identified through the types of analysis described above, factors most likely to predict impact-free price movement are identified, and an "alpha profile" is assigned to the order. To generate this alpha profile in real-time, one or more exemplary embodiments analyze many (typically, hundreds of) drivers coming from both fundamentals and technical information. These drivers include but are not limited to how the market reacts to news, momentum since the open, overnight gaps, and how a stock is trading relative to the sector. Taking these statistical factors into account, the service then recommends a trading strategy predicted to maximize alpha capture and minimize adverse selection. The trader can then manually initiate trading or can enable the system to automatically initiate the execution of the trade using the strategy recommendation.

As the trade proceeds, the analytics stream provides updates to one or more users on changes in the alpha outlook, leveraging market feedback from the execution process and feeds including news and real-time order flow analysis. Furthermore, the system constantly looks at differences between the results predicted by the strategy and the actual results. For example, impact anomaly is the difference between actual return and expected return given a pre-trade model. One or more exemplary embodiments of the system may also use predictive switching between algorithms and across venues to minimize implementation shortfall and find liquidity as the trade proceeds.

In addition, one or more exemplary embodiments of the systems and methods described herein give traders an unprecedented amount of information and control regarding the process and operation of the subject system. Most execution platforms on the market today operate as "black boxes": a trader enters an order, but he is given little to no information about how the system processes the order or how it is being executed. While this may protect the trade secrets that drive the operation of the "black box," traders do not like this lack of information and control. Traders want to understand what is going on with the market and their order, especially if the opinion they form about an order differs from the classification produced by a quantitative system. For example, a black box might tell a trader that a given trade is a high urgency trade, but then does not tell him why. Without knowing why the black box is recommending urgency, it is impossible for the trader to understand how to incorporate the system's information into his own thinking in order to take control of the execution.

In order to reconcile these kinds of differences and to have confidence in a "black box," a trader needs to be able to see the factors that drive the quantitative analysis to reconcile the two viewpoints. To address these limitations in the prior art, one or more exemplary embodiments of the subject system employs a graphical interface that provides users with unique insight into the factors behind the strategy assignment and selection for a given order. Then once the system begins to execute an order, an interface may also be used to allow traders to maintain unprecedented control over the system's automated trade execution. At any time, a trader may change speeds, grab a block, or change strategies, thereby allowing him to modulate the system's recommended strategy and actual order executions with his knowledge of factors driving optimal execution strategy.

One exemplary aspect comprises a method comprising: (a) receiving electronic data describing an executed trading order in a market traded security and related trade execution data; (b) calculating with a processing system an impact-free price estimate which estimates a price of the market traded security if the executed trading order had not been executed, wherein the impact-free price estimate is based in part on the data describing the executed trading order; and (c) transmitting data sufficient to describe the impact-free price estimate; wherein the processing system comprises one or more processors.

In one or more exemplary embodiments: (1) the related trade execution data comprises a list of executed fills and partial fills; (2) the list of executed fills and partial fills comprises symbol, price, and time of each fill or partial fill; (3) the calculating with a processing system an impact-free price estimate comprises comparing each fill and partial fill to one or more prevailing market quotes at the times of the fills and partial fills; (4) the method furtherr comprises classifying each fill or partial fill as a passive, aggressive, or intra-spread execution; (5) the calculating with a processing system an impact-free price estimate comprises calculating an estimated accrued price impact based on estimating price impact accrued to a tape transaction time for each fill or partial fill; (6) the calculating with a processing system an impact-free price estimate comprises calculating, for a buy trade, a difference between an observed price and an estimated accrued price impact; (7) the calculating with a processing system an impact-free price estimate comprises calculating, for a sell trade, a sum of an observed price and an estimated accrued price impact; and (8) the data sufficient to describe the impact-free price estimate comprises data sufficient to display one or more actual market prices and corresponding impact-free price estimates.

At least one other exemplary aspect comprises a method comprising: (a) receiving electronic data describing an executed trading order and related trade execution data; (b) calculating with a processing system an impact-free price estimate which estimates an execution price of the executed trading order if the executed trading order had been executed without market impact, wherein the impact-free price estimate is based in part on the data describing the executed trading order; and (c) transmitting data sufficient to describe the impact-free price estimate; wherein the processing system comprises one or more processors.

At least one other exemplary aspect comprises a method comprising: (a) receiving electronic data describing an executed trading order and related trade execution data; (b) calculating with a processing system an expected execution price of the executed trading order if the executed trading order had been executed using a specified algorithm, wherein the expected execution price is the sum of: (1) an impact-free price estimate based in part on the data describing the executed trading order, and (2) estimated market impact given the specified algorithm; and (c) transmitting data sufficient to describe the impact-free price estimate; wherein the processing system comprises one or more processors.

At least one other exemplary aspect comprises a method comprising: (a) receiving electronic data describing a potential trading order in a market traded security and related market data; (b) calculating with a processing system an impact-free price estimate which estimates a price of the market traded security if the potential trading order were not to be executed, wherein the impact-free price estimate is based in part on the data describing the potential trading order; and (c) transmitting data sufficient to describe the impact-free price estimate; wherein the processing system comprises one or more processors.

In one or more exemplary embodiments: (1) the data sufficient to describe the impact-free price estimate comprises an alpha profile; (2) calculating the impact-free price estimate comprises calculation of an average market impact; (3) calculating the impact-free price estimate comprises calculation of incremental impact from fills of portions of the potential trading order; (4) calculating the impact-free price estimate comprises calculation of incremental impact from fills of portions of the potential trading order that take place in specified time segments, and reversion from activity in prior time segments; (5) calculating the impact-free price estimate comprises calculation of net results of price effects of trading portions of the potential trading order during specified time segments; (6) calculating the impact-free price estimate comprises calculation of accrued price impacts for the potential trading order during specified time intervals; (7) calculating the impact-free price estimate when the potential trading order is a buy order comprises subtraction of an accrued price impact from a fill price for each time interval that contains that fill; and (8) calculating the impact-free price estimate when the potential trading order is a sell order comprises addition of an accrued price impact to a fill price for each time interval that contains that fill.

At least one other exemplary aspect comprises a method comprising: (a) receiving electronic data describing a potential trading order and related market data; (b) calculating with a processing system an impact-free price estimate which estimates an execution price of the potential trading order if the potential trading order were to be executed without market impact, wherein the impact-free price estimate is based in part on the data describing the potential trading order; and (c) transmitting data sufficient to describe the impact-free price estimate; wherein the processing system comprises one or more processors.

At least one other exemplary aspect comprises a method comprising: (a) receiving electronic data describing a potential trading order and related market data; (b) calculating with a processing system an expected execution price of the potential trading order if the potential trading order were to be executed using a specified algorithm, wherein the potential execution price is the sum of: (1) an impact-free price estimate based in part on the data describing the potential trading order, and (2) estimated market impact given the specified algorithm; and (c) transmitting data sufficient to describe the impact-free price estimate; wherein the processing system comprises one or more processors.

At least one other exemplary aspect comprises a method comprising: (a) receiving electronic data describing a potential trading order and related market data; (b) calculating with a processing system an expected execution price of the potential trading order if the potential trading order were to be executed using a specified algorithm, wherein the potential execution price is the sum of: (i) an impact-free price estimate based in part on the data describing the potential trading order, and (ii) estimated market impact given the specified algorithm; and (c) commencing execution of the potential trading order using the specified trading algorithm; wherein the processing system comprises one or more processors.

At least one other exemplary aspect comprises a method comprising: (a) receiving electronic data describing an executed trading order in a market traded security and related trade execution data; (b) calculating with a processing system one or more components of execution costs associated with execution of the executed trading order; and (c) transmitting data sufficient to describe the one or more components of execution costs associated with execution of the executed trading order; wherein the processing system comprises one or more processors.

In one or more exemplary embodiments: (1) the data sufficient to describe the one or more components of execution costs is received by a user terminal and displayed via a graphical user interface; (2) the graphical user interface displays the data sufficient to describe the one or more components of execution costs in a format that shows values of one or more of the components; (3) the graphical user interface displays the data sufficient to describe the one or more components of execution costs in a format that shows relative values of two or more of the components; (4) the one or more components of execution costs associated with execution of the executed trading order comprise alpha loss; (5) the one or more components of execution costs associated with execution of the executed trading order comprise market impact; (6) the one or more components of execution costs associated with execution of the executed trading order comprise alpha capture; (7) the one or more components of execution costs associated with execution of the executed trading order comprise adverse selection; (8) the one or more components of execution costs associated with execution of the executed trading order comprise opportunistic savings; (9) the one or more components of execution costs associated with execution of the executed trading order comprise speed impact; (10) the one or more components of execution costs associated with execution of the executed trading order comprise limit savings; (11) the one or more components of execution costs associated with execution of the executed trading order comprise opportunity cost; (12) the one or more components of execution costs associated with execution of the executed trading order comprise spread; and (13) the one or more components of execution costs associated with execution of the executed trading order comprise profit/loss.

At least one other exemplary aspect comprises a method comprising: (a) receiving electronic data describing an executed trading order in a market traded security and related trade execution data; (b) calculating with a processing system cost effect of one or more trade decision factors associated with execution of the executed trading order; and (c) transmitting data sufficient to describe the cost effect of one or more trade decision factors associated with execution of the executed trading order; wherein the processing system comprises one or more processors.

In one or more exemplary embodiments: (1) the one or more trade decision factors associated with execution of the executed trading order comprise limit price; (2) the one or more trade decision factors associated with execution of the executed trading order comprise choice of algorithm; (3) the one or more trade decision factors associated with execution of the executed trading order comprise level of aggression; (4) the one or more trade decision factors associated with execution of the executed trading order comprise choice of broker; (5) the one or more trade decision factors associated with execution of the executed trading order comprise participation rate; (6) the one or more trade decision factors associated with execution of the executed trading order comprise speed of execution; (7) the one or more trade decision factors associated with execution of the executed trading order comprise choice of manual versus automated execution; and (8) the one or more trade decision factors associated with execution of the executed trading order comprise choice of trading strategy.

At least one other exemplary aspect comprises a method comprising: (a) receiving electronic data describing an executed order in a market traded security and related trade execution data; (b) calculating with a processing system a decomposition of execution of the executed limit order into at least a first group of components and a second group of components, the first group of components being related to algorithm performance and the second group of components being related to trader-input parameters for the executed order; and (c) transmitting data sufficient to describe the first group of components and the second group of components; wherein the processing system comprises one or more processors.

In one or more exemplary embodiments: (1) the trader-input parameters comprise level of aggression parameters; (2) the trader-input parameters comprise limit order parameters; (3) the trader-input parameters comprise trading speed; (4) the trader-input parameters comprise participation rate; (5) the data sufficient to describe the first group of components and the second group of components is received by a user terminal and displayed via a graphical user interface; (6) the graphical user interface displays the data describing the first group of components and the second group of components in a format that shows relative values of two or more components in the first group of components and the second group of components; (7) the graphical user interface displays relative values of choices of participation rate and limit price; (8) the graphical user interface displays relative values of selected speed and benchmark speed level; (9) the graphical user interface displays relative values of market impact and alpha capture; and (10) the graphical user interface displays relative values of limit price savings and opportunity costs.

At least one other exemplary aspect comprises a method comprising: (a) receiving electronic data describing an executed trading order in a market traded security and related trade execution data; (b) calculating with a processing system one or more components of implementation shortfall associated with execution of the executed trading order; and (c) transmitting data sufficient to describe the one or more components of implementation shortfall associated with execution of the executed trading order; wherein the processing system comprises one or more processors.

At least one other exemplary aspect comprises a method comprising: (a) receiving electronic data describing an executed trading order in a market traded security and related trade execution data; (b) calculating with a processing system one or more components of profit/loss associated with execution of the executed trading order; and (c) transmitting data sufficient to describe the one or more components of profit/ loss associated with execution of the executed trading order; wherein the processing system comprises one or more processors.

At least one other exemplary aspect comprises a method comprising: (a) receiving electronic data describing an executed trading order in a market traded security and related trade execution data; (b) calculating with a processing system one or more components of execution outcome associated with execution of the executed trading order; and (c) transmitting data sufficient to describe the one or more components of execution outcome associated with execution of the executed trading order; wherein the processing system comprises one or more processors.

Other aspects and embodiments comprise related computer systems and software, as will be understood by those skilled in the art after reviewing the present description.

BRIEF DESCRIPTION OF THE DRAWINGS

FIG. 13 depicts a comparative graph of optimal trajectories in function of transactional time for different values of risk aversion.

FIG. 14 depicts a comparative graph of cost optimal trajectories in function of transactional time.

FIG. 34 provides an exemplary block color description.

DETAILED DESCRIPTION OF SELECT EXEMPLARY EMBODIMENTS

Figure 1:
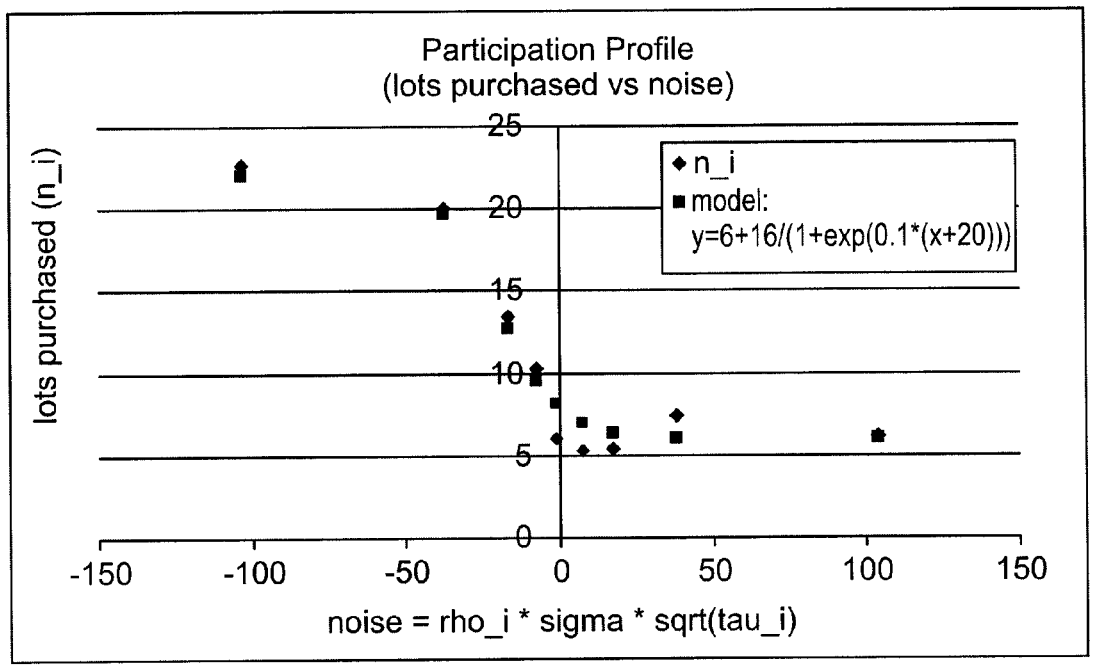
FIG. 1 depicts an exemplary participation profile.

At least one exemplary embodiment comprises a system and method for calculation, application, and display of an "impact free" price estimation on an executed trade or group of trades for the purposes of analyzing/judging the quality of the executed trade(s) and/or making and/or aiding in the selection of a trading strategy for a new trade order(s).

In an exemplary embodiment, a user provides data for an impact-free price estimation, including a list of executed partial fills giving the symbol, price, and time of every fill. This data may be automatically loaded from a database or spreadsheet by selecting the trade from a drop list. Tools known in the art for identifying the relevant trade from a set of trades (searching by date, symbol, etc.) may be provided for ease of use.

Having selected a trade of interest, the user may request from the system an impact-free price estimation using action buttons known in the art of user interface design. In a subsequent exemplary step, the system may compare each partial fill to prevailing market quotes at the time of the fill to classify each fill, distinguishing passive executions (buy on the bid or sell on the offer), aggressive executions (buy on the offer or sell on the bid) and intra-spread executions such as midpoint fills from dark pools.

Exemplary algorithms that may be used for this classification are known in the art. See, for example, "Imbalance Vector and Price Returns," Nataliya Bershova, Christopher R. Stephens, and H. Waelbroeck, (paper submitted to J. Financial Markets; copy included in U.S. Prov. App. No. 61/322, 637, which is incorporated herein by reference), and "Relating Market Impact to Aggregate Order Flow: The Role of Supply and Demand in Explaining Concavity and Order Flow Dynamics," Christopher R. Stephens, Henri Waelbroeck, Alejandro Mendoza (dated Nov. 20, 2009, and posted to the Social Science Research Network working paper series website (http://papers.ssrn.com/sol3/papers.cfm?abstract_id=1511205) on Nov. 22, 2009; copy included in U.S. Prov. App. No. 61/322,637, which is incorporated herein by reference).

In a third exemplary step, the system may estimate price impact accrued to the time of each tape transaction from the classified fills data and the tape data, as will be described in further detail below.

In a fourth exemplary step, the system may estimate corrected market prices that would have been observed had the price impact not existed, proceeding as follows. For a buy trade, the impact-free price associated with each market transaction is the difference between the observed price and the estimated accrued price impact; for a sell trade, the impact-free price is the sum of the observed price and the estimated accrued impact.

In a fifth exemplary step, the system displays to the user the actual market prices and the hypothetical impact-free prices that would have occurred had the trade not been executed. In an exemplary embodiment these price series may be represented graphically using charts with time on the x-axis and price on the y-axis, as is known in the art. See below for a description of an exemplary system display to a user, where the term "alpha" is used to represent and refer to the calculation of impact free price.

An exemplary embodiment further enables a user to select a group of trades, such as, for example, all trades executed in May whose size was between 1% and 5% of the average daily volume in the stock, using forms known in the art of user interface design.

Having selected a set of trades, the user is enabled to request an average impact-free return estimation regarding the impact-free price for this set of trades.

In this step, the system may estimate impact free prices for each trade individually as described herein, then perform the additional step of estimating the average impact free price as follows.

In step "4a" the impact-free price returns of each stock from the midpoint at the start of the trade may be calculated in the following manner: for each print, the return (in basis points) is defined as 10,000 times the natural logarithm of the ratio of the impact-free price of this print to the starting price, multiplying by (−1) for sell trades.

In step "4b" the average and standard deviation of these returns may be calculated, as the average and standard deviation of the return at the first print following the end of minutely time periods counted from each trade start. The user may be enabled to specify whether this average return should be calculated as a flat average, in which case each trade in the selected set is given the same weight, or as a value-weighted average, in which case each return in the average is weighted by the value of the realized trade.

In this exemplary embodiment, the graphic display of impact-free price may be replaced by a similar graphic display of the impact free returns as a function of time. This description may refer to the chart of impact-free returns and standard deviation versus time from trade start below as the impact-free returns profile.

In an exemplary embodiment, the user may be further enabled to test an alternate trading strategy or schedule. In this embodiment, the user selects an alternate strategy or schedule from a drop list. Examples of a set of strategies that may be found in such a drop list include participation at 5%, 10%, 15%, 20%, etc. Another example includes a front-loaded strategy such as those known in the art. As an example, see "Optimal Execution of Portfolio Transactions," Robert Almgren and Neil Chriss, J. Risk 3, pp. 5-39 (2000) (preprint dated Apr. 8, 1999 included in U.S. Prov. Pat. App. No. 61/322,637, which is incorporated herein by reference), and other common "benchmark" strategies such as AVWAP, TWAP, MarketOnClose, etc. Descriptions of such benchmarks can be found in reference texts on the subject—see, for example, "Optimal trading strategies," R. Kissell and M. Glantz, AMACOM (2003).

In this exemplary embodiment, the system may estimate hypothetical prices for executing the alternate strategies in two steps. First, the trading time may be broken down into time intervals (for example, 5 minute intervals). In each interval, the number of shares that would have been filled using the alternate strategy is estimated knowing the tape volume and selected benchmark schedule. For example, if the user had chosen 5% participation, then the number of shares filled in a 5-minute interval would be 5% of the tape volume in that interval.

Second, the price impact of these hypothetical fills may be calculated using one of the methods described below for estimating impact-free price, but in reverse.

Third, the estimated prices using the alternate strategy may be estimated by adding the impact to the impact-free price. This embodiment may further enable a user to view the estimated cost of the execution using the alternate strategy, and corresponding savings or additional cost. This embodiment may also enable a user to specify a different limit price; to estimate the hypothetical prices in presence of an alternate strategy and limit price the system proceeds as above but assumes only those fills that are within the limit price would actually occur; the reduced set of fills may be used to estimate impact of the alternate strategy. Since the limit price may prevent the trade from executing in full, the number of shares filled by the alternate strategy may be displayed to the user in addition to the total cost, and the additional cost required to execute these unfilled shares at the final price may be displayed as opportunity cost associated with this choice of limit price.

In another exemplary embodiment, the system may further enable a user to initiate an automated search for groups of trades that have specific impact-free returns profiles, by selecting a profile from a drop list.

Examples of impact-free return profiles include but are not limited to "high alpha" profiles, where the impact-free returns are positive and larger than a given threshold, "negative alpha" profiles associated with negative values of the impact-free returns, or "reversion" profiles where the impact-free return has an inverted U shape exhibiting positive impact-free returns up to some point followed by reversion back to an aggregate impact-free return that becomes close to or less than zero by the end of the trading day.

In this exemplary embodiment, the system may use historical data about trades from the user, and utilize predictive data mining methods known in the art to classify the historical trades as more likely or less likely to exhibit the requested profile, given available predictive drivers. Such drivers may include the variables that are available for the users in specifying a group of trades (in the example mentioned above, size as a percentage of average daily volume) but also drivers that are calculated using market data, data about the issuer, and other sources of information (news, earnings announcements, time of day, portfolio manger's name, fund name, trader name, urgency instruction from portfolio manager, and other relevant information that can be imagined by those skilled in the art).

In this embodiment the system may display to the user each class by the drivers and values used to define the class, and show the impact-free returns profile in each class.

In an exemplary embodiment of a system that enables a classification of trades by impact-free returns profiles, the system may be further connected to real-time trade data using data feed handlers as known in the art, and enable a user to request a predicted impact-free returns profile for a hypothetical or real order to buy or sell a certain amount of stock in a given security. In this embodiment, the value(s) of all the drivers may be calculated from the data feeds in the first step; the classification model may then be used in a second step to classify the order, and a corresponding impact-free returns profile displayed to the user.

In another embodiment, the system may automatically associate an optimal trading strategy to each impact-free returns profile, selecting for this purpose a strategy that minimizes the cost of the proposed alternate strategy, as described above. For the purposes of this description the terms strategy and algorithm, while not identical in meaning, may sometimes be used interchangeably.

In another embodiment, the impact estimation may be done using mathematical models that take into consideration costs associated with information leakage, and the optimal trading strategy may be determined using an optimization program such as dynamic programming or simulated annealing to minimize a risk-adjusted cost function, as explained below under the section entitled "Optimal Execution of Portfolio Transactions: The Effect of Information Leakage" (see also "Optimal Execution of Portfolio Transactions The Effect of Information Leakage," Adriana M. Criscuolo and Henri Waelbroeck (copy included in U.S. Prov. Pat. App. No. 61/322,637, which is incorporated herein by reference).

While the basic theory explaining impact from arbitrage arguments is known in the art of arbitrage mathematics (see "The Market Impact of Large Trading Orders: Predictable Order Flow, Asymmetric Liquidity and Efficient Prices," J. Doyne Farmer, Austin Gerig, Fabrizio Lillo, and Henri Waelbroeck; (copy included in U.S. Prov. Pat. App. No. 61/322,637, which is incorporated herein by reference; a version is available at http://www.haas.berkeley.edu/groups/finance/hiddenImpact13.pdf)), its application to optimal execution is innovative as described in detail herein. In an exemplary embodiment, the method may also be applied to matching optimal execution profiles to classes of trades with specific impact-free returns as explained in more detail below.

Other methods for matching optimal execution strategies to impact-free returns profiles will be envisioned by those skilled in the art. An embodiment may further include an interface to a trade execution system, enabling a user who has requested an impact-free returns profile to initiate the execution of an optimal execution strategy. This may be done by means of a FIX interface to deliver an order to a trading server, as is known in the art.

In certain embodiments involving a classification of trades by their impact-free returns profile, the system may also identify hypothesis validation conditions that statistically validate or reject the class membership hypothesis in the course of execution.

For example, even though a trade may have been classified as likely to have a flat returns profile (no price movement other than the impact of the trade), if the price in fact increased by more than 40 basis points within the first 15 minutes, this may imply that further impact-free price increases are more likely than a reversal. If this were the case, such an observation would therefore invalidate the initial class membership prediction (flat returns profile) and replace it by another (rising price trend).

While exemplary embodiments of the system can be used as a stand alone offering per the above-described embodiments; it also may be used in embodiments that combine the functionality of the system with functionality covered in the patent applications listed below to enable dynamic use of impact free price estimation in a trade execution platform.

These embodiments may apply the system's ability to associate optimal trading strategies with impact free price estimations in a dynamic setting whereby the impact free price estimation is used first as a filter to help determine the best trading strategy for a given order (see, for example, U.S. patent application Ser. No. 13/070,852, filed Mar. 24, 2011, incorporated herein by reference), then may, in conjunction with hypothesis validation conditions, enable the subject system to monitor its ongoing confidence in its strategy recommendation on a real time basis and automatically switch to different execution strategies when needed (see, for example, U.S. patent application Ser. No. 11/783,250 (Pub. No. 2008/0040254), incorporated herein by reference—in particular, paragraph 0055).

In addition the system may also be used in conjunction with a block execution platform as a mechanism for providing feedback for management and placement of block orders (see, for example, U.S. patent application Ser. No. 12/463,886 (Pub. No. 2009/0281954), incorporated herein by reference, and U.S. patent application Ser. No. 12/181,028 (Pub. No. 2009/0076961), incorporated herein by reference, as well as the electronic signal notifications for order activity and price protection (see, for example, U.S. Pat. App. No. 12/181,117 (Pub. No. 2009/0089199), incorporated herein by reference, and U.S. patent application Ser. No. 12/419,867 (Pub. No. 2009/0259584), incorporated herein by reference. Finally, embodiments of the system may also be used in conjunction with the risk classification system taught by U.S. patent application Ser. No. 12/695,243 (Pub. No. 2010/0153304), incorporated herein by reference.

Exemplary Impact Free Price Estimation Embodiments

To estimate impact it is useful to capture the fact that most trades are broken down into segments, each of which involves a relatively homogeneous intended participation rate, where segments may or may not be separated by quiet periods with no trading. Research involving data from executed trades shows that impact grows non-linearly during a segment, and reverts exponentially after the completion of a segment that is followed by a quiet period. The following describes exemplary embodiments enabling an estimation of the average market impact by splitting each trade into segments and further breaking down the timeline into 5-minute intervals.

In a first step the number of shares filled in each 5-minute interval may be calculated, and this may be further refined into a number of shares filled passively, aggressively, and inside the spread.

In a second step, the incremental impact from the fills in the segment may be added and reversion from activity in prior segments subtracted, to obtain the net price effects. The incremental impact from fills in the segment may be given for example by a parametric model as follows $$E(I_t) = a\nu\pi^\delta (Q_t/ADV)^{\alpha-1}(MktCap[\%])^{-\eta}$$

Where $\pi$ is the participation rate, the impact factor a and exponents $\alpha$, $\delta$, $\eta$ are parameters that may be estimated for different algorithmic trading styles as described below using methods known in the art of non-linear regressions for estimating exponents and taking care to control for selection bias; the shares filled up to time t are $Q_t$; $\nu$ is the stock's volatility and ADV is the average daily volume. The algorithmic trading style characterizes the manner in which an algorithm interacts with the market; this may be an algorithm name or aggression parameter provided by the client together with the fills data; or alternatively, it may be defined for example based on a clustering of aggregate metrics. Such metrics may include, for example, the percentage of prints by classification as aggressive, passive or midpoint. The aggregate metrics may also include short-term performance metrics. An example of such a style clustering analysis is described in Stephens and Waelbroeck, J. Trading, Summer 2009 and available at [www.alphascience.com/Portals/0/Documents/JOT_Summer_2009_Pipeline.pdf].

After a segment is completed, the impact contribution of the segment is the sum of residual temporary impact and permanent impact, as follows. Reversion is the difference between the segment impact at the end of the segment and this residual impact.

Temporary impact at the end of the trade may be estimated, for example, as ⅓ of the total impact. This form of impact decays exponentially. The exponential decay timescale may be estimated, for example, as $\tau=\tau_0+\kappa*LN(t_0+t[min])$ where $\tau_0=0$, $\kappa=4.34$, $t_0=3$ are parameters and the time t from the end of the segment is measured in minutes. Thus, t' minutes after segment completion, $$E(I, \text{end} + t') = E(I, \text{end})\left(1 - \frac{1}{3}\exp(-t'/\tau)\right)$$

Permanent impact may be estimated, for example, as ⅔ of total impact at the end of the segment. The manner in which permanent impact decays may itself be estimated as a power of elapsed tape volume. The decay exponent may be taken to be the same value $\delta$ as was introduced previously regarding the scaling of total segment impact to the participation rate. Thus, $$E(PI, \text{end} + t') = \frac{2}{3}E(I, \text{end})\left(\frac{\text{tape(start -> end)}}{\text{tape(start -> end} + t')}\right)^{0.4}$$

The accrued impact at time t may be calculated as the sum of the impact contribution of each segment.

Impact-free prices may be estimated for buys by subtracting the fill price by the accrued price impact up to the interval that contains each fill, or for sells by adding the accrued price impact.

In an alternate embodiment, the quantities inside the square root functions above may be calculated as a linear sum of weights times the quantity filled in passive, intra-spread, or aggressive executions; the three factors in this sum may be estimated using regression methods. Other embodiments including replacing the square root function with a different function or utilizing different parametric or non-parametric models in each of the steps outlined above may be easily envisioned by those skilled in the art.

Optimal Execution in Presence of Hidden Order Arbitrage

In order to enable an accurate estimation of the impact-free price for strategies with different execution speeds, it is useful to use an impact model that correctly accounts for the effect of execution speed on the cost of trading. As explained below, impact models known in the art fail to account for the possibility that arbitrage traders would be able to observe information about an algorithmic execution in the market data stream and trade on this information: if price were correctly explained by models known in the art, there would be risk-free profits available for such arbitrage strategies. Therefore it is the purpose of the present section to describe an exemplary impact model that is derived from a no-arbitrage argument, within a framework referred to herein as hidden order arbitrage theory.

The equations of hidden order arbitrage theory are a bit difficult to work with. Accordingly, to create a more readily implementable solution this description uses simplified versions in the impact model described above, using first-order expansions of some of the special functions that emerge from the theoretical framework.

It is also a purpose of this section to demonstrate how the framework of hidden order arbitrage theory enables one to calculate optimal execution solutions that minimize a risk-adjusted cost function or optimize performance relative to a VWAP benchmark.

Almgren and Chriss found that to maximize the risk-adjusted liquidation value of an asset it is optimal to trade fastest at the beginning of a trade. This result was based on simplifying assumptions including linear and stationary impact. Of these two assumptions, that of a stationary impact process is most clearly invalidated by observations: practitioners observe more price reversion after completing a long trade than a brief one. This portion of the description considers the optimal execution problem using a zero arbitrage argument for price formulation. Models and methods are described for dealing with a type of information arbitrage referred to herein as hidden order arbitrage.

Arbitrageurs detect the presence of hidden orders through the statistical properties of order flow on the market and formulate statistical models for future price and order flow imbalances. Competition between arbitrageurs keeps prices close to a level that fairly accounts for the information revealed in the order flow. When a hidden order stops, expectations of future order flow imbalances decay, and price reverts accordingly. This portion of the description explains that the shape of the impact function and subsequent reversion can be derived from the basic equations for hidden order arbitrage, the participation rate profile for executing a trade, and the statistical distribution of hidden order sizes. Numerical solutions to the optimal execution problem in the presence of hidden order arbitrage are provided.

This portion of the description considers the optimal execution of a large portfolio transaction that must be split into smaller slices and executed incrementally over time. There are many dimensions to this problem that are potentially important to the institutional trader: liquidity fluctuations, the news stream, and short-term alpha that may be associated with a fund manager's order origination process, to name a few. In response to these variables, traders make decisions including the participation rate, limit price, and other strategy attributes. As explained elsewhere in this description, one may limit the scope of the problem by adopting the definition of optimal execution from Almgren and Chriss (AC 2000): optimal execution is the participation rate profile that minimizes the risk-adjusted cost while completing the trade in a given amount of time.

To optimize the risk-adjusted cost one may first specify a model for market impact. Market impact has been analyzed by different authors as a function of time and trade size. See, for example, (Bertismas and Lo, 1998), (Almgren and Chriss, 2000), (Almgren et al., 2005), (Obizhaeva and Wang, 2006).

AC 2000 derived execution profiles that are optimal if certain simplifying assumptions hold true. These include the hypothesis that the market is driven by a random Brownian motion overlaid with a stationary market impact process. Impact is proposed to be the linear sum of permanent and temporary components, where the permanent impact depends linearly on the number of traded shares and the temporary impact is a linear function of the trading velocity. It follows that total permanent impact is independent of the trade schedule. The optimal participation rate profile requires trading fastest at the beginning and slowing down as the trade progresses according to a hyperbolic sine function.

This type of front-loaded participation rate profile is widely used by industry participants, yet it is also recognized that it is not always optimal. Some practitioners believe that the practice of front-loading executions bakes in permanent impact early in the trade, resulting in higher trading costs on average. A related concern is that liquidity exhaustion or increased signaling risk could also lead to a higher variance in trade results (Hora, 2006), defeating the main purpose of front-loading. In their paper, Almgren and Chriss acknowledge that the simplifying assumptions required to find closed-form optimal execution solutions are imperfect. The non-linearity of temporary impact in the trading velocity has been addressed previously in (Almgren, 2003), (Almgren et al., 2005); the optimization method has also been adjusted for non-linear phenomenological models of temporary impact (Loeb, 1983; Lillo et al., 2003). Most studies however share the common assumptions that short-term price formation in non-volatile markets is driven by an arithmetic Brownian motion and that the effect of trading on price is stationary, i.e., the increment to permanent impact from one interval to the next is independent of time and the temporary impact is a correction that depends only on the current trading velocity but not on the amount of time that the strategy has been in function. There are reasons to doubt the assumption of stationary impact. Practitioners find that reversion grows with the amount of time that an algorithm has been engaged; this suggests that temporary impact grows as a function of time.

Phenomenological models of market impact consistently produce concave functions for total cost as a function of trade size; this is inconsistent with linear permanent impact.

(Farmer et al., 2009) (FGLW) showed that it is possible to derive a concave shape for both temporary and permanent impact of a trade that is executed at a uniform participation rate. The basic assumption in this method is that arbitrageurs are able to detect the existence of an algorithm and temporary impact represents expectations of further activity from this algorithm. The concave shape of market impact follows from two basic equations.

The first is an arbitrage equation for a trader that observes the amount of time an execution has been in progress and uses the distribution of hidden order sizes to estimate the total size of the hidden order.

The second is the assumption that institutional trades break even on average after reversion. In other words, the price paid to acquire a large position is on average equal to the price of the security after arbitrageurs have determined that the trade is finished. The model explains how temporary impact sets the fair price of the expected future demand or supply from the algorithmic trade. When the trade ends and these expectations fade away, the model also explains how price reverts to a level that incorporates only permanent impact. The shape of the impact function can be derived from knowledge of the hidden order size distribution. If one believes the hidden order size distribution to have a tail exponent of approximately 1.5, the predicted shape of the total impact function is a square root of trade size in agreement with phenomenological models including the Barra model (Tone, 1997). See also (Chan and Lakonishok, 1993), (Chan and Lakonishok, 1995), (Almgren et al., 2005), (Bouchaud et al., 2008), (Moro et al., 2009).

This portion of the description extends hidden order arbitrage theory to estimate the impact of trades that execute with a variable participation rate, and uses the extended model to derive optimal execution solutions.

The first section below generalizes the framework for hidden order arbitrage to allow for varying-speed execution profiles. The next section describes trading solutions that minimize total trading cost with and without risk. Section 3 considers optimization with respect to the volume-weighted average price objective and shows that trade optimization with respect to the two benchmarks (implementation shortfall and VWAP) is a frustrated problem. Implications for institutional trading desks are discussed in the concluding section.

1. Hidden Order Arbitrage

This portion of the description addresses the situation of a large institutional trade that is executed over time through a sequence of smaller transactions. For simplicity's sake, one may consider a single institutional trade executing in a market that is otherwise driven by arithmetic Brownian motion. The trade is executed according to an execution schedule with the participation rate $\pi(n(t))$ representing the probability that a market transaction $n(t)$, at time t, belongs to the institutional trade.

1.1 Hypotheses

1. Hidden Order Detection. (H.1)

A hidden order executing during a period $\Delta t$ with an average rate $\pi$ is detected at the end of intervals of $\tau(\pi)=1/\pi^2$ market transactions[1]. The term "detectable interval" is used below to mean each set of $$\tau(\pi_i) = \frac{1}{\pi_i^2}$$

market transactions, for each $i \in \mathbb{N}$, over which a hidden order is detected with a constant participation rate $\pi_i$. A detectable interval i contains $$\frac{1}{\pi_i}$$

hidden order transactions, with $0<\pi_i<1$, $\forall i$.

[1]If order flow were a random walk with a bias it between buy and sell transactions, the imbalance would be detected with t-stat=1 after $1/\pi^2$ transactions.

In addition, there exists a function $\tau_r(X, \pi_f)$ such that the end of a hidden order can be detected after a reversion time $\tau_r(X, \pi_f)$, where $\pi_f$ is the most recently observed rate. Let be $N^*=N^*(X) \in \mathbb{R}_{>0}$, then $N^*=q+[N^*]$, $[N^*] \stackrel{def}{=}$ IntegerPart[$N^*$], $0 \leq q \leq 1$.

One may set $\tau_r(X, \pi_f)=q\pi_f^{-2}$. The number $N^*$ may be determined by the trade size X and [$N^*$] represents the last detectable interval.

2. Distribution. (H.2)

The total distribution function of the hidden order process is the product of a distribution $p(\vec{\pi}, N^*(X))$ of normalized execution schedules $\vec{\pi}=\{\pi_1, \pi_2, \ldots, \pi_{[N^*]}, \pi_f\}$, and the Gaussian distribution G of an arithmetic random walk.

For constant rate, $$\int_0^1 p(\pi, N^*(X)) d\pi \to p(N^*) \propto \frac{1}{N^{*\alpha+1}},$$

a truncated Pareto distribution of hidden order sizes for $N^* \leq M$, where the cutoff M is very large and $\alpha=1.5$ is the tail exponent (Gopikrishnan et al., 2000), (Gabaix et al., 2006).

One may call $p(\pi_1, \pi_2, \ldots, \pi_i, i \leq [N^*])$ the probability that the hidden order was detected at least in i intervals (and i be the last detectable step $[N^*]$ or not) with a participation schedule $\vec{\pi} = \{\pi_1, \pi_2, \ldots, \pi_i\}$. By definition of conditional probabilities, $$p(\pi_1, \pi_2, \ldots, \pi_i, i \leq [N^*]) = p(\pi_i, i \leq [N^*]/\pi_1, \pi_2, \ldots \pi_{i-1}) p(\pi_{i-1}, i-1 \leq [N^*]/\pi_1, \pi_2, \ldots, \pi_{i-2}) \ldots p(\pi_2, 2 \leq [N^*]/\pi_1) p(\pi_1, 1 \leq [N^*]).$$

Here $p(\pi_i, i \leq [N^*]/\pi_1, \pi_2, \ldots, \pi_{i-1})$ is the conditional probability that the hidden order will be detected at the interval i with rate $\pi_i$ given that it was detected in i−1 intervals with rate schedule $\vec{\pi} = \{\pi_1, \pi_2, \ldots, \pi_{i-1}\}$.

One may determine $p(\pi_i, i \leq [N^*]/\pi_1, \pi_2, \ldots, \pi_{i-1})$ when all the hypotheses are given (see below). By "reversion price", $S_i$, is meant the expected price after the end of the hidden order has been detected at the end of the interval i. One may denote by $\tilde{S}_i$ the expected average price in the interval, where the expectation is over G, with fixed $\{\pi_1, \pi_2, \ldots, \pi_i\}$.

3. Price Efficiency. (H.3)

For the short term, arbitrage opportunities disappear quickly due to the efficiency of the market. This concept translates to the equation:

$$\int_0^1 p(\pi_i, i \leq [N^*]/\pi_1, \pi_2, \ldots, \pi_{i-1})(\tilde{S}_i - \tilde{S}_{i-1}) d\pi_i +$$
$$p(i-1 = [N^*]/\pi_1, \pi_2, \ldots, \pi_{i-1})(S_{i-1} - \tilde{S}_{i-1}) == 0, i \geq 2.$$

Here, $$p(i-1 = [N^*]/\pi_1, \pi_2, \ldots, \pi_{i-1}) = 1 - \int_0^1 p(\pi_i, i \leq [N^*]/\pi_1, \pi_2, \ldots, \pi_{i-1}) d\pi_i$$

is the probability that the hidden order stops at the end of the interval i−1, given that it was detected through a schedule $\{\pi_1, \pi_2, \ldots, \pi_{i-1}\}$.

4. Breakeven. (H.4)

The expected reversion price following a trade that completed after k intervals is equal to its weighted average execution price[2]:

[2] The breakeven hypothesis may seem surprising. It states that the implementation cost on average equals the information value of the trade. FLGW shows that this hypothesis is an example of the tragedy of the commons: Portfolio managers understand that their information is not exclusive and other managers will join the trade until the net profit, after impact, goes to zero.

$$S_k = \frac{\sum_{i=1}^k \frac{1}{\pi_i} \tilde{S}_i}{\sum_{i=1}^k \frac{1}{\pi_i}}, k \geq 2.$$

5. Temporary Impact. (H.5)

First Interval Impact:

The impact of first-interval, $\tilde{S}_1 - S_0$, is equal to the product of a scaling factor that depends only on the volatility $\sigma$ and an exponent $\gamma$ of the participation rate in the first interval:

$$\tilde{S}_0 = S_0 \hat{\mu}(\sigma) \pi_1^\gamma.$$

Impact after the First Interval:

The temporary impact out of the first interval $\tilde{S}_{k+1} - S_k$ is a function only of the current participation rate $\pi_{k+1}$ and the total number of shares filled through interval k+1.

1.2 Exemplary Impact Model

One may derive an impact model from the hypotheses above and its simplified form to first order in $k^{-1}$.

By hypothesis 5, temporary impact does not depend directly on the participation rate profile before the interval in consideration. Therefore, it may be modeled as the temporary impact of a constant participation trajectory that has filled the same number of shares at the current participation rate of the variable rate model. Then, one may write:

$$\tilde{S}_{k+1} - S_k = \tilde{S}_{j_{k+1}} - S_{j_{k+1}-1}, \text{ such that}$$

$$\xi_{k+1} = \xi_{j_{k+1}} = j_{k+1} \pi_{k+1}^{-1}. \quad (1)$$

Here, $$\xi_{k+1} \stackrel{def}{=} \sum_{i=1}^{k+1} \frac{1}{\pi_i}$$

is the size executed through the end of interval k+1 in units of the average transaction size.

As shown in [FGLW], the price efficiency condition and breakeven equation in the case of a uniform participation rate and no impact-free returns can be solved recursively for the temporary impact in interval $j_{k+1}$, leading to $$\tilde{S}_{j_{k+1}} - S_{j_{k+1}-1} = \frac{1 - p_1}{(j_{k+1} - 1) \sum_{i=j_{k+1}}^M p_i} (\tilde{S}_1 - S_0). \quad (2)$$

Here $p_i \stackrel{def}{=} p(i=[N^*])$ the probability that the hidden order stops at the end of the interval i, such as defined in hypothesis 2. For a Pareto distribution of hidden order sizes (hypothesis 2), the sum in the denominator, $\Sigma_{i=j_{k+1}} p_i$, is a Hurwitz zeta function $\zeta(\alpha+1, j_{k+1})$. Using equalities (1), (2) and hypothesis 5, one may write:

$$\tilde{S}_{k+1} - S_k = \frac{1 - p_1}{(j_{k+1} - 1)\zeta(\alpha+1, j_{k+1})} (\hat{\mu}(\sigma)\pi_{k+1}^\gamma),$$

such that $$j_{k+1} = \xi_{k+1} \pi_{k\times 1}. \quad (3)$$

From the asymptotic form of the Hurwitz zeta function for large j, $(j-1)\zeta(\alpha+1, j) \xrightarrow{j \gg 1} j^{\alpha+1}$. Therefore, one may approximately write the solution to this model as:

$$\tilde{S}_{k+1} - S_k \approx \mu(\sigma)\pi_{k+1}^\beta \left( \sum_{i=1}^{k+1} \frac{1}{\pi_i} \right)^{\alpha-1}, k \gg 1. \quad (4)$$

Here, $\beta \stackrel{def}{=} \gamma + \alpha - 1$ and $\mu(\sigma) \stackrel{def}{=} (1-p_1)\hat{\mu}(\sigma)$. The temporary impact in Equation (3) only involves the most recent participation rate and shares acquired through the end of interval k+1 and is valid for all $k \geq 1$. Nevertheless, despite that equation (4) gives the temporary impact for large k, it does not invalidate Hypothesis 5 if one uses it for all the intervals $k \geq 0$. The parameters $\mu(\sigma)$ and $\beta$ can be estimated from data on small trades, for which the shortfall $\tilde{S}_1 - S_0$ can be measured with sufficient accuracy to distinguish execution strategies (see for example, Altunata et al. (2009). Trading data is consistent with $\beta = 0.3$ (Gomes and Waelbroeck, 2008).

2. Optimal Execution

Following the description above, one may write temporary impact as:

$$\tilde{S}_k = S_{k-1} + \mu \pi_k^\beta \left(\sum_{i=1}^{k} \frac{1}{\pi_i}\right)^{\alpha-1}, k \geq 1. \quad (5a)$$

Here, $$[\mu] = \frac{\$}{\text{share}}, \mu > 0$$

for a buy and $\mu<0$ for a sell. Combining (5a) with the breakeven hypothesis, one may derive by recursion the expression for the expected price at k, as a function of the participation rate schedule $\pi_i$, $1 \leq i \leq k$:

$$\tilde{S}_k = S_0 + \mu \left\{ \pi_k^\beta \left(\sum_{i=1}^{k} \pi_i^{-1}\right)^{\alpha-1} + \sum_{i=1}^{k-1} \pi_i^{\beta-1} \left(\sum_{j=1}^{i} \pi_j^{-1}\right)^{\alpha-2} \right\}, \quad (6a)$$

$$2 \leq k \leq [N^*],$$

$$\tilde{S}_1 = S_0 + \mu \pi_1^{\beta-\alpha+1}. \quad (6b)$$

$[N^*] \stackrel{\text{def}}{=}$ IntegerPart[$N^*$]. By (H.1), one is considering the possibility that the total number of detectable steps $N^*$ be a non-integer value; which means the institution could finish at an "extra time" $q=N^*-[N]$, $0 \leq q \leq 1$, that it is completed in less than $\pi^{-2}$ market transactions. In the case that $q \neq 0$, the expected price at $N^*$ will be:

$$\tilde{S}_{N^*} = S_{[N^*]} + \mu \pi_{N^*}^\beta \xi_{N^*}^{\alpha-1}, \quad (5b)$$

Or expanding as in (6a), $$\tilde{S}_{N^*} = S_0 + \mu \{\pi_{N^*}^\beta \xi_{N^*}^{\alpha-1} + \Sigma_{i=1}^{[N^*]} \pi_i^{\beta-1} (\Sigma_{j=1}^i \pi_j^{-1})^{\alpha-2}\} \quad (6c)$$

where $\xi_{N^*}$ is the total number of transactions traded until the last detectable interval $N^*$ and it is by definition:

$$\xi_{N^*} \stackrel{\text{def}}{=} \left(\sum_{i=1}^{[N^*]} \frac{1}{\pi_i} + q\pi_{N^*}^{-1}\right). \quad (7)$$

Furthermore, the expected total cost of the trade (over G) is $$E(\vec{\pi}, N^*) \stackrel{\text{def}}{=} n\xi_{N^*} S_0 - \sum_{i=1}^{[N^*]} n_i \tilde{S}_i - qn\pi_{N^*}^{-1} \tilde{S}_{N^*}, \quad (8)$$

where $n_i = n\pi_i^{-1}$ is the number of shares traded in the i-segment and n is the number of traded shares in each institutional transaction with $n>0$ for a sell and $n<0$ for a buy.

In addition, one may suppose that there exists $N \in \mathbb{N}$, $N \leq N^*$, such that from $N+1$ to $N^*$ the institution participates with a constant rate $\pi_f$. Therefore, the variables $(\vec{\pi}, N^*)$ may be reduced to $(\{\pi_i\}_{i=1}^N, \pi_f, N^*)$.

After a routine calculation, using equations (6), the expected total cost turns out to be:

$$E(\vec{\pi}, N^*) = \quad (9)$$

$$|\mu n| \xi_{N^*} \left\{ \sum_{k=1}^{[N^*]} \pi_k^{\beta-1} \left(\sum_{i=1}^{k} \pi_i^{-1}\right)^{\alpha-2} + q\pi_f^{\beta-1} \left(\sum_{i=1}^{[N^*]} \pi_i^{-1} + q\pi_f^{-1}\right)^{\alpha-2} \right\}.$$

Note that $E(\vec{\pi}, N^*) > 0$ always, for either a buy or a sell.

Additionally, as in (Almgren and Chriss, 2000), one may evaluate the variance of the cost $V(\vec{\pi}, N^*) \stackrel{\text{def}}{=} <(E(\vec{\pi}, N^*) - <(E(\vec{\pi}, N^*)>_G)^2>_G$. For that, one may sum the term representing the volatility of the asset $$\sigma \sum_{i=1}^{k} \pi_i^{-1} \varsigma_i, \quad (10)$$

to the equations (6). The $\zeta_{i+1}$ are random variables with zero Gaussian mean and unit variance and $\sigma$ is a constant with units $$[\sigma] = \frac{\$}{\text{share} \times \sqrt{\text{transaction}}}.$$

Therefore, the variance of $E(\vec{\pi}, N^*)$ takes the form $$V(\vec{\pi}, N^*) = \sigma^2 n^2 \sum_{k=1}^{[N^*]} \pi_k^{-2} \left(\xi_{N^*} - \sum_{j=1}^{K} \pi_j^{-1}\right)^2. \quad (11)$$

One may next write the risk-adjusted cost function:

$$U(\vec{\pi}, N^*; \lambda, \mu, n, \sigma, \alpha, \beta, N) \stackrel{\text{def}}{=} E(\vec{\pi}, N^*) + \lambda V(\vec{\pi}, N^*), \quad (12)$$

where $\lambda$ is the risk parameter with units $[\lambda] = \$^{-1}$.

Applying the previous expressions, one obtains:

$$U(\{\pi_i\}_{i=1}^N, \pi_f, N^*; \lambda, \mu, n, \sigma, \alpha, \beta, N) = \quad (13)$$

$$|\mu n| \xi_{N^*} \left\{ \sum_{k=1}^{[N^*]} \pi_k^{\beta-1} \left(\sum_{i=1}^{k} \pi_i^{-1}\right)^{\alpha-2} + q\pi_f^{\beta-1} \left(\sum_{i=1}^{[N^*]} \pi_i^{-1} + q\pi_f^{-1}\right)^{\alpha-2} \right\} +$$

$$\lambda \sigma^2 n^2 \sum_{k=1}^{[N^*]} \pi_k^{-2} \left(\xi_{N^*} - \sum_{j=1}^{k} \pi_j^{-1}\right)^2.$$

One may set the constraints on the total number of institutional transactions $$X = \xi_{N^*} \stackrel{\text{def}}{=} \left\{\sum_{j=1}^{N} \pi_j^{-1} + (N^* - N)\pi_f^{-1}\right\}, \quad (14)$$

and a maximum for the trading time $t_{N^*}$:

$$T_M \geq t_{N^*} \stackrel{def}{=} \sum_{i=1}^{N} \pi_i^{-2} + (N^* - N)\pi_f^{-2}. \quad (15)$$

2.1 The Optimal Trajectory for $\lambda=0$

First, one may optimize the cost without risk, equation (9) together with the constraints (14) and (15).

Results:

Let N=10, X=100 transactions, and $T_M$=1000 transactions. One may define the dimensionless cost $$\frac{E}{|\mu n|},$$

which allows an independent solution on the selection of the parameters n and μ.

The optimal solution for 100 traded lots is:

$$\frac{E(\text{minimum})}{|n\mu|} = 755.742,$$

$\{\pi_1^{-1} = 18.53, \pi_2^{-1} = 11.62, \pi_3^{-1} = 9.64, \pi_4^{-1} = 8.61, \pi_5^{-1} == 7.94, \pi_6^{-1} = 7.45, \pi_7^{-1} = 7.08, \pi_8^{-1} = 6.78, \pi_9^{-1} == 6.53, \pi_{10}^{-1} = 6.32, \pi_f^{-1} = 6.03, N^* = 11.57\}.$

It satisfies the constraints $\xi_{N^*}$=100, $t_{N^*}$=1000, the rate in the additional step 11 and in the fractional step q=0.57 is $\pi_f^{-1}$=6.03.

This result shows that, in absence of risk aversion, it is optimal to start the trade more slowly to minimize information leakage early in the trade.

What follows shows an optimal trajectory for the cost function, $$g = \frac{E}{|n\mu|},$$

with two variables ($\pi_1^{-1}$, $\pi_2^{-1}$), eight intervals traded with constant rate $\pi_1^{-1}$ and a fraction q of a unitary interval traded with the same constant rate $\pi_f^{-1}$. One may choose N*=10+q, X=100=$\sum_{i=1}^{2}\pi_i^{-1}$+(N*−2)$\pi_f^{-1}$ and $t_{N^*}$=1000=$\sum_{i=1}^{2}\pi_i^{-2}$+(N*−2)$\pi_f^{-2}$. The example was done with the purpose of showing a graph for the cost in 3D, and to understand the cost function for a number of variables >2. The constraints determine $$q = -8 + \frac{(100 - \pi_1^{-1} - \pi_2^{-1})^2}{1000 - \pi_1^{-2} - \pi_2^{-2}} \text{ and } \pi_f = \frac{100 - \pi_1^{-1} - \pi_2^{-1}}{1000 - \pi_1^{-2} - \pi_2^{-2}}.$$

Figure 15:
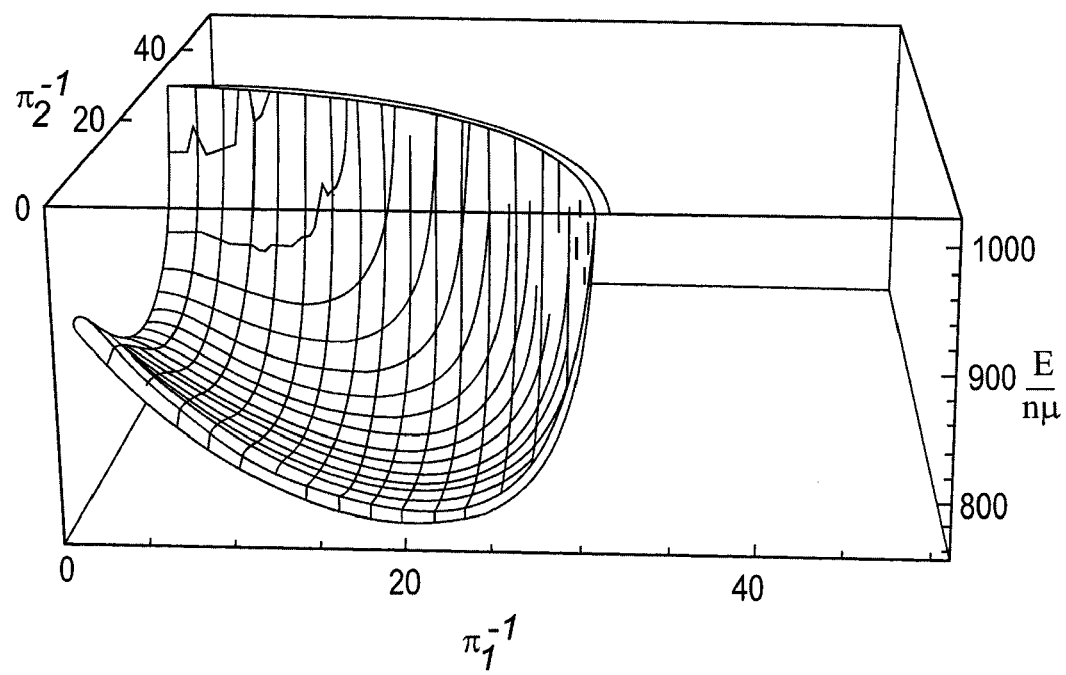
FIG. 15 depicts a graphic representation of cost.

The optimization gives:

$\{g(\text{minimum}) = 758.642, \{\pi_1^{-1} = 17.5318, \pi_2^{-1} = 11.6056\}\}$ A graphic representation of the cost for the whole domain is given in FIG. 15, which depicts a three-dimensional representation of the dimensionless-cost function $$\frac{E}{|n\mu|},$$

with two variables. The minimum is the point $$\left\{\pi_1^{-1} = 17.5318, \pi_2^{-1} = 11.6056, \frac{E}{|n\mu|} = 758.642\right\}.$$

The quarter of the circumference shows the divergence of the cost at $1000-\pi_1^{-2}-\pi_2^{-2}=0$.

Figure 16:
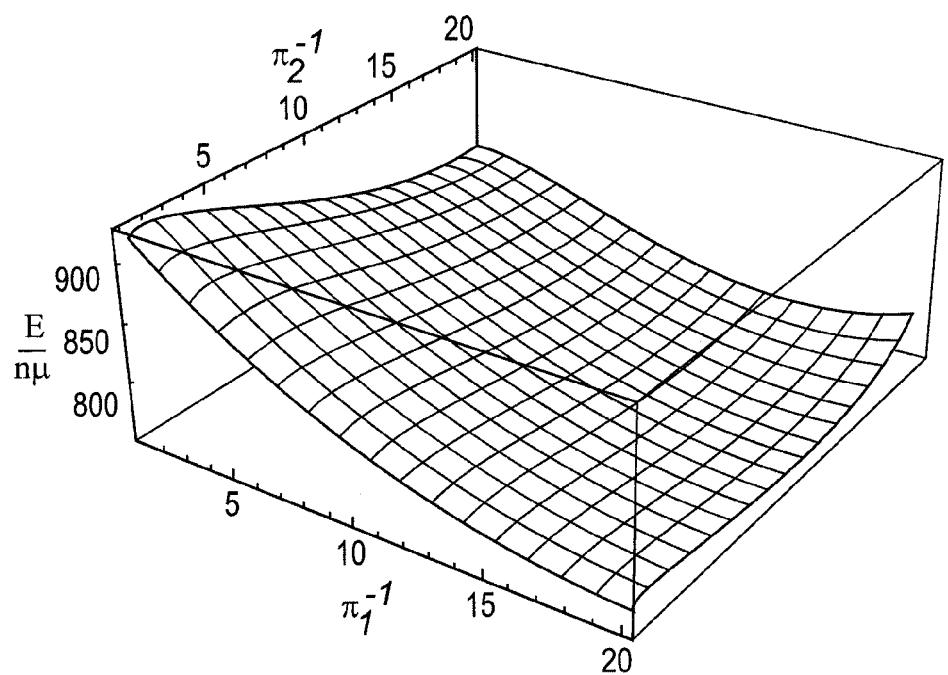
FIG. 16 depicts a closer view.

A closer view around the minimum is shown in FIG. 16.

FIG. 16 depicts a dimensionless-cost function around the optimal point $\{\pi_1^{-1}$=17.5318, π2−1=11.6056, Enμ=758.642, following FIG. 15.

The solution satisfies $\xi_{N^*}$=100, $t_{N^*}$=1000, q=1. The participation rate after step 2 is $\pi_f^{-1}$=7.87. This solution is more expensive that the one with N=10, which shows that the observable N*=11.57 minimizes the cost for the selected constraints.

2.2 Risk Adjusted Optimization

Above is provided an analysis of hidden order arbitrage methods for variable speed of trading with zero risk aversion ($\lambda=0$). The description below concentrates on finding optimal trading trajectories for a model with varying participation rate and arbitrary risk aversion. That means to minimize the total risk-adjusted cost function (13):

$$\frac{U(\vec{\pi}, N^*; L)}{|\mu n|} = \quad (16)$$

$$X\left\{\sum_{k=1}^{[N^*]} \pi_k^{-0.7}\left(\sum_{i=1}^{k}\pi_i^{-1}\right)^{-0.5} + q\pi_f^{-0.7}\left(\sum_{i=1}^{[N^*]}\pi_i^{-1} + q\pi_f^{-1}\right)^{-0.5}\right\} +$$

$$L\sum_{k=1}^{[N^*]} \pi_k^{-2}\left(X - \sum_{j=1}^{k}\pi_j^{-1}\right)^2,$$

with the constraints (14) and (15).

The results are summarized in Table 1 for X=100 lots, $T_M$=1000 transactions, α=1.5, β=0.3, for the different values of the risk constant L=λσ²|n/μ|.

TABLE 1

| L | E/\|μn\| | $\frac{E}{\|\mu n\|X}$ | $\frac{\lambda}{\|\mu n\|}V$ | $\frac{U}{\|\mu n\|}$ | $\frac{U}{\|\mu n\|X}$ | N* | $t_{N^*}$ |
|---|---|---|---|---|---|---|---|
| 3 × 10⁻⁴ | 925.65 | 9.26 | 527.63 | 1453.29 | 14.53 | 13.14 | 1000 |
| 1 × 10⁻⁴ | 827.97 | 8.28 | 240.12 | 1068.09 | 10.68 | 10.99 | 1000 |
| 0 | 755.74 | 7.56 | 0 | 755.742 | 7.56 | 11.57 | 1000 |

Optimal Risk Adjusted Cost. Results are for X=100 lots, $T_M$=1000 transactions, β=1.5, β=0.3, for the different values of the risk constant $L=\lambda\sigma^2\ln/\mu|$. Second column is total cost, third column is cost per lot or transaction, the fourth one gives the total risk, the fifth is the total risk-adjusted cost, the sixth is per lot or transaction. N* is the total number of detectable intervals realized by the hidden order. The last column indicates that the number of market transactions reaches the maximum limit $T_M$. All values are dimensionless.

Figure 17:
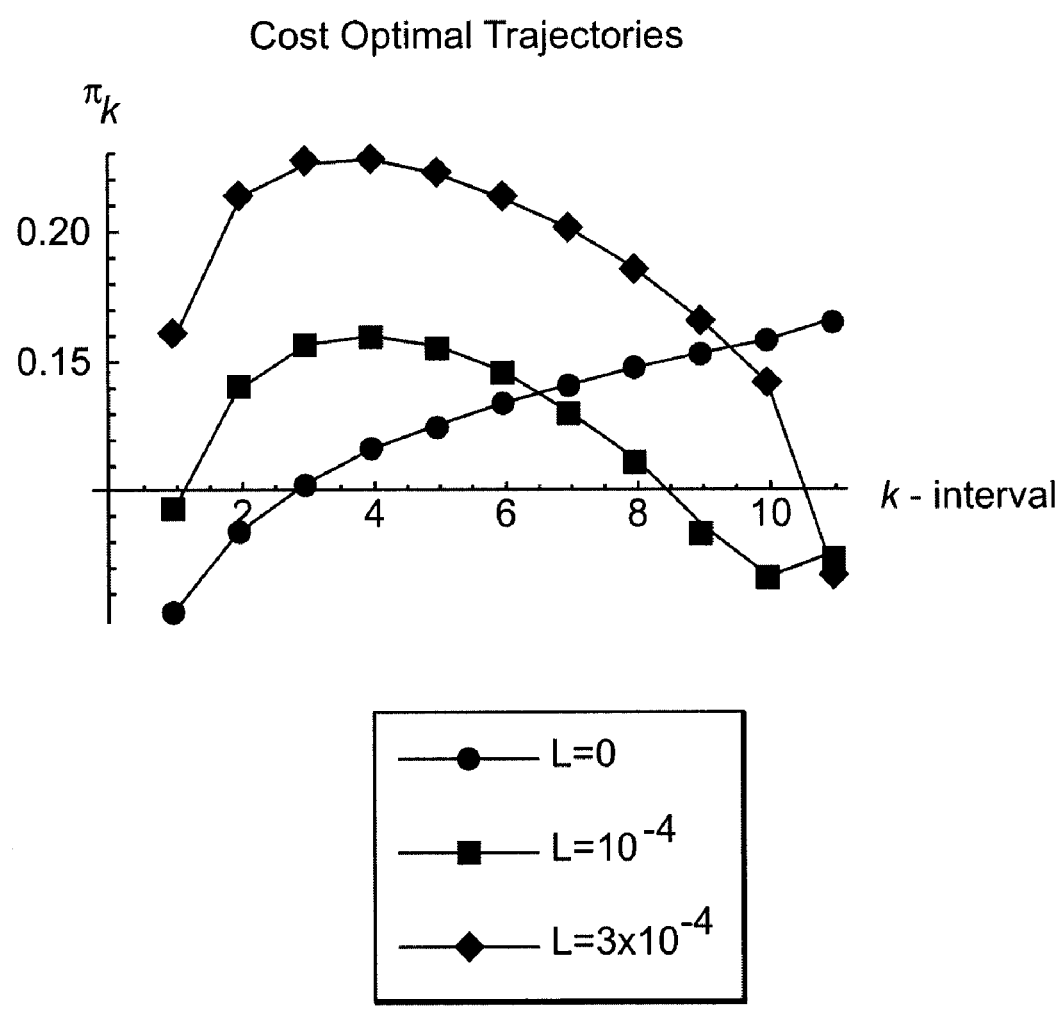
FIG. 17 depicts optimal trajectories representing the participation rate in function of the number of the detectable interval for different values of the risk constant.

FIG. 17 depicts a graph of the participation rate $\pi_k$ versus the detectable step k, in a continuum aproximation, for the different values of the risk constant $L=\lambda\sigma^2\ln/\mu|$. FIG. 17: Optimal trajectories representing the participation rate in function of the number of the detectable interval for different values of the risk constant.

Figure 18:
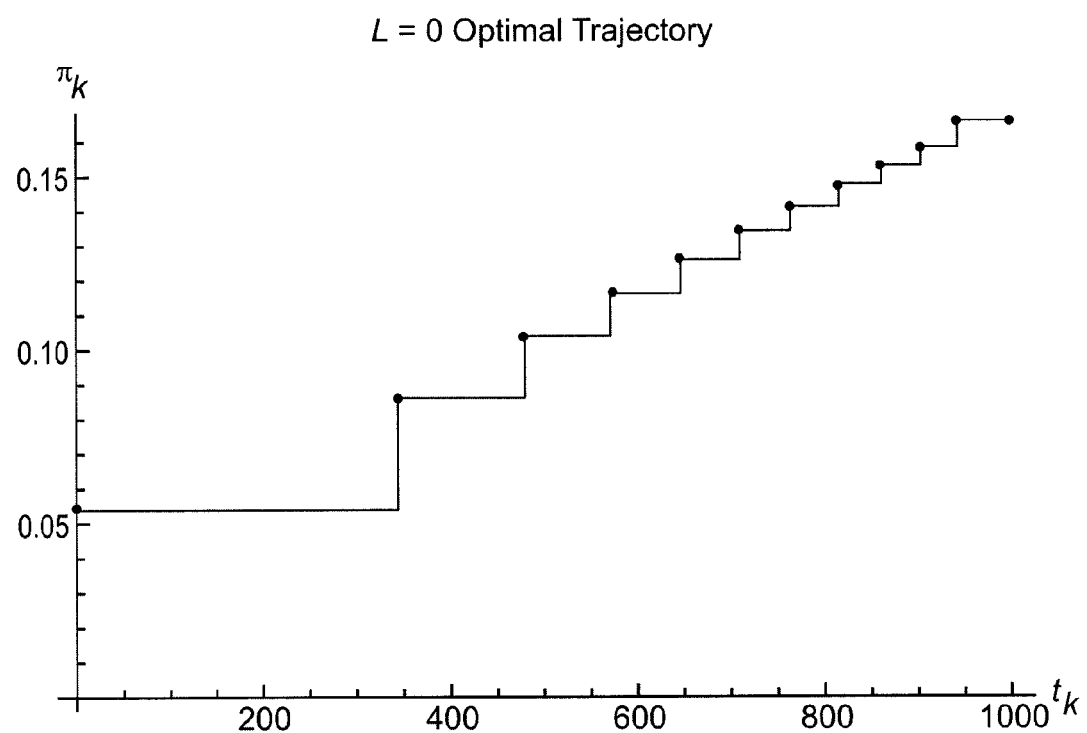
FIG. 18 depicts participation rate in function of the transactional time, $t_k = \Sigma_{i=1}^{k} \pi_i^{-2}$, corresponding to each k-interval, considering zero risk aversion.

Because in each step the participation rate may be constant, a detailed graph is presented of the participation rate versus the transactional time, $t_k=\Sigma_{i=1}^k \pi_i^{-2}$, corresponding to each k-interval, for each L:

FIG. 18. Participation rate in function of the transactional time, $t_k=\Sigma_{i=1}^k \pi_i^{-2}$, corresponding to each k-interval, considering zero risk aversion.

Figure 19:
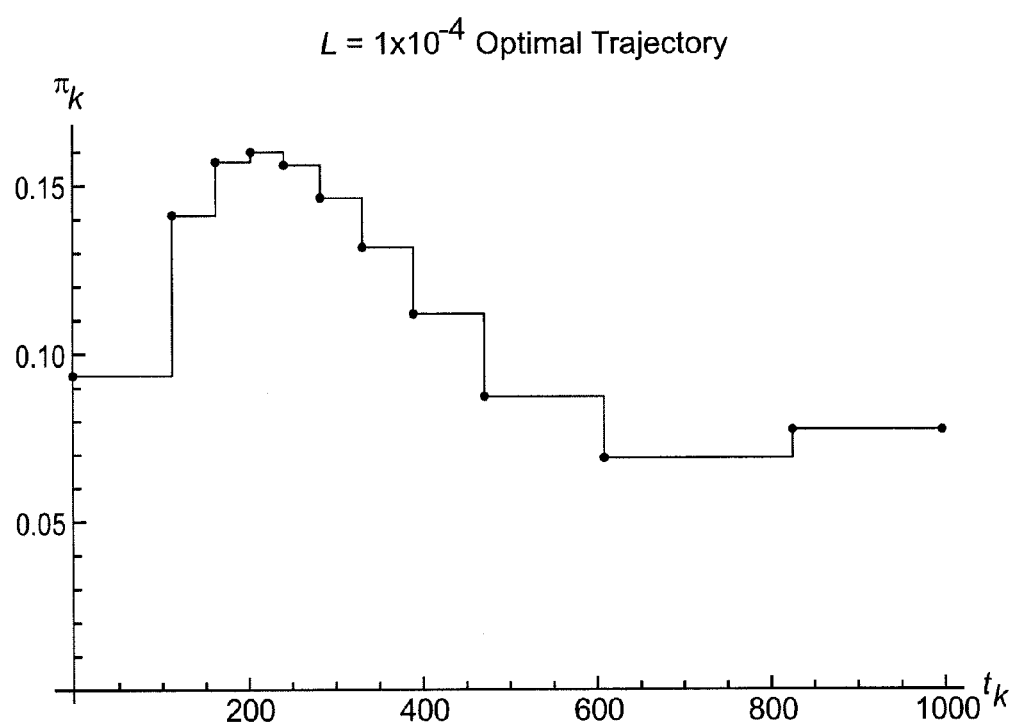
FIG. 19 depicts p participation rate in function of the transactional time, $t_k = \Sigma_{i=1}^{k} \pi_i^{-2}$, corresponding to each k-interval, considering risk aversion $L=1\times10^{-4}$.

FIG. 19. Participation rate in function of the transactional time, $t_k=\Sigma_{i=1}^k \pi_i^{-2}$, corresponding to each k-interval, considering risk aversion $L=1\times10^{-4}$.

Figure 20:
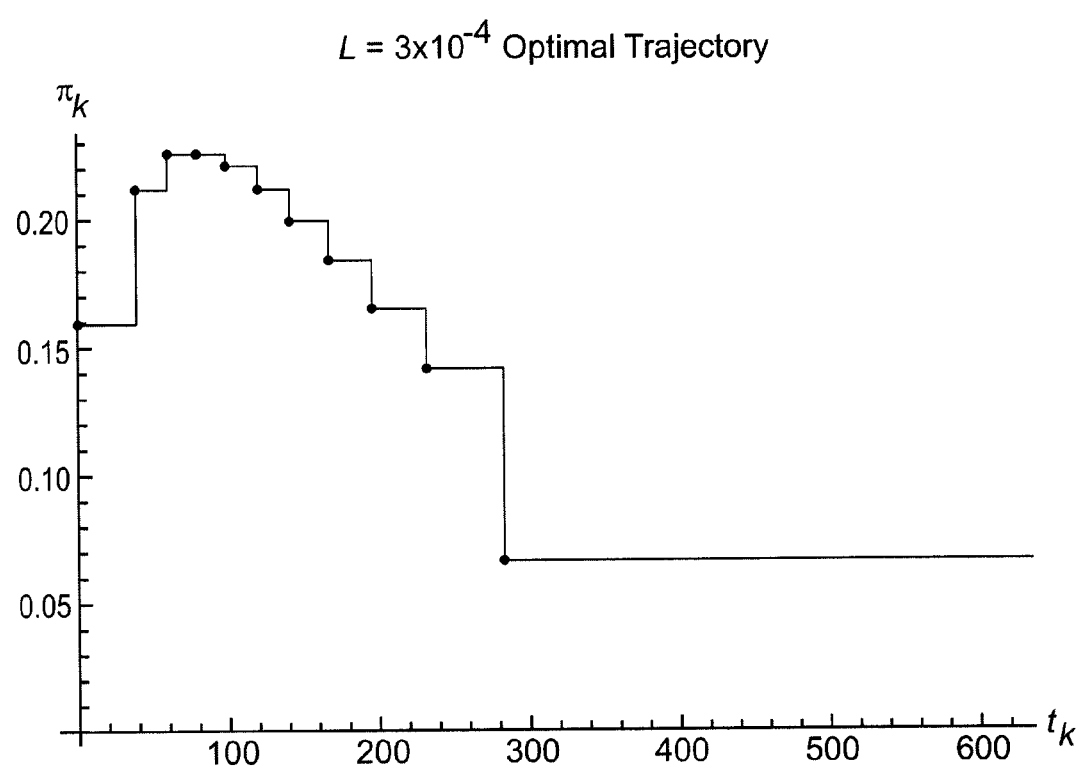
FIG. 20 depicts participation rate in function of the transactional time, $t_k = \Sigma_{i=1}^{k} \pi_i^{-2}$, corresponding to each k-interval, considering risk aversion $L=3\times10^{-4}$.

FIG. 20. Participation rate in function of the transactional time, $t_k=\Sigma_{i=1}^k \pi_i^{-2}$, corresponding to each k-interval, considering risk aversion $L=3\times10^{-4}$.

Figure 21:
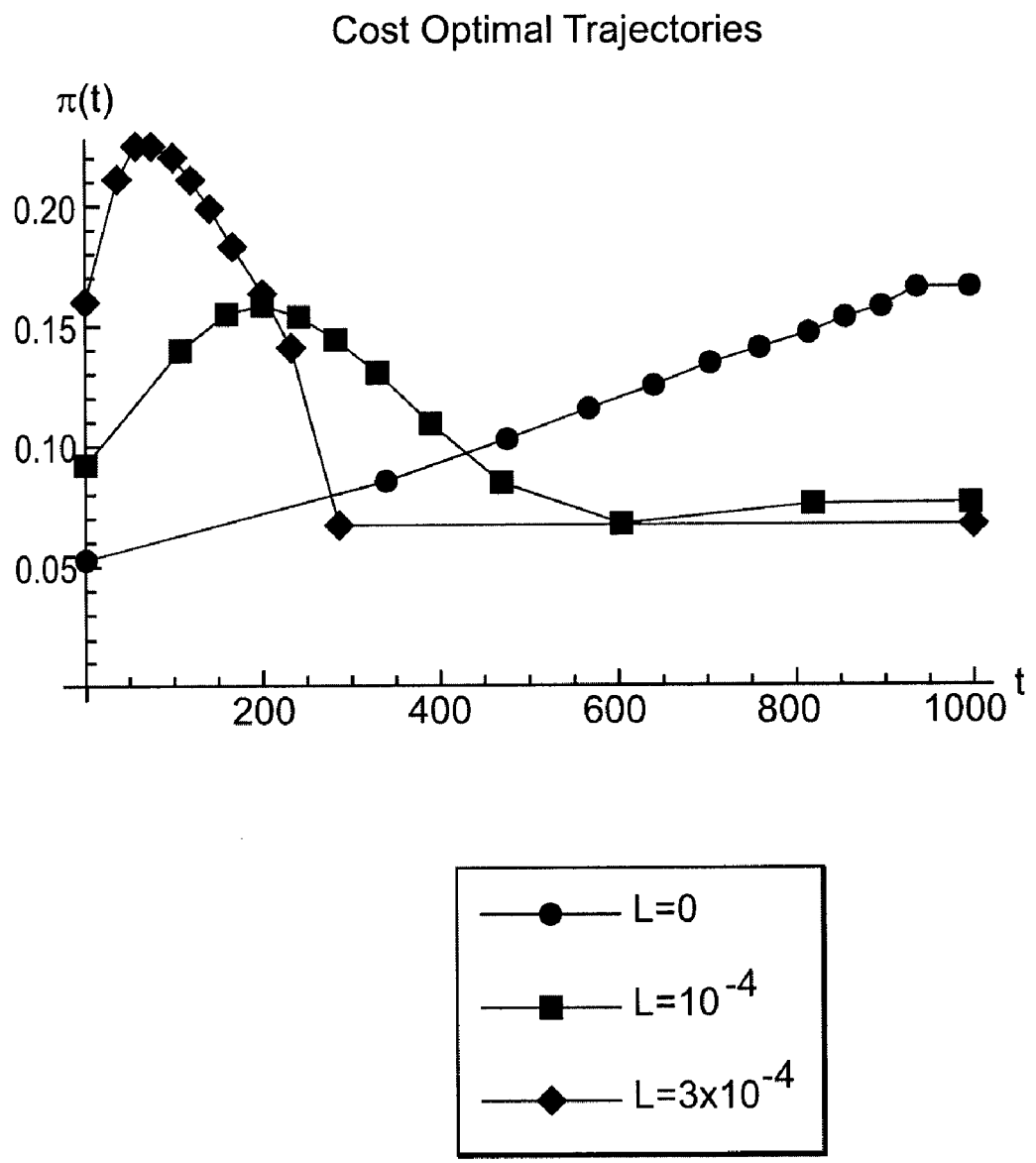
FIG. 21 depicts a comparative graph for the different values of the risk aversion in the quadratic approximation or continuum.

FIG. 21 depicts a comparative graph for the different values of the risk aversion in the quadratic approximation or continuum: FIG. 21 depicts a comparative graph of optimal trajectories in function of the transactional time for the different values of the risk aversion in the quadratic approximation or continuum.

3. Optimizing Performance to the VWAP Benchmark

The section above described optimizing a sum of expected implementation shortfall and its variance. This was called a risk-adjusted cost function and optimal trading trajectories were found.

The implementation shortfall in this context is the difference between the initial book value of the shares, $XS_0$, and the capture of the trajectory $\Sigma_{i=1}^{N^*} n_i \tilde{S}_i$. Nevertheless, traders may have other objectives or benchmarks rather than $XS_0$. These include:

1) Post reversion price or closing price. This is useful to measure the effect of an entry trade on assets under management marked to market after the trade is done and post-trade reversion is complete.
2) Volume-weighted average price during the transactional period or VWAP. This is the average price transacted by the market, which is useful to evaluate exit trades that are not too large relative to the ADV because it is less exposed to market effects than implementation shortfall.

The reversion price is equal to the average realized price by (H.4); hence, one may not regard this benchmark as being useful for the purpose of the schedule optimization. Therefore, one may analyze the difference $\alpha$ between VWAP and the capture. For a buy:

$$\Delta(\text{buy}) := -VWAP + \text{capture} \stackrel{def}{=} \qquad (17a)$$

$$\stackrel{def}{=} -\frac{1}{t_{N^*}}\sum_{i=1}^{N^*}\tau_i\tilde{S}_i + \frac{1}{\xi_{N^*}}\sum_{i=1}^{N^*}\pi_i^{-1}\tilde{S}_i.$$

Here, $t_{N^*}$ is the institutional trade duration and $\xi_{N^*}$ is the total number of institutional orders executed in that period. $\{\pi_i\}_{i=1}^{N^*}$ is the set of participation rates from the first to the last detectable segment and $\tau_i=\pi_i^{-2}$ is the minimum expected transactional market period for the detection of the $i^{th}$ segment. $\pi_i^{-1}$ is the expected value of the number of the institutional transactions executed in the i-detectable segment, and $\tilde{S}_i$ is the price per share paid by the institution in the i-segment. For a sell, $$\Delta(\text{sell}):=VWAP-\text{capture}. \qquad (17b)$$

Following the equations (6), and including the arithmetic Brownian noise, one has:

$$\Delta(\text{buy/sell}, \{\pi_i\}_{i=1}^{N^*}) = (-/+)\frac{\mu}{t_{N^*}} \qquad (18a)$$

$$\left\{\sum_{k=1}^{[N^*]}\pi_k^{\beta-1}\xi_k^{\alpha-2}(\pi_k^{-1}\xi_k - t_k) + q\pi_f^{\beta-1}\xi_{N^*}^{\alpha-2}(\pi_f^{-1}\xi_{N^*} - t_{N^*})\right\} +$$

$$(-/+)\sigma\sum_{k=1}^{[N^*]}\pi_k^{-1}\zeta_k\left(\frac{\xi_k}{\xi_{N^*}} - \frac{t_k}{t_{N^*}}\right),$$

where $$\xi_k \stackrel{def}{=} \sum_{i=1}^k \pi_i^{-1}, \qquad (18b)$$

$$t_k \stackrel{def}{=} \sum_{j=1}^k \tau_j = \sum_{j=1}^k \pi_j^{-2}, \qquad (18c)$$

$\mu$, $\alpha$, $\beta$, $\sigma$ are constant parameters and $\zeta_i$ are random variables with zero Gaussian mean and unit variance.

Taking $\mu(\text{sell})=-\mu(\text{buy})$ and the Gaussian mean, equation (18a) is:

$$\Delta(\text{buy or sell}, \{\pi_i\}_{i=1}^{N^*}) = \qquad (19)$$

$$-\frac{|\mu|}{t_{N^*}}\left\{\sum_{k=1}^{[N^*]}\pi_k^{\beta-1}\xi_k^{\alpha-2}(\pi_k^{-1}\xi_k - t_k) + q\pi_f^{\beta-1}\xi_{N^*}^{\alpha-2}(\pi_f^{-1}\xi_{N^*} - t_{N^*})\right\}.$$

Next, one may minimize (19) using Mathematica7 constrained with $$X=\xi_{N^*}=100, t_{N^*} \leq T_m=1000.$$

The optimal solution is:

$$\Delta(\text{buy or sell, minimum})/|\mu|=-0.666758,$$

with the optimal trajectory:

$$\pi_1^{-1}=9.48, \pi_2^{-1}=7.23, \pi_3^{-1}=6.78, \pi_4^{-1}=6.42,$$
$$\pi_5^{-1}=6.61, \pi_6^{-1}=6.90, \pi_7^{-1}=7.63, \pi_8^{-1}=9.38,$$
$$\pi_9^{-1}=11.40, \pi_{10}^{-1}=14.99, \pi_f^{-1}=13.54, N^*=10.97,$$
$$\xi_{N^*}=100, t_{N^*}=1000.$$

The negative value indicates that the institution buys below the market or sells above the market, and the gain (absolute value) is maximal for the optimal trajectory.

The cost for the solution, which optimizes the VWAP, is $$\frac{E}{|n\mu|} = 837.36.$$

This is bigger than the optimal cost $$\frac{E}{|n\mu|}(\text{minimum}) = 755.74,$$

for X=100, $t_{N^*}$=1000, L=0, found in section 2.1. Thus, it is possible to beat the VWAP benchmark with that trajectory but at the expense of a higher shortfall[3].

[3] For buys, the increased implementation shortfall is associated with a higher reversion price due to the breakeven condition, so the economic value of shortfall reduction may seem less evident at first glance. However, the dependence of a security price on the execution of a trade will decay over the investment horizon, so the shortfall will ultimately be a net negative contribution to the portfolio value for buys as well as for sells.

Conversely, the value for the VWAP benchmark using the optimal trajectory, which minimizes the shortfall, is:

$$\frac{\Delta(\text{buy or sell, optimal for } L=0)}{|\mu|} = 3.21403.$$

The positive value means that the institution reduces the shortfall to the minimum at expenses of selling below or buying above the market average price.

Figure 22:
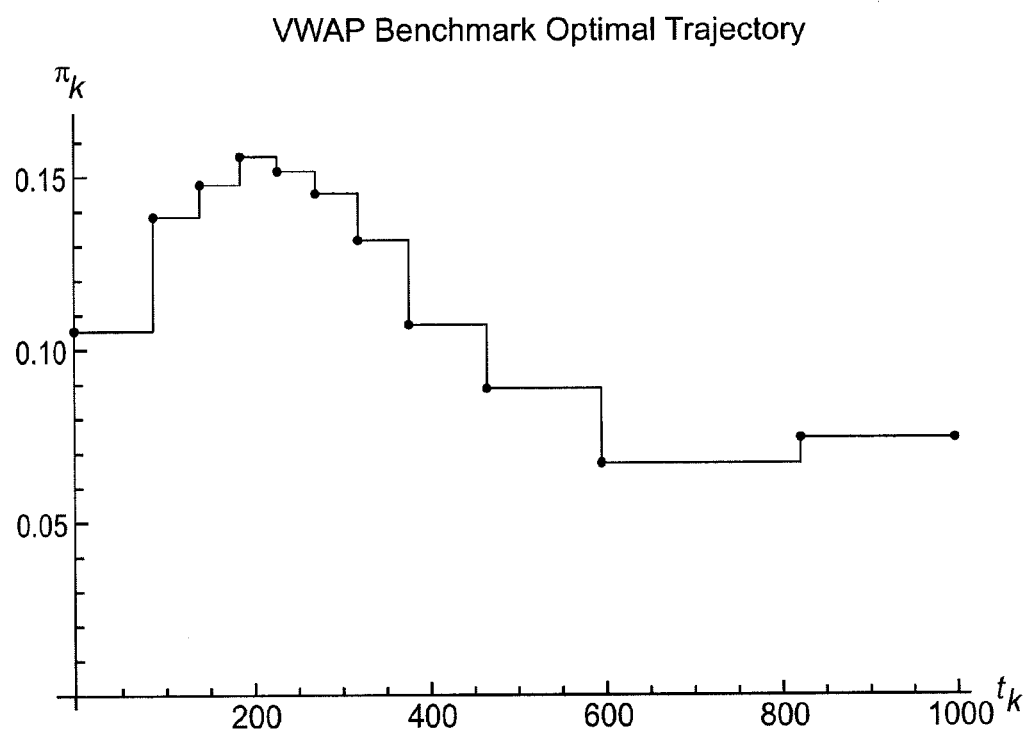
FIG. 22 depicts a graph of participation rate versus transactional time for a VWAP-optimal solution.

FIG. 22 depicts a graph of participation rate versus transactional time for a VWAP-optimal solution: FIG. 22 depicts participation rate in function of the transactional time, $t_k = \Sigma_{i=1}^{k} \pi_i^{-2}$, corresponding to each k-interval. This is the VWAP benchmark optimal trajectory.

4. Discussion

The preceding sections of this portion of the description generalized hidden order arbitrage models and methods to non-flat execution schedules. Hidden order arbitrage methods tie the concavity of the impact function to the predictability of the order flow. As explained by Hasbrouck (Hasbrouck, J. 1991), only the unpredictable component of the order flow can cause incremental market impact. The predictable component is preemptively incorporated into the security price in the form of temporary impact. The methods described herein use this principle to estimate temporary impact: a simplifying assumption may be introduced to the effect that the predictable component of the order flow can be approximated knowing only the current trading velocity and the total number of shares accumulated so far in the trade. When the trade ends, expectations of further order flow subside and price reverts to a level that incorporates only permanent impact.

In contrast, in Kyle's classic paper (Kyle, A. 1985), the informed trader is assumed to know precisely the final price and only buys if price is lower, so there is no reversion. When the market maker sets the price to the expected informed price, since informed traders buy below the informed price and sell above it, the order flow expectations in the next step are evenly balanced. Kyle shows that in this context, where order flow is unpredictable, the participation rate optimal trajectory is constant in time and the impact function is linear in the rate of trading. There is ample evidence that, unlike the informed trades described by Kyle, algorithmic execution of hidden orders leads to a predictable order flow, and there is ample evidence for the concavity of the impact function (Bouchaud et al, 2008). Yet prior to the present invention, there had not been an optimal execution derivation that accounts for these observations.

The above description provides solutions that minimize the risk-adjusted cost for various levels of risk aversion or the performance relative to a VWAP benchmark. The optimal schedules for risk-adjusted cost are strikingly different from the classic Almgren-Chriss solutions. In particular, this description shows that it is optimal to start trades slowly. The VWAP optimal solution is more reminiscent of the A-C solution. However, it beats the VWAP in part by creating impact early in the trade, resulting in a higher price throughout the trade and a higher shortfall. The near VWAP optimality of the A-C solution may help to explain why it is so frequently used by trading desks in spite of its higher average cost. The following description considers the frustration between various optimization objectives using a concrete example.

4.1 Example and Comparisons

Below is considered a mid-cap trade of $|Xn|$=25000 shares, $|n|$=250 shares per transaction, in a $S_0$=$50 security, executed at an average participation rate of 10% ($\pi$=0.1). If the security's trading volume is $$\frac{400 \text{ transactions}}{\text{hr}},$$

a detectable interval will represent 15 minutes of trading. The impact for a 15-minute interval is estimated to be 10 bps for this security. From formula (6b), with $\beta$=0.3, $\alpha$=1.5, one finds that a 10 bps impact for the first interval correspond to $$|\tilde{S}_1 - S_0| = 10^{-3} \times \$50 = |\mu| \times 0.1^{-0.2}, \text{ i.e. } |\mu| = 0.0315$$
$/share.

If one take san annual volatility of 30%, $$\sigma = \frac{0.95\left(\frac{\$}{\text{share}}\right)}{\sqrt{\text{day}}}.$$

In this case, one may work with transactions units as measure of time and $\tau = 1/\pi^2 = 100$ is the average number of the market transactions in each detectable interval. If one day consists of 6 hours and 30 minutes and each detectable interval lasts 15 minutes then, 1 day=2600 market transactions. Therefore, $$\sigma = \frac{0.019 \frac{\$}{\text{share}}}{\sqrt{\text{transaction}}}.$$

The shortfall and the VWAP benchmark of risk-adjusted cost optimal solutions are listed in Table 2 for this example and different risk aversion parameters.

TABLE 2

| L | Risk parameter $\lambda$ ($\$^{-1}$) | Shortfall per share $\left(\frac{\$}{\text{share}}\right)$ | Shortfall E ($) | Variance $\sqrt{V}$ ($) | ($\Delta$(buy or sell)) $\left(\frac{\$}{\text{share}}\right)$ |
|---|---|---|---|---|---|
| $1 \times 10^{-4}$ | $3.49 \times 10^{-4}$ | 0.2608 | 6520.5 | 7360.83 | −0.0173 |
| 0 | 0 | 0.2381 | 5953.5 | 9192.27 | 0.1012 |
| $3 \times 10^{-4}$ | $1.05 \times 10^{-4}$ | 0.2917 | 7292.25 | 6290.65 | 0.2418 |

Shortfall and VWAP benchmark of Cost Optimal solutions. Consider a mid-cap trade of 25000 shares, in a $S_0$=$50 security, executed at an average participation rate of 10% ($\pi$=0.1). If the security's trading volume is $$\frac{400 \text{ transactions}}{\text{hr}},$$

a detectable interval will represent 15 minutes of trading. The impact for a 15-minute interval is estimated to be 10 bps for this security, i.e. $|\mu|=0.0315$ \$/share. One may take an annual volatility of 30% or $$\sigma = \frac{0.95\left(\frac{\$}{\text{share}}\right)}{\sqrt{\text{day}}}.$$

One day consists of 6 hours and 30 minutes or 2600 market transactions. The last column is the VWAP benchmark calculated with the risk adjusted cost optimal solution.

Figure 23:
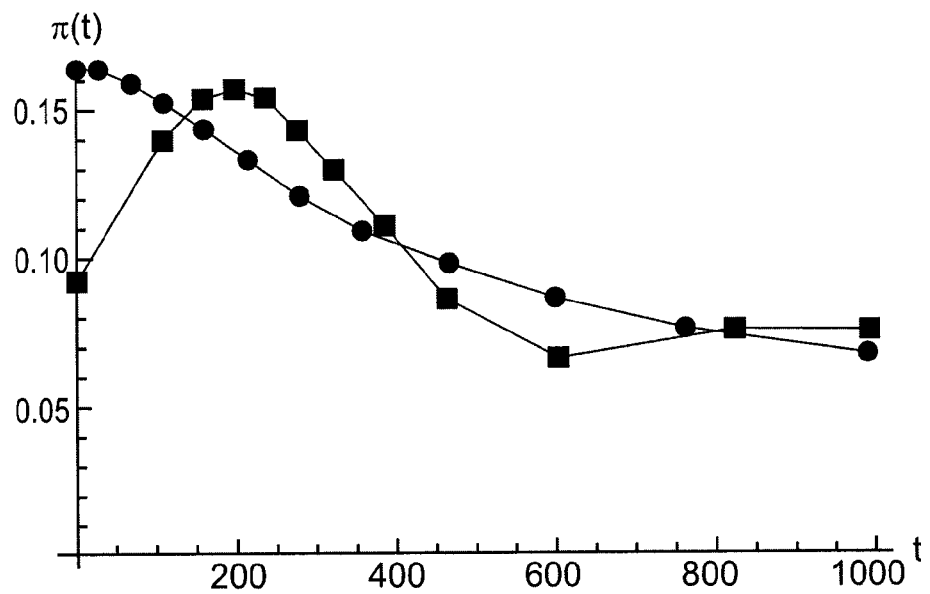
FIG. 23 depicts a comparative graph of the cost optimal trajectories in function of the transactional time.

Exemplary result: Shortfall minimization in absence of alpha requires back-loading, which increases execution risk. Optimal solutions for risk-averse traders are less front-loaded than suggested by AC2000 and avoid an aggressive trade start. FIG. 23 depicts a graph of the optimal risk averse trajectories for the information arbitrage theory with $L=10^{-4}$ in comparison to the Almgren-Chriss formulation (AC2000). For a buy, $$\pi_j^{A-C} = \frac{\sinh(\kappa T)}{2 \times \sinh\left(\frac{\kappa\tau}{2}\right)\cosh\left(\kappa\left(j-\frac{1}{2}\right)\tau\right)}, X = 100,$$

$$T = 165 \text{ minutes} = 0.423 \text{ day}, \kappa \sim \frac{3.83}{\text{day}}, \tau = 15 \text{ minutes} = 0.0384 \text{ day}.$$

The shortfall calculated with the optimal Almgren-Chriss trajectory for a risk averse constant $$\lambda(\text{Almgren-Chriss}) = \frac{10^{-5}}{\$} \text{ is } E\left(\{\pi_j^{A-C}\}_{j=1}^{11}\right) = 6879.05\$.$$

This is costlier than the shortfall $$E(\text{optimal}) = 6520.5\$ \text{ for } \lambda = 3.49 \times \frac{10^{-5}}{\$}.$$

FIG. 23. Comparative graph of the cost optimal trajectories in function of the transactional time. The dotted line is the solution predicted by Almgren-Chriss formulation with linear impact and risk averse constant $$\lambda(Almgren\text{-}Chriss) = \frac{10^{-5}}{\$}.$$

The square line is the optimal trajectory for the non-linear information arbitrage theory, as shown in FIG. 19, for risk averse constant $$L = 10^{-4} \text{ or } \lambda = 3.49 \times \frac{10^{-5}}{\$}.$$

Additionally, one obtains a VWAP optimal value in the first column of Table 3, and the shortfall and its variance per share corresponding to the VWAP optimal trajectory in the second and third columns, respectively.

TABLE 3

| (Δ(buy or sell, optimal)) $\left(\frac{\$}{\text{share}}\right)$ | Shortfall per share $\left(\frac{\$}{\text{share}}\right)$ | Variance per share $\left(\frac{\$}{\text{share}}\right)$ |
|---|---|---|
| −0.0210 | 0.2638 | 0.2893 7233.84\$ for the total |

Comparison of optimal VWAP and shortfall. VWAP optimal value is given in the first column, and the shortfall and its variance per share corresponding to the VWAP optimal trajectory in the second and third columns, respectively.

Comparing Tables 2 and 3, VWAP optimization increases shortfall if no risk or low risk aversion is taken into account. However, if high risk aversion applies, then VWAP optimization may be appropriate. On the other hand, to minimize implementation shortfall it is necessary to buy above or sell below the VWAP, when no risk or high risk aversion is considered. This is known in the art of multi-criteria optimization as frustration: one optimizes to one objective at the expense of the other. However, in this case only the implementation shortfall benchmark is relevant to the performance of the portfolio—so the existence of frustration simply implies that funds that create incentives for traders to perform well relative to a VWAP benchmark are in fact promoting trading behaviors that are harmful to the fund returns.

In conclusion, because the shortfalls per share are approximately the same for both optimizations, and the variance estimated with the VWAP benchmark optimal trajectory is lower, VWAP optimization is better at low risk aversion. It also provides lower shortfall and better VWAP performance than the high risk aversion solution; however, the variance of the shortfall is higher by 17% originating uncertainty.

What are the right incentives for a trading desk? The implementation shortfall is the measure of the effect of trade execution on assets under management. Other benchmarks can be used to promote trade behaviors that are more likely to result in lower shortfalls on a particular type of trade. Using the closing price for trades that have negative underlying alpha incentivizes back-loading, and will lead to lower average shortfall for exit trades. For entry trades, using the risk adjusted cost will encourage traders to reduce variance by front-loading and reduce average shortfall. For zero alpha trades VWAP benchmark provides the incentive for trades to pick favorable price points throughout the day. However, for large trades, the VWAP benchmark results in front-loaded executions schedules that increase implementation cost.

4.2 Comments about Price Efficiency

This section shows that the density probability function, $p(\pi_i, i \leq [N^*]/\pi_1, \pi_2, \ldots, \pi_{i-1})$, is determined by hypotheses 1 to 5 through a functional form. Reciprocally, it will be shown that given the formulae (5-6a) for Price Impact, in which (H.4) for breakeven is included, a specific probability functional form will satisfy Price Efficiency.

Proposition:
Price efficiency is satisfied $\Leftrightarrow \exists f = f(\pi_i, \{\pi_j\}_{j=1}^{i-1})$ such that $f(\pi_i, \{\pi_j\}_{j=1}^{i-1})|_{\pi_i=0}^1 =$ $1 \wedge \dfrac{(\pi_{i-1}^\beta \xi_{i-1}^{\alpha-1} - \pi_{i-1}^{\beta-1} \xi_{i-1}^{\alpha-2})}{(\pi_i^\beta \xi_{i-1}^{\alpha-1})} \dfrac{\partial f(\pi_i)}{\partial \pi_i} = p(\pi_i, i \le [N^*]/\pi_1, \pi_2, \ldots, \pi_{i-1})$, $\forall i > 2; \pi_j \ne 0, 1 \le j \le i$, and $p(\pi_i = 0, i \le [N^*]/\pi_1, \pi_2, \ldots, \pi_{i-1}) = 0, \forall i$.

Proof:
Hypothesis of Price Efficiency (H.3) says:

$$\int_0^1 p(\pi_i, i \le [N^*]/\pi_1, \pi_2, \ldots, \pi_{i-1})(\tilde{S}_i - \tilde{S}_{i-1}) d\pi_i + \quad \text{(H.3)}$$

$$p(i-1 = [N^*]/\pi_1, \pi_2, \ldots, \pi_{i-1})(S_{i-1} - \tilde{S}_{i-1}) = 0, i \ge 2.$$

Using $p(i-1 = [N^*]/\pi_1, \pi_2, \ldots, \pi_{i-1}) =$ (H.3)

$1 - \int_0^1 p(\pi_i, i \le [N^*]/\pi_1, \pi_2, \ldots, \pi_{i-1}) d\pi_i$ in, one may write:

$\Leftrightarrow (S_{i-1} - \tilde{S}_{i-1}) +$ (A)

$\int_0^1 p(\pi_i, i \le [N^*]/\pi_1, \pi_2, \ldots, \pi_{i-1})(\tilde{S}_i - S_{i-1}) d\pi_i = 0, i \ge 2.$ Using equations (5a) and (6a), one finds:

$S_{i-1} - \tilde{S}_{i-1} = -\mu(\pi_{i-1}^\beta \xi_{i-1}^{\alpha-1} - \pi_{i-1}^{\beta-1} \xi_{i-1}^{\alpha-2}), \quad i \ge 2,$ (B)

Introducing (B) and (5a) in (A), $\Leftrightarrow (\pi_{i-1}^\beta \xi_{i-1}^{\alpha-1} - \pi_{i-1}^{\beta-1} \xi_{i-1}^{\alpha-2}) ==$ (C)

$\int_0^1 p(\pi_i, i \le [N^*]/\pi_1, \pi_2, \ldots, \pi_{i-1}) \pi_i^\beta \xi_i^{\alpha-1} d\pi_i, \quad i \ge 2.$ $\Leftrightarrow \exists f = f(\pi_i, \{\pi_j\}_{j=1}^{i-1}) \big| (\pi_{i-1}^\beta \xi_{i-1}^{\alpha-1} - \pi_{i-1}^{\beta-1} \xi_{i-1}^{\alpha-2})[f(\pi_i, \{\pi_j\}_{j=1}^{i-1}) -$ (D)

$f(0, \{\pi_j\}_{j=1}^{i-1})] ==$ $\int_0^{\pi_i} p(\pi_i, i \le [N^*]/\pi_1, \pi_2, \ldots, \pi_{i-1}) \pi_i^\beta \xi_i^{\alpha-1} d\pi_i,$ $\wedge f(\pi_i, \{\pi_j\}_{j=1}^{i-1})|_{\pi_i=0}^1 = 1.$ $\Leftrightarrow \exists f = f(\pi_i, \{\pi_j\}_{j=1}^{i-1}) \big| f(\pi_i, \{\pi_j\}_{j=1}^{i-1})|_{\pi_i=0}^1 =$ (E)

$1 \wedge (\pi_{i-1}^\beta \xi_{i-1}^{\alpha-1} - \pi_{i-1}^{\beta-1} \xi_{i-1}^{\alpha-2}) \dfrac{\partial f(\pi_i)}{\partial \pi_i} =$ $p(\pi_i, i \le [N^*]/\pi_1, \pi_2, \ldots, \pi_{i-1})(\pi_i^\beta \xi_i^{\alpha-1}), i > 2.$ Because each detectable step i means by definition that $p(\pi_i=0, i \le [N^*]/\pi_1, \pi_2, \ldots, \pi_{i-1})=0, \forall i$; then, one may take:

$\dfrac{(\pi_{i-1}^\beta \xi_{i-1}^{\alpha-1} - \pi_{i-1}^{\beta-1} \xi_{i-1}^{\alpha-2})}{(\pi_i^\beta \xi_i^{\alpha-1})} \dfrac{\partial f(\pi_i)}{\partial \pi_i} ==$ (F)

$p(\pi_i, i \le [N^*]/\pi_1, \pi_2, \ldots, \pi_{i-1}), \forall i > 2;$ $\pi_j \ne 0, 1 \le j \le i.$ Examples
Let $$f(\pi_i, \{\pi_j\}_{j=1}^{i-1}) = \dfrac{\sum_{m=1}^n a_m(\{\pi_j, \xi_j\}_{j=1}^{i-1}) \pi_i^{\gamma_m}}{\sum_{m|\gamma_m \ne 0}^n a'_m} \quad \text{(G)}$$

$n \in \mathbb{N}, \gamma_m \in \mathbb{R} \ge 0 \wedge \sum_{m|\gamma_m \ne 0}^n a_m \ne 0.$ The functions $\alpha_m = \alpha_m(\{\pi_j, \xi_j\}_{j=1}^{i-1})$ and coefficients $\gamma_m$ could be partially determined by (H.2), $$\int_0^1 p(\pi, i = N^*(X)) d\pi \to p(i = N^*) \propto \dfrac{1}{i^{\alpha+1}},$$

when $\pi_j$=constant, $\forall j$. It can be shown that if $\alpha_m$ are constants for all m, then $\alpha_m$ and $\gamma_m$ are arbitrary.

If one takes $f(\pi_i) = \pi_i$ then, $p(\pi_i, i \le [N^*]/\pi_1, \pi_2, \ldots, \pi_{i-1}) = \dfrac{(\pi_{i-1}^\beta \xi_{i-1}^{\alpha-2} \xi_{i-2})}{(\pi_i^\beta \xi_i^{\alpha-1})}, i > 2.$ Also, because $$\int_0^1 p(\pi_1, 1 \le [N^*]) d\pi_1 \stackrel{def}{=} p(1 \le [N^*]) = C,$$

where C is a normalization constant; then, one may choose $p(\pi_1, 1 \le [N^*]) = C$. Let be $p(\pi_2, 2 \le [N^*]/\pi_1) = \pi_2^\beta \xi_2^{-\alpha+1}$. Using (H.2), $p(\pi_1, \pi_2, \ldots, \pi_i, i \le [N^*]) = C \dfrac{\pi_1^{-1}}{\pi_i^\beta \xi_i^{\alpha-1} \xi_{i-1}}.$ (H)

For constant participation rate, (H) becomes:

$p(\pi, i \le [N^*]) = C \dfrac{\pi^{\alpha-\beta-1}}{i^{\alpha-1}(i-1)}, i > 1.$ (I)

Additionally, $p(i \le [N^*]) = \int_0^1 p(\pi, i \le [N^*]) d\pi = \dfrac{c}{i^{\alpha-1}(i-1)}, i > 1.$ (J)

-continued $$\frac{C}{(k-1)k^{\alpha-1}} = p([N^*] \geq k) \stackrel{def}{=} \sum_{i=0}^{\infty} p_{k+i}, k > 1.$$

Subtracting $p([N^*] \geq k+1)$ from $p([N^*] \geq k)$, one obtains:

$$p_k = C\left[\frac{1}{(k-1)k^{\alpha-1}} - \frac{1}{k(k+1)^{\alpha-1}}\right], k > 1, . \quad (K)$$

Equation (K) turns out to be:

$$\frac{C}{k^{\alpha}(1-k^{-1})} - \frac{C}{k^{\alpha}(1+k^{-1})^{\alpha-1}} \stackrel{k \gg 1}{\to}$$

$$Ck^{-\alpha}(1+k^{-1}) - Ck^{-\alpha}(1-(\alpha-1)k^{-1}) = \alpha Ck^{-(\alpha+1)},$$

which is the Pareto distribution. It can be shown that results (J), (K) are also valid for any f such as (G), with $a_m \in \mathbb{R}$ for all m.

REFERENCES

Almgren, R. and Chriss, N. (2000). Optimal Execution of Portafolio Transactions. *Journal of Risk*, 3(2):5-39.

Almgren, R. (2003). Optimal execution with nonlinear impact functions and trading-enhanced risk. *Applied Mathematical Finance*, 10, 1-18.

Almgren, R., Thum, C., Hauptmann E., Li, .H. (2005). Direct Estimation of Equity Market Impact. *Risk*, 18, 57-62.

Altunata, S., Rakhlin D., Waelbroeck H. (2009). Adverse Selection vs. Opportunistic Savings in Dark Aggregators. *The Journal of Trading*. (Winter2010),5(1).

Bertismas, D., and Lo, A. (1998). Optimal control of execution costs. *Journal of Financial Markets*, 1, 1-50.

Bouchaud, J-P., Farmer, J. D., Lillo, F. (2008) How markets slowly digest changes in supply and demand. *Handbook of Financial Markets: Dynamics and Evolution*, 57-156. Eds. Thorsten Hens and Klaus Schenk-Hoppe. Elsevier: Academic Press, 2008.

Chan, L. K. C., and Lakonishok, J. (1995). The behavior of stock prices around institutional trades. *The Journal of Finance*, 50, 1147-1174.

Chan, L. K. C., and Lakonishok, J. (1993). Institutional trades and intraday stock price behavior. *Journal of Financial Economics*, 33, 173-199.

Farmer, J. D., Gerig, A., Lillo F., Waelbroeck H. (2009). Fair pricing and the market impact of large institutional trades. In preparation.

Gabaix, X., Gopikrishnan, P., Plerou, V. and Stanley, H. E. (2006). Institutional investors and stock market volatility. *Quarterly Journal of Economics*, 121, 461-504.

Gomes, C. and Waelbroeck, H. (2008). Effect of Trading Velocity and Limit Prices on Implementation Shortfall. Pipeline Financial Group Preprint PIPE-2008-09-003.

Gopikrishnan, P., Plerou, V., Gabaix, X., Stanley, H. E. (2000). Statistical Properties of Share Volume Traded in Financial Markets. *Physical Review E*, 62(4):R4493-R4496.

Hasbrouck, J. (1991). Measuring the information content of stock trades. *The Journal of Finance*, 46, 179-207.

Hora, M. (2006). The Practice of Optimal Execution. *Algorithmic Trading* 2, 52-60.

Kyle, A. (1985). Continuous auctions and insider trading. *Econometrica*, 53, 1315-1335.

Lillo, F., Farmer, J. D., and Mantegna, R. N. (2003). Master Curve for Price-Impact Function. *Nature*, 421, 129-130.

Loeb, T. F. (1983). Trading Cost: The critical link between investment information and results. *Financial Analysts Journal*, 39(3):39-44.

Moro, E., Moyano, L. G., Vicente, J., Gerig, A., Farmer, J. D., Vaglica, G., Lillo, F., and Mantegna, R. N. (2009). Market impact and trading protocols of hidden orders in stock markets. *Technical Report*.

Obizhaeva, A., and Wang, J. (2006). Optimal trading strategy and supply/demand dynamics. *Technical Report.AFA* 2006 Boston Meetings Paper.

Torre, N. (1997). *Market Impact Model Handbook*. Berkeley: Barra Inc.

Order Flow Imbalances and Short-term Alpha

The previous section described an impact model based on a no-arbitrage argument that fairly accounts for the effect of trading speed on market impact, referred to as hidden order arbitrage theory. That section also described how this framework enables the design of optimal execution schedules, using a simulated annealing optimization method.

One of the hypotheses in that section was that order flow in the absence of the impact from the subject algorithmic trade could be modeled as an unbiased random walk. The corresponding impact-free returns in this case are flat: returns in absence of a bias in order flow are log normal with zero mean. The next two sections challenge this hypothesis by introducing two sources of bias: first, a bias in the order flow itself will cause the realized participation rate of algorithms to differ from the intended target. Second, the bias can cause mean expected returns to be non-zero, a situation known in the art as "short-term alpha." Both observations have implications for the impact model, and for the exemplary methods that enable the calculation of optimal execution profiles. The results of the derivations below may be incorporated into the exemplary impact models described above.

Order Flow Imbalances

To this point, a price method was considered such that as market participants begin to detect the volume a trader is buying (selling), the market participants adjust their offers (bids) upward (downward). This adjustment or "impact" may be modeled using a random walk theory and Information Arbitrage Theory, leading to the equation:

$$\tilde{S}_k = S_{k-1} + \mu \pi_k^\beta \left(\sum_{i=1}^{k} \frac{1}{\pi_i}\right)^{\alpha-1}. \quad (40b)$$

The constant $\mu > 0$ for a buy and $\mu < 0$ for a sell and units $$[\mu] = \frac{\$}{\text{share}}$$

In addition, due to breakeven, one may write:

$$\widetilde{S_k} = S_0 + \mu\{\pi_k^\beta(\Sigma_{i=1}^{k}\pi_i^{-1})^{\alpha-1} + \Sigma_{i=1}^{k-1}\pi_i^{\beta-1}(\Sigma_{j=1}^{i}\pi_j^{-1})^{\alpha-2}\}, 2 \leq k \leq N, \quad (42a)$$

$\langle S_k \rangle$ is the Gaussian average market price per share at the k-step and $\langle \widetilde{S_k} \rangle$ is the Gaussian average cash price one pays per share. Calculating the difference $\langle \widetilde{S_{k+1}} - S_k \rangle$, one obtains:

$$\langle S_k \rangle - \langle S_{k-1} \rangle = \mu \pi_k^{\beta-1} \left(\sum_{i=1}^{k} \frac{1}{\pi_i}\right)^{\alpha-2}. \quad (42c)$$

The formula above means that the random market price variable can be written as:

$$S_k = S_{k-1} + \mu \pi_k^{\beta-1} \left( \sum_{i=1}^{k} \frac{1}{\pi_i} \right)^{\alpha-2} + \sigma \pi_k^{-1} \zeta_k, \qquad (42d)$$

where the $\zeta_k$ are random variables with zero Gaussian mean and unit variance and $\sigma$ is the volatility constant with units $$[\sigma] = \frac{\$}{\text{share} \times \sqrt{\text{transaction}}}.$$

Then, equation (42a) can be written for the random cash price variable as:

$$\tilde{S}_k = \qquad (42a)$$

$$S_0 + \mu \left\{ \pi_k^{\beta} \left( \sum_{i=1}^{k} \pi_i^{-1} \right)^{\alpha-1} + \sum_{i=1}^{k-1} \pi_i^{\beta-1} \left( \sum_{j=1}^{i} \pi_j^{-1} \right)^{\alpha-2} \right\} + \sigma \sum_{i=1}^{k-1} \pi_i^{-1} \zeta_i,$$

$$2 \le k \le N.$$

Therefore, the random cost variable without risk is:

$$U(\lambda = 0) = X S_0 - \sum_{i=1}^{N} n_i \tilde{S}_i = \qquad (44b)$$

$$|\mu X| \sum_{k=1}^{N} \pi_k^{\beta-1} \left( \sum_{i=1}^{k} \pi_i^{-1} \right)^{\alpha-2} - \sigma n \sum_{j=2}^{N} \pi_j^{-1} \sum_{i=1}^{j-1} \pi_i^{-1} \zeta_i,$$

with the constraints for the total number of traded shares and transaction time:

$$X = n \sum_{i=1}^{N} \pi_i^{-1}, \qquad (45)$$

$$T = \sum_{i=1}^{N} \pi_i^{-2}. \qquad (46)$$

One may calculate the optimal trajectory $\{\pi^*_k\}_{k=1}^{N}$ that makes minimum the Gaussian average cost $<U(\lambda=0)>$. That trajectory may be called static since it will not be modified while trading whatever the circumstances. However, what should one do if prices go downward instead upwards during one's buying? The "Aggressive in the money" trajectories says that one should buy faster. To consider that case in the context of Information Arbitrage Theory, one may adjust the next participation rate $\pi_k$ to the noise $\zeta_{k+1}$ of the previous step (k−1), which originated the fall in the buying price ($\zeta_{k+1}$ will be negative in this case). Therefore, one may use the static trajectory $\{\pi^*_j\}_{j=1}^{k-1}$ while the prices go upward, and change to an "adaptive trajectory" for j≧k, where the price started to go downward.

From equation (44b), taking k=2, one may optimize the cost for (N−1) variables $\{\pi_k\}_{k=2}^{N}$:

$$<U(\lambda=0, \pi^*_1, \zeta_1)> = |\mu X| \{\pi^{*\beta-\alpha+1}_1 + \Sigma_{k=2}^{N} \pi_k^{\beta-1}(\pi^{*-1}_1 + \Sigma_{i=2}^{k} \pi_i^{-1})^{\alpha-2}\} - \sigma \pi^{*-1}_1 \zeta_1 (X - n^*_1), \qquad (44c)$$

Here, $\pi^*_1$, $\zeta_1$ and the number of shares traded at the first step $n^*_1 = n/\pi^*_1$ are known from the last performed trade. One obtains the new optimal trajectory $\{\pi^{\#}_k\}_{k=2}^{N}$. One may use $\pi^*_1, \zeta_1, \pi^{\#}_2, \zeta_2$ to optimize the Gaussian mean cost for (N−2) variables $\{\pi_k\}_{k=3}^{N}$, etc., until all the variables are exhausted.

Below is written the average cost for the (N−1) variables $\{\pi_k\}_{k=2}^{N}$ and for the (N−2) variables $\{\pi_k\}_{k=3}^{N}$. One may use data from APA dated January 14. The total number of shares is X=176862 shares. The total number of institutional transactions is $1198 = \Sigma_{i=1}^{N} \pi_i^{-1}$, and the total number of market transactions corresponding to the institutional ones is about 5330. The average number of institutional transactions per interval is $$\frac{5330}{1198} = 4.45.$$

Then, N≈270 but to satisfy the constraints one may shorten to N=240. The constant $\mu = (\tilde{S}_1 - S_0) \pi^{*0.2}_1 = 0.017$\$/share, where the actual data was used: $\tilde{S}_1 = 107.28$\$/share, $S_0 = 107.26$\$/share an average for the nominal price of the first three best bid prices and an estimation for the speed rate for the first detectable interval of $\pi^{*(-1)}_1 = 3$, which coincides with the result of the static trajectory as shown above.

The noise term is $\sigma \pi^{*-1}_1 \zeta_1 = S_1 - S_0 - \mu \pi^{*(0.2)}_1 = -0.0729$\$/share, where one has proposed $S_1 = 107.21$\$/share from the best bid price data immediately after the third institutional transaction. The data reflects that, for the first detectable interval of 3 institutional transactions, the actual number of transacted shares by the institution is $n^*_1 = 400$ shares. One obtains:

$$(U(\lambda=0, \pi^*_1, \zeta_1)) = |\mu X| \{\pi^{*(-0.2)}_1 + \Sigma_{k=2}^{N} \pi_k^{(-0.7)}(\pi^{*-1}_1 + \Sigma_{i=2}^{k} \pi_i^{-1})^{0.5}\} - \sigma \pi^{*-1}_1 \zeta_1 (X - n^*_1), \qquad (44c)$$

One may optimize by Simulated Annealing:

$f = 0.016 \times 176862(3^{0.2} + \text{Sum}[n[i]^{0.7}(3 + \text{Sum}[n[k], \{k, 2, i\}])^{-0.5}, \{i, 2, 240\}]) - 0.0729 \times 176462;$ $c = \{\text{Sum}[n[k], \{k, 2, 240\}] \le 1195, \text{Sum}[n[k]^2, \{k, 2, 240\}] \le 5241\};$ $v = \text{Table}[n[i], \{i, 2, 240\}]$ $N\text{Minimize}[\{f, c\}, \text{Table}[\{n[i], 8, 10\}, \{i, 2, 240\}], \text{Method} \rightarrow \text{"SimulatedAnnealing"}]$ $\{U = 96506.3\$, \{n[2] = \pi^{*-1}_2 = 7.75746\}\}$ This solution suggests that the institution should transact 7 or 8 times during the second period.

Next, one may resolve for (N−3) or third period. The noise term is $\sigma \pi^{*-1}_2 \zeta_2 = S_2 - S_1 - \mu \pi^{*(0.7)}_2 (\pi^{*-1}_1 + \pi^{*-1}_2)^{0.5} = -0.061$\$/share, where one has proposed $S_2 = 107.16$\$/share taken from the data immediately after the tenth institutional transaction. Also, from the data, $n^*_2 = 1500$ shares.

$\pi^{*-1}_1$

One may optimize by Simulate Annealing:

$f = 0.016 \times 176862(3^{0.2} + 7^{0.7} 10^{-0.5} + \text{Sum}[n[i]^{0.7}(10 + \text{Sum}[n[k], \{k, 3, i\}])^{-0.5}, \{i, 3, 240\}]) - 0.0729 \times 176462 - 0.061(176862 - 1900);$ $c = \{\text{Sum}[n[k], \{k, 3, 240\}] \le 1188, \text{Sum}[n[k]^2, \{k, 3, 240\}] \le 5192\};$ $v = \text{Table}[n[i], \{i, 3, 240\}]$ NMinimize[{f, c}, Table[{n[i], 8, 10}, {i, 3, 240}],
    Method→"SimulatedAnnealing"]

$\{U=86671.3\$, \{n[3]=\pi*_2{}^{-1}=2.49399\}\}$

The solution suggests the institution should transact 2 or 3 times during the third period. The total cost is decreasing.

The problem with this method is that the noise does not contribute to the optimal trajectory although it does contribute to the total cost, as one can see from expressions (44c, d) The optimization does not "see" the constant terms in the expression for the cost, so the optimal trajectory is the same with or without the constant noise terms. Nevertheless, these adaptive trajectories are different from the static one. One obtains the result below for the complete problem of N variables (static trajectory):

$f=0.016\times 176862(\text{Sum}[n[i]^{0.7}(\text{Sum}[n[k], \{k, 1, i\}])^{-0.5}, \{i, 1, 240\}]);$ $c=\{\text{Sum}[n[k], \{k, 1, 240\}]\leq 1198, \text{Sum}[n[k]^2, \{k, 240\}]\leq 5250\};$ $v=\text{Table}[n[i], \{i, 1, 240\}]$ NMinimize[{f, c}, Table[{n[i], 8, 10}, {i, 1, 240}],
    Method→"SimulatedAnnealing"]

$\{U=109662\$., \{n[1]=2.20661, n[2]=5.02312, n[3]=7.41884\}\}$

The total cost is also bigger than the adaptive one. The total number of institutional transactions is 1003.37, the market transactions T=4678.67.

For the reason given above, one may introduce a modification to the method in order to incorporate a noise component to the participation rate. The disadvantage will be the calculation of the statistical average, because of the non-linear nature of the market impact.

One may start with the introduction of two kinds of participation rates:

a) The requested participation rate $\pi_i$: measure how many times the institution attempts to participate b) The realized participation rate $\tilde{\pi}_i$: measure how many times the institution actually participates.

Exemplary Modification to the Method

1. Hidden orders are detected every $\tau_i=1/\pi_i^2$ transactions, where $\pi_i$ is the requested participation rate.

2. Temporary impact and permanent impact depend only on the requested participation rate, not on the realized rate.

3. In each detectable interval, the number of shares filled is determined by the realized participation rate $\tilde{\pi}_i$, which is a function of market noise.

4. The utility function depends on the realized prices and realized rates $\pi_i$ as $$U = XS_0 - \sum_{k=1}^{n} \tilde{n}_k \tilde{S}_k$$

$\widetilde{n_k} = \widetilde{\pi_k^{-1}}$

5. $\pi_k^{-1} \geq \tilde{\pi}_k^{-1}$, and $\pi_k^{-1} = \tilde{\pi}_k^{-1}$+no realized transactions Data Analysis Data from a passive algorithm reveals the relationship between realized fills and noise is sigmoidal. The vertical range (16 in this case) is a control parameter for algorithms, additional to the participation rate (often called "discretion"). Therefore, the optimal solution may lead to an optimal schedule for discretion as well as rate—or the optimization can be performed for an optimal schedule given a specified discretion value.

See FIG. 1.

Next step is to calculate the total cost with all this new information and, more difficult, to calculate the average where second order terms of the noise are non-null.

One may introduce a modification to the method in order to incorporate a noise component to the participation rate. In this case, the participation rate becomes a random variable instead of a deterministic one.

One may start with the introduction of two kinds of participation rates:

a) The requested participation rate $\pi_i$: measure the fraction of one detectable interval the institution attempts to participate, b) The realized participation rate $\tilde{\pi}_i$: measure the fraction of one detectable interval the institution actually participates.

Exemplary Modification to the Method

1. Hidden orders are detected every $\tau_i=1/\pi_i^2$ market transactions where $\pi_i$ is the requested participation rate.

2. Temporary impact and permanent impact depend only on the requested participation rate, not on the realized rate, as:

$$\tilde{S}_k = S_0 + \mu \left\{ \pi_k^\beta \left( \sum_{i=1}^{k} \pi_i^{-1} \right)^{\alpha-1} + \sum_{i=1}^{k-1} \pi_i^{\beta-1} \left( \sum_{j=1}^{i} \pi_j^{-1} \right)^{\alpha-2} \right\} + \sigma \sum_{i=1}^{N} \pi_i^{-1} \varsigma_i,$$

$$1 \leq k \leq N,$$

3. In each detectable interval, the number of shares filled $\tilde{n}_i$ is determined by the realized participation rate $\tilde{\pi}_i$, $$\tilde{n}_i = \frac{n\tilde{\pi}_i}{\pi_i^2},$$

4. $\tilde{\pi}_i$ is a function of the market noise. Data from a passive algorithm reveals that the relationship between realized fills and noise is sigmoidal:

$$\tilde{n}_i = n\left(a + \frac{b}{1+\text{Exp}[c(x_i-x_0)]}\right)$$

With $x_i = \varsigma_i \sigma \pi_i^{-1}$

5. The utility function depends on the realized prices $\tilde{S}_i$ and realized rates $\tilde{\pi}_i$ as $$U = XS_0 - \sum_{k=1}^{N} \tilde{n}_i \tilde{S}_i$$

6. One may estimate that $\pi_k = \langle \tilde{\pi}_k \rangle$

Therefore, the random cost variable without risk is:

$\tilde{\pi}_i$ with the constraints for the total number of traded shares and transaction time:

$$X \geq \sum_{i=1}^{N} \tilde{n}_i, \qquad (45)$$

and $$T \geq \sum_{i=1}^{N} \pi_i^{-2}. \qquad (46)$$

The statistical average for the cost results:

$$\langle U(\{\langle \tilde{\pi}_i \rangle\}_{i=1}^{N}) \rangle =$$

$$|\mu n| \sum_{k=1}^{N} \langle \tilde{\pi} k \rangle^{0.7} \left( \sum_{i=1}^{k} \langle \tilde{\pi}_i \rangle^{-1} \right)^{0.5} \left( \sum_{i=1}^{N} \langle \tilde{\pi}_i \rangle^{-1} \right) - \sigma \sum_{j=1}^{N} \sum_{i=1}^{j} \langle \tilde{\pi}_i \rangle^{-1} \langle \tilde{n}_j \varsigma_i \rangle,$$

One may calculate the correlation:

$$\langle \tilde{n}_j \varsigma_i \rangle = n \left\{ a \langle \varsigma_i \rangle + \delta_{ij} b \left\langle \frac{\varsigma_i}{1 + \text{Exp}[c(x_j - x_0)]} \right\rangle \right\}$$

$$\left\langle \frac{\varsigma_i}{1 + \text{Exp}[c(x_i - x_0)]} \right\rangle \stackrel{\text{def}}{=} \frac{1}{\sqrt{2\pi}} \int_{-\infty}^{\infty} \frac{\varsigma_i}{1 + \text{Exp}[c(x_i - x_0)]} e^{-(\varsigma_i - \langle \varsigma_i \rangle)^2/2} d\varsigma_i =$$

$$\frac{1}{\sqrt{\pi}} \int_{-\infty}^{\infty} \frac{(\sqrt{2} \, v + \langle \varsigma_i \rangle)}{1 + \text{Exp}[c((\sqrt{2} \, v + \langle \varsigma_i \rangle) \sigma \langle \tilde{\pi}_i \rangle^{-1} - x_0]} e^{-v^2} dv$$

Using numerical integration, one obtains:

$$\left\langle \frac{\varsigma_i}{1 + \text{Exp}[c(x_i - x_0)]} \right\rangle = \frac{1}{\sqrt{\pi}} \lim_{n \to \infty} \sum_{i=1}^{n} 2^{n-1} n! \sqrt{\pi}$$

$$\frac{(\sqrt{2} \, x_i^* + \langle \varsigma_i \rangle)}{n^2 [H_{n-1}(x_i^*)]^2} \{1 + \text{Exp}[c[(\sqrt{2} \, x_i^* + \langle \varsigma_i \rangle) \sigma \langle \tilde{\pi}_i \rangle^{-1} - x_0]]\}^{-1}$$

Here, the $x^*_i$ are the roots of the Hermite polynomial of order n, $H_n(x)$ For $\langle \varsigma_i \rangle = 10^{-3}$, $\forall i$; $c=0.2$, $x_0=10$, $\sigma \langle \tilde{\pi}_i \rangle^{-1}=31$, one may evaluate the sum for:
n=2, $$(\sqrt{\pi}/2)((1 + \text{Exp}[8.2062])^{-1} - (1 + \text{Exp}[6.2(-1 + 10^{-3}) + 2])^{-1}) =$$

$$-0.872812$$

n = 6, $$0.7246 \times \sqrt{2} \times 0.4361((1 + \text{Exp}[2 + 31 \times 0.2(\sqrt{2} \times 0.4361 + 10^{-3})])^{-1} -$$

$$(1 + \text{Exp}[31 \times 0.2(-\sqrt{2} \times 0.4361 + 10^{-3}) + 2])^{-1}) +$$

$$0.1571 \times \sqrt{2} \times 1.3358((1 + \text{Exp}[2 + 31 \times 0.2(\sqrt{2} \times 1.3358 + 10^{-3})])^{-1} -$$

$$(1 + \text{Exp}[31 \times 0.2(-\sqrt{2} \times 1.3358 + 10^{-3}) + 2])^{-1} + 0.0045 \times$$

$$\sqrt{2} \times 2.3506((1 + \text{Exp}[2 + 31 \times 0.2(\sqrt{2} \times 2.3506 + 10^{-3})])^{-1} -$$

$$(1 + \text{Exp}[31 \times 0.2(-\sqrt{2} \times 2.3506 + 10^{-3}) + 2])^{-1}) =$$

$$-0.694858$$

One sees that for n>2, the sum of the roots becomes smaller in absolute value. One may choose cutting the sum in n=2, because orders of $10^0$ are almost negligible for this cost and it is the maximum variation one can obtain with respect to the problem of the total cost without noise.

Then, for the order of the parameters chosen above, one may write the correlation as:

$$\langle \tilde{n}_j \varsigma_i \rangle = n \left\{ a \langle \varsigma_i \rangle + \delta_{ij} \frac{b}{2} (1 + \langle \varsigma_i \rangle)(1 + \text{Exp}[c[(1 + \langle \varsigma_i \rangle) \sigma \langle \tilde{\pi}_i \rangle^{-1} - x_0]])^{-1} - \right.$$

$$\left. (1 + \text{Exp}[c[(-1 + \langle \varsigma_i \rangle) \sigma \langle \tilde{\pi}_i \rangle^{-1} - x_0]])^{-1} \right\}$$

Finally, the expression for the total cost becomes:

$$\langle U(\{\langle \tilde{\pi}_i \rangle\}_{i=1}^{N}) \rangle = |\mu n| \sum_{k=1}^{N} \langle \tilde{\pi}_k \rangle^{-0.7} \left( \sum_{i=1}^{k} \langle \tilde{\pi}_i \rangle^{-1} \right)^{-0.5} \left( \sum_{i=1}^{N} \langle \tilde{\pi}_i \rangle^{-1} \right) -$$

$$\sigma n \sum_{i=1}^{N} \langle \tilde{\pi}_i \rangle^{-1} \left\{ a(N - i + 1) \langle \varsigma_i \rangle + \right.$$

$$\frac{b}{2} (1 + \langle \varsigma_i \rangle)(1 + \text{Exp}[c[(1 + \langle \varsigma_i \rangle) \sigma \langle \tilde{\pi}_i \rangle^{-1} - x_0]])^{-1} -$$

$$\left. (1 + \text{Exp}[c[(-1 + \langle \varsigma_i \rangle) \sigma \langle \tilde{\pi}_i \rangle^{-1} - x_0]])^{-1} \right\}.$$

Optimal Execution of Portfolio Transactions with Short-Term Alpha

In their 2000 paper ("AC 2000"), Almgren and Chriss found that to maximize the risk-adjusted liquidation value of an asset it is optimal to trade fastest at the beginning of a trade and follow a schedule that is a hyperbolic function. This remarkable closed-form solution was made possible by simplifying assumptions that price is driven by an arithmetic Brownian motion and that impact is linear and stationary.

This portion of the description revisits the optimal execution problem with a different perspective. A recently proposed impact model is used that is derived from a no-arbitrage argument for traders that use statistical models to detect hidden orders. Adjusted cost functions are derived for optimal trade scheduling in presence of risk aversion without a directional bias, as in AC 2000; and in presence of "short-term alpha" with no risk aversion. Numerical solutions of optimal execution problems in the presence of hidden order arbitrage are found for a variety of alpha decay profiles and implications for institutional trading desks are discussed.

Recent years have witnessed an increasing use on quantitative modeling tools and data processing infrastructure by high frequency trading firms and automated market makers. They monetize the value of the options written by institutional trade algorithms with every order placement on the market. This creates a challenge for institutional traders. The result for institutions is that trades with poor market timing typically execute too fast and those that have high urgency tend to execute too slowly and sometimes fail to complete. When the market controls the execution schedule, it is seldom to the advantage of the institutional trader.

To cope with this problem, the trader needs to perform three challenging tasks.

First, develop an understanding of how urgent a trade is—i.e., when the benefits of speedier execution outweigh the additional impact costs. Second, map this urgency to an optimal execution schedule; and third, implement the schedule efficiently in the presence of market noise—a stochastic optimization problem. The industry is increasingly working to solve each of these three problems.

This portion of the description addresses the second task: assign an optimal trade schedule given a view on short-term alpha. To this end, an alternative to the AC 2000 framework is based on more realistic assumptions for market impact and explicitly considers the possibility of a directional bias, or "short-term alpha".

This new framework addresses the optimal execution of a large portfolio transaction that it is split into smaller slices and executed incrementally over time. There are many dimensions to this problem that are potentially important to the institutional trader: liquidity fluctuations, news stream, order flow imbalances, etc. In response to these variables, traders make decisions including the participation rate, limit price, and other strategy attributes. This portion of the description limits the scope of the problem by adopting the definition of optimal execution from AC 2000: optimal execution is the participation rate profile that minimizes the cost or risk-adjusted cost while completing the trade in a given amount of time.

To optimize the risk-adjusted cost, one must first specify a model for market impact. Market impact has been analyzed by different authors as a function of time and trade size. See for example (Bertismas and Lo, 1998), (Almgren and Chriss, 2000), (Almgren et al., 2005), (Obizhaeva and Wang, 2006).

AC 2000 derived execution profiles that are optimal if certain simplifying assumptions hold true. These include the hypothesis that the market is driven by an arithmetic Brownian motion overlaid with a stationary market impact process. Impact is proposed to be the linear sum of permanent and temporary components, where the permanent impact depends linearly on the number of traded shares and the temporary impact is a linear function of the trading velocity. It follows that total permanent impact is independent of the trade schedule. The optimal participation rate profile requires trading fastest at the beginning and slowing down as the trade progresses according to a hyperbolic sine function.

This type of front-loaded participation rate profile is widely used by industry participants, yet it is also recognized that it is not always optimal. Some practitioners believe that the practice of front-loading executions bakes in permanent impact early in the trade, resulting in higher trading costs on average. A related concern is that liquidity exhaustion or increased signaling risk could also lead to a higher variance in trade results (Hora, 2006), defeating the main purpose of front-loading. In their paper, Almgren and Chriss acknowledge that the simplifying assumptions required to find closed-form optimal execution solutions are imperfect. The non-linearity of temporary impact in the trading velocity has been addressed previously in (Almgren, 2003), (Almgren et al., 2005); the optimization method has also been adjusted for non-linear phenomenological models of temporary impact (Loeb, 1983; Lillo et al., 2003). However, most studies share the common assumptions that short-term price formation in non-volatile markets is driven by an arithmetic Brownian motion and that the effect of trading on price is stationary, i.e., the increment to permanent impact from one interval to the next is independent of time. In addition, the temporary impact is a correction that depends only on the current trading velocity but not on the amount of time that the strategy has been in operation. There are reasons to doubt the assumption of stationary impact. Practitioners find that reversion grows with the amount of time that an algorithm has been engaged; this suggests that temporary impact grows as a function of time. Phenomenological models of market impact consistently produce concave functions for total cost as a function of trade size; this is inconsistent with linear permanent impact.

(Farmer et al., 2009) (FGLW) showed that it is possible to derive a concave shape for both temporary and permanent impact of a trade that is executed at a uniform participation rate. The basic assumption in this case is that arbitrageurs are able to detect the existence of an algorithm and temporary impact represents expectations of further activity from this algorithm. The concave shape of market impact follows from two basic equations. The first is an arbitrage equation for traders that observe the amount of time an execution has been in progress. They use the distribution of hidden order sizes to estimate the probability that the hidden order will continue in the near future. The second is the assumption that institutional trades break even on average after reversion. In other words, the price paid to acquire a large position is on average equal to the price of the security after arbitrageurs have determined that the trade is finished. The model explains how temporary impact sets the fair price of the expected future demand or supply from the algorithmic trade. When the trade ends and these expectations fade away, the model predicts how price will revert to a level that incorporates only permanent impact. The shape of the impact function can be derived from knowledge of the hidden order size distribution. If one believes the hidden order size distribution to have a tail exponent of approximately 1.5, the predicted shape of the total impact function is a square root of trade size in agreement with phenomenological models including the Barra model (Torre, 1997). See also, (Chan and Lakonishok, 1993), (Chan and Lakonishok, 1995), (Almgren et al., 2005), (Bouchaud et al., 2008), (Moro et al., 2009).

Hidden order arbitrage theory has been extended to varying participation rate profiles by some of the present inventors. This extension adds the assumption that temporary impact depends only on the current trading speed and total number of shares acquired so far in the execution process.

This portion of the description is organized as follows. Section 1 uses the extended hidden order arbitrage theory to derive the cost functions for two optimal execution problems. Section 2.1 describes minimization of trading cost given a specific directional view on short-term alpha decay. Section 2.2 describes minimization of risk-adjusted cost in absence of short-term alpha. It is of interest when risk is a consideration but one has no directional bias on the short-term price trends in the stock. Section 3 provides numerical solutions in cases of some relevance to institutional trading desks. The concluding section discusses implications of these results to the choice of benchmarks used at institutional trading desks to create incentives for traders.

1. Short-Term Alpha Decay and Hidden Order Arbitrage Theory:

The alpha coefficient ($\alpha$) and beta coefficient ($\beta$) play an important role in the capital asset pricing model (CAPM). Both constants can be estimated for an individual asset or portfolio using regression analysis for the asset returns versus a benchmark. The excess return of the asset over the risk-free rate follows a linear relation with respect to the market return $r_m$ as:

$$r_a = \alpha_a + \beta_a r_m + \epsilon_a, \qquad (1),$$

where $\epsilon_a$ is the statistical noise with null expectation value. The variance of asset returns introduces idiosyncratic risk, which is minimized by building a balanced portfolio, and systematic risk, for which the investor is compensated through the multiplier beta. The same terminology is used to project future returns: a portfolio manager will assign $\alpha$ to desirable positions based on estimated target prices.

It is common to borrow from this terminology in the trade execution arena. The expected market return over the execution horizon is generally assumed to be zero, so the term "short-term alpha" is used by some to denote either the expected return of a stock or the expected alpha after beta-adjustment as given in (1). To address the optimal execution problem it is important to know not only the total short-term alpha to the end of the execution horizon, but also the manner in which it decays over time. There are four cases of interest 1) Urgent trades (on news or liquidity exhaustion events, for example) can be expected to have an exponential alpha decay with a short time constant, for example 10-60 minutes.
2) Other informed trades may be expected to have slower alpha decay, with an adverse trend persisting throughout the execution horizon—for example if multiple managers are competing to execute similar trades.
3) Some trades have no short-term market timing and no alpha decay is expected on the execution horizon.
4) Contrarian trades (exit trades or value buys aiming to take advantage of selling pressure on the market, for example) are expected to have slow negative alpha over the execution horizon.

All cases above are well modeled with an exponential alpha decay profile, $$\alpha(t) = \alpha_\infty \left(1 - e^{\frac{[t-t_0]}{\tau}}\right), \qquad (2)$$

with a magnitude $\alpha_\infty$, and decay constant $\tau$. In the presence of a trade, the expected return will be $$E(r, t) = \text{Impact}(t) + \alpha(t), \qquad (3)$$

where one considers $E(r_m) \approx 0$, but has added a market impact component as result of the intrinsic dynamics of the trade.

Some of the present inventors have proposed an impact model that assumes that market makers are able to observe imbalances caused by institutional trades. Below is a summary of the hypothesis that may be used for the description of market impact and addition of new components modeling the short-term alpha decay.

Hypothesis I: Hidden Order Detection

A hidden order executing during a period $\alpha t$ with an average rate $\pi$, is detected at the end of intervals of $\tau(\pi) = 1/\pi^2$ market transactions[4]. The term "detectable interval" is used below to mean each set of

[4]If order flow were a random walk with a bias $\pi$ between buy and sell transactions, the imbalance would be detected with t-stat=1 after $1/\pi^2$ transactions.

$$\tau(\pi_i) = \frac{1}{\pi_i^2}$$

market transactions, for each $i \in \mathbb{N}$, over which a hidden order is detected with a constant participation rate $\pi_i$. A detectable interval i contains $$\frac{1}{\pi_i}$$

hidden order transactions, with $0 < \pi_i < 1$, $\forall i$.

In addition, there exists a function $\tau_r(X, \pi_f)$ such that the end of a hidden order can be detected after a reversion time $\tau_r(X, \pi_f)$, where $\pi_f$ is the most recently observed rate. Let be $N^* = N^*(X) \in \mathbb{R}_{>0}$, then $N^* = q + [N^*]$, $[N^*] \stackrel{\text{def}}{=}$ Integer-Part[$N^*$], $0 \le q < 1$.

One may set $\tau_r(X, \pi_f) = q\pi_f^{-2}$. The number $N^*$ will be determined by the trade size X and $[N^*]$ represents the last detectable interval.

Hypothesis II: Linear Superposition of Alpha and Impact

Considering the asset return as the difference between the initial price of a share $S_0$ and the price paid at the k-interval, $\tilde{S}_k$, one may write equation (3) as $$\tilde{S}_k - S_0 = \alpha_k + \text{Impact}_{[0, k]}, \qquad (4).$$

Here, $\alpha_k$ is a function of the transactional time $t_k$ elapsed from the beginning of the trade to the interval k, and will be called the "short term alpha".

$\text{Impact}_{[0, k]}$, is the impact of the security price from the beginning of the trade to the end of the interval k.

Denote by $\tilde{S}_k$ the expected average price in the interval, where the expectation is over a Gaussian (G) function of an arithmetic random walk, with fixed $\{\pi_1, \pi_2, \ldots, \pi_k\}$.

Hypothesis III: Impact Model

Impact of the security price is related to price formation from the beginning of the trade to the end of the interval k, as $$\text{Impact}_{[0,k]} = \mu \left\{ \pi_k^\beta \left(\sum_{i=1}^k \pi_i^{-1}\right)^{\alpha-1} + \sum_{i=1}^{k-1} \pi_i^{\beta-1} \left(\sum_{j=1}^i \pi_j^{-1}\right)^{\alpha-2} \right\}, \qquad (5a)$$

$$2 \le k \le [N^*],$$

$$\text{Impact}_{[0,1]} = \mu \pi_1^{\beta-\alpha+1} \qquad (5b)$$

Here, $\alpha = 1.5$ (Gopikrishnan et al., 2000), (Gabaix et al., 2006). Empirical observations suggest $\beta = 0.3$ (Gomez and Waelbroeck, 2008), close to theoretical predictions of 0.25, (Bouchaud et al., 2008). The constant $\mu > 0$ for a buy and $\mu < 0$ for a sell.

By Hypothesis I, one may consider the possibility that the total number of detectable steps $N^*$ is a non-integer value; which means the institution could finish at an "extra time" $q = N^* - [N^*]$, $0 \le q < 1$, that it is completed in less than $\pi^{-2}$ market transactions. In the case that $q \ne 0$, the total impact between the origin O and $N^*$ will be:

$$\text{Impact}_{[0, N^*]} = \mu \{\pi_{N^*}^\beta \xi_{N^*}^{\alpha-1} + \Sigma_{i=1}^{[N^*]} \pi_i^{\beta-1} (\Sigma_{j=1}^i \pi_j^{-1})^{\alpha-2}\}, \qquad (5c)$$

where $\xi_{N^*}$ is the total number of transactions traded until the last detectable interval $N^*$ and it is by definition:

$$\xi_{N^*} \stackrel{\text{def}}{=} \left(\sum_{i=1}^{[N^*]} \frac{1}{\pi_i} + q\pi_{N^*}^{-1}\right). \qquad (6)$$

Hypothesis V: Alpha Decay Model $$\alpha_k = S_0 \alpha_\infty \left(1 - e^{-\frac{t_k + t_{k-1}}{2\kappa}}\right), \qquad (7)$$

$$t_k = \sum_{i=1}^k \pi_i^{-2}. \qquad (8)$$

$\kappa$ is a typical time decay and $\alpha_\infty$ is a parameter associated with the information of a trade.

2. Total Cost Definition and Constraints

2.1 Equations without Risk Term

The expected total cost of the trade (over G) is $$E(\vec{\pi}, N^*) \stackrel{def}{=} n\xi_{N^*}S_0 - \sum_{i=1}^{[N^*]} n_i \tilde{S}_i - qn\pi_{N^*}^{-1}\tilde{S}_{N^*}, \qquad (9)$$

where $n_i = n\pi_i^{-1}$ is the number of shares traded in the i-segment and n is the number of traded shares in each institutional transaction with n>0 for a sell and n<0 for a buy.

In addition, suppose that there exists $N \in \mathbb{N}$, $N \leq N^*$, such that from N+1 to N* the institution participates with a constant rate $\pi_f$. Therefore, the variables $(\vec{\pi}, N^*)$ will be reduced to $(\{\pi_i\}_{i=1}^N, \pi_f, N^*)$.

After a calculation, using the equations above, the expected total cost turns out to be:

$$E(\{\pi_i\}_{i=1}^N, \pi_f, N^*; \vec{p}) = \qquad (10)$$

$$|\mu n|\xi_{N^*}\left\{\sum_{k=1}^{[N^*]} \pi_k^{\beta-1}\left(\sum_{i=1}^k \pi_i^{-1}\right)^{\alpha-2} + q\pi_f^{\beta-1}\left(\sum_{i=1}^{[N^*]} \pi_i^{-1} + q\pi_f^{-1}\right)^{\alpha-2}\right\} -$$

$$nS_0\alpha_\infty\left\{\xi_{N^*} - \sum_{i=1}^N \pi_i^{-1} e^{-\frac{t_i + t_{i-1}}{2\kappa}} - \right.$$

$$\pi_f^{-1}\left(\sum_{i=N+1}^{[N^*]} e^{-\frac{\left(\sum_{j=1}^N \pi_j^{-2}(i-N)\pi_f^{-2} - 0.5\pi_f^{-2}\right)}{\kappa}} + \right.$$

$$\left.\left.(N^* - [N^*])e^{-\frac{\left(\sum_{j=1}^N \pi_j^{-2} + (N^* - N)\pi_f^{-2}\right)}{\kappa}}\right)\right\},$$

with:

$$N^* = q + [N^*], \quad [N^*] \stackrel{def}{=} \text{IntegerPart}[N^*], \ 0 \leq q < 1,$$

$$t_k = \sum_{i=1}^k \pi_i^{-2}, \ 1 \leq k \leq N,$$

and the parameter vector:

$$\vec{p} = (\mu, n, N, \alpha, \beta, S_0, \alpha_\infty, \kappa)$$

Set the constraints to be:

$$X/n = \xi_{N^*} \stackrel{def}{=} \left\{\sum_{j=1}^N \pi_j^{-1} + (N^* - N)\pi_f^{-1}\right\}, \qquad (11)$$

$$T_M \geq t_{N^*} \stackrel{def}{=} \sum_{i=1}^N \pi_i^{-2} + (N^* - N)\pi_f^{-2}. \qquad (12)$$

Here, X is the total number of shares fixed to trade and $T_M$ is the time horizon.

Section 3.1 describes find optimal trajectories for the set of the expected trading rates $(\{\pi_i\}_{i=1}^N, \pi_f)$ and the total number of detectable steps N*, which minimize the total cost. Using Mathematica 8, this may be resolved by simulated annealing.

2.2 Equations Including Risk without Alpha Term

Additionally, as in (Almgren and Chriss, 2000), one may evaluate the variance of the cost $V(\vec{\pi}, N^*; \alpha_\infty=0) \stackrel{def}{=} <(E(\vec{\pi}, N^*; \alpha_\infty=0) - (E(\vec{\pi}, N^*; \alpha_\infty=0))_G)^2>_G$. For that, one may sum the term representing the volatility of the asset $$\sigma \sum_{i=1}^k \pi_i^{-1} \zeta_i, \qquad (13)$$

to the equations (5). The $\zeta_{i+1}$ are random variables with zero Gaussian mean and unit variance and $\sigma$ is a constant with units $$[\sigma] = \frac{\$}{\text{share} \times \sqrt{\text{transaction}}}.$$

Therefore, the variance of $E(\vec{\pi}, N^*; \alpha_\infty=0)$ takes the form $$V(\vec{\pi}, N^*; \alpha_\infty = 0) = \sigma^2 n^2 \sum_{k=1}^{[N^*]} \pi_k^{-2}\left(\xi_{N^*} - \sum_{j=1}^k \pi_j^{-1}\right)^2. \qquad (14)$$

One may next write the risk-adjusted cost function:

$$U(\vec{\pi}, N^*; \lambda, \mu, n, \sigma, \alpha, \beta, N) \stackrel{def}{=} E(\vec{\pi}, N^*; \alpha_\infty=0) + \lambda V(\vec{\pi}, N^*; \alpha_\infty=0), \qquad (15)$$

where $\lambda$ is the risk parameter with units $[X] = \$^{-1}$.

Applying the previous expressions, one obtains:

$$U(\{\pi_i\}_{i=1}^N, \pi_f, N^*; \lambda, \mu, n, \sigma, \alpha, \beta, N) = \qquad (16)$$

$$|\mu n|\xi_{N^*}\left\{\sum_{k=1}^{[N^*]} \pi_k^{\beta-1}\left(\sum_{i=1}^k \pi_i^{-1}\right)^{\alpha-2} + q\pi_f^{\beta-1}\left(\sum_{i=1}^{[N^*]} \pi_i^{-1} + q\pi_f^{-1}\right)^{\alpha-2}\right\} +$$

$$\lambda\sigma^2 n^2 \sum_{k=1}^{[N^*]} \pi_k^{-2}\left(\xi_{N^*} - \sum_{j=1}^k \pi_j^{-1}\right)^2,$$

with the constraints set to be (11) and (12). Section 3.2 provides optimal trajectories.

3. Total Cost Optimization

3.1 Results for $\lambda=0$ and Arbitrary Alpha Term

Below are reproduced the results for $\lambda=0$ and different values of the parameter $\alpha_\infty$ and the decay parameter in time $\kappa$ on a graph showing the optimal participation rate $\pi_k$ in function of the transactional time $t_k$. The parameters are set to be:

| $\mu$ | $n$ | $N$ | $\beta$ | $\alpha$ | $S_0$ | $X$ | $T_M$ |
|---|---|---|---|---|---|---|---|
| $\dfrac{0.0315\$}{\text{share}}$ | −250 shares (buy) | 10steps | 0.3 | 1.5 | $\dfrac{50\$}{\text{share}}$ | −25000 shares (buy) | 1000 transactions |

3.1.1. Slow Alpha Decay

This is a case where alpha decay is slow and almost linear over the execution horizon: $\kappa \gg T_M$. When the outlook is for the price to drift in the opposite direction of the trade ($\alpha_\infty<0$), it is optimal to push the execution schedule towards the end of the allowed window as for a market-on-close strategy. In the neutral case ($\alpha_\infty=0$), the optimal strategy starts slowly to minimize information leakage early in the trade and steadily increases the participation rate. In presence of adverse momentum ($\alpha_\infty>0$), the optimal schedule has trading speed reaching a maximum near the middle of the execution horizon, or for very strong directional bias, ramp up quickly to a 20% participation rate to complete the trade early.

Figure 2:
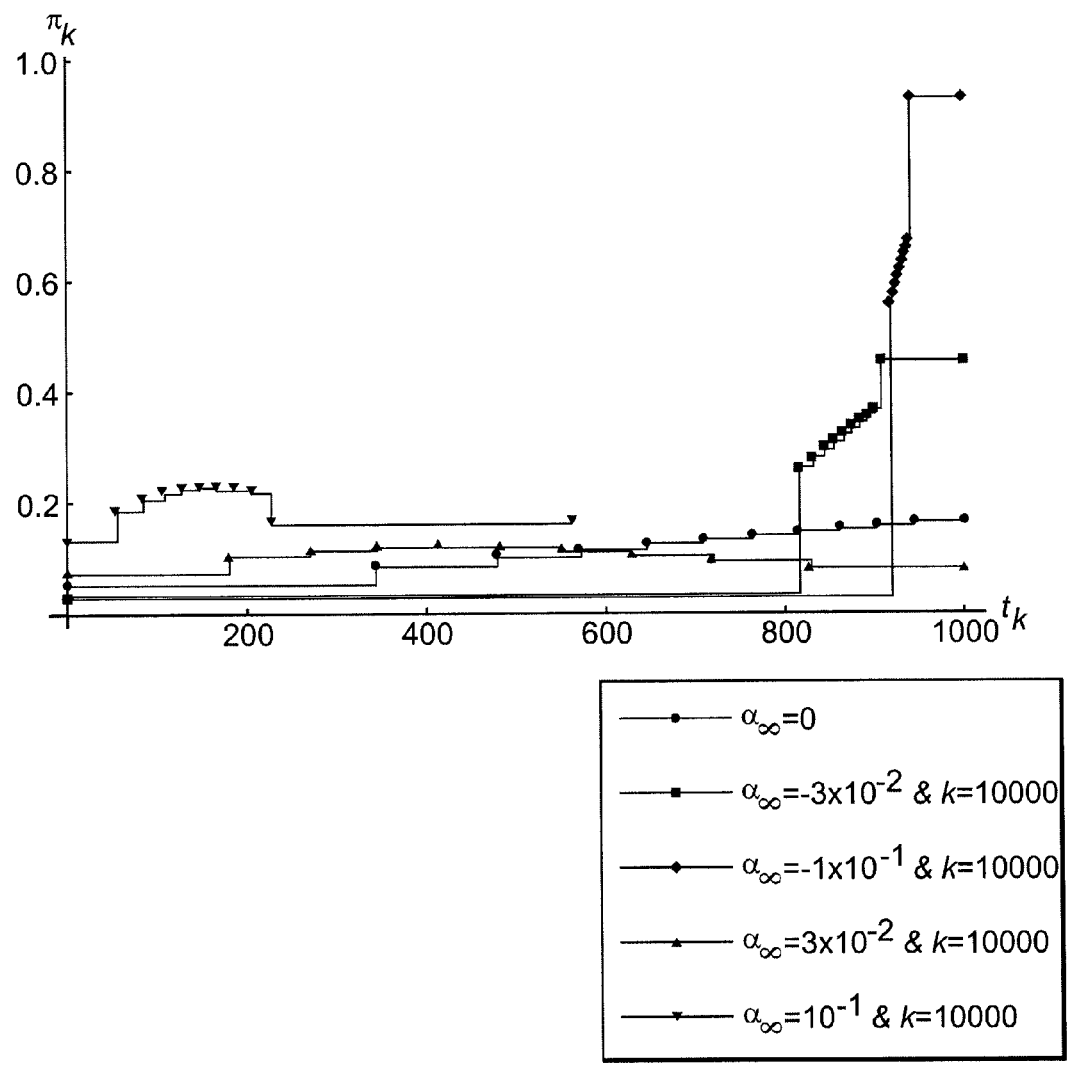
FIG. 2 depicts slow alpha decay with $\kappa \gg T_M$.

FIG. 2. Case $\kappa \gg T_M$. The general characteristic is that the participation rate $\pi_k$ increases with $t_k$ more than ⅓ of the time. The case ($\alpha_\infty>0$) indicates that the price tends to rise. Therefore, it is justified to buy incrementally faster from the beginning but increasing the rate slightly with time to avoid high impact costs. After impact takes place, when $t_k$ is closer to the end of the trade $t_{N^*}$, the rate should decrease slightly with time to about the initial slow rate. The case $\alpha_\infty<0$ represents that prices tends to down. It is convenient to keep the rate very slow and constant more than 80% of the time since the beginning of the trade, passing for a period of fast and constant increment until the end to more than 50% of the original rate. Note that the starting rate $\pi_1$ is slightly higher for $\alpha_\infty>0$, as a consequence of the expectations of higher prices, and slightly lower for $\alpha_\infty<0$, or expectations of lower prices, than the one for $\alpha_\infty=0$.

TABLE 4

| $\alpha_\infty$ | Cost - Optimal ($) | Cost at 10% ($) |
|---|---|---|
| 0 | 5953.5 | 6266.72 |
| −3 × 10⁻² | −6082.71 | 721.25 |
| −1 × 10⁻¹ | −37608.9 | −12218. |
| 3 × 10⁻² | 8969.41 | 11812.2 |
| 10⁻¹ | 12982.5 | 24751.6 |

Table 4. The second column shows the cost of optimal trajectories for different values of the parameter $\alpha_\infty$. The third column is the cost calculated with a constant rate $\pi_i=0.1$, $1 \leq i \leq N^*=10$. Negative costs represent gains due to diminishing prices. Costs increase as $\alpha_\infty>0$ increses.

3.1.2. Very High Urgency

Figure 3:
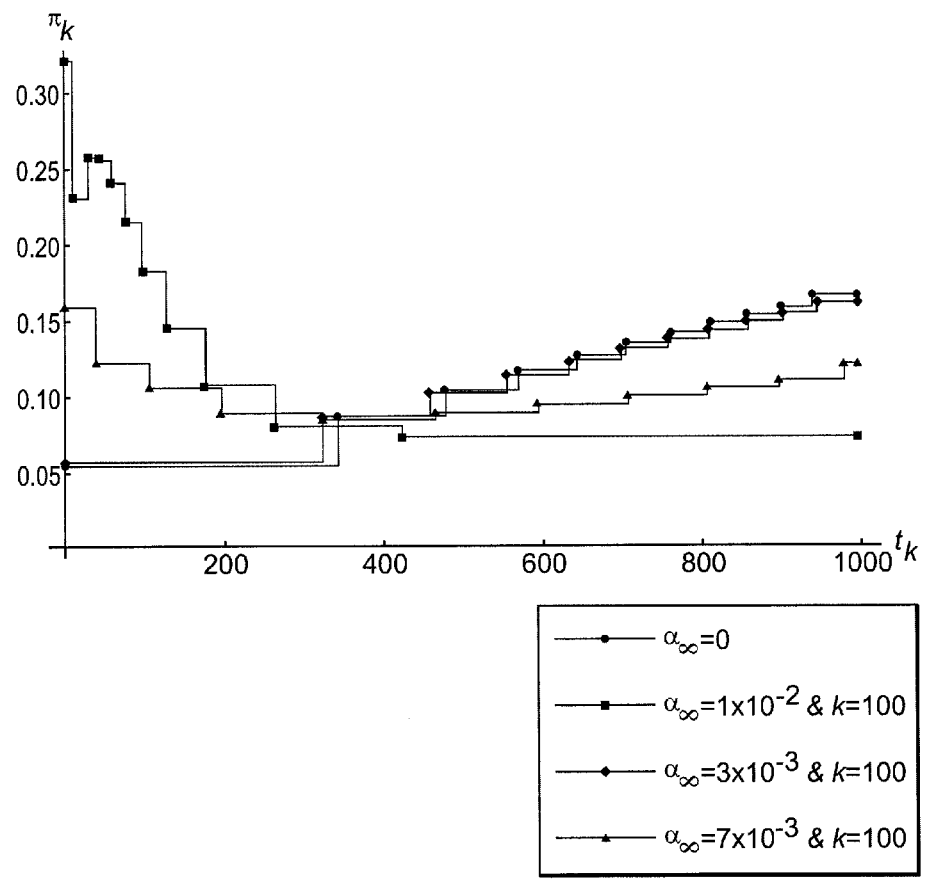
FIG. 3 depicts optimal execution trajectories for very rapid alpha decay: $\kappa \ll T_M$.

FIG. 3. The figure shows optimal execution trajectories for very rapid alpha decay: $\kappa \ll T_M$. The two trajectories $\alpha_\infty=0$ and $\alpha_\infty=3\times10^{-3}$ coincide on this graph: an aggressive trade start is optimal only when short-term alpha is large enough to outweigh the additional impact cost. The value $\alpha_\infty=7\times10^{-3}$ is the critical point for the "phase change," where the trajectory changes radically and stops behaving as $\alpha_\infty=0$.

TABLE 5

| $\alpha_\infty$ | Cost - Optimal ($) | Cost at 10% ($) |
|---|---|---|
| 0 | 5953.5 | 6266.72 |
| 1 × 10⁻² | 17945.1 | 18325.5 |
| 3 × 10⁻³ | 9689.93 | 9884.37 |
| 7 × 10⁻³ | 14686.5 | 14707.9 |

Table 5. The costs of the optimal schedule are shown in comparison to the 10% strategy for different levels of short-term alpha in the case of very rapid alpha decay. Costs increase as $\alpha_\infty>0$ increases; schedule optimization offers little room for profit in this case because alpha decays too rapidly in relation to the trade size: there is too little time to trade.

3.1.3 High Urgency

Figure 4:
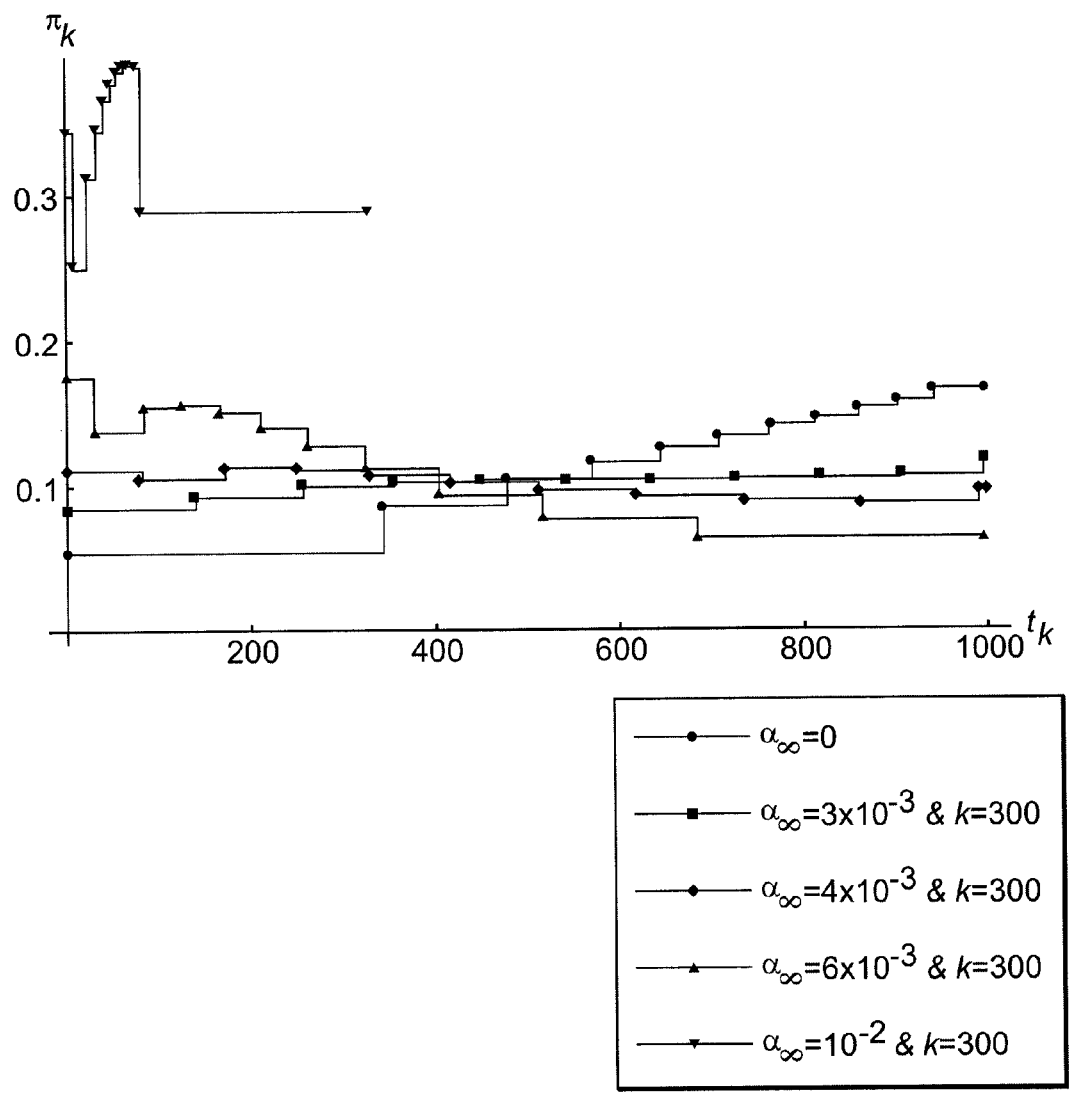
FIG. 4 depicts alpha decay with $\kappa < T_M$.

FIG. 4. This is the case $\kappa<T_M$. For $\alpha_\infty \leq 3\times10^{-3}$, trajectories are qualitatively very similar to the one for $\alpha_\infty=0$. The case $\alpha_\infty=4\times10^{-3}$ marks the transition from back-loaded schedules to front-loaded ones when short-term alpha is larger. In the extreme case where short-term alpha is 100 bps, ($\alpha_\infty=1\times10^{-2}$), the high expectation of increasing prices suggests a fast start and a short trading time (about 36% of $T_M$). Immediately, the optimization decreases the rate in a 10% to compensate impact costs. It follows a monotonous increase of more than 10% in a lapse of $$\frac{1}{6}$$

of the total trading time. Finally, it reduces 10% to a constant rate during $$\frac{5}{8}$$

of the time, until the end. Those rises and falls in the participation rate are the efforts of the optimization to reach an equilibrium between impact and alpha term increments.

TABLE 6

| $\alpha_\infty$ | Cost - Optimal ($) | Cost at 10% ($) |
|---|---|---|
| 0 | 5953.5 | 6266.72 |
| 10⁻² | 14912.4 | 16225.3 |
| 3 × 10⁻³ | 9248.68 | 9254.29 |
| 4 × 10⁻³ | 10241.5 | 10250.2 |
| 5 × 10⁻³ | 11175.6 | 11246 |
| 6 × 10⁻³ | 12037.2 | 12241.9 |

Table 6 Optimal costs are compared to the 10% participation strategy for the case of moderately rapid alpha decay. The 10% strategy is close to optimal for the most common alpha values, 30-50 bps. Back loaded schedules are more economical when expectations are balanced; frontloading provides significant benefits for short-term alpha values in excess of 60 bps.

3.1.4. Moderate Urgency

Figure 5:
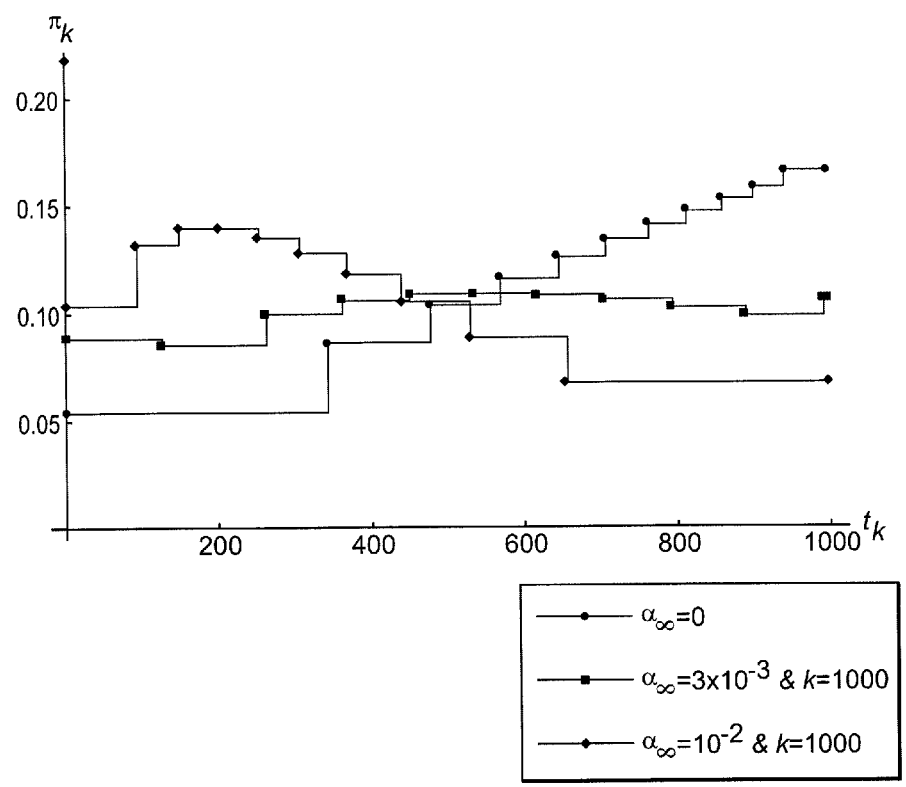
FIG. 5 depicts alpha decay with $\kappa = T_M$.

FIG. 5. This is the case $\kappa=T_M$. Even for the high $\alpha_\infty$ scenario, $\alpha_\infty=100$ bps, it is optimal to extend the execution over the entire window to minimize impact costs.

TABLE 7

| $\alpha_\infty$ | Cost - Optimal ($) | Cost at 10% ($) |
|---|---|---|
| 0 | 5953.5 | 6266.72 |
| $3 \times 10^{-3}$ | 7987.48 | 8003.97 |
| $10^{-2}$ | 11348 | 12057.5 |

Table 7 The costs of optimal solutions are compared to the 10% participation strategy for different short-term alpha expectations; the 10% strategy is near optimal when the expected short-term alpha is 30 bps.

3.1.5. Graph Comparison Between Different Time Decay Constants

Very strong momentum

Figure 6:
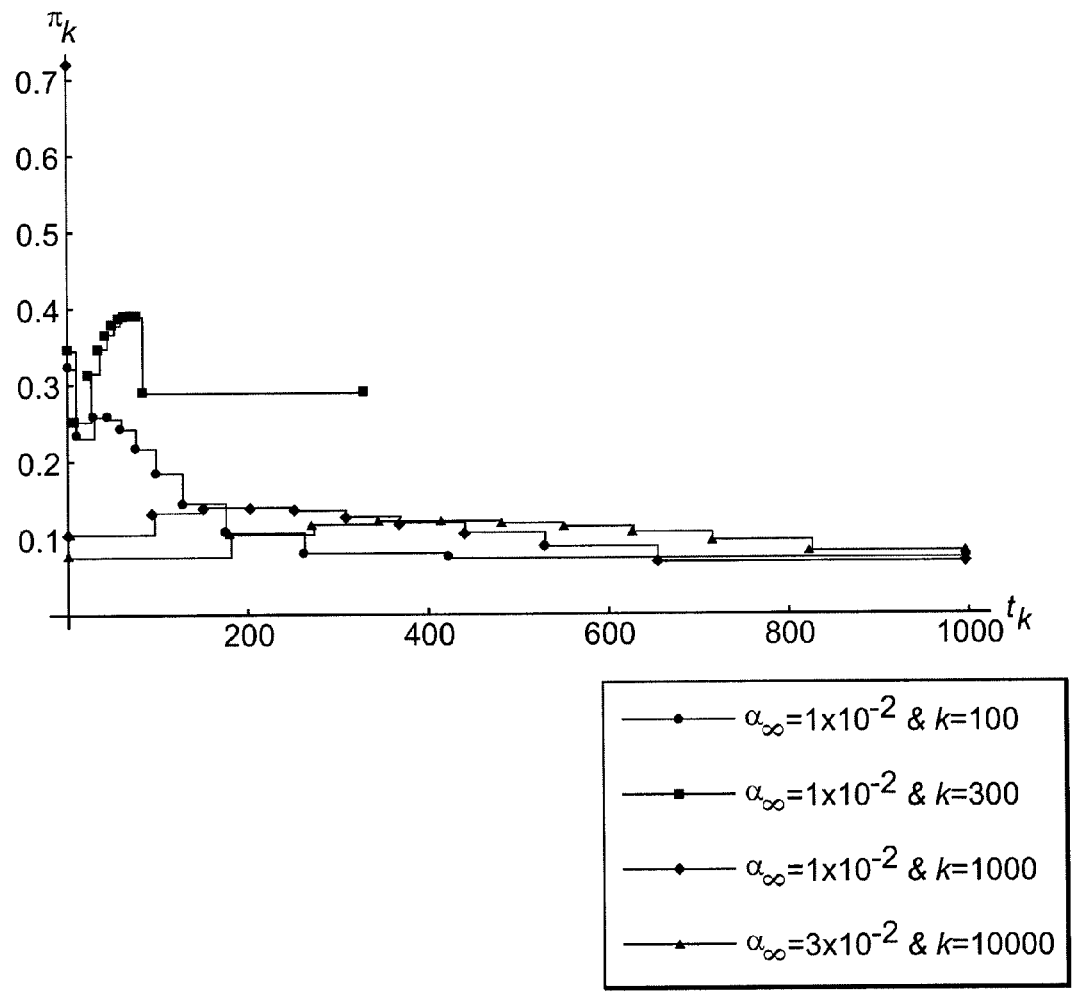
FIG. 6 depicts alpha decay with very strong momentum.

See FIG. 6.

Moderate momentum

Figure 7:
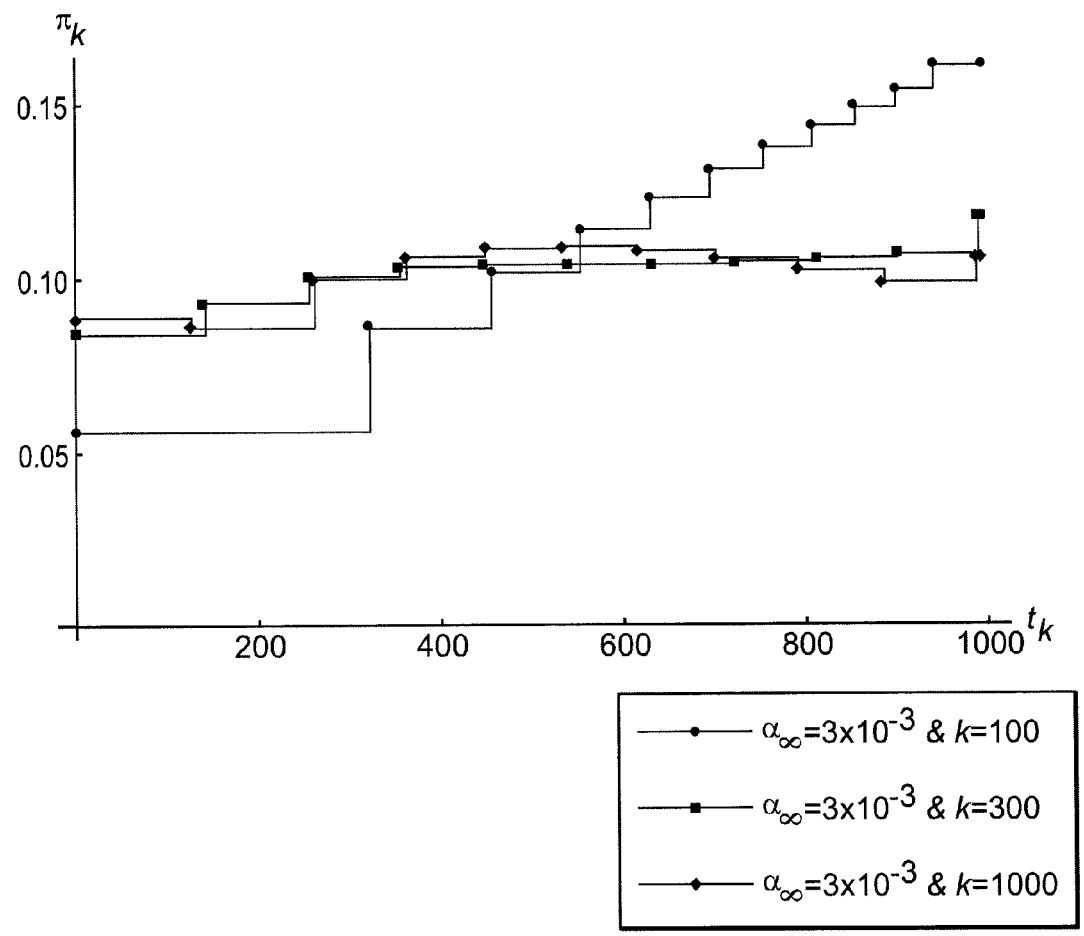
FIG. 7 depicts alpha decay with moderate momentum.
Figure 8:
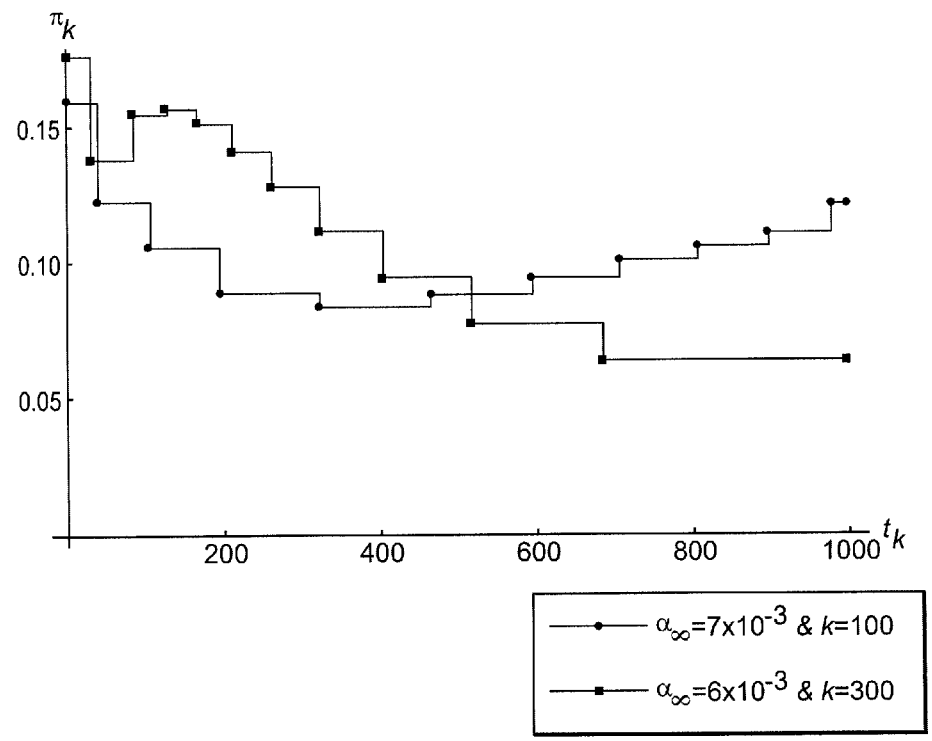
FIG. 8 depicts alpha decay with additional values of $\alpha$ and $\kappa$.

See FIG. 7 and FIG. 8.

3.2. Risk Adjusted Optimization

Above is an analysis of the hidden order arbitrage theory for variable speed of trading with zero risk aversion ($\lambda=0$). In what follows, the description is concentrated on finding optimal trading trajectories for a model with varying participation rate, alpha term zero and arbitrary risk aversion. That means to minimize the total risk-adjusted cost function (16), with the constraints (11) and (12).

If one takes an annual volatility of 30%, $$\sigma = \frac{0.95\left(\frac{\$}{\text{share}}\right)}{\sqrt{\text{day}}}.$$

In this case, one may
work with transactions units as a measure of time, with $$\tau = \frac{1}{\pi^2} = 100$$

the average number of the market transactions in each detectable interval. If one day consists of 6 hours and 30 minutes and each detectable interval last 15 minutes then, 1 day=2600 market transactions. Therefore, $$\sigma = \frac{0.019\frac{\$}{\text{share}}}{\sqrt{\text{transaction}}}.$$

The shortfall of risk-adjusted cost optimal solutions is listed in Table 5 for this example and different risk aversion parameters. $L=\lambda\sigma^2\ln/\mu|$ is the corresponding dimensionless risk parameter.

TABLE 8

| $\alpha_\infty$ | L | Risk parameter $\lambda$ ($\$^{-1}$) | Shortfall per share $\left(\frac{\$}{\text{share}}\right)$ | Shortfall E ($) | Variance $\sqrt{V}$ ($) | N* | $t_N$* |
|---|---|---|---|---|---|---|---|
| | $1 \times 10^{-4}$ | $3.49 \times 10^{-5}$ | 0.2608 | 6520.5 | 7360.83 | 10.99 | 1000 |
| 0 | 0 | 0 | 0.2381 | 5953.5 | 9192.27 | 11.57 | 1000 |
| | $3 \times 10^{-4}$ | $1.05 \times 10^{-4}$ | 0.2917 | 7292.25 | 6290.65 | 13.14 | 1000 |

Shortfall of Risk Adjusted Cost Optimal Solutions.

Consider a mid-cap trade of 25000 shares, in a $S_0=\$50$ security, executed at an average participation rate of 10% ($\pi=0.1$). If the security's trading volume is $$\frac{400 \text{ transactions}}{hr},$$

a detectable interval will represent 15 minutes of trading. The impact for a 15-minute interval is estimated to be 10 bps for this security, i.e. $|\mu|=0.0315$ $/share. One may take an annual volatility of 30% or $$\sigma = \frac{0.95\left(\frac{\$}{\text{share}}\right)}{\sqrt{\text{day}}}.$$

One day consists of 6 hours and 30 minutes or 2600 market transactions. Results are for $T_M=1000$ transactions, $\alpha=1.5$, $\beta=0.3$, for the different values of the dimensionless risk constant $L=\lambda\sigma^2\ln/\mu|$. The sixth column N* is the total number of detectable intervals realized by the hidden order. The last column indicates that the number of market transactions reaches the maximum limit $T_M$.

Figure 9:
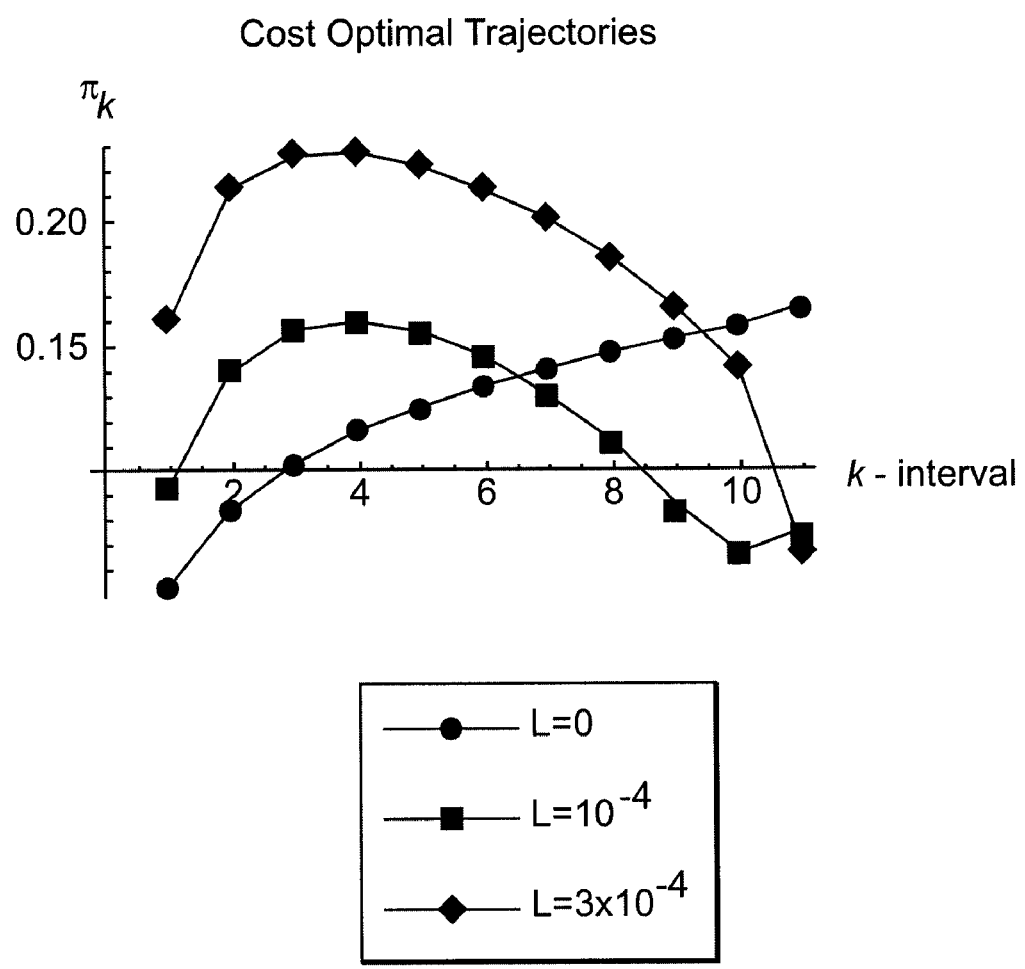
FIG. 9 depicts exemplary cost optimal trajectories.

FIG. 9 depicts a graph of the participation rate $\pi_k$ versus the detectable step k, in a continuum aproximation, for the different values of the risk constant $L=\lambda\sigma^2\ln/\mu|$ and nule alpha term. Optimal trajectories are shown representing the participation rate in function of the number of the detectable interval for different values of the risk constant and $\alpha_\infty=0$.

In each step the participation rate must be constant.

Figure 10:
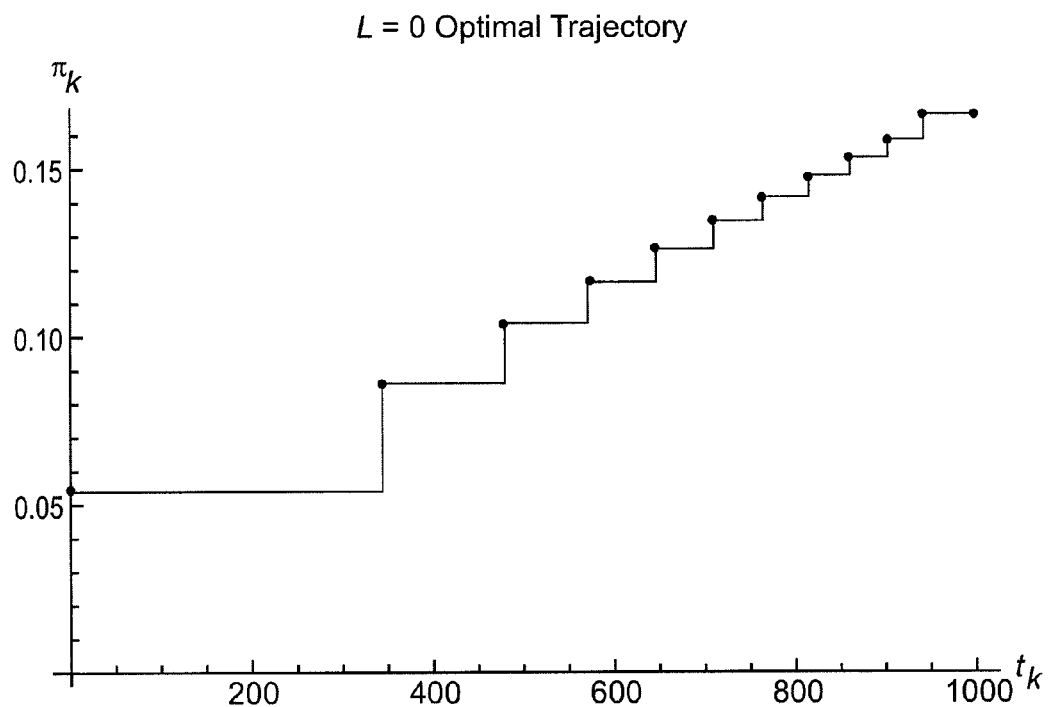
FIGS. 10-12 depict participation rate in function of transactional time.

FIG. 10 depicts a detailed graph of the participation rate versus the transactional time, $t_k=\Sigma_{i=1}^{k}\pi_i^{-2}$, corresponding to each k-interval, for each L. In particular, FIG. 10 depicts Participation rate in function of the transactional time, $t_k=\Sigma_{i=1}^{k}\pi_i^{-2}$, corresponding to each k-interval, considering zero risk aversion and alpha term.

Figure 11:
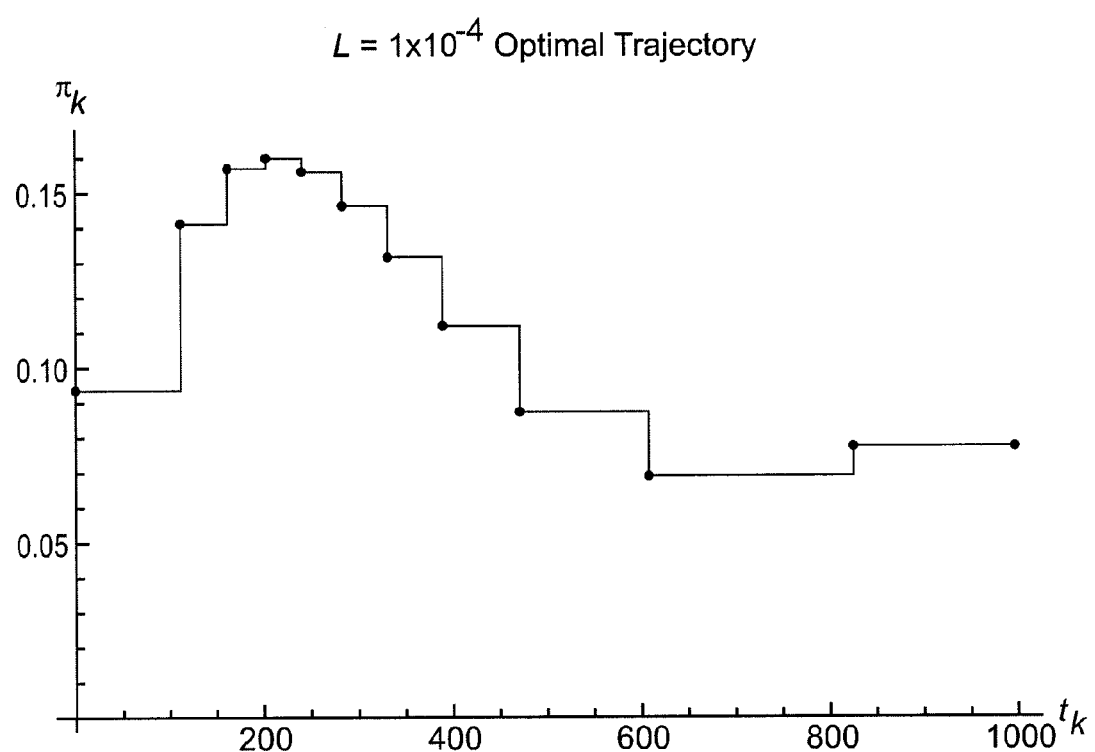

FIG. 11 depicts participation rate in function of the transactional time, $t_k=\Sigma_{i=1}^{k}\pi_i^{-2}$, corresponding to each k-interval, considering risk aversion $L=1\times10^{-4}$ and $\alpha_\infty=0$.

Figure 12:
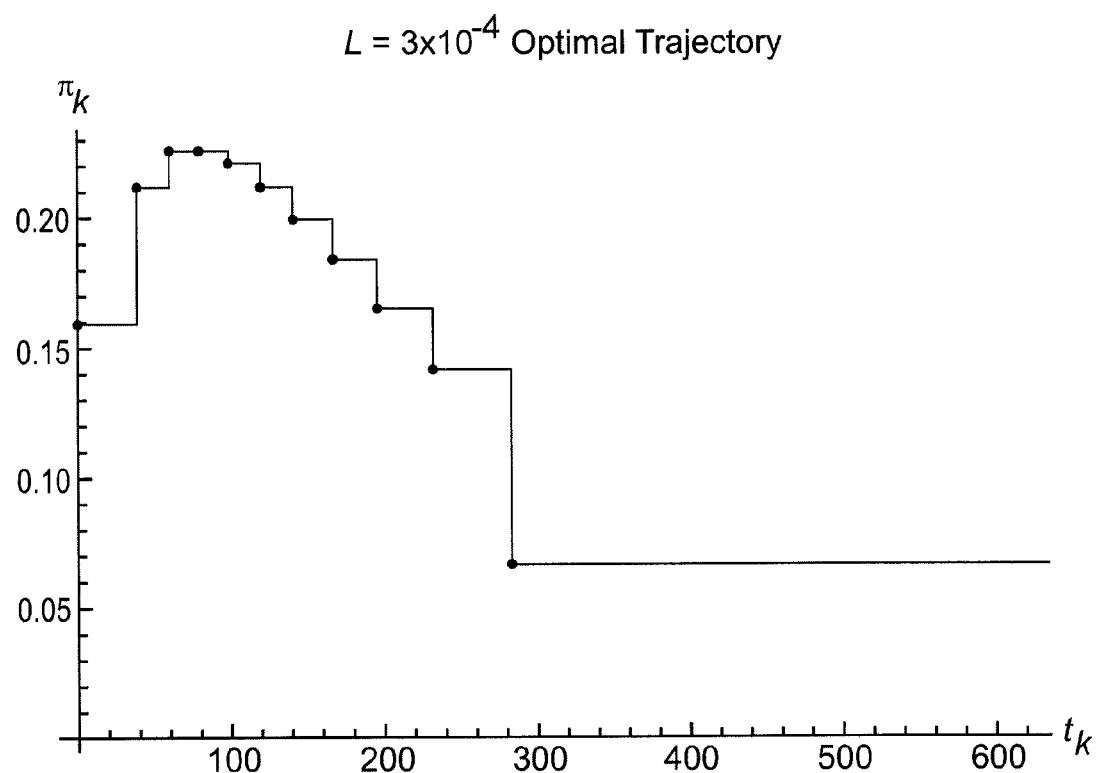

FIG. 12 depicts participation rate in function of the transactional time, $t_k=\Sigma_{i=1}^{k}\pi_i^{-2}$, corresponding to each k-interval, considering risk aversion $L=3\times10^{-4}$ and $\alpha_\infty=0$.

FIG. 13 depicts a comparative graph for the different values of the risk aversion in the quadratic approximation or continuum. In particular, FIG. 13 depicts a comparative graph of optimal trajectories in function of the transactional time for the different values of the risk aversion and $\alpha_\infty=0$ in the quadratic approximation or continuum.

4. Conclusions for this Section

Execution schedules are described above that minimize cost functions originating from the hidden order arbitrage impact model with several optimization objectives: first, considering short-term alpha decay profiles typical of real-world trading situations, and second, considering the risk-adjusted optimization problem in absence of short-term alpha.

4.1 Main Results in Absence of Short-Term Alpha Shortfall minimization in absence of alpha requires back loading, which increases execution risk. Optimal solutions for risk-averse traders are less front-loaded than suggested by AC2000 and avoid an aggressive trade start.

FIG. 14 depicts a graph of the optimal risk averse trajectories for the information arbitrage theory with $L=10^{-4}$ in comparison to the Almgren-Chriss formulation (AC2000). For a buy, $$\pi_j^{A-C} = \frac{\sinh(\kappa T)}{2X\sinh\left(\frac{\kappa T}{2}\right)\cosh\left(\kappa\left(j-\frac{1}{2}\right)\tau\right)}, X = 100,$$

$T = 165$ minutes $= 0.423$ day, $\kappa \sim \frac{3.83}{\text{day}}$, $\tau = 15$ minutes $= 0.0384$ day.

The shortfall calculated with the optimal Almgren-Chriss trajectory for a risk averse constant $$\lambda(Almgren\text{-}Chriss) = \frac{10^{-5}}{\$}$$

is $E(\{\pi_j^{A-C}\}_{j=1}^{11})=6879.05\$$. This is 5.5% costlier than the shortfall $E(\text{optimal})=6520.5\$$ for $$\lambda = 3.49 \times \frac{10^{-5}}{\$},$$

and 9.8% costlier than a constant 10% participation rate strategy.

FIG. 14 depicts a comparative graph of the cost optimal trajectories in function of the transactional time. Dot-line is the solution predicted by Almgren-Chriss formulation with linear impact and risk averse constant $$\lambda(Almgren\text{-}Chriss) = \frac{10^{-5}}{\$}.$$

Square-line is the optimal trajectory for the non-linear information arbitrage theory, as shown in FIG. 11, for risk averse constant $$L = 10^{-4} \text{ or } \lambda = 3.49 \times \frac{10^{-5}}{\$}.$$

4.2 Main Results with Adverse Short-Term Alpha

Cost-optimal strategies are described above with moderate urgency levels that are front-loaded in a manner similar to the optimal solution from hidden order arbitrage theory with risk aversion and no alpha. Large trades with very high urgency gain little from a rapid start due to the insufficient time available to trade before alpha decay takes place; only the strongest short-term alpha decay profiles justify front-loading such large trades. In other cases, it is optimal to ignore the alpha decay and execute using a profile similar to the zero-alpha case.

Comparing these results to the prevalent practices at institutional trading desks, there is support for the common practice of using risk averse execution strategies in presence of short-term alpha. There are two significant differences in the trading solutions:

1) Institutional desks tend to front-load the execution more than is suggested by the above results. They adopt a front-loading profile with a monotonically decreasing participation rate, often explicitly implementing the Almgren Chriss model. This practice increases early signaling and results in higher shortfalls.

2) Uninformed trades are generally executed using constant participation rate schedules such as VWAP algorithms, whereas the above results indicate that using some back loading may be preferable.

Both deviations have the effect of reducing execution risk but increasing trading costs on average. The industry's preference for risk aversion may be motivated, in part, by imperfect communication between the portfolio manager and the trading desk. In the absence of a precise understanding of what the trading desk is doing, portfolio managers naturally respond asymmetrically, blaming the desk for large negative results and not offering corresponding praise for large positive results. Also, contributing to this, a large positive trading P&L for the desk will only occur when the portfolio manager's decision was quite wrong in the short term (a buy order preceding a large drop in the price, or vice versa). If a poor trade decision is executed too fast, the desk is less likely to hear from the manager; but the same is not true for a good trading decision that was started too slowly. A similar economic distortion exists for broker-dealers handling institutional orders—in part, for precisely the same reasons; but also because the broker dealer is compensated by commissions on executed shares. There is an additional incentive to start executions quickly to lock in the commission before the order is canceled.

Ultimately, it is the aggregate shortfall, and not execution risk, that impacts fund performance, and the economic distortions mentioned above contribute negatively to fund rankings. For example, a 10 bps reduction in trading costs would translate to an improvement of 10 places in Bloomberg's ranking of US mutual funds in the "balanced" category. There are 1364 funds in that category for which one-year rate of returns is reported.

These economic distortions may be rectified if institutional desks are able to measure trading costs effectively and rate execution providers accurately. This, however, is complicated by the fact that post-trade data analysis must deal with complex issues that can easily dominate the results and blur interpretation.

First, among these, is the use of limit prices. Limits are used to achieve a better average price for a trade, but occasionally lead to incomplete executions. The opportunity cost of the unfilled shares must be accounted for to evaluate the results, but opportunity costs depend on other decisions made by the manager. For example, were the unfilled shares replaced by an order in a different, correlated security? Or were they no longer needed because of redemptions from the fund?

Second, for large institutions it is common for large trades to execute over a period of weeks or even months. The trade size is likely to be adjusted multiple times, and the adjustments themselves depend on the progress in executing the trade. Again, this greatly complicates the task of measuring opportunity costs. Because of these difficulties, it is common practice to analyze post-trade results mainly in terms of realized shortfalls without accounting for unfilled shares. Unfortunately, this makes post-trade analysis entirely worthless, as may be illustrated with a simple example: if a trader mistrusts a particular broker she is likely to set limit prices close to arrival to avoid impact. Given such a limit, the trade can only complete if price moves favorably, in which case the trading P&L is positive. In this hypothetical situation, the mistrusted broker will most likely be near the top of any ranking of providers by implementation shortfall. The opposite case, where a broker is trusted and given difficult orders with no limit, will result in higher average implementation shortfalls. Trading desks are aware of these issues and mostly ignore post-trade transaction cost analysis (TCA).

Post trade analysis methods that fairly account for opportunity costs do exist, see for example (Gomes and Waelbroeck, 2010), but their implementation by post-trade TCA vendors is complicated by the fact that most post-trade data systems today do not include the limit price used on institutional orders.

REFERENCES

Almgren, R. and Chriss, N. (2000). Optimal Execution of Portafolio Transactions. *Journal of Risk*, 3(2):5-39.

Almgren, R. (2003). Optimal execution with nonlinear impact functions and trading-enhanced risk. *Applied Mathematical Finance*, 10, 1-18.

Almgren, R., Thum, C., Hauptmann E., Li, .H. (2005). Direct Estimation of Equity Market Impact. *Risk*, 18, 57-62.

Bertismas, D., and Lo, A. (1998). Optimal control of execution costs. *Journal of Financial Markets*, 1, 1-50.

Bouchaud, J-P., Farmer, J. D., Lillo, F. (2008) How markets slowly digest changes in supply and demand. *Handbook of Financial Markets: Dynamics and Evolution*, 57-156. Eds. Thorsten Hens and Klaus Schenk-Hoppe. Elsevier: Academic Press, 2008.

Chan, L. K. C., and Lakonishok, J. (1995). The behavior of stock prices around institutional trades. *The Journal of Finance*, 50, 1147-1174.

Chan, L. K. C., and Lakonishok, J. (1993). Institutional trades and intraday stock price behavior. *Journal of Financial Economics*, 33, 173-199.

Criscuolo, A. M., and Waelbroeck, H. (2010). Optimal execution in Presence of Hidden Order Arbitrage. Pipeline Preprint PIPE-2011-01.

Farmer, J. D., Gerig, A., Lillo F., Waelbroeck H. (2009). Fair pricing and the market impact of large institutional trades. In preparation.

Gabaix, X., Gopikrishnan, P., Plerou, V. and Stanley, H. E. (2006). Institutional investors and stock market volatility. *Quarterly Journal of Economics*, 121, 461-504.

Gomes, C. and Waelbroeck, H. (2008). Effect of Trading Velocity and Limit Prices on Implementation Shortfall. Pipeline Financial Group Preprint PIPE-2008-09-003.

Gomes, C. and Waelbroeck, H. (2010).

Gopikrishnan, P., Plerou, V., Gabaix, X., Stanley, H. E. (2000). Statistical Properties of Share Volume Traded in Financial Markets. *Physical Review E*, 62(4):R4493-R4496.

Hora, M. (2006). The Practice of Optimal Execution. *Algorithmic Trading* 2, 52-60.

Lillo, F., Farmer, J. D., and Mantegna, R. N. (2003). Master Curve for Price-Impact Function. *Nature*, 421, 129-130.

Loeb, T. F. (1983). Trading Cost: The critical link between investment information and results. *Financial Analysts Journal*, 39(3):39-44.

Moro, E., Moyano, L. G., Vicente, J., Gerig, A., Farmer, J. D., Vaglica, G., Lillo, F., and Mantegna, R. N. (2009). Market impact and trading protocols of hidden orders in stock markets. *Technical Report*.

Obizhaeva, A., and Wang, J. (2006). Optimal trading strategy and supply/demand dynamics. *Technical Report. AFA 2006 Boston Meetings Paper*.

Torre, N. (1997). *Market Impact Model Handbook*. Berkeley: Barra Inc.

Exemplary Client Data Processing

The sections above describe an impact modeling framework based on hidden order arbitrage theory and demonstrate with some examples how this framework enables the computation of optimal execution strategies given a knowledge of the bias in order flow or short-term alpha.

Order flow bias can be estimated using methods known in the art such as regressions. Other embodiments with greater accuracy for order flow prediction will be envisioned by those skilled in the art. The prediction of short-term alpha, on the other hand, is not known in the art: in fact, the present inventors have argued that price should be arbitrage-free, which appears to preclude the possibility of predicting short-term alpha. Yet embodiments of the present invention are described herein that do in fact predict short-term alpha profiles and additionally associate optimal execution profiles using the methods described above. Predicting a short-term alpha profile rests on two points: first, that the knowledge of a hidden order arrival in itself constitutes private information—there is no reason for the market to be efficient to this information because it is not disclosed. A good example where this may lead to short-term alpha is the case where a stock has been sold heavily and liquidity providers have retreated due to fears of more selling to come—an effect known as liquidity exhaustion; the price at that point accounts for a risk that no buyer will show up in the short-term to meet the liquidity needs of the seller, even though the security may be underpriced relative to the expected worth of the issuer. In this case, the arrival of a buy order from an institutional portfolio manager in itself removes the liquidity exhaustion risk and therefore carries substantial short-term alpha. Second, different portfolio managers are reasonably likely to think coherently, either because a particular investment style is currently in fashion, or because their reasoning is influenced by analysts that publish reports, or because one portfolio manager decides to step in to provide liquidity after observing what she perceives as being excessive impact by another. In all these cases, even though price may be perfectly efficient based on publicly available information, the knowledge of one portfolio manager's trade start informs about the likely actions of other portfolio managers whose actions would not otherwise be known to the market, and whose orders would likely impact prices. The effect of all other portfolio managers on the security price in this case constitutes impact-free returns.

The following two sections describe a methodology that enables the estimation of short-term alpha based on data available at the start of the trade and further during the execution process. Exemplary embodiments of the method may rely on a detailed analysis of historical trade data representing the arrival of institutional orders and the results of their execution. In a first step, the impact-free price is estimated for each historical trade. In a second step, the impact of alternative strategies, such as 5%, 10%, and 20% participation strategies, may be estimated using the same impact model, and the corresponding trade results for each alternative strategy may be computed. In a third step, the historical trade arrivals data may be enriched to add columns representing all the information known at the time of trade start; each information item is known as a "factor" in the art of factor analysis.

In a fourth step, data mining methods may be used to identify the conditions at the time of trade start that are most predictive of any one of the benchmark strategies being optimal. As discussed, the result of the predictive data mining effort may be a set of schemata which are combinations of factors that were historically associated with one of three classes, being the alpha class, negative alpha class, or "others". A factor may be categorical, such as "Buy" or "Sell", or it may be a range of values, such as volatility between 20% and 50%. Each schemata matches with a subset of historical trades, which is the subset of trades for which each factor is present. In a fifth step one may compute the average impact-free return in this subset at different time points such as 5, 15, 30 minutes after arrival and at the close, for example. This average impact-free return as a function of time is the alpha profile for the specified schemata.

In a sixth step the alpha profile may be stored in computer memory. In a seventh step, upon receiving an order from a user of the subject system, the data representing the state of the market at order arrival may be calculated; each schemata may be tested in rank order until one matches in every factor. In step eight, the alpha profile associated with the first matching schemata may be returned to the user together with a description of the factors that led to its selection. In step nine, the system may further select an execution strategy designed as indicated herein to be optimal (or near optimal) given the alpha profile, and in step 10 the system may implement that execution strategy.

In alternate embodiments, all schemata may be evaluated; each schemata may recommend a particular execution strategy. If more than one schemata matches with the state of the market a voting rule may be used to determine which execution strategy should be selected, and the weighted average alpha profile may be sent to the user, where the same voting weights may be used as for selecting the execution strategy.

In an exemplary embodiment, the class of trades for which the 20% participation rate is optimal is called "alpha" class; this constitutes approximately 16% of the sample. Vice versa, the 16% of trades for which the 5% participation rate most outperforms the 10% benchmark is referred to as the "negative alpha" class. The predictive data mining problem is therefore transformed into a classification problem for which methods are known in the art of associative classification. The task therein is to find combinations of factors that best classify alpha or negative alpha. The remainder of this section describes in more detail how the data provided by a client may be transformed to enable the estimation of the impact-free price, and enriched with factors. This sets the stage for the predictive data mining problem.

One or more exemplary embodiments provide a post-trade data enrichment process combining elements from and ultimately replacing an algo_segments_cust table and enriched client data tables. The enriched data enable consultation with clients on how to better use speed controls and limits, and support alpha profiling research.

An "actionable TCA" approach predicts the outcome of various implementable execution strategies given the state of the market, information in the OMS order, and when available, a portfolio manager's trading history. The results may be used to evaluate the past, or in an Alpha Pro environment (one or more embodiment are labeled "Alpha Pro" herein, for ease of reference only), advise optimal execution choices in real time.

When a variety of formats for inputs and outputs leading to difficulties in debugging and enhancements are used, universe comparisons may very difficult to deploy. New columns developed for one client don't automatically apply to others leading to unequal service levels.

The purpose of this section is to describe requirements for exemplary embodiments comprising a standardized process that may consume a standardized input file representing pieces of trades that are of individual interest to a client (such as broker placements, limit price segments of trading system activity, or PM (portfolio manager)-specific orders), and produce standardized output files enabling optimization of the individual trade piece after accounting for the impact of all trades from a given desk.

Corporate Actions

{corporate action data}→daily normalization factors

Corporate actions cause renormalization of stock prices and name changes; in more complex cases custom code may be used to extend a series using calculated prices and volumes. Renormalization factors provide the scale for measuring prices on each day and symbol. See corporate action requirements for details.

Aggregating Impact from a Trading Desk

One client (trading desk) may provide data representing multiple trades on the same symbol and side; various trades may originate from different managers, or be executed via different traders. If one were to look at each trade individually, a recommendation to trade fast is likely, simply to get ahead of other trades from the same desk—impact from other trades gets confused for underlying alpha. To avoid this problem, it is desirable to remove impact from a client's overall activity, rather than only for an individual trade. Impact-free prices may be calculated after removing the impact from the entire trading desk.

Figure 24:
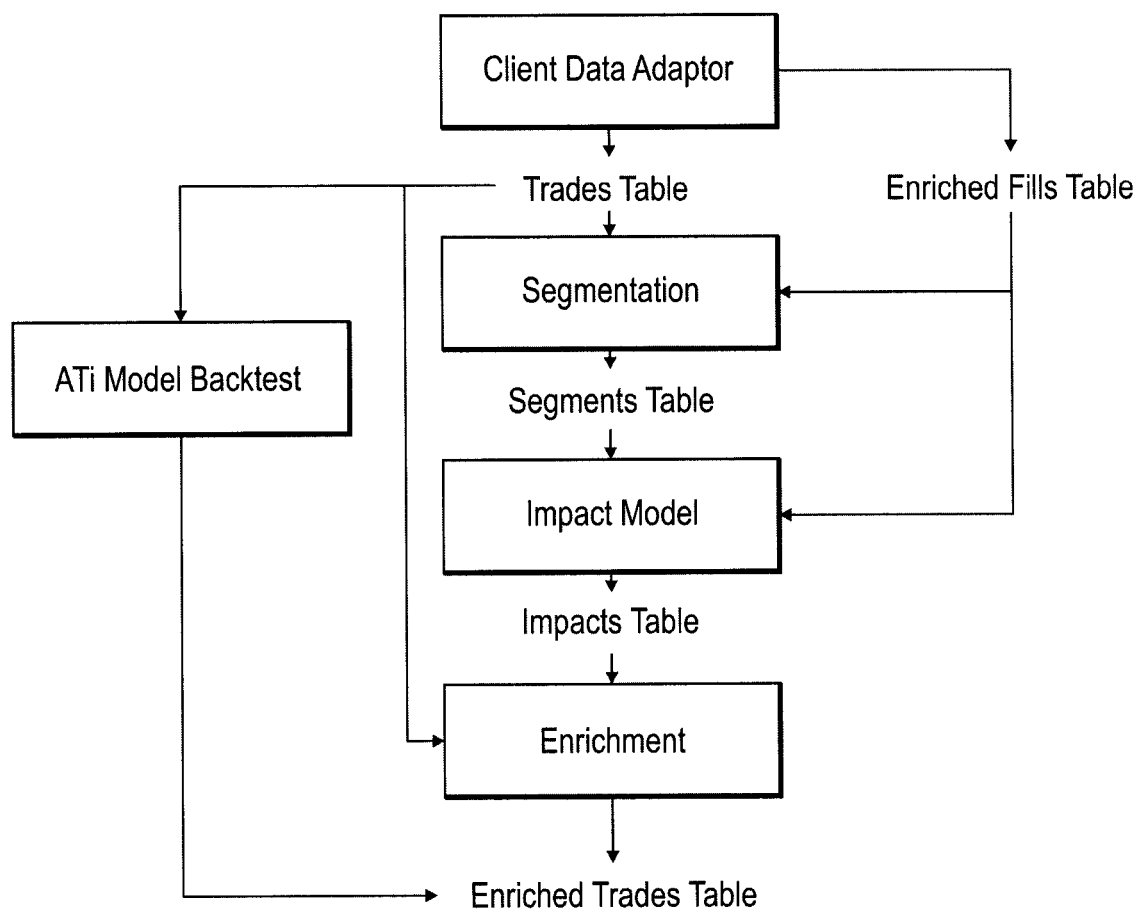
FIG. 24 depicts certain exemplary processes and tables.

FIG. 24 depicts certain exemplary processes and tables.

Enriched Fills Table

Partial fills if provided by the client, may be enriched with quote matching logic to support impact estimation and research.

Trades Table

The trades table is the basic input for analysis, in standardized form. The impact model process consumes trades and produces segments and impact tables. These in turn enable enrichment of the trades table, and of other aggregates. The enriched trades table is used to advise the client on optimal decisions at the aggregation level they choose in their own reporting.

Segments Table

Transforming the raw trade data into segments is an important step in the process of estimating the impact of the trading desk. A segment is a non-overlapping trading periods during which the trading desk is trading continually at a more or less uniform speed.

Client Impact Table

Client impacts tables have estimated impacts at 5-minute timestamps, broken down as estimated permanent impact and estimated temporary impact.

The impact model (described below) may consume segments and 5-minute aggregate market data and produce 5-minute impact values.

Enriched Trades Table; Daily Updates

The main output table may include all the alternate strategy evaluation items required to analyze optimal trading decisions, in addition to the inputs including drivers and model outputs, news drivers, specifics of the order, etc. Care should be taken so that the expected large number of columns does not make access to data exceedingly slow; each trade is likely to have about 1000 relevant variables, counting both inputs and outputs.

Multi-day trades: separate columns will provide the additional information providing the context, minimally including the variables available as filter conditions in sortd "was trading yesterday" requirements.

TCA tables must be able to process new trade information daily. Some fields (like returns to T+5, or PWP5 for a large trade) cannot be computed on the trade day close, but may become available a number of days after the trade. Fields that cannot be computed may be left as missing values or set to temporary values (for example, mark-to-market at the last sale price); a daily process may look for missing values and temporary values and attempt to fill them in.

Trade Segments Table

Derived from segments, this table may have the same structure as the trades table and data may be enriched for analysis.

Trade Megablocks Table

Aggregation of trades into megablocks, in the same format as the trades table.

Enriched Trade Segments Table

Provides enriched data on trade segments. Required to advise clients on broker performance, and the effect of speed and limit decisions.

Enriched Megablocks Table

Provides enriched data on megablocks. May be required to advise at the trading desk level on trade urgency, scaling, block exposure and strategic limits.

Systematic QA

All specifications below may have a QA range and Missing value column: if the value cannot be calculated or falls outside the QA Range, the error may be documented in human-readable file for review by Research and flagged as "major". The record in the output file will be flagged as QA=Failed until these errors are resolved so it does not contaminate research results. In addition, researchers may over time submit scripts to check data and flag certain conditions with a specific error code in the QA column.

For optional fields, missing values are simply left blank. In other cases missing values will be set to a specified default value, like 999, when the fact that the value is missing is in itself informative to data mining.

QA checks: some optional fields may have QA ranges; values outside this range will be documented as "minor" error in the human-readable file for review by researchers. Other fields will require checking relative to another, as specified in the QA section of this document. For example, an alert may be required if a price is more than 20% larger or smaller than another price for the same trade record. Such checks may produce human-readable output to an error file for examination by researchers.

Input File Specification

The TCA process requires at least a ticket-level input file[5], and optionally a partial fills file. The partial fills file may contain the basic elements of enriched fills data as defined in a data warehouse, and a ticket-ID indicating to which ticket the fill belongs. One may have various aggregation levels where "tickets" capture bigger or smaller aggregates of partial fills, but each fill may belong to one and only one ticket within a given aggregation level. Thus, partial fills may have several ticket-IDs pointing to their membership in different aggregations.

[5]Occasionally, tickets may be duplicated to reflect multiple allocations to different accounts.

A "ticket" is the basic entity to be analyzed for TCA and optimal execution purposes. A ticket may be any of the following aggregation options: broker placement, segment, PM_Order-ID[6], block-ID, "megablock". The placement, order and block aggregations are defined by the client. One may define segments and megablocks at the desk level; megablocks represent multiple days of trading on the same symbol and side.

[6]In many environments, order_id refers to a placement from the trading desk to the broker, not from the PM to the trading desk.

This section provides an exemplary definition for a data structure representing a "ticket". Downstream processes may be universal—i.e., processing may be the same regardless of whether the ticket represents trade segments, PM trades, or broker placements. The context of a ticket relative to the rest of a trading desk's activity may be captured in two ways.

(1) The impact-free price calculation may strip out impact from the entire desk, and (2) The output table, an enriched ticket-level data, may comprise columns identifying the context of this ticket in a larger block.

TABLE 9

| Field | Description/notes | Type | QA Range | Missing value? |
|---|---|---|---|---|
| PM DECISION | | | | |
| Trade_dt_key | Date at which this trade record started (key) | | | Required |
| Trade_ID | Unique identifier of this trade record (key) | | | Required |
| QA | Flag identifying possible quality issues with this record. Set only if there is a known problem | String | n.a. | Optional |
| Firm | Identifies the firm originating the order (trading desk). All orders on the same symbol/side from the same firm will be considered in estimating impact-free returns | String | n.a. | Required |
| PM_Order_ID | Client-provided order-ID, for cross-validation versus the client's TCA | String | n.a. | Optional |
| Side | The side of the trade | Enum | B, S, BC, SS | Required |
| Symbol | The symbol identifies the security within the trading system environment, and must enable discovery of primary exchange, volatility, beta, currency, etc., and have available market data | String | Must exist in trading system universe | Required |

TABLE 9-continued

| Field | Description/notes | Type | QA Range | Missing value? |
|---|---|---|---|---|
| PM_Ordered_Qty | Shares ordered by the PM, if known | Long | $1\text{-}10^9$ | Required |
| PM_Limit | Limit price from the PM, if known. Market = "0". Unavailable means it is unknown whether there was a limit | Float | $0\text{-}10^6$ | Optional |
| Order_Creator | Name of PM, if available | String | n.a. | Optional |
| Product | | String | n.a. | Optional |
| Sub_Product | | String | n.a. | Optional |
| Type | Classifies the trade by type (cash flow; etc.) Trade intention from OMS data | String | n.a. | Optional |
| Instructions | Execution instructions, if available | String | n.a. | Optional |
| Decision Time | Time of the trade decision, if available. First decision time if multiple. Decision time if available is usually in an allocations table where there is a sequence for the multiple accounts under the same PM. | Date Time | n.a. | Optional |
| Creation Time | Time of the trade creation in the OMS | Date Time | n.a. | Optional |
| TRADER DECISION | | | | |
| Trader | Trader name | String | n.a. | Required |
| Block_ID | Client-provided block-ID, if any, revealing the manner in which the trading desk blocks orders from various PMs | String | n.a. | Optional |
| Order_ID | Client-provided order-ID, or for trading system algo segments the combination of order_ID and lpchange_segment | String | n.a. | Required |
| Arrival_Time | Date/Time at which the trade is allowed to start (for example, 9:30 AM for continuation of a multi-day trade) This is the creation time if OMS data is available, else the submit time in trading system data. | Date Time | Within market hours | Required |
| Placement_Time | Date/Time at which the trade actually starts (for example, first broker placement time) | Date Time | Within market hours | Required |
| Start_time | Time of First fill | | | |
| Ordered_Qty | Shares ordered | Long | $1\text{-}10^9$ | Required |
| Broker | Broker the order was originally placed with. For trading system SB trades, concatenate preferred SB broker. Example: "Pipe" "Pipe.GS", "Citi-Algo". Broker names may be specific to a given client | String | n.a. | Optional |
| First_Strategy | For trading system trades, the execution strategy the ticket was originally assigned to, if known. For other brokers, enter the broker of record on the first placement. Examples: "TL AlphaT", "Trickle" "Citi-Algo" | String | n.a. | Optional |
| Second_Strategy | If strategy was modified within the span of the ticket, the second one. Examples: "TL Muni.Mv", "ANoser" | String | n.a. | Optional |
| Last_Strategy | Strategy in force at completion/cancel of the ticket | String | n.a. | Optional |
| First_Limit_Price | If available, the limit price at start of the trade. 0 = MKT, unavailable = don't know | Float | $0\text{-}10^6$ | Optional |
| Last_Limit_Price | If available, the limit at completion/cancel | Float | $0\text{-}10^6$ | Optional |
| RESULTS | | | | |
| Filled_Qty | Shares filled | Long | $1\text{-}10^9$ | Required |
| Filled_Price | Share-weighted average price of executed shares | Float | $0.01\text{-}10^6$ | Required |

TABLE 9-continued

| Field | Description/notes | Type | QA Range | Missing value? |
|---|---|---|---|---|
| Limit_Tape | Tape volume below (above) the highest (lowest) known limit price, if available, from start_time to end_time | Long | $1\text{-}10^9$ | Optional |
| Limit_Participation | If First_Limit_Price = Last_Limit_Price, Filled_Qty/Limit_Tape, else unavailable | Float | 0-1 | Optional |
| End_Time | Date/Time of end of trading | Date Time | Within market hours | Required |
| Total tape | Tape volume from start to end | | | |

Segmenting Client Trade Data

Segments are non-overlapping, trading segments on a firm, symbol, side, (and broker, limit), presumed to be trading with a uniform participation rate and a unique limit price or market. The segment data enables estimating impact to build the "impact-free price" and provides an empirical dataset for ongoing research on impact models. Because trades can overlap, segments do not link to a unique trade_ID, rather they are associated to a firm, day, symbol and side.

TABLE 10

| Name | Description | Type | QA range | Missing value? |
|---|---|---|---|---|
| Trade_dt_key | Date of the segment (key) | | n.a. | Required |
| Segment_ID | Unique identifier of the segment (key) | | n.a. | Required |
| QA | Flag identifying possible quality issues with this record. Set only if there is a known problem | String | n.a. | Optional |
| Firm | Identifies the trading desk whose impact is being estimated | String | n.a. | Required |
| Megablock_ID | Unique identifier for all trades from the same firm, on the same side, symbol and same or consecutive trading days, or with the same client-provided block-ID | | n.a. | Required |
| Start_Time | Start of the segment | Date Time | Market hours | Required |
| End_Time | End of the segment | Date Time | Market hours | Required |
| SVD_Start | Normalized time of day for segment start according to the smile curve (SVD model) | Float | 0-1 | Required |
| SVD_End | | Float | 0-1 | Required |
| Side | The side of the trade | Enum | B, S, BC, SS | Required |
| Symbol | Unique description of the security in the trading system universe | String | Must be in the trading system universe | Required |
| Filled_Shares | Shares filled in the segment | Long | $1\text{-}10^9$ | Required |
| Filled_Price | Share-weighted average price of shares filled in the segment | Long | $1\text{-}10^9$ | Required |
| Block_Shares | Shares filled in the segment counting only prints of at least 10000 shares | Long | $1\text{-}10^9$ | Required |
| Block_Price | Share-weighted average price of block fills in the segment | Long | $1\text{-}10^9$ | Required |
| Segment_Tape | The tape volume from start to end | Long | $1\text{-}10^9$ | Required |
| Day_tape | Actual tape volume for this day | Long | Filled Shares - $10^{10}$ | Required |
| Prior_tape | Tape volume since the open, prior to start. | Long | | |
| Limit_Price | The presumed limit price, 0 = MKT | Float | $0\text{-}10^6$ | Required |
| Limit_Tape | The tape volume from start to end, counting only prints below (above) the limit price for B or BC (S or SS) | Long | $1\text{-}10^9$ | Required |
| BB_VOL | Annualized volatility, from Bloomberg, in percent | Float | 1-999 | Required |

TABLE 10-continued

| Name | Description | Type | QA range | Missing value? |
|---|---|---|---|---|
| ADV | Average Daily Volume, from Bloomberg | Long | $1\text{-}10^{10}$ | Required |
| Beta | Beta, from Bloomberg | Float | 0.01-99 | Required |
| Broker_Code | Identifies the broker | String | n.a. | Optional |
| Algo_Data | Any data about the method used by the broker to execute, such as algo name, broker sub-code, etc. | String | n.a. | Optional |
| Seg_Num | Number of this segment in a sequence of segments from the same trading desk, symbol and side (megablock) | Int | 1-999 | Required |
| Prior_Seg_ID | ID of the most recent segment prior to this one, if any. Segments are ordered by start date/time | Int | 1-999 | Required |
| Tape_Last_Seg | Tape volume elapsed since end of last segment. If the prior segment was on the previous trading day, do not count the overnight tape but instead add 0.25 * ADV for the overnight. NOTE: calendar days will be used for the purpose of overnight information decay measures: the gap from Friday close to Monday open comprises three overnight steps so one may model the weekend tape as 0.75 * ADV, but trade segments on Friday and Monday will belong to the same megablock. Set to 9 if this is the first segment, 0 if the segment immediately follows a previous one. | Long | $0\text{-}10^{10}$ | Required |
| Time_Last_Seg | SVD time elapsed since end of prior segment. If the prior segment was on the previous trading day, add 0.25 for the overnight gap. Set to 9 if this is the first segment, 0 if it is immediately follows a prior segment | Float | 0-9 | Required |
| Last_Filled | Shares filled on the megablock as of the end of the past segment. Values 0 or 9 as above | Long | $0\text{-}10^{9}$ | Required |
| Last_Tape | Tape accrued from the start of the megablock to the end of the last segment, +0.25 * ADV for every overnight gap. Values 0 or 9 as above | Long | $0\text{-}10^{10}$ | Required |
| Last_TI | Temporary impact accrued as of the end of the last segment, in basis points | Float | 0-999 | Required |
| Last_PI | Permanent impact accrued as of the end of the last segment, in basis points | Float | 0-999 | Required |
| Start_Price | NBBO Midpoint at start | Float | $0.01\text{-}10^{6}$ | Required |
| Start_SPY | SPY Midpoint at start | Float | 10-999 | Required |
| Start_ETF | ETF Midpoint at start | Float | 1-9999 | Required |
| 5min_Price | NBBO Midpoint 5 minutes after start | Float | $0.01\text{-}10^{6}$ | Required |
| 5min_SPY | SPY Midpoint 5 minutes after start | Float | 10-999 | Required |
| 5min_ETF | ETF Midpoint 5 minutes after start | Float | 1-9999 | Required |
| 5min_P | Passive fills in the first 5 minutes classified as BUY (i.e. on the offer against displayed liquidity) for a sell trade, or SELL for a buy trade. | Int | $1\text{-}10^{9}$ | Required |
| 5min_A | Aggressive Fills in the first 5 minutes, classified as BUY (i.e. on the offer against displayed liquidity) for a buy trade, or SELL for a sell trade. | Int | $1\text{-}10^{9}$ | Required |
| 5min_DP | Dark Passive Fills in the first 5 minutes classified as DARK BUY (i.e. on the offer against hidden liquidity) for a sell trade, or DARK SELL for a buy trade. | Int | $1\text{-}10^{9}$ | Required |
| 5min_DA | Dark aggressive fills in the first 5 minutes classified as BUY (i.e. on the offer against displayed liquidity) for a sell trade, or SELL for a buy trade. | Int | $1\text{-}10^{9}$ | Required |

TABLE 10-continued

| Name | Description | Type | QA range | Missing value? |
|---|---|---|---|---|
| 5min_DX | Dark Cross fills in the first 5 minutes, classified as dark cross. | Int | $1-10^9$ | Required |
| 5min_Async | Other fills in the first 5 min. | Int | $1-10^8$ | Required |
| 10min_(etc - 9 columns) | Same columns as for 5 min above, but for the first 10 minutes if the trade is still active beyond the first 5-minute interval, else n.a. | Int | $1-10^8$ | Required |
| 15min_(etc) | Same columns as for 5 min above, but for the first 15 minutes, if the trade goes beyond 10. | Int | (as above) | (as above) |
| 20min_(etc) | Same columns as for 5 min above, but for the first 20 minutes if the trade goes beyond 15. | Int | | |
| 30min_(etc) | Same columns as for 5 min above, but for the first 30 minutes if the trade goes beyond 20. | Int | | |
| 60min_(etc) | Same columns as for 5 min above, but for the first 60 minutes if the trade goes beyond 30. | Int | | |
| Spread | | | | |

1. Client Submits Partial Fills Data.

Segments are built using the 1-minute Tickdata and client fills data.

For each symbol, order all fills in chronological order. Step (A) is the identification of a segment start with a measurable participation rate. The first minute interval containing a fill starts the segment. Extend the segment forward minute by minute and read the fills file counting total tape and total number of shares filled until it is determined that a participation rate can be measured reliably. At each step the participation rate is tentatively estimated as rate=(filled shares)/(tape), both counted from the beginning of the segment. A trade is considered to have a measurable participation rate if the number of minute-intervals with fills is at least Max(5, 1/rate), or the number of minute-intervals is at least 5 and the shares filled amount to at least 250/rate. An exemplary algorithm to search for a measurable participation rate will not extend beyond 60 minutes. If at 60 minutes the above conditions are still not met, the segment is deemed to have started at the first partial fill in those 60 minutes and ended at the last fill in the same 60-minute interval.

In other cases, one has an interval with a measurable participation rate; this starts a segment. The next step (B) in the segment algorithm is to determine where the segment ends. For this purpose one may look forward by increments of Max(5, 1/rate) minute intervals. In each step forward, observe the participation rate in the new interval, test to see if it is similar to the previous rate, and if so add it to the segment. The similarity test is based on an approximate formula for the 95% confidence interval of the Poisson distribution. Let x=Max(5, 1/rate). The lower bound of the confidence interval will be violated if the ratio of the rate in the new interval to the previous rate is less than 0.15* power(x, 0.4). The upper bound will be violated if it is greater than 3*Power(x, −0.2).

Thus, for example, if one has observed a participation rate of 10%, x=10, the above ratios are 0.377 and 1.893 respectively, the confidence interval in this example is therefore [3.77%, 18.93%]. If the rate in the new interval lies outside this confidence interval, the segment closes at the last fill in the previous segment and a new segment begins at the first fill in the new interval. Else, the interval is added to the segment, the measured participation rate is updated to incorporate the new interval, and one may go to step (B) above.

The first fill following a closed segment starts a new segment as in step (A) above.

2. Client Submits Placements Data Only

If the placements do not overlap, each placement is a segment. Overlapping placements may be merged and handled as a single segment. In other words, the segment may extend from the start time of the first placement to the end time of the last placement; the filled shares may be the total sum of filled shares of overlapping placements.

3. Client Submits Placements Data and Partial Fills Data (Case 2 or 3—Never Seen Case 1 Only)

If the placement overlaps with another placement from the same firm, one may ignore the placements information and process partial fill as in 1. above. The description below handles non-overlapping placements.

One may test the assumption that each placement has a uniform participation rate and possibly a limit. First, if the limit price on the placement is not one of the fields, determine empirically whether it seems that there was a limit. For a buy: start with a price 10% from the high of the range within the interval from start to end of the placement. (a) Count the number of tape shares above this price and filled shares above this price. (b) If there are filled shares, assume that the placement was a market order. (c) Else, if the tape shares above this price is at least 5% of the total tape during the placement, the limit will be the highest partial fill price. (d) Else, consider a price 20% from the high of the range and continue as in (a) above. This algorithm stops when one has either determined that the placement was a market order or has a presumed limit price.

Next, one may test the uniform participation rate as follows. Divide the placement in two halves; in each half determine the limit rate as the filled shares divided by the tape counting only prints below the limit (above for sells). If the difference between the first half participation and second half participation is less than 50% of the average, one may consider the placement to be a single segment. Else, one may ignore the placement information and process the partial fills in the placement as in case 1. above.

Client Impact Table

Purpose: produce impact adjustments, in basis points, at 5-minute ticks, up to 10 trading days after the last close following the end of the megablock. Note, if a new megablock starts before these 10 days are expired, there may be multiple records with the same symbol, side and trade_dt_key but with different megablock_IDs; the total impact of the firm in this case is the sum of the overlapping megablock impacts.

Process: (daily,)
  read the day's segments and 5-minute aggregate market data
  read stored data on impact from last segment, if any, today or in the previous trading day
  estimate impact at each 5-minute segment close for the day The impact mode is based on a breakdown of fills into trade segments. One may count the off-market period as 90 minutes (this correctly accounts for the standard deviation of overnight gaps as a contribution to annualized volatility, after removing 1% outliers). Segments never carry across multiple days.

The impact is the sum of
  intra-segment total impact
  decay of temporary impact of prior segments (exponential)
  decay of permanent impact of prior segments (power-law)

An exemplary impact model is specified below. The output will give 5-minute impacts up to 10 days after the end of the last segment.

day-to-day operation, incomplete parents and parents that have not died over 10 days ago may be updated day to day. This may require persisting some information overnight so microstructure-level calculations do not have to be repeated.

Intra-segment, the total segment impact function may be subject to occasional updates. Initially one may use the following model for the segment impact at time t $E(I_t) = a v \pi^\delta (Q_t/ADV)^{\alpha-1} (MktCap[\$])^{-\eta}$; the impact factor a will be configurable per impact_client; the shares filled up to time t are $Q_t$, the three exponents will be globally configurable. Initial parameter values will be $a=8$, $\delta=0.4$, $\alpha=1.4$, $\eta=0$.

After the segment is finished, segment impact is the sum of temporary impact and permanent impact.

Temporary impact at the end of the trade is ⅓ of the total impact, and decays with a timescale $\tau = \tau_0 + \kappa * LN(t_0 + t[min])$ where $\tau=0$, $\kappa=4.34$, $t_0=3$ are global system configurable parameters. Thus, t' minutes after segment completion,

TABLE 11

| Name | Description | Type | QA Range | Missing value? |
|---|---|---|---|---|
| Trade_dt_key | Date of the impact record (key) | | | |
| QA | Flags potential problems with the data; empty if OK | String | n.a. | Required |
| Firm | Identifies the trading desk for which one is examining impact | String | n.a. | Required |
| Megablock-ID | Identifies a megablock comprising segments on the same symbol, side and consecutive trading days | | n.a. | Required |
| Symbol | The symbol for which one has impact (key) | String | n.a. | Required |
| Side | Side of the megablock | String | n.a. | Required |
| Time_min | Time from the open, in minutes: {0, 5, 10, 15, . . .}. Use appropriate timelines for foreign markets, breaking down in 5-minute segments. | Int | 0-390 (US) | Required |
| Shares | Shares filled up to this point | Long | $0-10^9$ | Required |
| Segment_TI | If inside a segment, the temporary impact at this point, in basis points, from this segment, rounded to the nearest whole number, signed by the trade: Positive for buys, negative for sells | Int | 0-999 | Required |
| Segment_PI | If inside a segment, the permanent impact at this point, in basis points, from this segment, rounded to the nearest whole number, signed by the trade: Positive for buys, negative for sells | Int | 0-999 | Required |
| Residual_TI | Temporary impact at this point from prior segments, or 0 if there are no prior segments, in basis points, rounded to the nearest whole number, signed by the trade: Positive for buys, negative for sells | Int | 0-999 | Required |
| Residual_PI | Permanent impact at this point from prior segments, or 0 if there are no prior segments, in basis points, rounded to the nearest whole number, signed by the trade: Positive for buys, negative for sells | Int | 0-999 | Required |
| Impact | Sum of the above four values | Int | 0-999 | Required |

Market Impact Model

A "parent" order is a set of segments on the same symbol, side and same or consecutive trading days. In an exemplary embodiment, an impact model aims to estimate impacts at 5-minute intervals starting on the day when a parent order starts and continuing up to 10 days after its completion. In $$E(I, end + t') = E(I, end)\left(1 - \frac{1}{3}\exp(-t'/\tau)\right)$$

Permanent impact is ⅔ of total impact at the end of the segment, and decays as a power δ of elapsed tape volume, where δ is the same exponent introduced previously for total impact. Thus, $$E(PI, \text{end} + t') = \frac{2}{3} E(I, \text{end}) \left( \frac{\text{tape}(\text{start} \to \text{end})}{\text{tape}(\text{start} \to \text{end} + t')} \right)^{0.4}$$

The impact for a block is the sum of the impact contribution of each segment.

Enriched Trades and Enriched Segments Tables

The enriched trades and segments tables comprise a pointer to the trade or segment data, variables representing the information universe at trade/segment start, pulled in from internal and external sources and variables required to estimate the performance of alternate trading strategies and the returns up to 60 days following the completion of the trade/segment.

Columns may include
PWP benchmarking; tracking error adjustments etc
  Adverse selection/opportunistic savings
  Alternate speeds
  Alternate limit price choices
  Add two-stage strategy benchmarks; make sure all PWPs extend over multiple days where needed
  PWP_SPY weighted by the tape of the stock, for the core PWP estimations (AVWAP, 5, 10, 15, 20, 30; no limit price)
  Apply reasonable rounding of PWP windows to avoid small residuals at market close; let AVWAP end to the first close where the trade size as a Percent of Available Liquidity to Last close (PALL) is less than 4%
  For volume-weighted average price, show the corresponding volume
Prior/post price comparisons.
  For historical prices <T−5 or >T+1 show only closing price: stock, ETF and SPY.
  T−1 to T−5 add HLOC, stock only. For T+1 add VWAP for stock ETF and SPY, and HLOC.
Price and order flow metrics from the start of execution
  5, 15, 30, 60 minute impact anomalies
  5, 15, 30, 60 minute order low imbalances
  5, 15, 30, 60 minute participation rate anomalies
  5, 15, 30, 60 minute sector divergence
Impact-adjusted returns 5, 10, 15, 20, 30, 60 minutes after creation, to close, at last fill, last close and post-trade VWAP prices to T+1, T+2, T+5, T+10, T+20, T+60
HLOC prices in date ranges covering T−60 to T+60
All alpha profiling drivers supported in the server
Drivers Existing in Current Datamining Base Tables The output table may comprise the same drivers as are currently in the dwh_sys.res_cl_analysis_jpm_daily table and enhanced by other variables available from dwh_sys.res_cl_analysis_jpm_ext table.

TABLE 12

| Nb | Driver's name | |
|---|---|---|
| 1 | TRADE_DT_KEY | NUMBER(8) |
| 2 | ID | NUMBER |
| 3 | PARENT_BLOCKID | VARCHAR2(20) |
| 4 | PRIMARY_STRATEGY | VARCHAR2(50) |
| 5 | SYMBOL | VARCHAR2(20) |
| 6 | SIDE | VARCHAR2(30) |
| 7 | SECTOR | VARCHAR2(40) |

TABLE 12-continued

| Nb | Driver's name | |
|---|---|---|
| 8 | MANAGER | VARCHAR2(50) |
| 9 | PARENT_CREATED_TIME | TIMESTAMP(6) |
| 10 | PARENT_SUBMITTED_QTY[7] | NUMBER |
| 11 | PARENT_START_TIME | TIMESTAMP(6) |
| 12 | PARENT_END_TIME | TIMESTAMP(6) |
| 13 | PARENT_FILLED_QTY | NUMBER |
| 14 | PARENT_AVGPRICE | NUMBER |
| 15 | ORDERID | VARCHAR2(20) |
| 16 | SUBMITTED_QTY | NUMBER |
| 17 | FILLED_QTY | NUMBER |
| 18 | ORDER_AVGPRICE | NUMBER |
| 19 | ORDER_CREATED_TIME | TIMESTAMP(6) |
| 20 | ORDER_START_TIME | TIMESTAMP(6) |
| 21 | ORDER_END_TIME | TIMESTAMP(6) |
| 22 | PARENT_MIDQUOTE_CREATED | NUMBER |
| 23 | MIDQUOTE_CREATED | NUMBER |
| 24 | MIDQUOTE_START | NUMBER |
| 25 | MIDQUOTE_END | NUMBER |
| 26 | MIDQUOTE_5MIN | NUMBER |
| 27 | MIDQUOTE_15MIN | NUMBER |
| 28 | MIDQUOTE_30MIN | NUMBER |
| 29 | MIDQUOTE_60MIN | NUMBER |
| 30 | AVWAP | NUMBER |
| 31 | PWP_5 | NUMBER |
| 32 | PWP_10 | NUMBER |
| 33 | PWP_20 | NUMBER |
| 34 | TAPE | NUMBER |
| 35 | TAPED_QTY_5 | NUMBER |
| 36 | TAPED_QTY_10 | NUMBER |
| 37 | TAPED_QTY_20 | NUMBER |
| 38 | PX_OPEN | NUMBER(30,6) |
| 39 | PX_CLOSE | NUMBER(30,6) |
| 40 | PX_HIGH | NUMBER(30,6) |
| 41 | PX_LOW | NUMBER(30,6) |
| 42 | ALL_DAY_VWAP | NUMBER |
| 43 | TWAP1M | NUMBER |
| 44 | TWAP5M | NUMBER |
| 45 | PRIOR_PX_OPEN | NUMBER(30,6) |
| 46 | PRIOR_PX_CLOSE | NUMBER(30,6) |
| 47 | PRIOR_PX_HIGH | NUMBER(30,6) |
| 48 | PRIOR_PX_LOW | NUMBER(30,6) |
| 49 | PRIOR_ALL_DAY_VWAP | NUMBER |
| 50 | PRIOR_TWAP1M | NUMBER |
| 51 | PRIOR_TWAP5M | NUMBER |
| 52 | NEXT_PX_OPEN | NUMBER(30,6) |
| 53 | NEXT_PX_CLOSE | NUMBER(30,6) |
| 54 | NEXT_PX_HIGH | NUMBER(30,6) |
| 55 | NEXT_PX_LOW | NUMBER(30,6) |
| 56 | NEXT_ALL_DAY_VWAP | NUMBER |
| 57 | NEXT_TWAP1M | NUMBER |
| 58 | NEXT_TWAP5M | NUMBER |
| 59 | END_PWP_20 | TIMESTAMP(6) |
| 60 | END_PWP_10 | TIMESTAMP(6) |
| 61 | END_PWP_5 | TIMESTAMP(6) |
| 62 | BID_CREATE[8] | NUMBER |
| 63 | ASK_CREATE | NUMBER |
| 64 | REVERSION_TIME | TIMESTAMP(6) |
| 65 | PART_RATE | NUMBER |
| 66 | PWP_5_SHARES | NUMBER |
| 67 | PWP_10_SHARES | NUMBER |
| 68 | PWP_20_SHARES | NUMBER |
| 69 | PWP_5_INCURRED_IMPACT[9] | NUMBER |
| 70 | PWP_10_INCURRED_IMPACT | NUMBER |
| 71 | PWP_20_INCURRED_IMPACT | NUMBER |
| 72 | TE_5_ADJUSTMENT | NUMBER |
| 73 | TE_10_ADJUSTMENT | NUMBER |
| 74 | TE_20_ADJUSTMENT | NUMBER |
| 75 | TE_5_PERCENT | NUMBER |
| 76 | TE_10_PERCENT | NUMBER |
| 77 | TE_20_PERCENT | NUMBER |
| 78 | TE_20_PERCENT_ADJUSTED | NUMBER |
| 79 | PRICE_20 | NUMBER |
| 80 | AVWAP30 | NUMBER |
| 81 | AVWAP60 | NUMBER |
| 82 | VOL_ELAPSED | NUMBER |
| 83 | FILLED_QTY_5 | NUMBER |
| 84 | FILLED_QTY_15 | NUMBER |
| 85 | FILLED_QTY_30 | NUMBER |

TABLE 12-continued

| Nb | Driver's name | |
|---|---|---|
| 86 | FILLED_QTY_60 | NUMBER |
| 87 | TAPE_5 | NUMBER |
| 88 | TAPE_15 | NUMBER |
| 89 | TAPE_30 | NUMBER |
| 90 | TAPE_60 | NUMBER |
| 91 | PART_RATE_5 | NUMBER |
| 92 | PART_RATE_15 | NUMBER |
| 93 | PART_RATE_30 | NUMBER |
| 94 | PART_RATE_60 | NUMBER |
| 95 | FIRM_FILLED_QTY_5 | NUMBER |
| 96 | FIRM_FILLED_QTY_15 | NUMBER |
| 97 | FIRM_FILLED_QTY_30 | NUMBER |
| 98 | FIRM_FILLED_QTY_60 | NUMBER |
| 99 | SUMFILL_QTY | NUMBER |
| 100 | URGENCY | NUMBER(1) |
| 101 | SPY_PARENT_CREATED | NUMBER |
| 102 | ETF_PARENT_CREATED | NUMBER |
| 103 | SPY_CREATED | NUMBER |
| 104 | ETF_CREATED | NUMBER |
| 105 | SPY_START | NUMBER |
| 106 | ETF_START | NUMBER |
| 107 | SPY_END | NUMBER |
| 108 | ETF_END | NUMBER |
| 109 | SPY_5MIN | NUMBER |
| 110 | ETF_5MIN | NUMBER |
| 111 | SPY_15MIN | NUMBER |
| 112 | ETF_15MIN | NUMBER |
| 113 | SPY_30MIN | NUMBER |
| 114 | ETF_30MIN | NUMBER |
| 115 | SPY_60MIN | NUMBER |
| 116 | ETF_60MIN | NUMBER |
| 117 | SPY_CLOSE | NUMBER |
| 118 | SPY_HIGH | NUMBER |
| 119 | SPY_LOW | NUMBER |
| 120 | SPY_ALL_DAY_VWAP | NUMBER |
| 121 | SPY_OPEN | NUMBER |
| 122 | PRIOR_SPY_OPEN | NUMBER |
| 123 | PRIOR_SPY_CLOSE | NUMBER |
| 124 | PRIOR_SPY_HIGH | NUMBER |
| 125 | PRIOR_SPY_LOW | NUMBER |
| 126 | PRIOR_SPY_ALL_DAY_VWAP | NUMBER |
| 127 | NEXT_SPY_OPEN | NUMBER |
| 128 | NEXT_SPY_CLOSE | NUMBER |
| 129 | NEXT_SPY_HIGH | NUMBER |
| 130 | NEXT_SPY_LOW | NUMBER |
| 131 | NEXT_SPY_ALL_DAY_VWAP | NUMBER |
| 132 | ETF_OPEN | NUMBER |
| 133 | ETF_CLOSE | NUMBER |
| 134 | ETF_HIGH | NUMBER |
| 135 | ETF_LOW | NUMBER |
| 136 | ETF_ALL_DAY_VWAP | NUMBER |
| 137 | PRIOR_ETF_OPEN | NUMBER |
| 138 | PRIOR_ETF_CLOSE | NUMBER |
| 139 | PRIOR_ETF_HIGH | NUMBER |
| 140 | PRIOR_ETF_LOW | NUMBER |
| 141 | PRIOR_ETF_ALL_DAY_VWAP | NUMBER |
| 142 | NEXT_ETF_OPEN | NUMBER |
| 143 | NEXT_ETF_CLOSE | NUMBER |
| 144 | NEXT_ETF_HIGH | NUMBER |
| 145 | NEXT_ETF_LOW | NUMBER |
| 146 | NEXT_ETF_ALL_DAY_VWAP | NUMBER |
| 147 | PRIOR_PX_OPEN2 | NUMBER |
| 148 | PRIOR_PX_CLOSE2 | NUMBER |
| 149 | PRIOR_PX_HIGH2 | NUMBER |
| 150 | PRIOR_PX_LOW2 | NUMBER |
| 151 | PRIOR_ALL_DAY_VWAP2 | NUMBER |
| 152 | PRIOR_PX_OPEN5 | NUMBER |
| 153 | PRIOR_PX_CLOSE5 | NUMBER |
| 154 | PRIOR_PX_HIGH5 | NUMBER |
| 155 | PRIOR_PX_LOW5 | NUMBER |
| 156 | PRIOR_ALL_DAY_VWAP5 | NUMBER |
| 157 | PRIOR_PX_OPEN10 | NUMBER |
| 158 | PRIOR_PX_CLOSE10 | NUMBER |
| 159 | PRIOR_PX_HIGH10 | NUMBER |
| 160 | PRIOR_PX_LOW10 | NUMBER |
| 161 | PRIOR_ALL_DAY_VWAP10 | NUMBER |
| 162 | PRIOR_PX_OPEN20 | NUMBER |
| 163 | PRIOR_PX_CLOSE20 | NUMBER |
| 164 | PRIOR_PX_HIGH20 | NUMBER |
| 165 | PRIOR_PX_LOW20 | NUMBER |
| 166 | PRIOR_ALL_DAY_VWAP20 | NUMBER |
| 167 | PRIOR_PX_OPEN60 | NUMBER |
| 168 | PRIOR_PX_CLOSE60 | NUMBER |
| 169 | PRIOR_PX_HIGH60 | NUMBER |
| 170 | PRIOR_PX_LOW60 | NUMBER |
| 171 | PRIOR_ALL_DAY_VWAP60 | NUMBER |
| 172 | NEXT_PX_OPEN2 | NUMBER |
| 173 | NEXT_PX_CLOSE2 | NUMBER |
| 174 | NEXT_PX_HIGH2 | NUMBER |
| 175 | NEXT_PX_LOW2 | NUMBER |
| 176 | NEXT_ALL_DAY_VWAP2 | NUMBER |
| 177 | NEXT_PX_OPEN5 | NUMBER |
| 178 | NEXT_PX_CLOSE5 | NUMBER |
| 179 | NEXT_PX_HIGH5 | NUMBER |
| 180 | NEXT_PX_LOW5 | NUMBER |
| 181 | NEXT_ALL_DAY_VWAP5 | NUMBER |
| 182 | NEXT_PX_OPEN10 | NUMBER |
| 183 | NEXT_PX_CLOSE10 | NUMBER |
| 184 | NEXT_PX_HIGH10 | NUMBER |
| 185 | NEXT_PX_LOW10 | NUMBER |
| 186 | NEXT_ALL_DAY_VWAP10 | NUMBER |
| 187 | NEXT_PX_OPEN20 | NUMBER |
| 188 | NEXT_PX_CLOSE20 | NUMBER |
| 189 | NEXT_PX_HIGH20 | NUMBER |
| 190 | NEXT_PX_LOW20 | NUMBER |
| 191 | NEXT_ALL_DAY_VWAP20 | NUMBER |
| 192 | NEXT_PX_OPEN60 | NUMBER |
| 193 | NEXT_PX_CLOSE60 | NUMBER |
| 194 | NEXT_PX_HIGH60 | NUMBER |
| 195 | NEXT_PX_LOW60 | NUMBER |
| 196 | NEXT_ALL_DAY_VWAP60 | NUMBER |
| 197 | PRIOR_SPY_OPEN2 | NUMBER |
| 198 | PRIOR_SPY_CLOSE2 | NUMBER |
| 199 | PRIOR_SPY_HIGH2 | NUMBER |
| 200 | PRIOR_SPY_LOW2 | NUMBER |
| 201 | PRIOR_SPY_ALL_DAY_VWAP2 | NUMBER |
| 202 | PRIOR_SPY_OPEN5 | NUMBER |
| 203 | PRIOR_SPY_CLOSE5 | NUMBER |
| 204 | PRIOR_SPY_HIGH5 | NUMBER |
| 205 | PRIOR_SPY_LOW5 | NUMBER |
| 206 | PRIOR_SPY_ALL_DAY_VWAP5 | NUMBER |
| 207 | PRIOR_SPY_OPEN10 | NUMBER |
| 208 | PRIOR_SPY_CLOSE10 | NUMBER |
| 209 | PRIOR_SPY_HIGH10 | NUMBER |
| 210 | PRIOR_SPY_LOW10 | NUMBER |
| 211 | PRIOR_SPY_ALL_DAY_VWAP10 | NUMBER |
| 212 | PRIOR_SPY_OPEN20 | NUMBER |
| 213 | PRIOR_SPY_CLOSE20 | NUMBER |
| 214 | PRIOR_SPY_HIGH20 | NUMBER |
| 215 | PRIOR_SPY_LOW20 | NUMBER |
| 216 | PRIOR_SPY_ALL_DAY_VWAP20 | NUMBER |
| 217 | PRIOR_SPY_OPEN60 | NUMBER |
| 218 | PRIOR_SPY_CLOSE60 | NUMBER |
| 219 | PRIOR_SPY_HIGH60 | NUMBER |
| 220 | PRIOR_SPY_LOW60 | NUMBER |
| 221 | PRIOR_SPY_ALL_DAY_VWAP60 | NUMBER |
| 222 | NEXT_SPY_OPEN2 | NUMBER |
| 223 | NEXT_SPY_CLOSE2 | NUMBER |
| 224 | NEXT_SPY_HIGH2 | NUMBER |
| 225 | NEXT_SPY_LOW2 | NUMBER |
| 226 | NEXT_SPY_ALL_DAY_VWAP2 | NUMBER |
| 227 | NEXT_SPY_OPEN5 | NUMBER |
| 228 | NEXT_SPY_CLOSE5 | NUMBER |
| 229 | NEXT_SPY_HIGH5 | NUMBER |
| 230 | NEXT_SPY_LOW5 | NUMBER |
| 231 | NEXT_SPY_ALL_DAY_VWAP5 | NUMBER |
| 232 | NEXT_SPY_OPEN10 | NUMBER |
| 233 | NEXT_SPY_CLOSE10 | NUMBER |
| 234 | NEXT_SPY_HIGH10 | NUMBER |
| 235 | NEXT_SPY_LOW10 | NUMBER |
| 236 | NEXT_SPY_ALL_DAY_VWAP10 | NUMBER |
| 237 | NEXT_SPY_OPEN20 | NUMBER |
| 238 | NEXT_SPY_CLOSE20 | NUMBER |
| 239 | NEXT_SPY_HIGH20 | NUMBER |
| 240 | NEXT_SPY_LOW20 | NUMBER |
| 241 | NEXT_SPY_ALL_DAY_VWAP20 | NUMBER |

TABLE 12-continued

| Nb | Driver's name | |
|---|---|---|
| 242 | NEXT_SPY_OPEN60 | NUMBER |
| 243 | NEXT_SPY_CLOSE60 | NUMBER |
| 244 | NEXT_SPY_HIGH60 | NUMBER |
| 245 | NEXT_SPY_LOW60 | NUMBER |
| 246 | NEXT_SPY_ALL_DAY_VWAP60 | NUMBER |
| 247 | PRIOR_ETF_OPEN2 | NUMBER |
| 248 | PRIOR_ETF_CLOSE2 | NUMBER |
| 249 | PRIOR_ETF_HIGH2 | NUMBER |
| 250 | PRIOR_ETF_LOW2 | NUMBER |
| 251 | PRIOR_ETF_ALL_DAY_VWAP2 | NUMBER |
| 252 | PRIOR_ETF_OPEN5 | NUMBER |
| 253 | PRIOR_ETF_CLOSE5 | NUMBER |
| 254 | PRIOR_ETF_HIGH5 | NUMBER |
| 255 | PRIOR_ETF_LOW5 | NUMBER |
| 256 | PRIOR_ETF_ALL_DAY_VWAP5 | NUMBER |
| 257 | PRIOR_ETF_OPEN10 | NUMBER |
| 258 | PRIOR_ETF_CLOSE10 | NUMBER |
| 259 | PRIOR_ETF_HIGH10 | NUMBER |
| 260 | PRIOR_ETF_LOW10 | NUMBER |
| 261 | PRIOR_ETF_ALL_DAY_VWAP10 | NUMBER |
| 262 | PRIOR_ETF_OPEN20 | NUMBER |
| 263 | PRIOR_ETF_CLOSE20 | NUMBER |
| 264 | PRIOR_ETF_HIGH20 | NUMBER |
| 265 | PRIOR_ETF_LOW20 | NUMBER |
| 266 | PRIOR_ETF_ALL_DAY_VWAP20 | NUMBER |
| 267 | PRIOR_ETF_OPEN60 | NUMBER |
| 268 | PRIOR_ETF_CLOSE60 | NUMBER |
| 269 | PRIOR_ETF_HIGH60 | NUMBER |
| 270 | PRIOR_ETF_LOW60 | NUMBER |
| 271 | PRIOR_ETF_ALL_DAY_VWAP60 | NUMBER |
| 272 | NEXT_ETF_OPEN2 | NUMBER |
| 273 | NEXT_ETF_CLOSE2 | NUMBER |
| 274 | NEXT_ETF_HIGH2 | NUMBER |
| 275 | NEXT_ETF_LOW2 | NUMBER |
| 276 | NEXT_ETF_ALL_DAY_VWAP2 | NUMBER |
| 277 | NEXT_ETF_OPEN5 | NUMBER |
| 278 | NEXT_ETF_CLOSE5 | NUMBER |
| 279 | NEXT_ETF_HIGH5 | NUMBER |
| 280 | NEXT_ETF_LOW5 | NUMBER |
| 281 | NEXT_ETF_ALL_DAY_VWAP5 | NUMBER |
| 282 | NEXT_ETF_OPEN10 | NUMBER |
| 283 | NEXT_ETF_CLOSE10 | NUMBER |
| 284 | NEXT_ETF_HIGH10 | NUMBER |
| 285 | NEXT_ETF_LOW10 | NUMBER |
| 286 | NEXT_ETF_ALL_DAY_VWAP10 | NUMBER |
| 287 | NEXT_ETF_OPEN20 | NUMBER |
| 288 | NEXT_ETF_CLOSE20 | NUMBER |
| 289 | NEXT_ETF_HIGH20 | NUMBER |
| 290 | NEXT_ETF_LOW20 | NUMBER |
| 291 | NEXT_ETF_ALL_DAY_VWAP20 | NUMBER |
| 292 | NEXT_ETF_OPEN60 | NUMBER |
| 293 | NEXT_ETF_CLOSE60 | NUMBER |
| 294 | NEXT_ETF_HIGH60 | NUMBER |
| 295 | NEXT_ETF_LOW60 | NUMBER |
| 296 | NEXT_ETF_ALL_DAY_VWAP60 | NUMBER |
| 297 | PRIOR_MIDQUOTE_5MIN | NUMBER |
| 298 | PRIOR_MIDQUOTE_15MIN | NUMBER |
| 299 | PRIOR_MIDQUOTE_30MIN | NUMBER |
| 300 | PRIOR_MIDQUOTE_65MIN | NUMBER |
| 301 | PRIOR_MIDQUOTE_130MIN | NUMBER |
| 302 | PRIOR_MIDQUOTE_195MIN | NUMBER |
| 303 | PRIOR_MO5 | NUMBER |
| 304 | PRIOR_MO15 | NUMBER |
| 305 | PRIOR_MO30 | NUMBER |
| 306 | PRIOR_MO65 | NUMBER |
| 307 | PRIOR_MO130 | NUMBER |
| 308 | PRIOR_MO195 | NUMBER |
| 309 | PRIOR_DO5 | NUMBER |
| 310 | PRIOR_DO15 | NUMBER |
| 311 | PRIOR_DO30 | NUMBER |
| 312 | PRIOR_DO65 | NUMBER |
| 313 | PRIOR_DO130 | NUMBER |
| 314 | PRIOR_DO195 | NUMBER |
| 315 | PRIOR_LCO5 | NUMBER |
| 316 | PRIOR_LCO15 | NUMBER |
| 317 | PRIOR_LCO30 | NUMBER |
| 318 | PRIOR_LCO65 | NUMBER |
| 319 | PRIOR_LCO130 | NUMBER |
| 320 | PRIOR_LCO195 | NUMBER |
| 321 | MO5 | NUMBER |
| 322 | MO15 | NUMBER |
| 323 | MO30 | NUMBER |
| 324 | MO60 | NUMBER |
| 325 | DO5 | NUMBER |
| 326 | DO15 | NUMBER |
| 327 | DO30 | NUMBER |
| 328 | DO60 | NUMBER |
| 329 | LCO5 | NUMBER |
| 330 | LCO15 | NUMBER |
| 331 | LCO30 | NUMBER |
| 332 | LCO60 | NUMBER |
| 333 | PRIOR_TAPE5 | NUMBER |
| 334 | PRIOR_TAPE15 | NUMBER |
| 335 | PRIOR_TAPE30 | NUMBER |
| 336 | PRIOR_TAPE65 | NUMBER |
| 337 | PRIOR_TAPE130 | NUMBER |
| 338 | PRIOR_TAPE195 | NUMBER |
| 339 | SUBPRODUCT | VARCHAR2(300) |
| 340 | BB30ADV | NUMBER |
| 341 | BBVOL | NUMBER |
| 342 | BETA | NUMBER |
| 343 | MARKET_CAP | VARCHAR2(20) |
| 344 | LISTING_EXCHANGE | VARCHAR2(20) |
| 345 | INTENTION | VARCHAR2(20) |
| 346 | PRIOR_SPY_MIDQUOTE_5MIN | NUMBER |
| 347 | PRIOR_SPY_MIDQUOTE_15MIN | NUMBER |
| 348 | PRIOR_SPY_MIDQUOTE_30MIN | NUMBER |
| 349 | PRIOR_SPY_MIDQUOTE_65MIN | NUMBER |
| 350 | PRIOR_SPY_MIDQUOTE_130MIN | NUMBER |
| 351 | PRIOR_SPY_MIDQUOTE_195MIN | NUMBER |
| 352 | PRIOR_ETF_MIDQUOTE_5MIN | NUMBER |
| 353 | PRIOR_ETF_MIDQUOTE_15MIN | NUMBER |
| 354 | PRIOR_ETF_MIDQUOTE_30MIN | NUMBER |
| 355 | PRIOR_ETF_MIDQUOTE_65MIN | NUMBER |
| 356 | PRIOR_ETF_MIDQUOTE_130MIN | NUMBER |
| 357 | PRIOR_ETF_MIDQUOTE_195MIN | NUMBER |
| 358 | IMPACT_5 | NUMBER |
| 359 | IMPACT_15 | NUMBER |
| 360 | IMPACT_30 | NUMBER |
| 361 | IMPACT_60 | NUMBER |
| 362 | PRIOR_DELTAPRICE5 | NUMBER |
| 363 | PRIOR_DELTAPRICE15 | NUMBER |
| 364 | PRIOR_DELTAPRICE30 | NUMBER |
| 365 | PRIOR_DELTAPRICE65 | NUMBER |
| 366 | PRIOR_DELTAPRICE130 | NUMBER |
| 367 | PRIOR_DELTAPRICE195 | NUMBER |
| 368 | SEGMENTSIZE | NUMBER |
| 369 | CALCULATIONTIME | VARCHAR2(20) |
| 370 | MO15HAT | NUMBER |
| 371 | DO15HAT | NUMBER |
| 372 | LCO15HAT | NUMBER |
| 373 | DX15HAT | NUMBER |
| 374 | BUYCALP | NUMBER |
| 375 | SELLCALP | NUMBER |
| 376 | GAMMAMINUS | NUMBER |
| 377 | GAMMAPLUS | NUMBER |
| 378 | DELTAP15HAT01 | NUMBER |
| 379 | DELTAP15HAT10 | NUMBER |
| 380 | DELTAP15HAT01_DRIVER1 | VARCHAR2(20) |
| 381 | DELTAP15HAT01_STATE1 | NUMBER(2) |
| 382 | DELTAP15HAT01_DRIVERVALUE1 | NUMBER |
| 383 | DELTAP15HAT01_DRIVER2 | VARCHAR2(20) |
| 384 | DELTAP15HAT01_STATE2 | NUMBER(2) |
| 385 | DELTAP15HAT01_DRIVERVALUE2 | NUMBER |
| 386 | DELTAP15HAT01_DRIVER3 | VARCHAR2(20) |
| 387 | DELTAP15HAT01_STATE3 | NUMBER(2) |
| 388 | DELTAP15HAT01_DRIVERVALUE3 | NUMBER |
| 389 | DELTAP15HAT01_DRIVER4 | VARCHAR2(20) |
| 390 | DELTAP15HAT01_STATE4 | NUMBER(2) |
| 391 | DELTAP15HAT01_DRIVERVALUE4 | NUMBER |
| 392 | DELTAP15HAT01_DRIVER5 | VARCHAR2(20) |
| 393 | DELTAP15HAT01_STATE5 | NUMBER(2) |
| 394 | DELTAP15HAT01_DRIVERVALUE5 | NUMBER |
| 395 | DELTAP15HAT10_DRV1 | VARCHAR2(20) |
| 396 | DELTAP15HAT10_STATE1 | NUMBER(2) |
| 397 | DELTAP15HAT10_DRIVERVALUE1 | NUMBER |

TABLE 12-continued

| Nb | Driver's name | |
|---|---|---|
| 398 | DELTAP15HAT10_DRV2 | VARCHAR2(20) |
| 399 | DELTAP15HAT10_STATE2 | NUMBER(2) |
| 400 | DELTAP15HAT10_DRIVERVALUE2 | NUMBER |
| 401 | DELTAP15HAT10_DRV3 | VARCHAR2(20) |
| 402 | DELTAP15HAT10_STATE3 | NUMBER(2) |
| 403 | DELTAP15HAT10_DRIVERVALUE3 | NUMBER |
| 404 | DELTAP15HAT10_DRV4 | VARCHAR2(20) |
| 405 | DELTAP15HAT10_STATE4 | NUMBER(2) |
| 406 | DELTAP15HAT10_DRIVERVALUE4 | NUMBER |
| 407 | DELTAP15HAT10_DRV5 | VARCHAR2(20) |
| 408 | DELTAP15HAT10_STATE5 | NUMBER(2) |
| 409 | DELTAP15HAT10_DRIVERVALUE5 | NUMBER |
| 410 | BUYFINISH | TIMESTAMP(6) |
| 411 | BUYIMPACTBPS | NUMBER |
| 412 | BUYIMPACTSTDDEVBPS | NUMBER |
| 413 | SELLFINISH | TIMESTAMP(6) |
| 414 | SELLIMPACTBPS | NUMBER |
| 415 | SELLIMPACTSTDDEVBPS | NUMBER |
| 416 | NEUTRALMARKETBUYIMPACTBPS | NUMBER |
| 417 | NEUTRALMARKETSELLIMPACTBPS | NUMBER |
| 418 | SECURITYID | NUMBER |
| 419 | MARKET | VARCHAR2(20) |
| 420 | PIPELINELBQ | NUMBER |
| 421 | TS | TIMESTAMP(6) |
| 422 | COMPANYNAME | VARCHAR2(30) |
| 423 | VOLUME | NUMBER |
| 424 | DAYHIGH | NUMBER |
| 425 | DAYLOW | NUMBER |
| 426 | OPENPRICE | NUMBER |
| 427 | CLOSEPRICE | NUMBER |
| 428 | DAYCLOSE | NUMBER |
| 429 | PREVCLOSE | NUMBER |
| 430 | CHANGE | NUMBER |
| 431 | CHGINPCT | NUMBER |
| 432 | WEEK52_LOW | NUMBER |
| 433 | WEEK_52HIGH | NUMBER |
| 434 | CHGFROM52WEEKLOW | NUMBER |
| 435 | CHGFROM52WEEKHIGH | NUMBER |
| 436 | PCTCHGFROM52WEEKHIGH | NUMBER |
| 437 | PCTCHGFROM52WEEKLOW | NUMBER |
| 438 | CHGFROM200DAYMOVINGAVG | NUMBER |
| 439 | PCTCHGFROM200DAYMVAVG | NUMBER |
| 440 | CHGFROM50DAYMOVINGAVG | NUMBER |
| 441 | PCTCHGFROM50DAYMVAVG | NUMBER |
| 442 | LASTTRADEDATE | TIMESTAMP(6) |
| 443 | DATEFROMYAHOO | TIMESTAMP(6) |
| 444 | AVGDAILYVOL | NUMBER |
| 445 | VOLPCTOFAVG | NUMBER |
| 446 | DAYRANGEPCT | NUMBER |
| 447 | DHIGHPCTCLOSE | NUMBER |
| 448 | DLOWPCTCLOSE | NUMBER |
| 449 | ONEYEARTARGETPRICE | NUMBER |
| 450 | ONEYRTARGMINUSCLOSE | NUMBER |
| 451 | TARGASPCTOFCLOSE | NUMBER |
| 452 | EPS | NUMBER |
| 453 | EPSESTNEXTQUARTER | NUMBER |
| 454 | EPSESTNXQTRPCTEPS | NUMBER |
| 455 | EPSESTCURRENTYEAR | NUMBER |
| 456 | ESPESTCURYRPCTEPS | NUMBER |
| 457 | EPSESTNEXTYEAR | NUMBER |
| 458 | EPSNEXTYRPCTEPS | NUMBER |
| 459 | PRICEEPSESTICURRENTYEARRATIO | NUMBER |
| 460 | PRICEEPSESTNEXTYEARRATIO | NUMBER |
| 461 | MOVINGAVG_200DAY | NUMBER |
| 462 | MOVINGAVG_50DAY | NUMBER |
| 463 | SHORTRATIO | NUMBER |
| 464 | DIVIDENDYIELD | NUMBER |
| 465 | DIVIDENDPERSHARE | NUMBER |
| 466 | BOOKVALUE | NUMBER |
| 467 | MARKETCAPITALIZATION | NUMBER |
| 468 | PRICESALESRATIO | NUMBER |
| 469 | PERATIO | NUMBER |
| 470 | PEGRATIO | NUMBER |
| 471 | EBITDA | NUMBER |
| 472 | PRICEBOOKRATIO | NUMBER |
| 473 | DIVIDENDPAYDATE | TIMESTAMP(6) |
| 474 | EXDIVIDENDDATE | TIMESTAMP(6) |
| 475 | DAYSTODIVPAY | NUMBER |
| 476 | DAYSTOEXDIV | NUMBER |
| 477 | DATEFROMGOOGLE | TIMESTAMP(6) |
| 478 | BETA | NUMBER |
| 479 | DATEFROMSTERN | TIMESTAMP(6) |
| 480 | HILORISK | NUMBER |
| 481 | NETMARGIN | NUMBER |
| 482 | EVTRAILINGSALESRATIO | NUMBER |
| 483 | TOTALDEBT | NUMBER |
| 484 | PRETAXOPERATINGMARGIN | NUMBER |
| 485 | EFFTAXRATE | NUMBER |
| 486 | BVOFASSETS | NUMBER |
| 487 | FIRMVALUE | NUMBER |
| 488 | ENTERPRISEVALUE | NUMBER |
| 489 | BOOKVALUEOFEQUITY | NUMBER |
| 490 | SHARESOUTSTANDING | NUMBER |
| 491 | NONCASHWC | NUMBER |
| 492 | INVESTEDCAPITAL | NUMBER |
| 493 | CAPITALEXPENDITURES | NUMBER |
| 494 | DEPRECIATION | NUMBER |
| 495 | CORRELATION | NUMBER |
| 496 | INSTITUTIONALHOLDINGS | NUMBER |
| 497 | ROE | NUMBER |
| 498 | BOOKDEBTTOCAPITAL | NUMBER |
| 499 | EVEBITRATIO | NUMBER |
| 500 | SGAEXPENSES | NUMBER |
| 501 | EVINVESTEDCAPITALRATIO | NUMBER |
| 502 | MARKETDEBTTOCAPITAL | NUMBER |
| 503 | CASHPCTTOTALASSETS | NUMBER |
| 504 | EXPFIVEYRREVGROWTH | NUMBER |
| 505 | CHGNONCASHWC | NUMBER |
| 506 | THREEYRPRICESTDDEV | NUMBER |
| 507 | INSIDERHOLDINGS | NUMBER |
| 508 | VALUEBVRATIO | NUMBER |
| 509 | REINVESTMENTRATE | NUMBER |
| 510 | FIVEYREPSGROWTH | NUMBER |
| 511 | PAYOUTRATIO | NUMBER |
| 512 | FORWARDPE | NUMBER |
| 513 | TRAILINGNETINCOME | NUMBER |
| 514 | NETINCOME | NUMBER |
| 515 | FIXEDASSETSTOTALASSETSRATIO | NUMBER |
| 516 | PREVIOUSEBIT | NUMBER |
| 517 | EBIT | NUMBER |
| 518 | SICCODE | NUMBER |
| 519 | DATEFROMDELTANEUTRAL | TIMESTAMP(6) |
| 520 | CALLIMPVOLATILITY | NUMBER |
| 521 | PUTIMPVOLATILITY | NUMBER |
| 522 | PUTMINUSCALLIMPVOLATILITY | NUMBER |
| 523 | MEANIMPVOLATILITY | NUMBER |
| 524 | CALLVOLUME | NUMBER |
| 525 | CALLVOLADVRATIO | NUMBER |
| 526 | PUTVOLUME | NUMBER |
| 527 | PUTVOLADVRATIO | NUMBER |
| 528 | CALLOPENINT | NUMBER |
| 529 | CALLOIADVRATIO | NUMBER |
| 530 | PUTOPENINT | NUMBER |
| 531 | PUTOIADVRATIO | NUMBER |
| 532 | VOLATILITY | NUMBER |
| 533 | MEANIMPVOLMINUSVOLATILITY | NUMBER |
| 534 | MEANIMPVOLPCTVOLATILITY | NUMBER |
| 535 | WEEK52_RANGEPCT | NUMBER |
| 536 | WEEK52_LOWREACHEDYESTERDAY | NUMBER |
| 537 | WEEK52_HIGHREACHEDYESTERDAY | NUMBER |

[7]Parent submitted quantity will be the greater of submitted shares on any trade belonging to the parent, or the filled shares
[8]For pre-open arrivals, this will be the NBBO at the open
[9]Summing over 5-minute intervals within the PWP5 window, the number of shares filled times the average of the impact at the beginning and end of that interval. Divide the total by the total number of shares filled to get the weighted average incurred impact Additional Drivers—TCA Support and Datamining Enhancements In addition to the above, the enriched trades table may contain the information required to support TCA services; alternatively this may be a separate table, which may be joined when needed.

TABLE 13

| Field | Description/notes | Type | QA Range | Missing value? |
|---|---|---|---|---|
| Trade_dt_key | Date at which the trade record starts | | n.a. | Required |
| Trade_ID | Links to trade record | | n.a. | Required |
| USER INTENT | | | | |
| User_Speed | Intended speed, time-weighted from a basis of 0, 1, 2, 3, excluding FF, for trading system trades | Float | 0-3 | Optional |
| User_Base_Rate | Intended participation rate not counting block exposure, for trading system trades | Float.4 | 0-1 | Optional |
| User_Rate | Intended participation rate. For trading system trades, see algo_segments_cust; for other types of trades, user_rate will be the flat average Limit_Participation over all trades records from the client with the same (in order, where available) trader, broker, first strategy | Float.4 | 0-1 | Required |
| FF_Shares | For trading system trades, shares filled at speed 4 | Long | $1\text{-}10^9$ | Optional |
| User_Shares | Max(Filled, Min(Ordered, User_rate * Tape)) | Long | $1\text{-}10^9$ | Required |
| PWP | Participation-weighted price at user_rate for accumulating user_shares | Float.5 | $0.01\text{-}10^6$ | Required |
| PWP_SPY | Calculated as for PWP, but substituting the stock price for SPY midpoint price at the time of each print | Float.3 | 10-999 | Required |
| PWP_Shares | Shares actually filled in the above PWP window | Long | $1\text{-}10^9$ | Required |
| PWP_Tape | Tape volume in the above PWP window | Long | $1\text{-}10^9$ | Required |
| Tape | Tape volume from trade start to end | Long | $1\text{-}10^9$ | Required |
| Tape_Limit | Tape volume within the limit price, from trade start to end | Long | $1\text{-}10^9$ | Required |
| User_Limit_Shares | Max(Filled, Min(Ordered, User_rate * Tape_Limit)) Current: User_limit_shares = Max(Filled, Min(Ordered, User_rate * max{BELOW_LIMIT_PRICE_VOL, below_limit_price_vol_PWP)) where below_limit_price_vol_PWP is volume within the limit between submittime and end of the PWP window. Surprise in filled shares | Long | $1\text{-}10^9$ | Required |
| Rate_Anomaly | If tape_limit = 0, 0, else Rate_anomaly = (Filled/Tape_Limit) − User_rate | Float.4 | −1 to 1 | Required |
| Rate_anomaly2 | Rate anomaly in PWP window Traded less than expected | | | |
| Limit_Share_Deficit | If the user expected to fill more ignoring his limit, how many shares did he miss due to either his limit or poor performance? Limit_share_deficit = Max(0, User_Shares − Max(Filled, User_limit_shares)) | Long | $0\text{-}10^9$ | Required |
| Share_Deficit | If the user expected to fill more after accounting for his limit, how many shares did he miss due to poor performance? Share_deficit = Max(Filled, User_limit_shares) − Filled | Long | $0\text{-}10^9$ | Required |
| Reversion_Time | $\tau_r = 7(Ln(T + 15) - Ln(15))$ | Float.1 | 0-999 | Required |
| Reversion_Price | The reversion price is the VWAP for the 5 minute period starting from the minute interval that comprises the max{end of the reversion period, closetime}. | Float.4 | $0.01\text{-}10^6$ | Required |

TABLE 13-continued

| Field | Description/notes | Type | QA Range | Missing value? |
|---|---|---|---|---|
| Cleanup_Price | The cleanup price is the participation weighted price to fill Share_Deficit shares at User_Rate, starting from the end of the reversion period, and extending across overnight periods if needed | Float.4 | $0.01\text{-}10^{\wedge}6$ | Required |
| Cleanup_Price_Limit | Same, but for Limit_Share_Deficit | Float.4 | $0.01\text{-}10^{\wedge}6$ | Required |
| Cleanup_Impact | Estimated market impact for executing Share_Deficit shares at User_Rate. The impact model here and below will be the segment impact model provided herein | Float.1 | 0-999 | Required |
| Clean_Price | Clean_price is the average price one would have paid for the shares had one incurred the cleanup cost, including impact, to trade the shares one filled or should have filled given the limit:<br>Clean_price = (Filled * P_fill + (USER_LIMIT_SHARES − Filled) * Cleanup_price * (1 + sign(trade) * Cleanup_impact/10000))/USER_LIMIT_SHARES | Float | $0.01\text{-}10^{\wedge}6$ | Required |
| Cleanup_Impact_Limit | Same, but for Limit_Share_Deficit . . . this is impact to clean up all shares one should have filled had a limit *not* been used, i.e. the deficit due to the limit | Float.1 | 0-999 | Required |
| Clean_Price_Limit | Traded more than expected<br>Clean_price is the average price one would have paid for the shares had one incurred the cleanup cost, including impact, to trade the shares one filled or should have filled had one not used a limit | Float | $.01\text{-}10^{\wedge}6$ | Required |
| Excess_Shares | The excess shares one took on due to trading faster than user_rate<br>Excess_Shares = Filled − Min(Filled, Min(Ordered, User_rate * Tape_limit)) | Long | $0\text{-}10^{\wedge}9$ | Required |
| Excess_Cost | P&L [in basis points] of excess shares marked-to-market post reversion:<br>Excess_cost = Excess_shares * sign(trade) * (Reversion_price − Filled_price)/Filled_price * 10000 | Float.1 | 0-999 | Required |
| Excess_Impact | Impact of executing excess shares at user speed | Float.1 | 0-999 | Required |
| Excess_Risk | Standard deviation on the cost of executing the excess shares, based on shortfall uncertainty and volatility during the reversion period:<br>Excess_risk = 2.5 * Excess_impact + Symbol_volatility * $\sqrt{\tau_r}$. | Float.1 | 0-999 | Required |
| Limit_Savings | Surprise in fill price − AS/OS 10000 * sign(trade) * ln(PWP/PWP_limit) | Float.1 | 0-999 | Required |
| Block_TE | Blocks are partial fills of at least 10000 shares.<br>Block_TE = (Block_Filled/Filled) * 10000 * sign(trade) * ln(Block_Price/PWP_Limit) | Float.1 | 0-999 | Required |

TABLE 13-continued

| Field | Description/notes | Type | QA Range | Missing value? |
|---|---|---|---|---|
| Algo_TE | Tracking error for non-block fills. (Filled_Shares-Block_Shares)/Filled_shares * 10000 * sign(trade) * ln(Algo_Price/PWP Limit), Where Algo_Price = (Filled_Shares * Fill_Price − Block_shares * Bock_Price)/(Filled_Shares − Block_Shares) | Float.1 | 0-999 | Required |
| Incurred_Impact | Estimated impact of filled shares | Float.1 | 0-999 | Required |
| PWP_Incurred_Impact | Incurred impact of shares filled in the PWP window | Float.1 | 0-999 | Required |
| TE_Adjustment | Incurred_Impact − PWP_Incurred_impact | Float.1 | 0-999 | Required |
| Alpha | Alpha is the part of the PWP return not attributable to incurred impact Alpha = 10000 * sign(trade) * Ln(PWP_Limit/Arrival_Price) − PWP_Incurred_Impact | Float.1 | 0-999 | Required |
| Residual_Alpha | Return from PWP to reversion price net of incurred impact Residual_alpha = 10000 * sign(trade) * Ln(Reversion_Price/PWP) − Incurred_impact + PWP_incurred_impact | Float.1 | 0-999 | Required |
| "WHAT IF" SCENARIOS | | | | |
| | Speed choices | | | |
| PWP_5_User | Participation-weighted price for filling User_shares at 5% participation | Float | 0.01-10^6 | Required |
| PWP_10_User | | | | |
| PWP_15_User | | | | |
| PWP_20_User | | | | |
| PWP_30_User | | | | |
| PWP_5_User _shares | Shares actually filled in the PWP5 interval | Long | 0-10^9 | Required |
| PWP_10_User _shares | | | | |
| PWP_15_User _shares | | | | |
| PWP_20_User _shares | | | | |
| PWP_30_User _shares | | | | |
| PWP_5_User _IF | Impact-free PWP_5, based on the trading desk - wide impact estimates, as a price | Float | 0.01-10^6 | Required |
| PWP_10_User _ IF | | | | |
| PWP_15_User _ IF | | | | |
| PWP_20_User _ IF | | | | |
| PWP_30_User _ IF | | | | |
| PWP_5_User _impact | Impact in basis points for a 5% participation strategy | Float.1 | 0-999 | Required |
| PWP_10_User _ impact | | | | |
| PWP_15_User _ impact | | | | |
| PWP_20_User _ impact | | | | |
| PWP_30_User _ impact | | | | |
| PWP_5_User _return | Return in basis points from the impact-free arrival price to PWP_5_IF, plus PWP_5_impact | Float.1 | 0-999 | Required |
| PWP_10_User _ return | | | | |
| PWP_15_User _ return | | | | |
| PWP_20_User _ return | | | | |
| PWP_30_User _ return | | | | |
| | Limit choices | | | |
| Tactical_Limit | Calculate tactical limit price as 20 bps up from the midpoint at arrival for buys, or down for sells | Float | 0.01-10^6 | Required |
| Strategic_Limit_1 | First strategic limit price accounts for the impact of the trade but not normal volatility, calculated from the midpoint with the number of basis points given by 1.5 * PWP_10_impact | Float | 0.01-10^6 | Required |
| Strategic_Limit_2 | Second strategic limit accounts for expected impact plus one standard deviation, approximated as this number of basis points from the midpoint at arrival: 4 * PWP_10_impact | Float | 0.01-10^6 | Required |

TABLE 13-continued

| Field | Description/notes | Type | QA Range | Missing value? |
|---|---|---|---|---|
| Tactical_Deficit | Limit share deficit given tactical limit and 10% participiation This is Max(0, user_shares – 10% of limit tape), where limit tape counts shares within the limit up to the close of the day at which the PWP_5 period ends | Long | $1\text{-}10^9$ | Required |
| Strategic_Deficit_1 | Limit share deficit given first strategic limit | Long | $1\text{-}10^9$ | Required |
| Strategic_Deficit_2 | Limit share deficit given second strategic limit | Long | $1\text{-}10^9$ | Required |
| PWP10_Tactical | PWP_10_limit calculated up to the end of the window described in tactical_deficit | Float | $.01\text{-}10^6$ | Required |
| PWP10_Strategic_1 | Float | | $.01\text{-}10^6$ | Required |
| PWP10_Strategic_2 | Float | | $.01\text{-}10^6$ | Required |
| Cleanup_tactical | Null if Tactical_Deficit = 0, else this is the 10% PWP for filling tactical_deficit shares after the end of the window described in tactical_deficit | Float | $.01\text{-}10^6$ | Required |
| Cleanup_strategic1 | | Float | $.01\text{-}10^6$ | Required |
| Cleanup_strategic2 | | Float | $.01\text{-}10^6$ | Required |
| Cleanup_impact_tactical | Null if tactical_deficit = 0, else impact of a 10% participation to fill tactical_deficit shares | Float.1 | 0-999 | Required |
| Cleanup_impact_strategic1 | | Float.1 | 0-999 | Required |
| Cleanup_impact_strategic2 | | Float.1 | 0-999 | Required |
| Clean_Tactical | Clean price is the cost of the shares filled within the limit + cleanup shares, including impact. Clean_tactical = ((User_shares – Tactical_Deficit) * PWP_tactical + Tactical_Deficit * Exp(sign(trade) * Cleanup_impact _tactical/10000) * Cleanup_tactical)/User_Shares | Float | $.01\text{-}10^6$ | Required |
| Clean_Strategic1 | | Float | $.01\text{-}10^6$ | Required |
| Clean_Strategic2 | | Float | $.01\text{-}10^6$ | Required |
| Tactical_savings | Limit savings from the tactical limit, in basis points 10000 * sign(trade) * ln(PWP/ PWP_tactical) | Float.1 | 0-999 | Required |
| Strategic_savings_1 | | Float.1 | 0-999 | Required |
| Strategic_savings_2 | | Float.1 | 0-999 | Required |
| Clean_savings_tactical | Net savings of using the tactical limit after accounting for cleanup, if any 10000 * sign(trade) * LN(PWP/ Clean_Price_Tactical) | Float.1 | 0-999 | Required |
| Clean_savings_1 | | Float.1 | 0-999 | Required |
| Clean_savings_2 | | Float.1 | 0-999 | Required |
| ALPHA PROFILE | | | | |
| | y-values for the alpha profile charts, in bps, measured from arrival. All returns described here must be calculated based on adjusted prices using corporate actions tables | | | Required |
| R_T_60 | 10000 * trade_sign * LN(T-60 VWAP price/Arrival Price) | Float.1 | 0-999 | Required |
| R_T_20 | | Float.1 | 0-999 | Required |
| R_T_10 | | Float.1 | 0-999 | Required |
| R_T_5 | | Float.1 | 0-999 | Required |
| R_T_2 | | Float.1 | 0-999 | Required |
| R_T_1 | | Float.1 | 0-999 | Required |
| R_T_1_CLOSE | 10000 * trade_sign * LN(last close/ arrival price) | Float.1 | 0-999 | Required |
| R_OPEN | 10000 * trade_sign * LN(open/ arrival price) | Float.1 | 0-999 | Required |
| R_5 | 10000 * trade_sign * LN(5 minutes after arrival/arrival price) | Float.1 | 0-999 | Required |
| R_10 | | Float.1 | 0-999 | Required |
| R_15 | | Float.1 | 0-999 | Required |

TABLE 13-continued

| Field | Description/notes | Type | QA Range | Missing value? |
|---|---|---|---|---|
| R_20 | | Float.1 | 0-999 | Required |
| R_30 | | Float.1 | 0-999 | Required |
| R_60 | | Float.1 | 0-999 | Required |
| R_END | 10000 * trade_sign * LN(midpoint at end of today's trading/arrival price) | Float.1 | 0-999 | Required |
| R_CLOSE | 10000 * trade_sign * LN(today's close/arrival price) | Float.1 | 0-999 | Required |
| R_LAST_END | 10000 * trade_sign * LN(midpoint at end of megablock trade/arrival price) | Float.1 | 0-999 | Required |
| R_LAST_CLOSE | 10000 * trade_sign * LN(close at end of megablock/arrival price) | Float.1 | 0-999 | Required |
| R_T1 | 10000 * trade_sign * LN(VWAP price for the first day after the end of megablock/arrival price) | Float.1 | 0-999 | Required |
| R_T2 | | Float.1 | 0-999 | Required |
| R_T5 | | Float.1 | 0-999 | Required |
| R_T10 | | Float.1 | 0-999 | Required |
| R_T20 | | Float.1 | 0-999 | Required |
| R_T60 | | Float.1 | 0-999 | Required |
| RSPY_T_60 | 10000 * trade_sign * LN(T-60 SPY VWAP price/SPY at Arrival) | Float.1 | 0-999 | Required |
| RSPY_T_20 | | Float.1 | 0-999 | Required |
| RSPY_T_10 | | Float.1 | 0-999 | Required |
| RSPY_T_5 | | Float.1 | 0-999 | Required |
| RSPY_T_2 | | Float.1 | 0-999 | Required |
| RSPY_T_1 | | Float.1 | 0-999 | Required |
| RSPY_T_1_CLOSE | 10000 * trade_sign * LN(SPY last close/SPY arrival) | Float.1 | 0-999 | Required |
| RSPY_OPEN | 10000 * trade_sign * LN(SPY open/SPY arrival) | Float.1 | 0-999 | Required |
| RSPY_5 | 10000 * trade_sign * LN(SPY 5 minutes after arrival/SPY arrival) | Float.1 | 0-999 | Required |
| RSPY_10 | | Float.1 | 0-999 | Required |
| RSPY_15 | | Float.1 | 0-999 | Required |
| RSPY_20 | | Float.1 | 0-999 | Required |
| RSPY_30 | | Float.1 | 0-999 | Required |
| RSPY_60 | | Float.1 | 0-999 | Required |
| RSPY_END | 10000 * trade_sign * LN(SPY end of today/SPY arrival) | Float.1 | 0-999 | Required |
| RSPY_CLOSE | 10000 * trade_sign * LN(SPY day close/SPY arrival) | Float.1 | 0-999 | Required |
| RSPY_LAST_END | 10000 * trade_sign * LN(SPY end of megablock trade/SPY arrival) | Float.1 | 0-999 | Required |
| RSPY_LAST_CLOSE | 10000 * trade_sign * LN(close at end of megablock/SPY arrival) | Float.1 | 0-999 | Required |
| RSPY_T1 | 10000 * trade_sign * LN(SPY VWAP price for the first day after the end of megablock/SPY arrival) | Float.1 | 0-999 | Required |
| RSPY_T2 | | Float.1 | 0-999 | Required |
| RSPY_T5 | | Float.1 | 0-999 | Required |
| RSPY_T10 | | Float.1 | 0-999 | Required |
| RSPY_T20 | | Float.1 | 0-999 | Required |
| RSPY_T60 | | Float.1 | 0-999 | Required |
| RETF_T_60 | 10000 * trade_sign * LN(T-60 ETF VWAP price/ETF at Arrival) | Float.1 | 0-999 | Required |
| RETF_T_20 | | Float.1 | 0-999 | Required |
| RETF_T_10 | | Float.1 | 0-999 | Required |
| RETF_T_5 | | Float.1 | 0-999 | Required |
| RETF_T_2 | | Float.1 | 0-999 | Required |
| RETF_T_1 | | Float.1 | 0-999 | Required |
| RETF_T_1_CLOSE | 10000 * trade_sign * LN(ETF last close/ETF arrival) | Float.1 | 0-999 | Required |
| RETF_OPEN | 10000 * trade_sign * LN(ETF open/ETF arrival) | Float.1 | 0-999 | Required |
| RETF_5 | 10000 * trade_sign * LN(ETF 5 minutes after arrival/ETF arrival) | Float.1 | 0-999 | Required |
| RETF_10 | | Float.1 | 0-999 | Required |
| RETF_15 | | Float.1 | 0-999 | Required |
| RETF_20 | | Float.1 | 0-999 | Required |
| RETF_30 | | Float.1 | 0-999 | Required |
| RETF_60 | | Float.1 | 0-999 | Required |
| RETF_END | 10000 * trade_sign * LN(ETF end of today/ETF arrival) | Float.1 | 0-999 | Required |
| RETF_CLOSE | 10000 * trade_sign * LN(ETF day close/ETF arrival) | Float.1 | 0-999 | Required |

TABLE 13-continued

| Field | Description/notes | Type | QA Range | Missing value? |
|---|---|---|---|---|
| RETF_LAST_END | 10000 * trade_sign * LN(ETF end of megablock trade/ETF arrival) | Float.1 | 0-999 | Required |
| RETF_LAST_CLOSE | 10000 * trade_sign * LN(close at end of megablock/ETF arrival) | Float.1 | 0-999 | Required |
| RETF_T1 | 10000 * trade_sign * LN(ETF VWAP price for the first day after the end of megablock/ETF arrival) | Float.1 | 0-999 | Required |
| RETF_T2 | | Float.1 | 0-999 | Required |
| RETF_T5 | | Float.1 | 0-999 | Required |
| RETF_T10 | | Float.1 | 0-999 | Required |
| RETF_T20 | | Float.1 | 0-999 | Required |
| RETF_T60 | | Float.1 | 0-999 | Required |
| IMPACT_ARR | Total impact at arrival (or 0 if this is the first trade in a megablock) Use linear interpolation based on the two nearest total impact values in the 5-minute breakdown: if t1 is the time from prior 5-minute marker to arrival, t2 is the time from arrival to next 5-minute marker and x1, x2 are the corresponding total impacts, then t1 + t2 = 5 and the total impact at arrival is Impact = (t2 x1 + t1 x2)/5 | Float.1 | 0-999 | Required |
| IMPACT_T_10 | Average of total impacts at T-10, minus total impact at arrival. | Float.1 | 0-999 | Required |
| IMPACT_T_5 | | Float.1 | 0-999 | Required |
| IMPACT_T_2 | | Float.1 | 0-999 | Required |
| IMPACT_T_1 | | Float.1 | 0-999 | Required |
| IMPACT_T_1_CLOSE | Average of total impacts at T-1, minus total impact at arrival. | Float.1 | 0-999 | Required |
| IMPACT_OPEN | Total impact at open, minus total impact at arrival. | Float.1 | 0-999 | Required |
| IMPACT_ARR | Total impact at arrival. | Float.1 | 0-999 | Required |
| IMPACT_5 | Total impact 5 minutes after arrival, minus total impact at arrival. Use linear interpolation based on the two nearest total impact values in the 5-minute breakdown | Float.1 | 0-999 | Required |
| IMPACT_10 | | Float.1 | 0-999 | Required |
| IMPACT_15 | | Float.1 | 0-999 | Required |
| IMPACT_20 | | Float.1 | 0-999 | Required |
| IMPACT_30 | | Float.1 | 0-999 | Required |
| IMPACT_60 | | Float.1 | 0-999 | Required |
| IMPACT_END | Total impact at end, minus total impact at arrival | Float.1 | 0-999 | Required |
| IMPACT_CLOSE | Total impact at close, minus total impact at arrival | Float.1 | 0-999 | Required |
| IMPACT_LAST_END | Total impact at megablock end, minus total impact at arrival | Float.1 | 0-999 | Required |
| IMPACT_LAST_CLOSE | Total impact at close after megablock end, minus total impact at arrival | Float.1 | 0-999 | Required |
| IMPACT_T1 | Average of total impacts on the day following the last close, minus total impact at arrival | Float.1 | 0-999 | Required |
| IMPACT_T2 | | Float.1 | 0-999 | Required |
| IMPACT_T5 | | Float.1 | 0-999 | Required |
| IMPACT_T10 | | Float.1 | 0-999 | Required |
| PRODUCTION DRIVERS | | | | |
| | Non-news, non HV drivers implemented in strategy selection engine | | | |
| Mom | Momentum from the open 10000 * trade_sign * ln(arrival/open) | Float.1 | $+/-10^3$ | Required |
| Gap | Overnight gap 10000 * trade_sign * ln(open/close) | Float.1 | $+/-10^3$ | Required |
| Mom_Gap | Mom + Gap | Float.1 | $+/-10^3$ | Required |
| ETF_Mom | Sector momentum from the open 10000 * trade_sign * ln(ETF_arrival/ETF_Open) | Float.1 | $+/-10^3$ | Required |
| ETF_Gap | Sector gap | Float.1 | $+/-10^3$ | Required |
| ETF_Mom_Gap | ETF_mom + ETF_gap | Float.1 | $+/-10^3$ | Required |

TABLE 13-continued

| Field | Description/notes | Type | QA Range | Missing value? |
|---|---|---|---|---|
| SPY_Mom | SPY Momentum from open | Float.1 | $+/-10^3$ | Required |
| SPY_Gap | | Float.1 | $+/-10^3$ | Required |
| SPY_Mom_Gap | | Float.1 | $+/-10^3$ | Required |
| Rel_Mom | Mom-SPY_Mom | Float.1 | $+/-10^3$ | Required |
| Rel_Gap | | Float.1 | $+/-10^3$ | Required |
| Rel_Mom_Gap | | Float.1 | $+/-10^3$ | Required |
| SRel_Mom | Mom-ETF_Mom | Float.1 | $+/-10^3$ | Required |
| SRel_Gap | | Float.1 | $+/-10^3$ | Required |
| SRel_Mom_Gap | | Float.1 | $+/-10^3$ | Required |
| Beta | Bbrg beta (derived from daily observations, 60-day trailing) | Float.2 | 0-99 | Required |
| Spread | Average spread, in basis points, as known in the instrument table on the server | Float.2 | 0-999 | Required |
| Volatility | Bbrg trailing 60-day average of annualized volatility [%] | Float.2 | 0-9999 | Required |
| Relative_volatility | Relative Volatility is the relative difference between a stock's theoretical volatility and its actual volatility, RV = (AV − TV)/TV where AV is the Average Volatility in the instrument table, TV is the theoretical volatility calculated as follows: TV = 7.5 + 3500000 * Power(TotalDollarQuantity, −0.85) | Float.2 | 0-9999 | Required |
| AV | Average trailing 1-minute volatility, from instrument table | Float.2 | 0-999 | Required |
| Mkt_Cap | Market cap | Enum | "Large Cap", . . . | Required |
| ADV | Bbrg 60-day trailing average daily volume | Long | $0-10^{10}$ | Required |
| Value | Trade value at arrival price, rounded to nearest | Long | $0-10^{10}$ | Required |
| Size | Ordered_Shares/ADV | Float.4 | 0-99 | Required |
| PAL | Ordered Shares as a fraction of Available Liquidity | Float.4 | 0-99 | Required |
| Daytime | x ∈ [0,1] argument of SVD smile curve | Float.4 | 0-1 | Required |
| Listing_Market | NYSE, Nasdaq, etc | Enum | | Required |
| Sector | Sector the instrument belongs to | Enum | | Required |
| WAS TRADING YESTERDAY | | | | |
| First_Arrival | Date Time of start of megablock, or Null if this trade is the start | Date Time | Within market hours | Optional |
| Momentum_since_original_arrival | Signed return from original arrical to today's arrival price [bps] | Float.4 | 0-99 | Optional |
| Relative_Momentum_since_original_arrival | Signed return from original arrical to today's arrival price, relative to SPY [bps] | Float.4 | 0-99 | Optional |
| Sector_Relative_Momentum_since_original_arrival | Signed return from original arrical to today's arrival price, relative to ETF [bps] | Float.4 | 0-99 | Optional |
| Yesterday_Filled_Quantity | Shares/ADV filled yesterday, or Null if this is the first day of the megablock | Float.4 | 0-99 | Optional |
| All_Filled_Quantity | Shares/ADV filled on megablock since original start and up to the new arrival, or Null if this is the first day of the megablock | Float.4 | 0-999 | Optional |

TABLE 13-continued

| Field | Description/notes | Type | QA Range | Missing value? |
|---|---|---|---|---|
| Yesterday_Impact | Impact of shares filled yesterday, using the basic model called g(X) in the trading server requirements. $g(X) = a\left(\frac{\sigma}{10000}\right)^b \sqrt{X}$, where X is the number of shares filled for the order so far, including trading system block fills, divided by the stock's ADV; a and b are system configurable global parameters. These parameters were calculated from the standard Bloomberg model as: a = 0.08 b = 0.11 | Float.1 | 0-999 | |
| All_Impact | Impact of all shares up to the new arrival | Float.1 | 0-999 | |
| Elapsed_SVD | SVD time elapsed since end of last segment yesterday, or null | Float.4 | 0-1 | Optional |
| Yesterday_Shortfall | Shortfall of shares filled yesterday, relative to the original arrival price, or Null | Float.1 | 0-999 | Optional |
| All_Shortfall | Shortfall of all shares filled in days prior to this day on the megablock, or Null | Float.1 | 0-999 | Optional |
| NEWS | | | | |
| News | Was news between last close and arrival time with relevance > 0.4 | Boolean | T/F | Required |
| Recent_News | Was news with relevance > 0.4 within last 15 minutes prior to arrival, with relevance > 0.4 | Boolean | T/F | Required |
| News_30 | News with relevance > 0.4 occurs during the first 30 minutes of the trade | Boolean | T/F | Required |
| News_Close | News with relevance > 0.4 occurs after the first 30 minutes of the trade but before the close | Boolean | T/F | Required |
| Post_News | News with relevance > 0.4 occurs after the close and before midnight of that same day | Boolean | T/F | Required |
| DRIVERS IN QUEUE TO BE ADDED IN PRODUCTION | | | | |
| | Technicals | | | |
| HL_1 | Price relative to yesterday's High Low range, signed by the trade (Arrival − (H1 + L1)/2)/((H1 − L1)/2) * trade_sign | Float.2 | $+/-10^3$ | Required |
| HL_Range_1 | Yesterday's High Low range, relative to BBVol (H1 − L1)/(VWAP_1 * BBVol/100) | Float.2 | 0-99 | Required |
| HL_2 | Price relative to last 2 days' High Low range, signed by the trade NOTE: here and below use the highest high and lowest low in the window | | | Required |
| HL_Range_2 | | | | Required |
| HL_5 | Price relative to last 5 days' high low range, signed by the trade | | | Required |
| HL_Range_5 | | | | Required |
| HL_10 | | | | Required |
| HL_Range_10 | | | | Required |
| HL_20 | | | | Required |
| HL_Range_20 | | | | Required |
| HL_60 | | | | Required |
| HL_Range_60 | | | | Required |

Trade Segments Table

Each limit-price segment (as defined for the algo_segments and algo_segments_cust tables) may be considered as a "trade" and submitted as input to the process described herein for purposes of enrichment and to analyze the effect of trader decisions (or Alpha Pro decisions) regarding speed and limit price. Here are provided exemplary specifications for creating a trade record from a segment. The structure of this table may be identical to the trades table; either one can serve as input to the enrichment process.

When a limit-price segment is associated to a single trade, references to a trade record below are unambiguous; when a segment represents overlapping trades the segment will be associated with the first trade to start. Note: the field names may be a bit strange in this case since the underlying data is different, the description/notes column has been updated.

TABLE 14

| Field | Description/notes | Type | QA Range | Missing value? |
|---|---|---|---|---|
| PM DECISION | | | | |
| Trade_dt_key | Date of this trade segment (key) | | | Required |
| Trade_ID | Unique identifier of this trade record (key) | | | Required |
| QA | Flag identifying possible quality issues with this record. Set only if there is a known problem | String | n.a. | Optional |
| Firm | Identifies the firm originating the order (trading desk). All orders on the same symbol/side from the same firm will be considered in estimating impact-free returns | String | n.a. | Required |
| PM_Order_ID | Client order-ID on the parent order, if known from the OMS integration, to enable cross-validation versus the client's TCA. | String | n.a. | Optional |
| Side | The side of the trade | Enum | B, S, BC, SS | Required |
| Symbol | The symbol identifies the security within the Pipeline environment, and must enable discovery of primary exchange, volatility, beta, currency, etc., and have available market data | String | Must exist in Pipeline universe | Required |
| PM_Ordered_Qty | Shares ordered by the PM, if known, from the OMS integration | Long | $1\text{-}10^9$ | Optional |
| PM_Limit | Limit price from the PM, if known, from the OMS integration. Market = "0". Unavailable means it is unknown whether there was a limit | Float | $0\text{-}10^6$ | Optional |
| Order_Creator | PM, if available from the OMS integration | String | n.a. | Optional |
| Product | n.a. | String | n.a. | Optional |
| Sub_Product | n.a. | String | n.a. | Optional |
| Type | n.a. | String | n.a. | Optional |
| Instructions | If available from the OMS integration | String | n.a. | Optional |
| Decision Time | Time of the trade decision, if available from the OMS integration | Date Time | n.a. | Optional |
| Creation Time | Time of the trade creation in the OMS | Date Time | n.a. | Optional |
| TRADER DECISION | | | | |
| Trader | Trader name | String | n.a. | Required |
| Block_ID | n.a. | String | n.a. | Optional |
| Order_ID | Pipeline order ID | String | n.a. | Required |
| Arrival_Time | Time the order received by Pipeline. For staged workflows this may not be the same as start_time | Date Time | Within market hours | Required |
| Start_Time | Date/Time at which the trade actually starts (activated in the block market or in the Engine) | Date Time | Within market hours | Required |
| Ordered_Qty | Shares ordered | Long | $1\text{-}10^9$ | Required |
| Broker | Pipe, or for Pipeline SB trades, concatenate preferred SB broker. Example: "Pipe", "Pipe.GS" | String | n.a. | Optional |

TABLE 14-continued

| Field | Description/notes | Type | QA Range | Missing value? |
|---|---|---|---|---|
| First_Strategy | Label of the execution strategy the ticket was originally assigned to, if known. For OMS data, broker of record is the default, absent specific info. Examples: "TL AlphaT", "Trickle" | String | n.a. | Optional |
| Second_Strategy | If strategy was modified within the span of the ticket, the second one. | String | n.a. | Optional |
| Last_Strategy | Strategy in force at completion/cancel of the ticket | String | n.a. | Optional |
| First_Limit_Price | The limit price at start of the trade. 0 = MKT | Float | $0\text{-}10^6$ | Required |
| Last_Limit_Price | Same as first, by design | Float | $0\text{-}10^6$ | Required |
| RESULTS | | | | |
| Filled_Qty | Shares filled | Long | $1\text{-}10^9$ | Required |
| Filled_Price | Share-weighted average price of executed shares | Float | $0.01\text{-}10^6$ | Required |
| Limit_Tape | Tape volume below (above) the limit price | Long | $1\text{-}10^9$ | Optional |
| Limit_Participation | Filled_Qty/Limit_Tape | Float | 0-1 | Optional |
| End_Time | Date/Time of end of segment | Date Time | Within market hours | Required |
| Last fill time | | | | |
| Tape | Tape volume | | | |

FIGS. 25-28 depict exemplary alpha profile displays.

Figure 25:
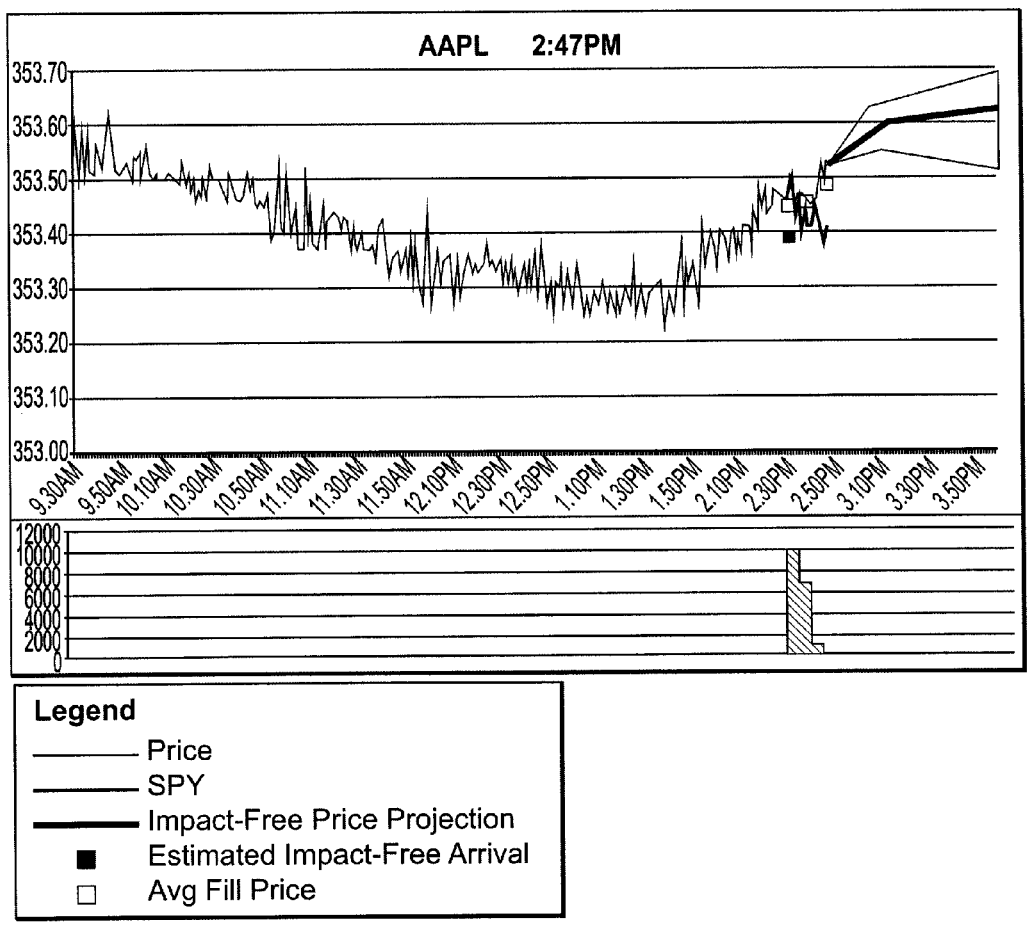
FIGS. 25-28 depict exemplary alpha profile displays.
Figure 26:
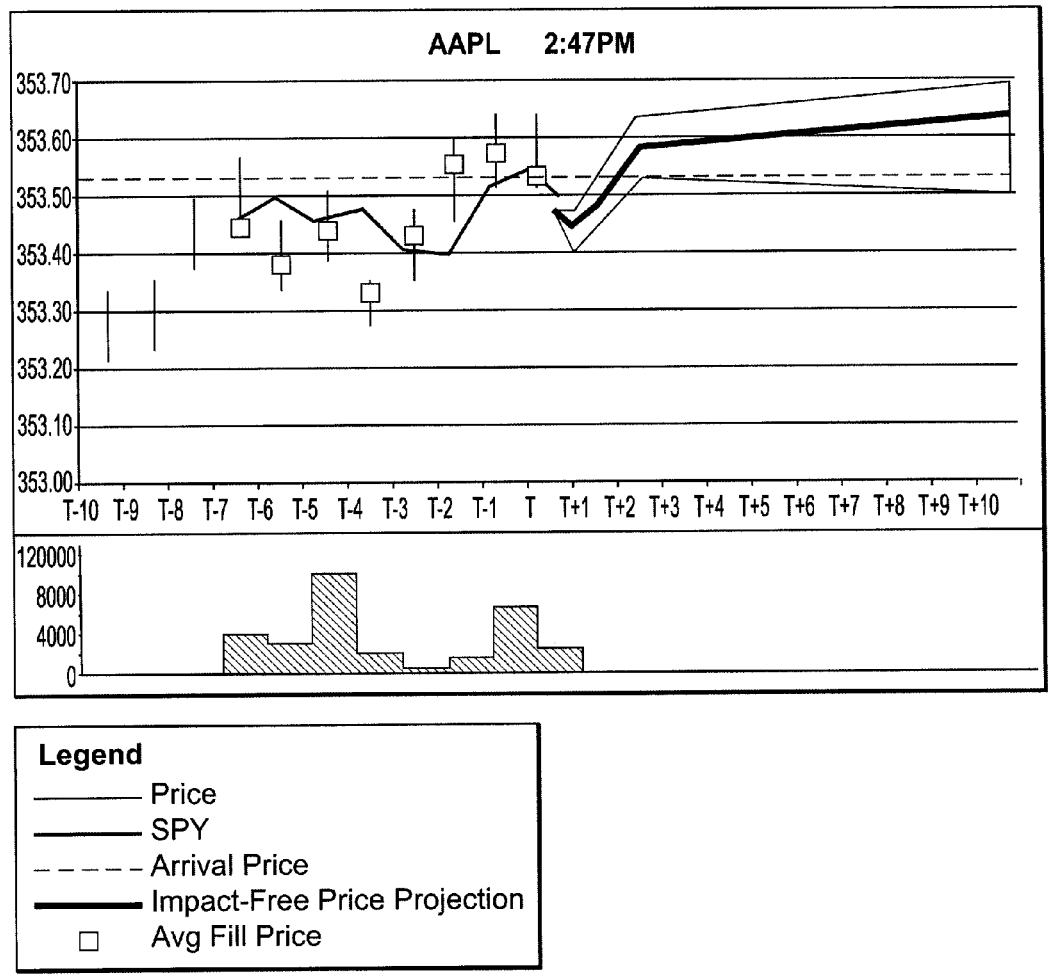
Figure 27:
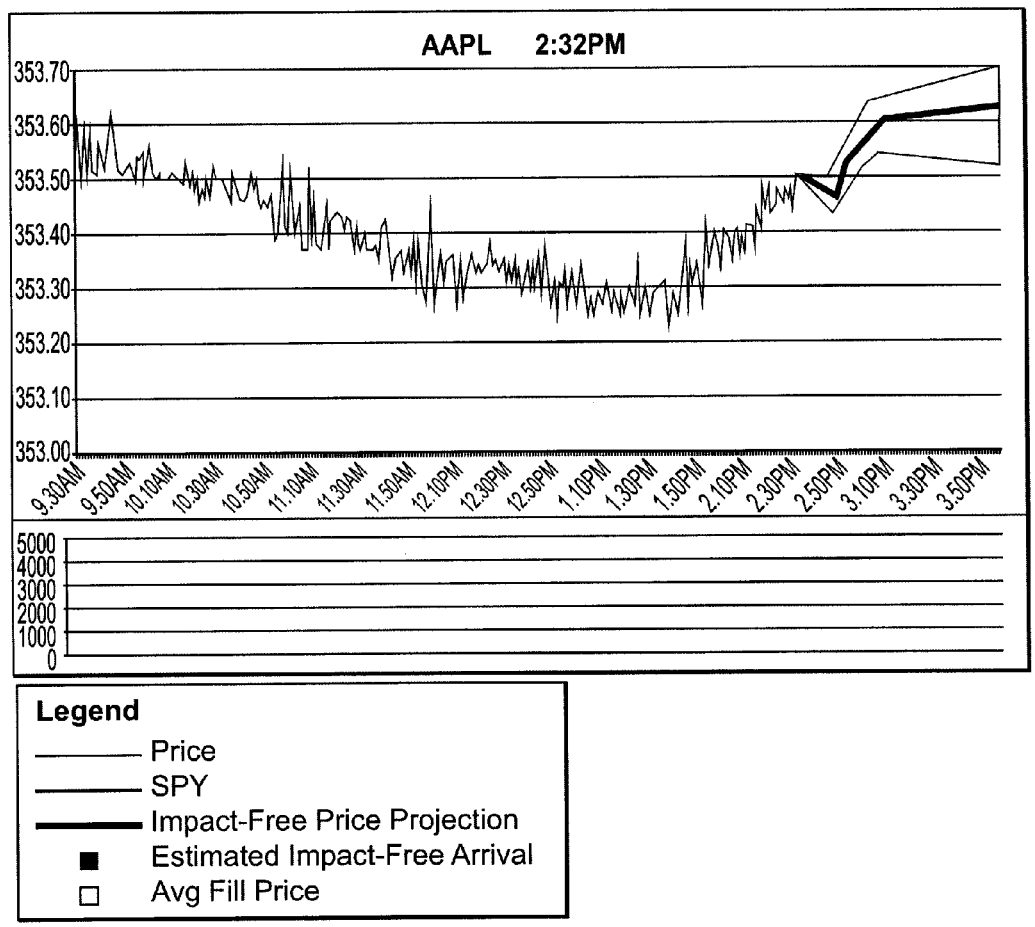
Figure 28:
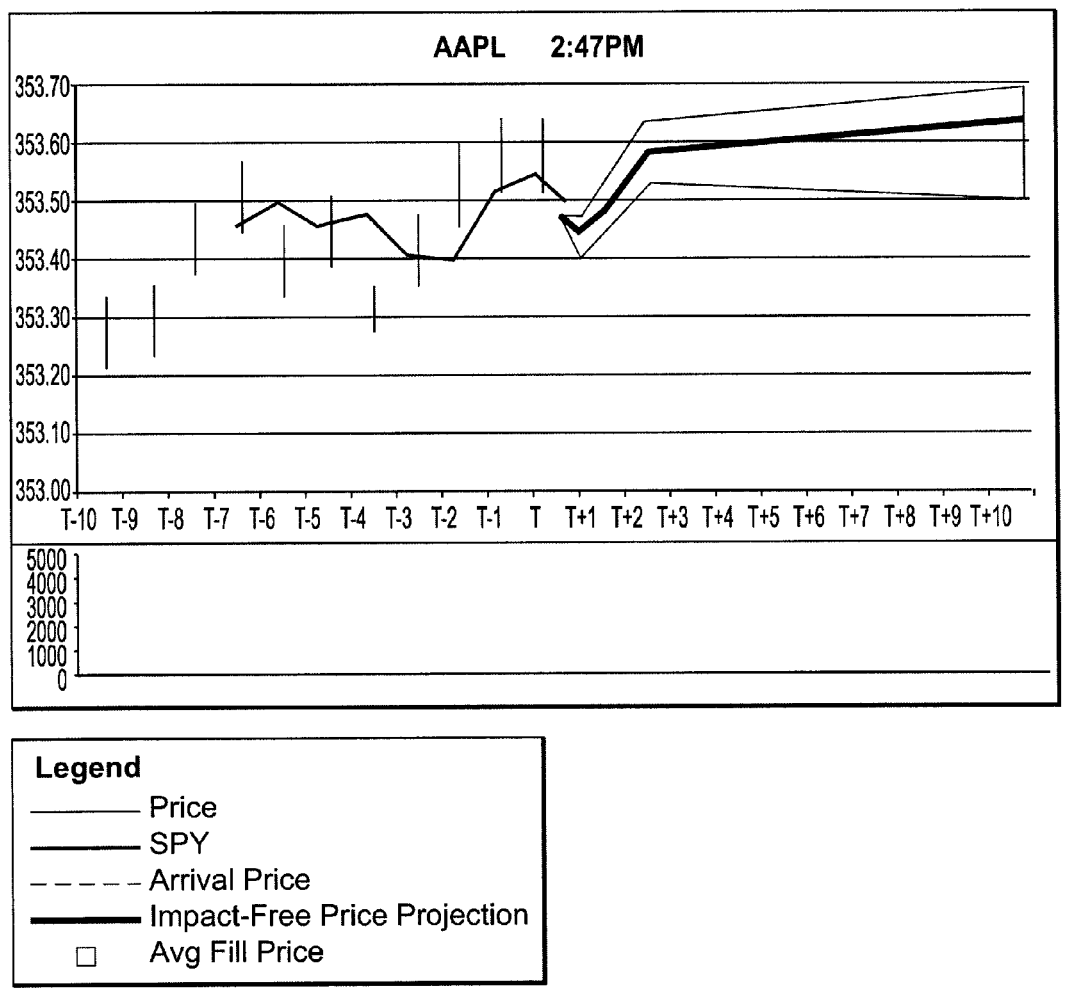

FIGS. 25-26 depict alpha profile displays for an active order, and FIGS. 27-28 depict alpha profile displays for an inactive order.

The AlphaT strategy is designed for trades with short-term alpha and a bias towards trend continuation. The strategy starts at 20% participation to capture the expected short-term alpha, then starts using tactical limits to seek best price with a completion time estimated based on a 7% minimum participation rate for the rest of the order.

Strategy Overview

Stage 1: work the first 20% of the order with a scheduled completion time based on an average 15% participation. This is historically matched to the short-term alpha for this profile.

Stage 2: tactical price selection with completion scheduled on the close or sooner based on a 7% min rate. The trailing rate will also be kept above 7% and the delay between partial fills will not exceed 30 minutes.

Opportunistic behavior: relative to S&P500.

Block exposure: 30% of the residual or 100% on price opportunities.

Additional Exemplary Strategies

AlphaStealth

Figure 29:
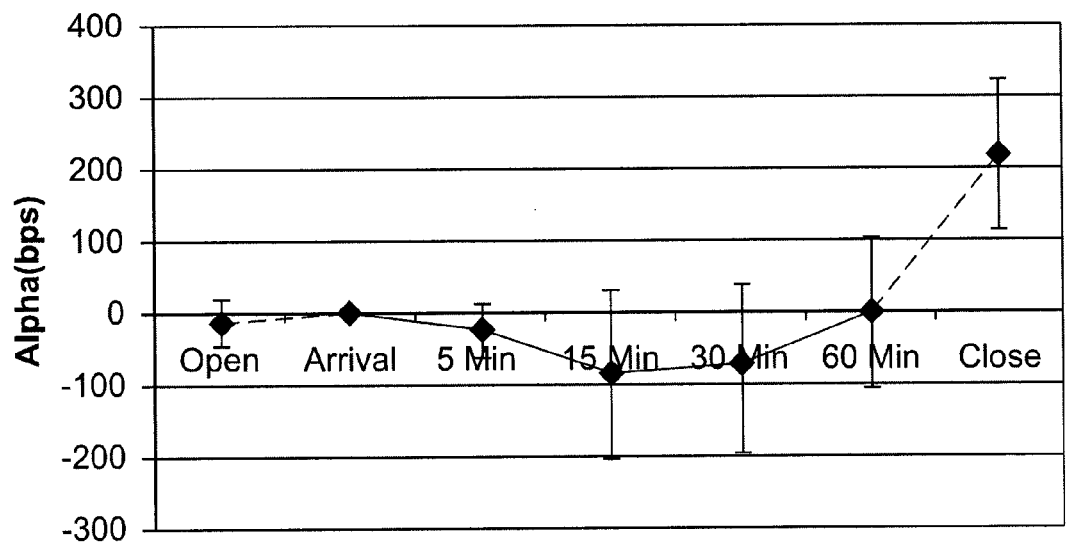
FIGS. 29-32 depict exemplary trading strategy displays.

Strategy designed to capture relative value vs. a benchmark in large trades where early impact would prevent alpha capture on the larger residual. This strategy will start softly to avoid triggering arbitrage strategies then increase participation to capture alpha, and maximize opportunistic liquidity capture. When expected alpha is exhausted it uses tactical pull-backs to avoid overshoot. The system will automatically activate the "AlphaS" strategy when it detects the subset of market conditions specific to this type of profile. Alternatively, the trader may choose to activate this strategy based on their present view of the market. See FIG. 29.

Stage 1: work the first 10% of the order with a scheduled completion time based on an average 6% participation. This may be historically matched to the short-term alpha for this profile.

Stage 2: tactical price selection with completion scheduled on the close or sooner based on a 10% min rate. The trailing rate will also be kept above 10% and the delay between partial fills will not exceed 30 minutes.

Opportunistic behavior: none.

Block exposure: on arrival, then 30% of the residual.

AlphaTrend

Figure 30:
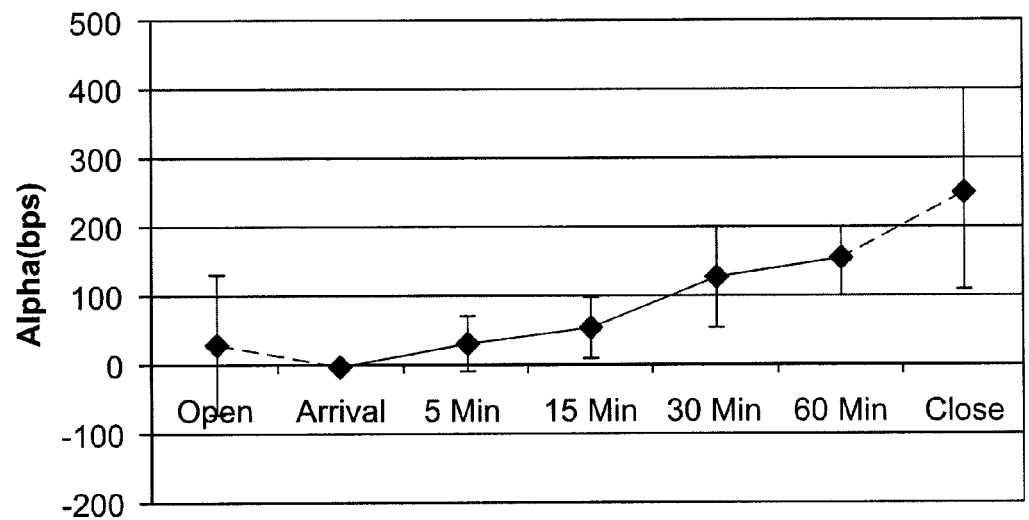

Strategy designed for trades with short-term alpha and a bias towards trend continuation. This strategy will front load the execution as it tries to capture the expected underlying alpha to the close. The system will automatically activate the "AlphaT" strategy when it detects the subset of market conditions specific to a trending alpha profile. Alternatively, the trader may choose to activate this strategy based on their present view of the market. See FIG. 30.

Stage 1: work the first 20% of the order with a scheduled completion time based on an average 15% participation. This may be historically matched to the short-term alpha for this profile. Stage 2: tactical price selection with completion scheduled on the close or sooner based on a 7% min rate. The trailing rate will also be kept above 7% and the delay between partial fills will not exceed 30 minutes.

Opportunistic behavior: relative to S&P500.

Block exposure: 30% of the residual or 100% on price opportunities.

AlphaRevert

Figure 31:
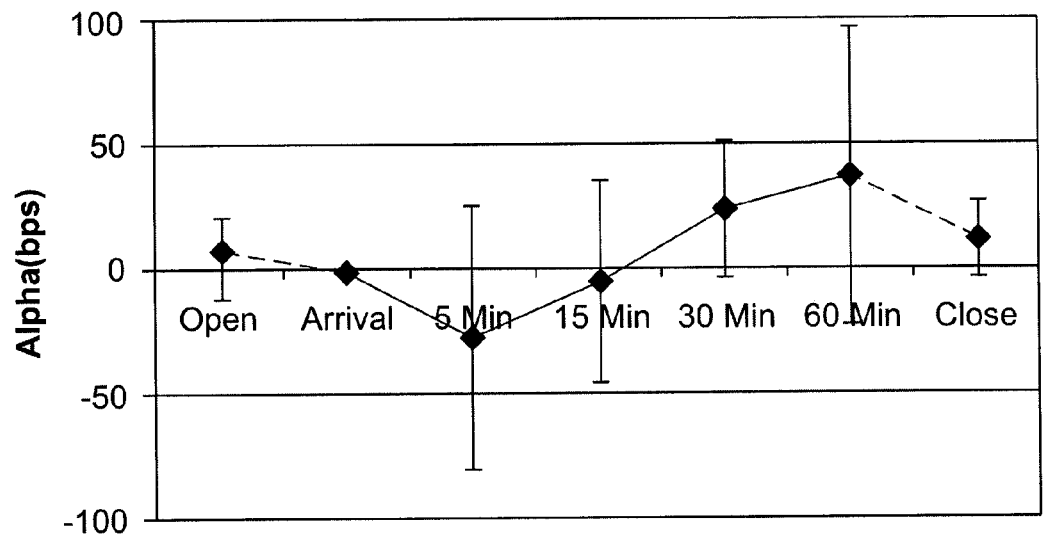

Strategy designed for trades with short-term alpha and a bias towards subsequent mean reversion. This strategy will front load the execution initially and then make use of tactical limits to capture the expected partial reversion to the close. The system will automatically activate the "AlphaR" strategy when it detects the subset of market conditions specific to a mean reverting alpha profile. Alternatively, the trader may choose to activate this strategy based on their present view of the market. See FIG. 31.

Stage 1: work the first 20% of the order with a scheduled completion time based on an average 15% participation. This may be historically matched to the short-term alpha for this profile.

Stage 2: tactical price selection with completion scheduled on the close or sooner based on a 1% min rate. The trailing rate will also be kept above 1% and the delay between partial fills will not exceed 30 minutes.

Opportunistic behavior: relative to S&P500.

Block exposure: 30% of the residual or 100% on price opportunities.

Munitions Manager

Figure 32:
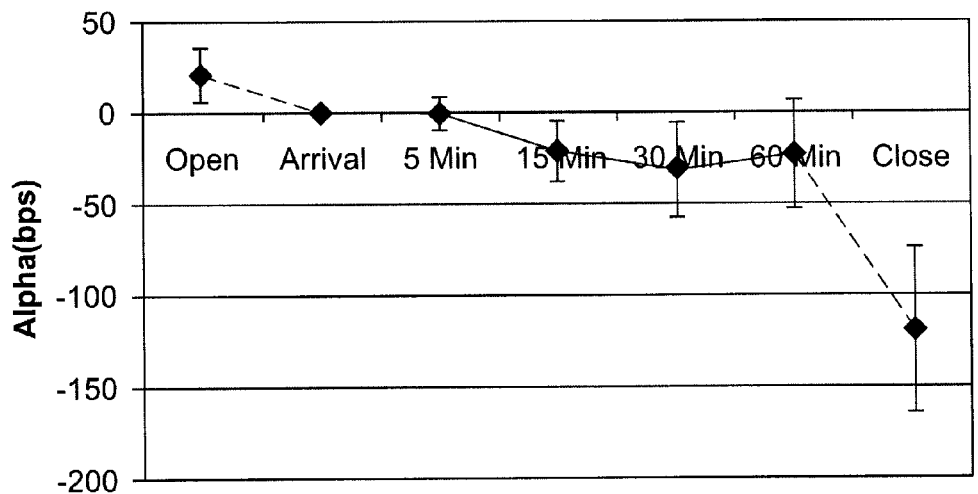

Strategy designed to tactically manage munitions as prices become more favorable towards the day close. An execution path will be determined dynamically to minimize adverse selection while completing the trade. The system will automatically activate the "MunitionsMan" strategy when it detects the subset of market conditions specific to a no short-term (intraday) alpha profile. Alternatively, the trader may choose to activate this strategy based on their present view of the market. See FIG. 32.

Tactical price selection with completion scheduled on the close. There will not be a minimum rate maintained for the trade, but the delay between subsequent fills will not exceed 30 minutes.

Block exposure: 30% of the initial order size throughout the execution.

In order to reach completion time objectives, the strategy may transition into moderate or high speed.

Large orders that would require overall participation rates higher than 30% for completion may not finish by the end of the day.

Figure 33B:
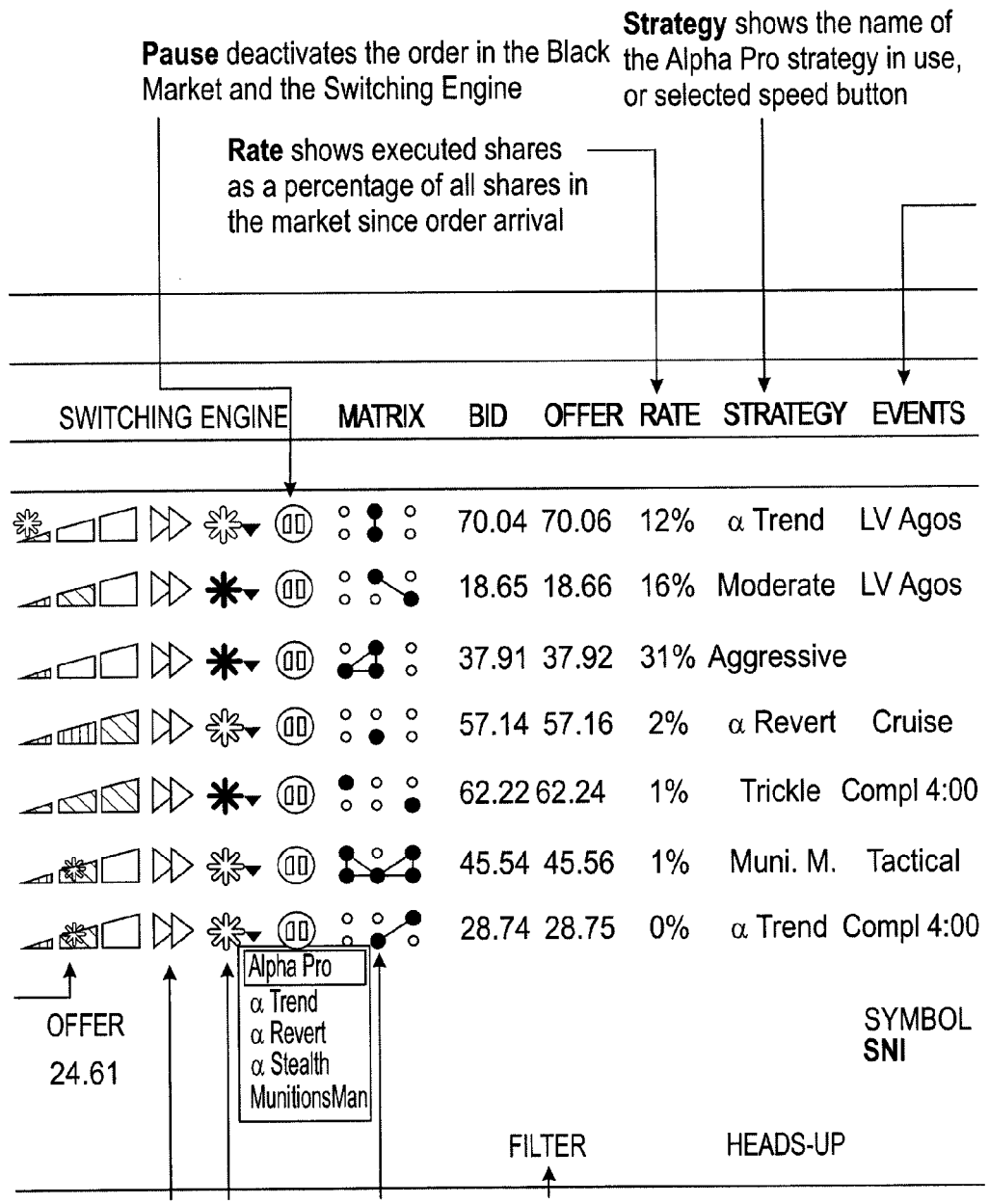
FIG. 33 depicts an exemplary graphical user interface that may be used with one or more aspects or embodiments.
Figure 33F:
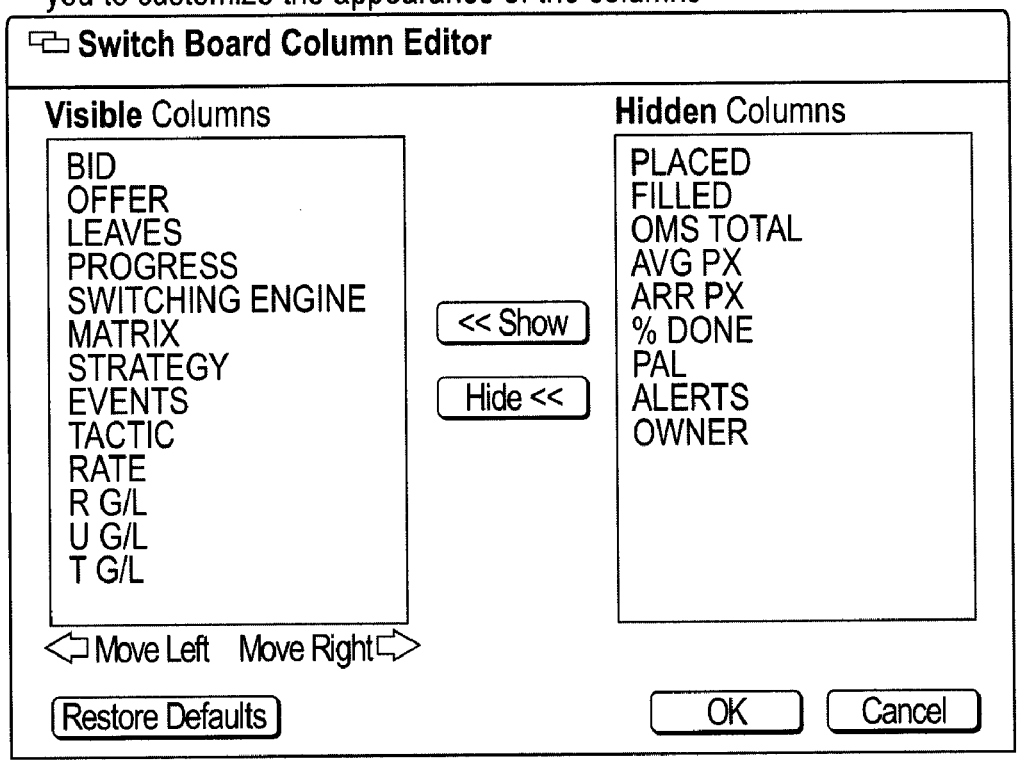

FIG. 33 depicts an exemplary graphical user interface that may be used with one or more aspects and embodiments.

FIG. 34 provides an exemplary block color description. More details may be found in U.S. patent application Ser. No. 12/463,886 (Pub. No. 2009/0281954) and U.S. patent application Ser. No. 12/181,028 (Pub. No. 2009/0076961)), as well as U.S. patent application Ser. No. 12/181,117 (Pub. No. 2009/0089199) and U.S. patent application Ser. No. 12/419,867 (Pub. No. 2009/0259584).

Implementation Shortfall Decomposition for Market Orders

The description below describes an exemplary implementation shortfall decomposition into its primary components for the case of market orders. This description is then extended to the case of limit orders, where limit price savings need to be weighted against opportunity costs associated with the delay of the execution. Examples are provided of how post-trade TCA can be applied to trade profiles with distinct short-term alpha loss characteristics.

Short-term Alpha Loss, Market Impact and Adverse Selection

Figure 35:
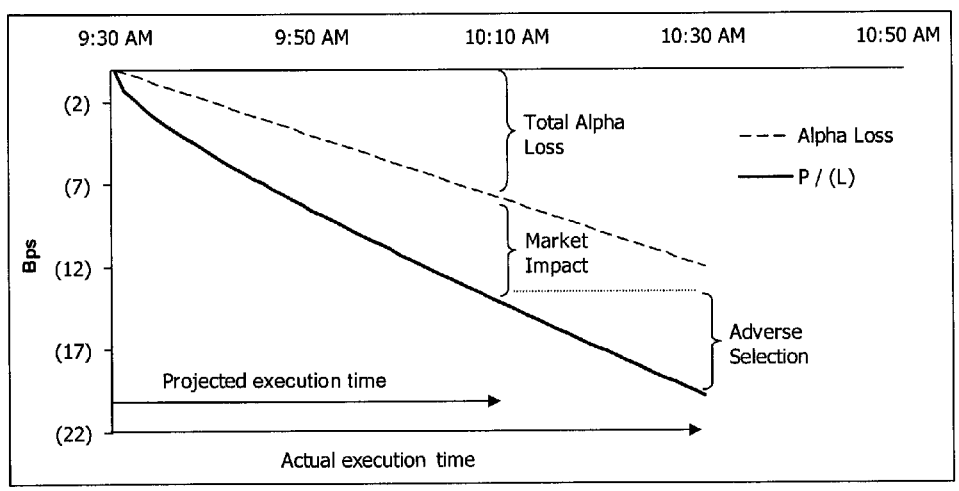
FIG. 35 depicts an example with the main components of implementation shortfall in terms of Profit/(Loss).

FIG. 35 depicts an example with the main components of implementation shortfall in terms of Profit/(Loss). As the execution progresses, there is usually a deterioration of the execution price which results not only from the alpha loss but also from the market impact of the execution. Potential delays in the execution which may exacerbate the total loss in the presence of short-term alpha fall into the category of adverse selection costs.

Let $S_{exec}$ be the number of shares executed and $P_{exec}$ the average execution price for an order with arrival price equal to $P_{arrival}$. The P/(L) can be broken down into its main components as follows:

$$-1 \times \ln\left(\frac{P_{exec}}{P_{arrival}}\right) = -1 \times \underbrace{\left(\ln\left(\frac{PWP}{P_{arrival}}\right) - MI(S_{PWP})\right)}_{\text{Alpha Loss}} - \underbrace{MI(S_{exec})}_{MI} - \underbrace{\left(\ln\left(\frac{P_{exec}}{PWP}\right) - MI(S_{exec}) + MI(S_{PWP})\right)}_{AS-OS} \quad (1)$$

PWP is the participation weighted average price, calculated as the VWAP for the time period starting at order arrival until the time that is required to complete the order at the selected participation rate. $S_{PWP}$ is the number of shares executed in this same PWP evaluation time window.

MI is the market impact, a widely recognized source of trading costs for institutional orders, whose main determinants are the volatility of the stock and executed size relative to average daily volume. The appropriate functional form of market impact function depends to a large extent on the pattern of the execution strategy being considered and is out of the scope of this paper. Gomes and Waelbroeck (2008) provide a model estimated for Switching Engine executions (see, e.g., U.S. Pat. No. 7,908,203).

What remains of implementation shortfall after taking out the contribution of short-term alpha and market impact is the net balance between adverse selection (AS) and opportunistic savings (OS) (see Altunata, Rakhlin and Waelbroeck, 2010). AS and OS refer to the results of decisions made by an algorithm to trade at specific price points, as opposed to tracking a volume-weighted average price. Good price selection results in opportunistic savings, whereas an algorithm that gets "picked off" at poor price points suffers from adverse selection.

Accordingly, AS and OS measure the negative and positive deviations between the average execution price and the PWP, respectively. Here, the PWP must be adjusted to take into account the difference between the market impact of the realized trade and the hypothetical impact of a pure PWP strategy, as shown in Eqn (1) of this section. An algorithm's ability to control the participation rate and generate OS can have dramatic consequences on the implementation shortfall.

For example, a particular algorithm switching engine (see U.S. Pat. No. 7,908,203) can eliminate 70% of adverse selection costs with only a small reduction in opportunistic savings, resulting in a 40% lower implementation shortfall relative to continuous use of a dark aggregator.

Alpha loss is measured as the difference between the arrival price and the PWP net of the market impact of the shares that were executed in the PWP window.

Determining Optimal Speed

The decomposition of implementation shortfall can be extended to include the relative performance of the selected speed (R) as compared to a benchmark speed level. For example, for a 10% participation rate benchmark, the alpha loss and market impact can be expressed as the combination of their respective values at the benchmark and the marginal effect of the elected speed.

Figure 36:
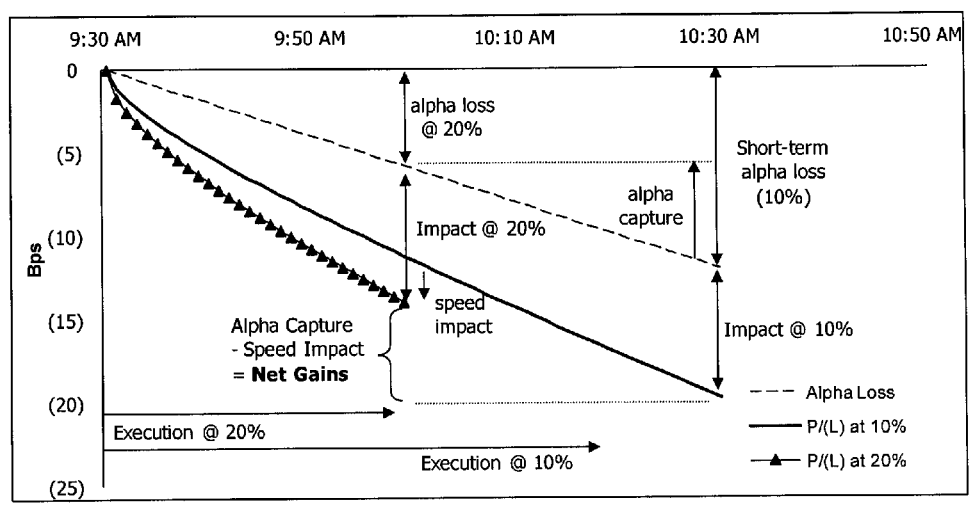
FIG. 36 illustrates trade-off between market impact and alpha capture for two speeds.

The example depicted in FIG. 36 illustrates the case of considering a 20% participation rate, rather than 10%, in the presence of significant short-term alpha. The market impact at 20% is equal to the market impact at 10% plus the additional impact from executing at 20%. Alpha loss over a 20% participation window is the alpha loss over a 10% window net of the alpha capture from completing the order earlier.

In the example shown in FIG. 36, due to the significant short-term alpha loss, the increase in market impact is more than compensated for by the gains in alpha capture, so 20% would be the better choice of execution speed.

A P/(L) decomposition that accommodates a speed benchmark can be written as:

$$-1 \times \ln\left(\frac{P_{exec}}{P_{arrival}}\right) = \qquad (2)$$

$$\underbrace{-\left(\ln\left(\frac{PWP_{10}}{P_{arrival}}\right) - MI(S_{PWP_{10}})\right)}_{\text{Short-Term Alpha Loss}} \underbrace{-\left(\ln\left(\frac{PWP}{PWP_{10}}\right) - MI(S_{PWP}) + MI(S_{PWP_{10}})\right)}_{\text{Speed Alpha Capture/Loss}}$$

$$\text{Alpha Loss at Selected Speed}$$

$$\underbrace{-MI(S_{exec}, r=10\%)}_{MI(10\%)} \underbrace{- MI(S_{exec}, r=R) + MI(S_{exec}, r=10\%)}_{\text{Speed Impact}} -$$

$$\text{MI at Selected Speed}$$

$$(AS - OS)$$

Speed Impact is the net market impact cost of the selected speed, measured as the difference between the market impact at the corresponding participation rate and the market impact at 10%.

FIG. 36 shows an example of how to decide the optimal trading speed: is it the 20% participation rate that the customer has chosen or an alternative 10% participation rate? The y axis of FIG. 36 is Profit/(Loss) in basis points. The x axis is time. The customer chose a 20% participation rate, and one observes the P/(L) of 20%. It The customer has a loss of 15 bps.

Would the customer have had a lower loss if he had picked a 10% participation rate? To answer that question entails simulating the P/(L) the customer would have gotten if the customer had picked the 10% participation rate.

And for that one may:

i) take the observed prices (curve with the triangles);

ii) subtract from observed prices the impact of the execution at 20% to see what the impact-free price is (see dotted curve for Alpha Loss);

iii) calculate the average impact-free price for the execution at 10% (still on the dotted curve for Alpha Loss, but going further to the right in time because an execution at 10% takes more time than an execution at 20%);

iv) to get the P/(L) at 10% one then needs to add to the impact-free price the impact of the execution at 10%

If one didn't take impact into account, the only thing that one would notice is that 10% takes more time, and if the stock moves away the customer will incur more losses. If the impact is not taken into account, one won't see how much is saved in impact by lowering the speed. Indeed, in this particular case of FIG. 36, what the customer lost in terms of impact is more than compensated for by what he gains by getting the order done earlier. But the size of the cost and benefits could have been different and the only way to know is by calculating both.

Or, in other words, transaction cost analysis is based on historical data in which what is observed is to some extent affected by the customer's strategies. To make a good assessment of alternative strategies, one needs to first subtract out the impact of those strategies to then be able to simulate accurately alternative strategies. This applies not only to speed analysis but also to limit price analysis.

Speed Alpha Capture/Loss is the effect of the selected speed on the timeliness of the trading with respect to the alpha loss. This is measured by the tracking performance of the PWP at the chosen participation rate as compared to the PWP at the 10% benchmark, adjusted for the differential market impact in the two PWP evaluation windows.

The combined result of alpha capture and speed impact provides an assessment of the adequacy of the speed choice. As a rule, a less significant alpha loss is associated with higher potential gains from executing at a lower speed level, given that moderate adverse price movements throughout a longer execution can be more than compensated for by lower market impact costs.

Alpha capture and speed impact can be calculated for any speed level $\{r\}$. The optimal participation rate R* is such that the net cost of the speed choice is minimized:

$$\ln\left(\frac{PWP_{R*}}{PWP_{10}}\right) - MI(S_{PWP_{R*}}) + \qquad (3)$$

$$MI(S_{PWP_{10}}) + MI(S_{exec}, r = R^*) - MI(S_{exec}, 10\%) =$$

$$\text{Min}\Big\{0, \ln\left(\frac{PWP_r}{PWP_{10}}\right) - MI(S_{PWP_r}) + MI(S_{PWP_{10}}) +$$

$$MI(S_{exec}, r) - MI(S_{exec}, 10\%)\Big\}_r$$

Determining Optimal Limit Price

In the case of limit orders, the P/(L) decomposition adjusts for the price limit as follows:

$$-1 \times \ln\left(\frac{P_{exec}}{P_{arrival}}\right) = \qquad (4)$$

$$-1 \times (\text{Short term Alpha Loss} + \text{Speed Alpha Capture/Loss} +$$

$$MI(10\%) + \text{Speed Impact}) -$$

$$\underbrace{1 \times \left[\ln\left(\frac{P_{exec}}{PWP\_\lim}\right) - (MI(S_{exec}) - MI(S_{PWP}))\right]}_{AS-OS} + \underbrace{\ln\left(\frac{PWP}{PWP\_\lim}\right)}_{\text{Limit Savings}}$$

The algorithm's performance in terms of AS/OS is isolated from the effect of the limit price by comparing the average execution price against the PWP within the range of the limit (PWP_lim).

The difference between PWP_lim and PWP reflects the savings from imposing the limit price, which need to be weighted against the cost of executing any unfilled shares due to the limit in order to properly evaluate the adequacy of the limit price strategy. Assume that the order completion (cleanup) occurs after the reversion period at an execution price that accounts for the market impact of the execution of this residual. The resulting overall execution price for the total order size is:

$$P_{total} = \underbrace{\frac{S_{exec}}{S_{total}} * P_{exec}}_{W_{exec}} + \underbrace{\frac{(S_{total} - S_{exec})}{S_{total}}}_{1-W_{exec}} * \underbrace{\frac{P_{post-rev} * (1 + MI(S_{total-S_{exec}}))}{P_{cl}}}_{} \qquad (5)$$

The overall P/(L) associated with this average execution price is:

$$-1 \times \ln\left(\frac{P_{total}}{P_{arrival}}\right) = -\ln\left(\frac{P_{exec}}{P_{arrival}}\right) - \underbrace{\ln\left(1 + \frac{1 - W_{exec}}{W_{exec}} x \frac{P_{cl}}{P_{exec}}\right)}_{\text{Opportunity Costs}} \qquad (6)$$

Figure 37:
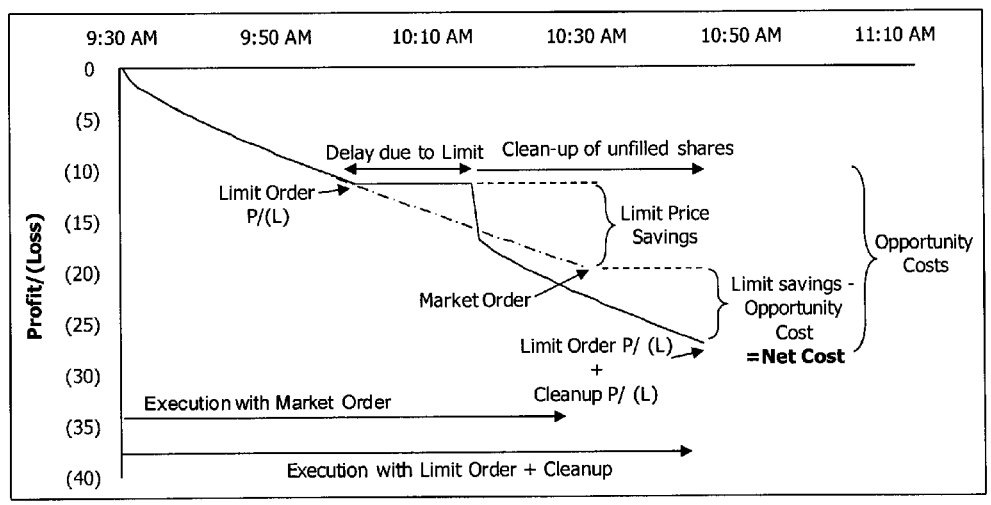
FIG. 37 illustrates trade-off between limit price savings and opportunity costs.

The net savings of the limit order over a market order are measured as $\ln(PWP/P_{total})$. When the alpha loss is not significant, the limit price generates savings that are likely to outweigh the opportunity costs. Otherwise, the cost associated with the clean-up of the unfilled shares due to the lower tape volume within the limit will over-compensate for the limit savings. The example depicted in FIG. 37 illustrates this case. Although the loss associated with the execution of the limit order is in general lower than that of the market order, the limit price in this example prevents completion of the execution early on, causes delays and forces a clean-up at much less favorable prices.

Figure 38:
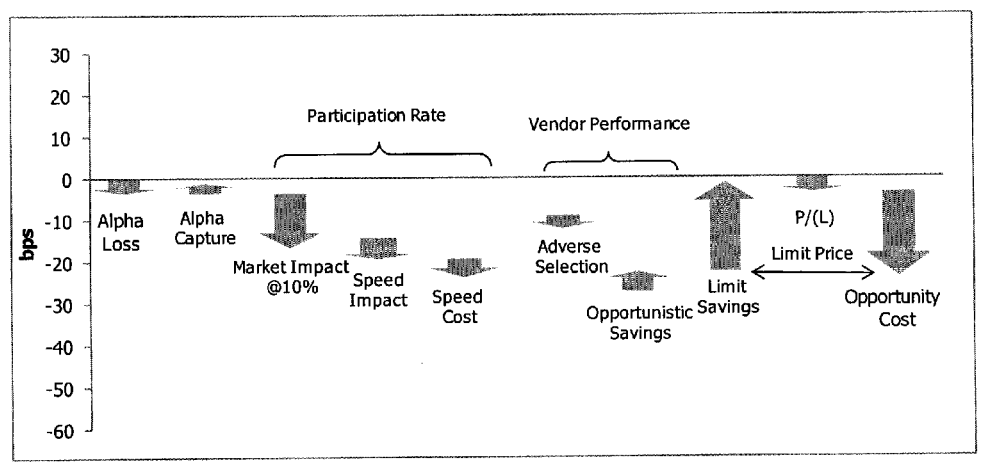
FIG. 38 depicts an example of value-weighted P/(L) decomposition for limit orders (in bps).

FIG. 38 depicts an example of P/(L) decomposition for a set of limit orders placed by an institutional client. Market impact is the largest component of implementation shortfall. In this particular case, since the alpha loss is weak, the impact cost of an average speed higher than 10% does not outweigh the gains from alpha capture. The opportunistic savings generated by the algorithm switching engine outweigh the adverse selection costs. The opportunity costs from imposing a limit price outweigh the limit savings, suggesting that more aggressive limit prices will produce a better performance on average.

The limit price P* over a set of limit prices {l} that maximizes the benefit of limit price savings net of opportunity costs is such that:

$$\ln(PWP/P_{total}(P^*)) = \max\{\ln(PWP/P_{total}(l))\}_l \quad (7)$$

Figure 39:
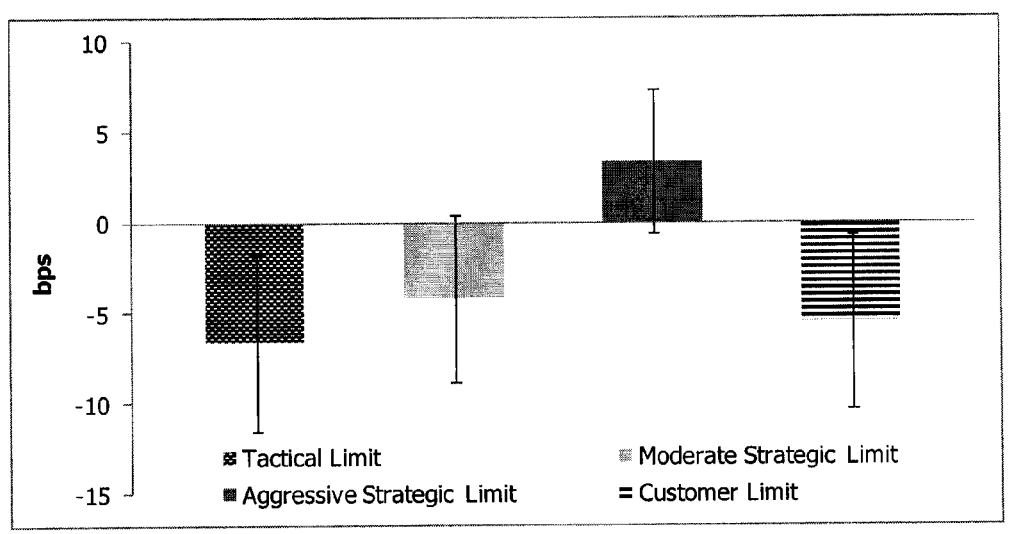
FIG. 39 illusttates an example of net limit price savings over market orders.

FIG. 39 depicts exemplary net limit price savings associated with the customer limit along with three other alternatives: a tactical limit, defined as a price limit 20 basis points away from the arrival price, and moderate and aggressive strategic limits, defined as limit prices that allow for, respectively, 2 times and 4 times the market impact of the execution. The results indicate than an aggressive strategic limit is the best of the four alternatives and in fact generates savings over market orders. In this example, net limit price savings over a market order are maximized with an aggressive strategic price limit.

Optimal Trading Decisions for High Urgency Versus Low Urgency Trades

The profit/(loss) decomposition described above in this section provides an immediate performance evaluation of all the relevant sources of trading costs, as well as an assessment of the short-term alpha loss during the term of the execution. The results of this exemplary TCA methodology may suggest whether a determined set of orders has high alpha loss and can benefit from executions with higher urgency or instead exhibits less significant alpha, presenting opportunities to manage it more tactically.

In most cases, recognizing heterogeneity in the order flow is an important step. Clusters that exhibit similar characteristics should be identified and analyzed separately so that the estimates of their respective components of implementation shortfall can be more informative. This clustering can be done in consultation with a trader or portfolio manager, using fields in the data such as urgency instructions if available, or inferred from the data—however, to be useful the trade urgency must be defined ex-ante so as to enable an optimal trading decision at the start of a trade. The profiling of trade arrivals by urgency is a difficult predictive classification problem that lies outside the scope of this description.

Figure 40:
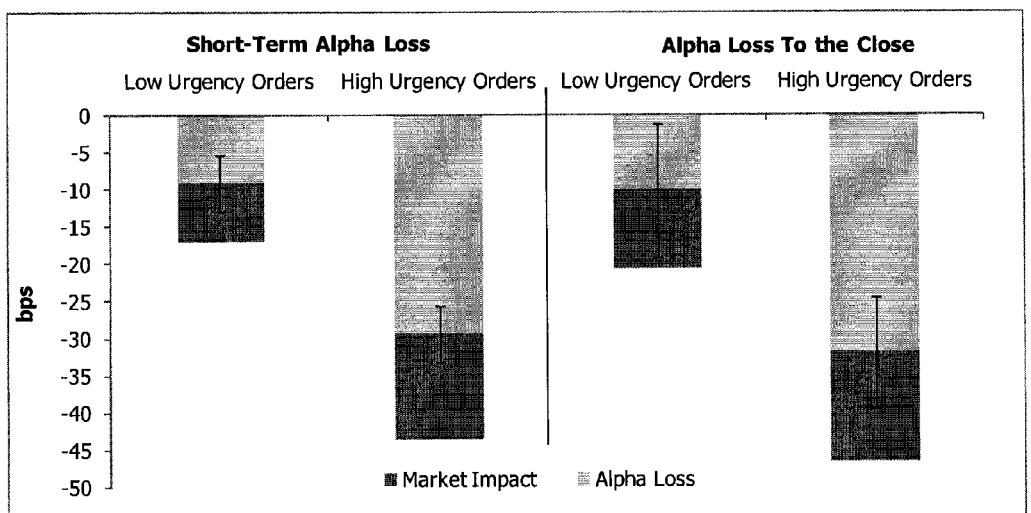
FIGS. 40-42 illustrate exemplary order flow analysis.

FIG. 40 displays an alpha loss profile for two clusters in the order flow of an institutional client, after subtracting market impact from the observed price returns. Despite the variation within each cluster, the differences in alpha loss between the two groups are statistically significant. Two classes of trading strategies were implemented based on the established trade arrival profiles associated with these disparities: a more aggressive trading strategy for orders identified as high urgency, and a more tactical one for low urgency orders. The identified clusters in order flow with respect to alpha loss are statistically different.

Figure 41:
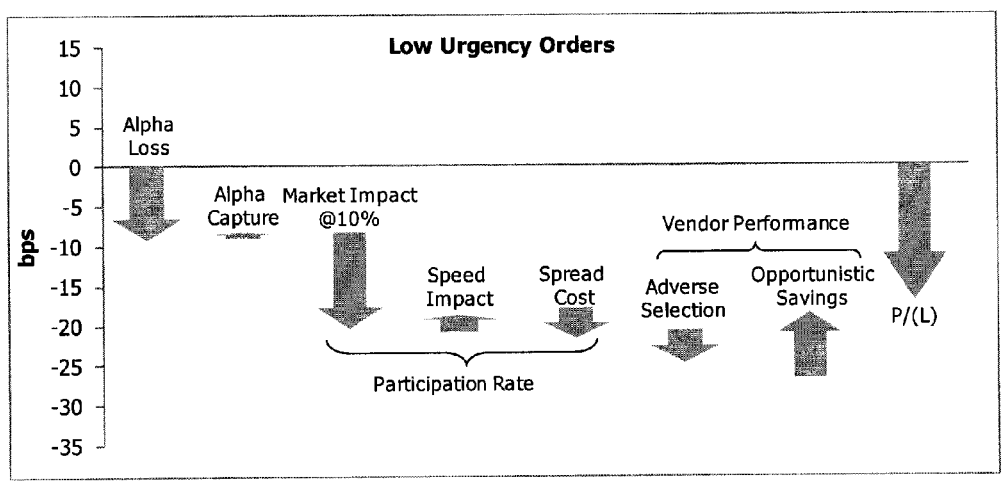
Figure 42:
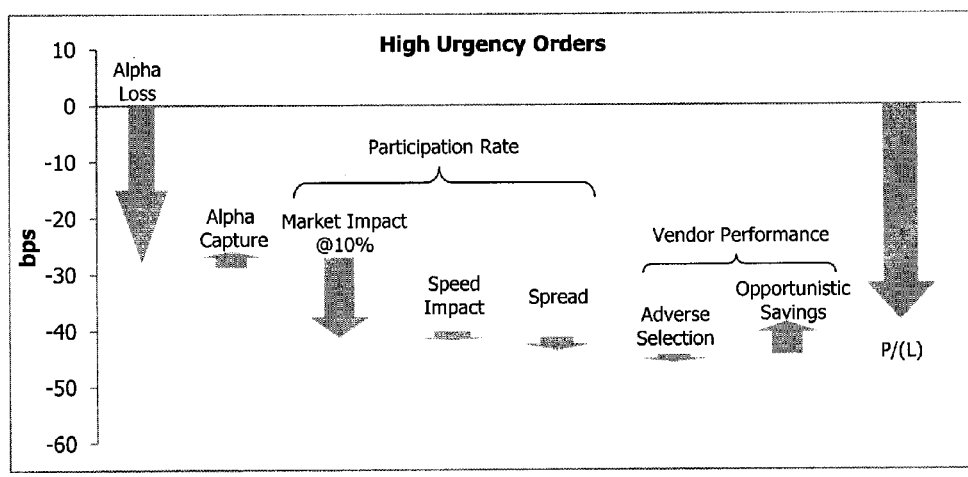
Figure 43:
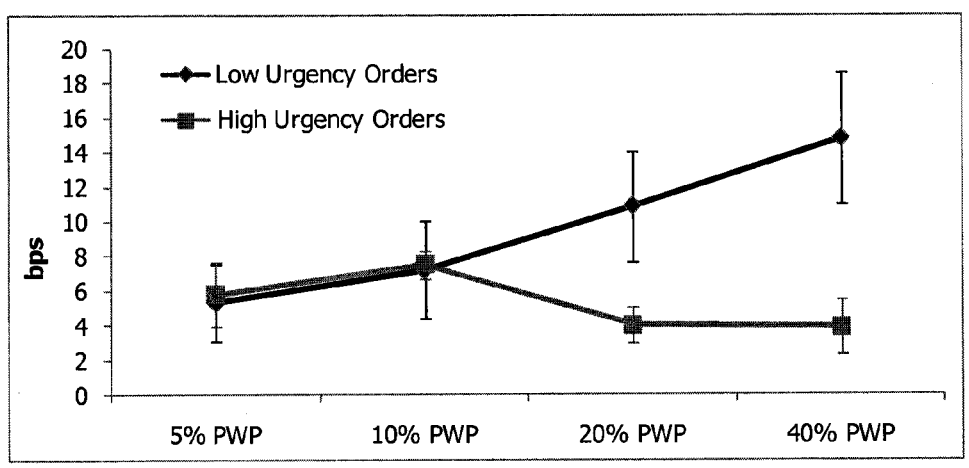
FIG. 43 illustrates an example of cost of benchmark speed levels versus selected target rate.

FIGS. 41 and 42 depict a P/(L) decomposition for the two types of strategies. The results show that low urgency orders were executed with an average speed below 10% without significant alpha loss. On the other hand, although high urgency orders are inevitably associated with higher trading implementation losses due to the significant short-term alpha, the additional market impact cost of a speed level over 10% was compensated by the benefit of alpha capture. FIG. 43 displays the market impact cost net of the alpha capture benefit of each benchmark speed level suggesting 5% for low urgency orders and 20% for high urgency orders as the optimal speed levels.

Low urgency orders were executed with an average speed below 10% without significant alpha loss. Although high urgency orders are inevitably associated with higher trading implementation losses due to the significant short-term alpha loss, the additional market impact cost of a speed level over 10% was compensated by the benefit of alpha capture.

FIG. 43 depicts an example of cost of benchmark speed levels versus selected target rate. A 5% participation rate minimizes the implementation shortfall cost for low urgency orders whereas 20% or 40% are better choices for high urgency orders.

While traders have advanced trading tools available, they still need to have access to solutions that help them determine how to use these tools effectively in light of their order flow in order to meet their specific objectives. The standard TCA methods fail to take into account the specific circumstances of each trade and often produce results that are not relevant for each particular set of institutional orders. This description provides a new methodology for TCA that provides an accurate assessment of each term of the profit/(loss) associated with trade execution. This description explains how to identify the impact on performance of the algorithms deployed separately from the impact of the trader's decisions with regard to trading speed and limit prices. At the same time, the methodology described herein also helps in the assessment of the short-term alpha nature of the order flow, which is relevant to higher level trading decisions.

Aspects of a TCA that can successfully assist in the design of optimal trading strategies may be based on the following:
  Understanding the efficiency of an algorithm requires measuring adverse selection and opportunistic savings
  Strategy decisions depend on estimating short-term alpha loss. To estimate alpha loss from post-trade data requires subtracting out the market impact of the trading strategy. To evaluate an alternate strategy requires adding the impact of the strategy under consideration
  Profiling orders based on their arrival characteristics is a valuable first step to determine systematic disparities in short-term alpha loss and identify opportunities to enhance performance The exemplary analytical framework proposed herein that relates to one or more aspect and exemplary embodiments offers opportunities to enhance the investment process by breaking down the implementation shortfall into its root causes and tackling these individually through better algo design or better execution schedules. Armed with this level of analysis, a trading desk can separately assess the value added by the traders' decisions from the underlying quality of the algorithmic trading tools provided by each broker.

REFERENCES FOR THIS SECTION

Altunata, S., Rakhlin D. and Waelbroeck, H "Adverse Selection vs. Opportunistic Savings in Dark Aggregators", Journal of Trading 5 (1) (2010).

Gomes, C. and Waelbroeck, H. "Effect of Trading Velocity and Limit Prices on Implementation Shortfall", Pipeline Financial Report, PIPE-2008-09-003, September 2008.

As an example with respect to algorithm and filter design (see, e.g., U.S. Pat App. No. 13/071,992), incorporated herein by reference), if one determines that a 20% participation rate is indeed the optimal for a well-defined set of order profiles, one can design strategies that optimize around this participation rate and make them available to traders. The execution strategy may be designed to automatically select and manage the most adequate algorithms for a 20% target rate.

Subsequent orders that meet that profile may be automatically assigned to this strategy. In that case, the graphical interface may inform the trader of the name of the strategy being deployed, to which subset of order characteristics it applies, and the respective impact-free price profile.

Alternatively, one may suggest the strategy to the trader and then allow the trader to decide whether to follow the suggestion. Strategies may be selected through drag and drop.

Exemplary Analysis of Trade Profile

The following section describes an exemplary analysis of trades between April 2010 and September 2010 and describes associated optimal trading strategies. See FIGS. 44-51, described in more detail below.

In general, buy orders exhibit higher impact-free returns than sell orders and, accordingly, may be executed with front loaded strategies to minimize risk, especially for the case of orders above 1% ADV.

Orders following a prior Close-to-Open gap exhibit continuing trend in impact-free returns whereas the remaining orders exhibit reversion. For the case of buy orders larger than 1% with no gap, the Alpha strategy may be designed to take advantage of the probable price improvement later in the trade. Sell orders with no gap may be executed with a strategy that will extend the execution to the close.

Orders between 0.01 and 1% ADV are associated with weaker impact-free returns to the close than the larger orders and, in general, may be executed with less urgency.

Small trades (<0.01% ADV) may be handled using a tactical price-selection alpha-capture strategy, using, fro example, an algorithm switching engine in a low-adverse-selection trickle mode, with a minimum participation of 2% to avoid unnecessary execution delays.

Orders of size larger than 15% ADV are subject to high uncertainty and execution risk. These trades may be executed with a strategy that has a minimum 10% rate to test the market while avoiding adverse selection. In the case of difficult trading conditions with bias to trend continuation, the strategy may increase participation in the market to minimize risk. If a short term decoupling from the sector index or excessive impact occur, the strategy may respond by pausing the execution for 15 minutes and then continuing with a patient execution schedule aiming to minimize impact. The executions may become aggressive in the money on price opportunities; if the stock completely reverts, the strategy may proceed with a 10% rate.

TABLE 15

Overview of exemplary execution strategies

| Strategy | Trade Size, % ADV | Gap | Side | Obs. # | Strategy |
|---|---|---|---|---|---|
| AS Control | <=0.01 | Y/N | B/S | 1,669 | Execute on arrival; dark if possible |
| Alpha T | 0.01-15 | Y | B | 1,870 | 1) Moderate to fill 40%/30 min; 2) Tactical with 7% min rate |
| Alpha R | 1-15 | N | B | 581 | 1) Moderate to fill 20%/15 min 2) Tactical with 1% min rate |
| Alpha | 1-15 | Y | S | 452 | 1) Moderate to fill 20%/15 min 2) Tactical with 7% min rate |
| 10% | 0.01-1 | Y | S | 1,477 | Schedule completion with 10% target rate, using tactical limits to seek good price points. |
| Muni. M | 0.01-1 0.01-15 | N | B S | 3,331 | All day munitions management with a minimum rate according to order size. |
| Mega | 15-30 | Y/N | B/S | 406 | Minimum 10% rate, responding to real-time market conditions as described above. |

Descriptive Statistics

TABLE 16

First Day Trades

| Variables | Observations | | Mean | | Median | |
|---|---|---|---|---|---|---|
|  | Buy | Sell | Buy | Sell | Buy | Sell |
| Order Duration (minutes) | 4,065 | 4,052 | 516 ± 37 | 417 ± 38 | 66 | 52 |
| Trade Duration (minutes) | 4,065 | 4,052 | 484 ± 37 | 407 ± 38 | 61 | 48 |
| Delay Time (minutes) | 4,065 | 4,052 | 32 ± 6 | 10 ± 3 | 2 | 2 |
| Trade Size (% adv) | 4,065 | 4,052 | 5 ± 1 | 5 ± 1 | .4 | .3 |
| BB Pretrade | 4,065 | 4,052 | 94 ± 2* | 100 ± 2* | 14 | 11 |
| Shortfall (bps vs. arrival price) | 4,065 | 4,052 | 64 ± 2* | 62 ± 2* | 7 | 3 |
| Delay Costs (bps vs. arrival price) | 4,065 | 4,052 | −1 ± 1 | −1 ± 1 | 0 | 0 |
| Participation Rate (%) | 4,065 | 4,052 | 10 ± .2 | 10 ± .2 | 6 | 6 |
| Adjusted Tracking Error 5% PWP (bps) | 4,065 | 4,052 | 7 ± 1 | 4 ± 1 | 2 | 1 |
| Adjusted Tracking Error 10% PWP (bps) | 4,065 | 4,052 | 4 ± 1 | 0 ± 1 | 0 | −1 |
| Adjusted Tracking Error 20% PWP (bps) | 4,065 | 4,052 | 2 ± 1 | −2 ± 1 | −1 | −3 |

(*) Value-weighted averages

Methodology and Key Parameters

This subsection considers the classification of trade arrivals by impact-free returns. Impact-free returns may be determined by subtracting expected impact from the observed post-trade prices, using a speed-adjusted model and assuming uniform trading speed within each execution window.

One may define a class C of orders where the sector trader has significant impact-free returns to close, and define X to be a potential filter; the sector trader is statistically likely to have positive impact-free returns if the likelihood of class C is enhanced by applying the filter X. This is the case when:

$$\varepsilon = \frac{N_X(P(C \mid X) - P(C))}{(Nx(P(C)(1 - P(C)))^{1/2}} > 2,$$

where P(C|X) is the probability that the sector has positive impact-free returns given X, and there are Nx observations associated with X Summary of Findings Class C defines trades with significant impact-free returns to close and X defines the filter

TABLE 17

| | First Node | | |
|---|---|---|---|
| Factor | X | $\epsilon$ | $\text{Alpha}_{arrival,close}$|X, C |
| Trade Size (% ADV) | >1% | 3.4 | 201 ± 5 |

TABLE 18

| | Second Node (orders > 1% ADV) | | |
|---|---|---|---|
| Factor | X | $\epsilon$ | $\text{Alpha}_{arrival,close}$|X, C |
| Prior Close to Open Gap, SPY | $R_{SPY,open,prior\_close}$ > 10 bps | 4.3 | 200 ± 6 |
| Time of Day | Arrival time before 10 A.M | 3.6 | 236 ± 7 |
| Prior Close to Open Gap | $R_{open,prior\_close}$ > 10 bps | 2.9 | 215 ± 8 |

1. Trades >1% ADV. Impact-Free to Return Close (prices adjusted for expected impact)

A. Buy orders with prior Close-to-Open gap larger than 10 bps exhibit continuing trend of impact-free returns to the close. Order with gap lower than 10 bps exhibit momentum for the first 60 minutes, which is then followed by some reversion to the close. See FIGS. 44 and 45.

Figure 44:
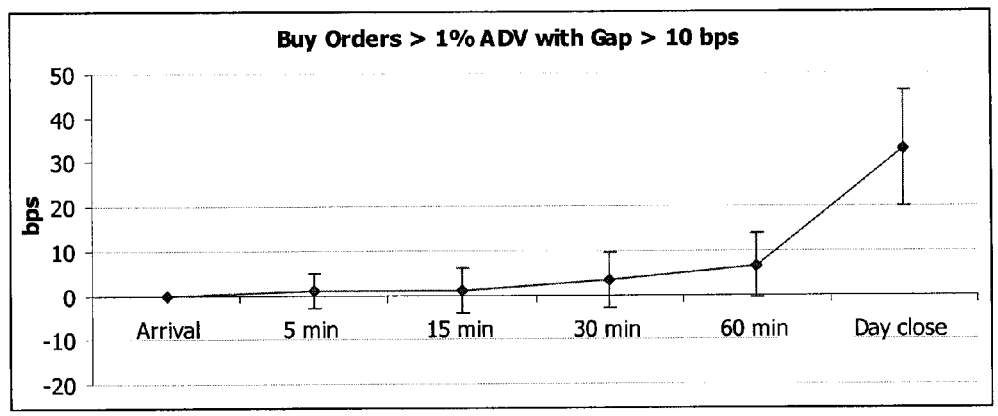
FIGS. 44-47 depict exemplary results of trades greater than 1% ADV.
Figure 45:
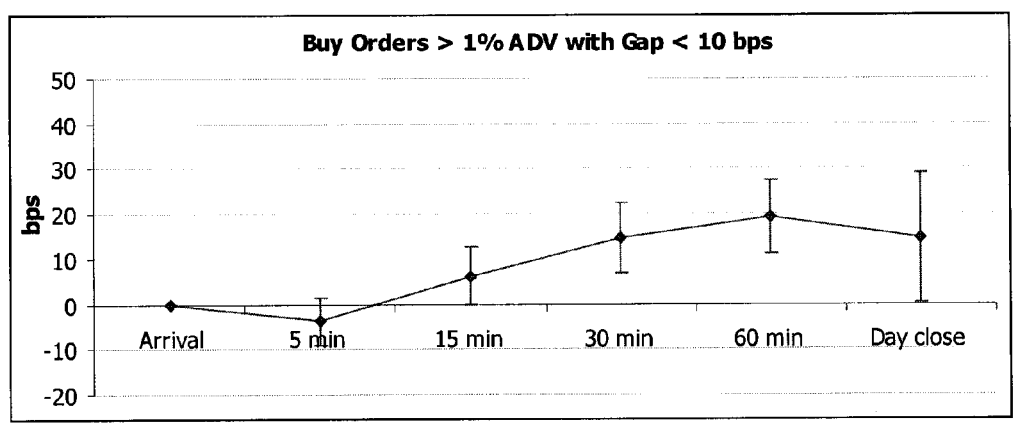
Figure 46:
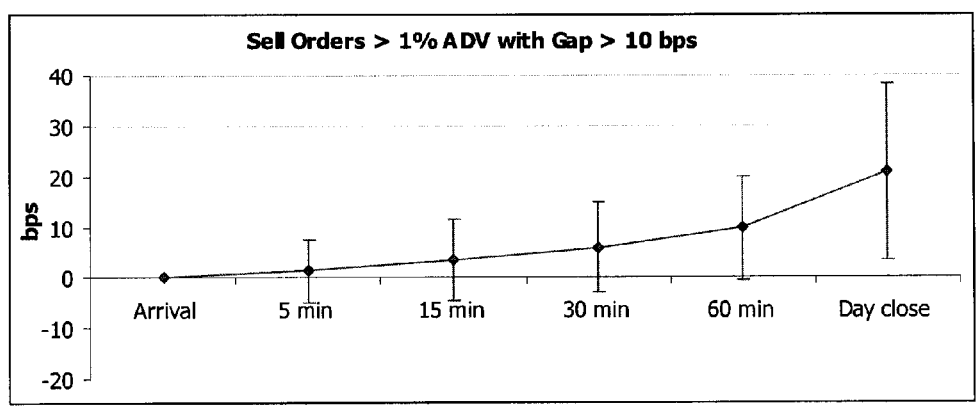
Figure 47:
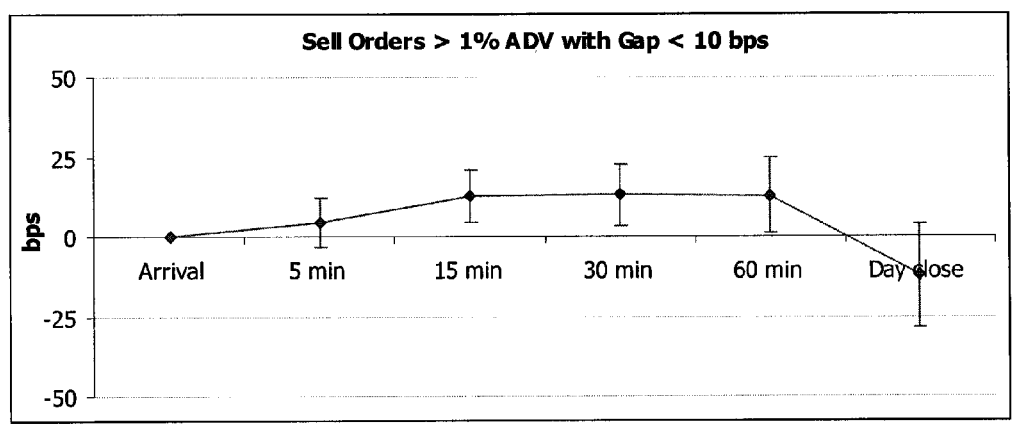
Figure 48:
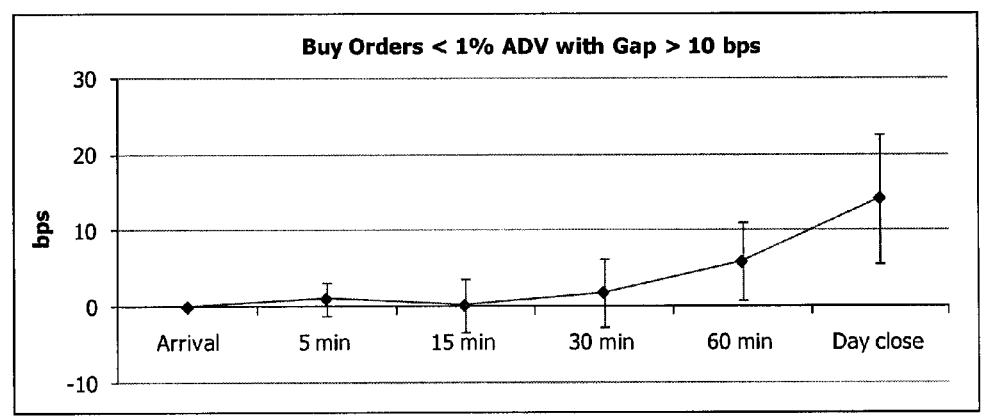
FIGS. 48-51 depict exemplary results of trades less than 1% ADV.
Figure 49:
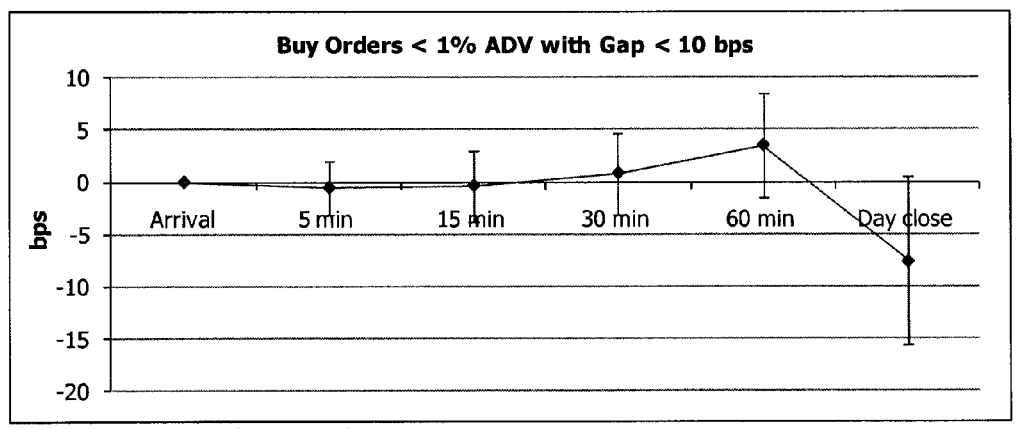
Figure 50:
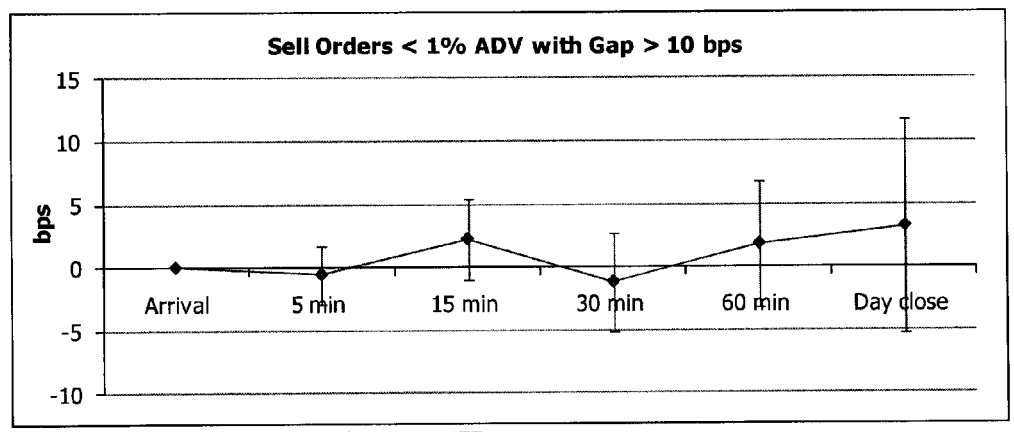
Figure 51:
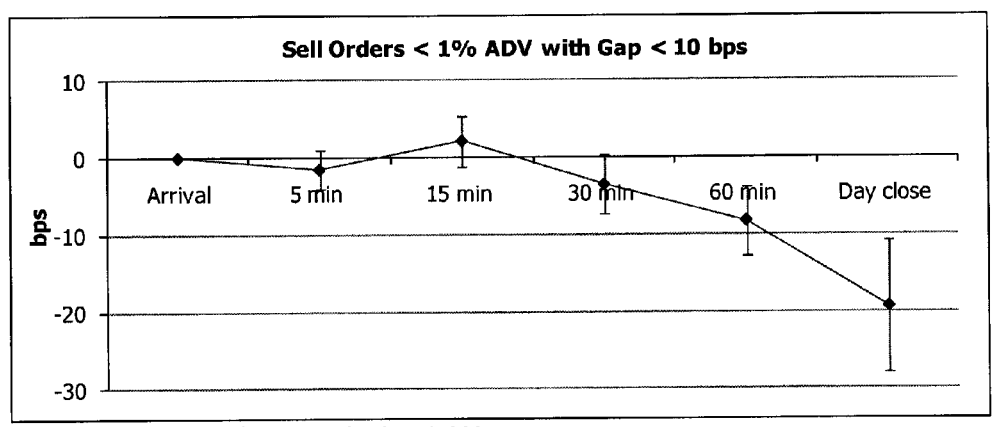

FIGS. 44 and 45 depict two subsets of orders from a customer for which the 20% participation rate is optimal: orders received before 10 A.M. and orders in Large or Mid caps placed later in the day on price reversion. For all other orders from this customer a 5% participation rate appears to be the most adequate.

B. Sell orders with prior Close-to-Open gaps larger than 10 bps also exhibit continuing trend of impact-free returns to the close. Orders with gaps lower than 10 bps exhibit a reversion more pronounced than buy orders. See FIGS. 46 and 47.

2. Trades <1% ADV. Impact-Free to Returns to Close (prices adjusted for expected impact)

C. Smaller buy orders with prior Close-to-Open gap larger than 10 bps also exhibit continuing trend of impact-free returns to the close, whereas those with gap lower than 10 bps exhibit a reversion even more pronounced than large buy orders. See FIGS. 48 and 49.

D. Smaller sell orders with prior Close-to-Open gap larger than 10 bps do not exhibit significant impact-free returns to the close, whereas those with gap lower than 10 bps exhibit a reversion even more pronounced than buy orders. See FIGS. 50 and 51.

Exemplary Report Regarding Trade Profile and Execution Performance

This exemplary report section summarizes findings from an analysis of order placement and execution data from August, 2009 to June, 2010. The first subsection below describes the trade profiles identified in the order flow analysis and suggests the most adequate speed level for each profile. The second subsection presents the execution performance results for each profile.

The most significant underlying alpha to close and short-term underlying alpha are found in orders placed before 10 am as well as in Large/Mid Cap orders with size >0.5% ADV, placed after 10 am on reversion. All other orders do not exhibit strong alpha.

The selected participation rate is optimal for the two above-mentioned order profiles with significant alpha. For the other orders, a lower speed seems to be more appropriate.

Executing orders with no significant alpha at a lower participation rate would likely generate impact savings that more than compensate for the alpha decay. Cash balancing or other PM constraints may require aggressive execution in spite of these recommendations.

For orders with no significant alpha, the chosen limit price is appropriate. For order profiles associated with a strong alpha decay, an aggressive strategic limit price or even a market order are more appropriate.

Subsection 1: Profiling Trade Arrivals: Underlying Alpha and Speed Analysis

One may identify underlying alpha to the close and short-term underlying alpha by measuring price returns net of market impact. This methodology allows one to identify opportunities to trade tactically, managing munitions to take advantage of opportunities while minimizing impact. This exemplary report considered several classifications of trades using variables such as trade size, trade side, start time and prior momentum. These exemplary findings suggest that orders placed before 10 am as well as Large/Mid Cap orders with size >0.5% ADV, placed after 10 am on reversion exhibit strong alpha. All other orders do not exhibit substantial alpha decay.

For each exemplary group of trade profiles, in order to understand the potential costs of using a participation rate other than the selected participation rate, one may consider the tracking performances against 5%, 10%, 20%, and 40% benchmarks. Positive tracking performances may be considered as the costs of the speed benchmarks in question vs. the selected target rates. In contrast, negative tracking performances indicate the savings that would have been achievable had that speed level been used instead of the selected average speed level. The results of the analysis suggest that the selected average participation rates are optimal for the trade profiles associated with significant alpha decay. A 5% participation rate seems to be the most appropriate for the orders with no significant alpha.

Figure 52:
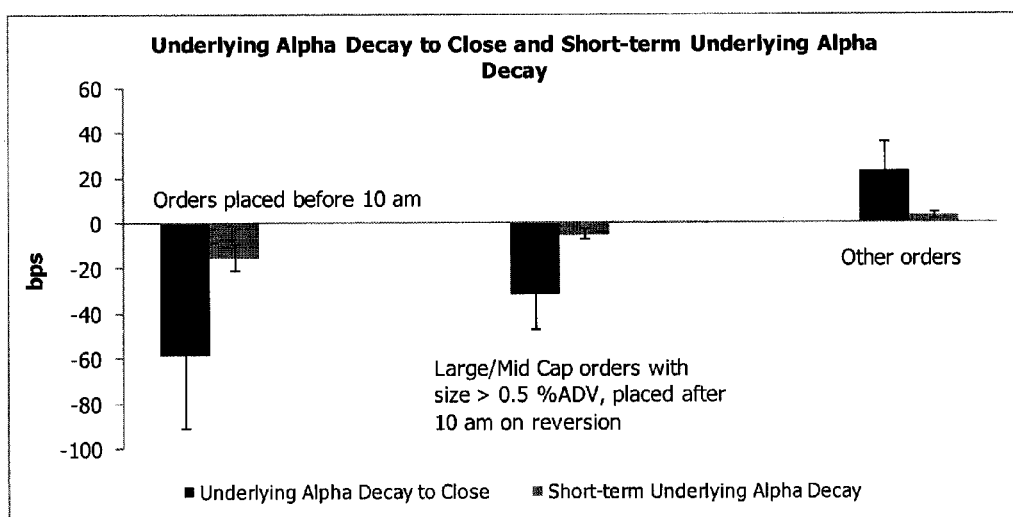
FIG. 52 illustrates underlying alpha decay to close and short-term underlying alpha decay.
Figure 53:
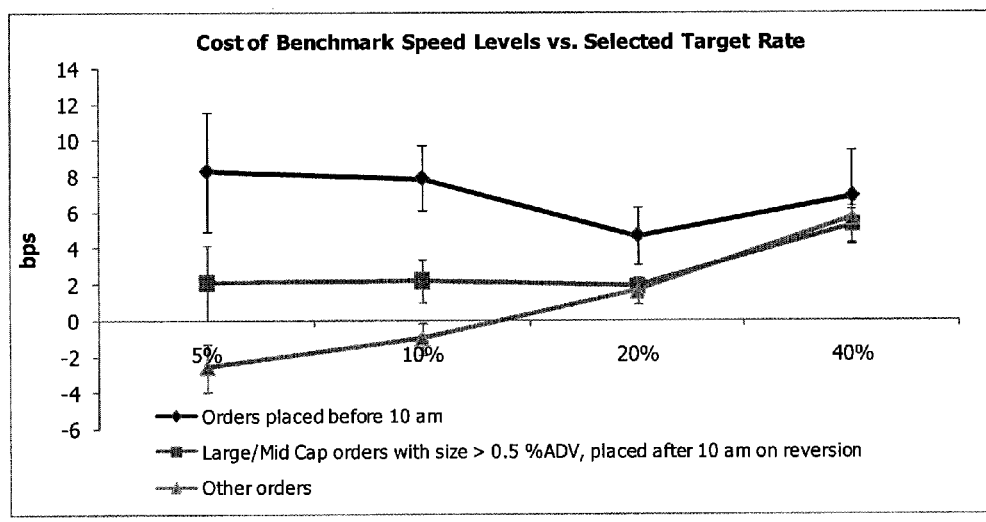
FIG. 53 illustrates cost of benchmark speed levels versus selected target rate.

FIGS. 52 and 53 depict orders placed before 10 am and Large/Mid Cap orders with size >0.5% ADV, placed after 10 am on reversion are associated with strong alpha decays. A rate around 20% minimizes cost for these trade profiles. For all other orders, which do not exhibit significant alpha decay, 5% is the speed that minimizes cost.

TABLE 19

Underlying Alpha Decay to Close and Short-term Underlying Alpha Decay, Net of Impact (bps)

| | | # | Mean | Std. Error | Median |
|---|---|---|---|---|---|
| Orders placed before 10 am | Underlying Alpha Decay to Close | 27 | −58 | 32 | −57 |
| | Short-term Underlying Alpha Decay | 146 | −15 | 6 | −11 |
| Large/Mid Cap orders with size > 0.5% ADV, placed after 10 am on reversion | Underlying Alpha Decay to Close | 113 | −32 | 15 | -17 |
| | Short-term Underlying Alpha Decay | 228 | −5 | 2 | −2 |
| Other orders | Underlying Alpha Decay to Close | 123 | 24 | 13 | 24 |
| | Short-term Underlying Alpha Decay | 708 | 4 | 1 | 3 |

TABLE 20

Impact-Adjusted Cost of Benchmark Speed Levels against Selected Target Rate (bps)

| | # | Selected Target Rate (%) | Tracking to 5% | Tracking to 10% | Tracking to 20% | Tracking to 40% |
|---|---|---|---|---|---|---|
| Orders placed before 10 am | 146 | 19 (0.8) | 8.3 (3.3) | 7.9 (1.8) | 4.7 (1.6) | 6.9 (2.6) |
| Large/Mid Cap orders with size > 0.5% ADV, placed after 10 am on reversion | 228 | 21 (0.7) | 2.1 (2.1) | 2.2 (1.2) | 1.9 (0.5) | 5.3 (0.9) |
| Other orders | 708 | 27 (0.8) | −2.6 (1.3) | −1.0 (0.9) | 1.6 (0.7) | 5.7 (0.7) |

Note:
Standard errors in parenthesis

Subsection 2: Descriptive Statistics and Profit/(Loss) Analysis

This subsection presents an analysis of trade execution performance separately for each order profile identified in the prior subsection.

TABLE 21

Descriptive Statistics

| | Orders placed before 10 am | | Large/Mid Cap orders with size > 0.5% ADV, placed after 10 am on reversion | | Other orders | |
|---|---|---|---|---|---|---|
| | | | | | | |
| # | Mean | Std. Error | Mean | Std. Error | Mean | Std. Error |
| | 146 | | 228 | | 708 | |
| Trade Size (% ADV) | 1.7 | 0.3 | 1.2 | 0.1 | 1.0 | 0.1 |
| Trade Duration (min) | 47 | 6.8 | 28 | 2.7 | 17 | 1.2 |
| Performance to VWAP (cents) | 1.7 | 0.6 | 0.9 | 0.3 | 0.4 | 0.1 |
| Performance to VWAP (bps) | 7.8 | 2.4 | 3.6 | 1.0 | 1.7 | 0.5 |
| P/(L) (bps) | −16 | 5.3 | −9 | 1.8 | −6 | 1.0 |
| Bloomberg Pre-trade (bps) | −24 | 2.0 | −21 | 0.8 | −18 | 0.8 |
| Participation Rate (%) | 18 | 1.6 | 23 | 1.2 | 30 | 1.0 |
| Participation Rate within Limit (%) | 21 | 1.7 | 28 | 1.2 | 32 | 1.0 |

Figure 54:
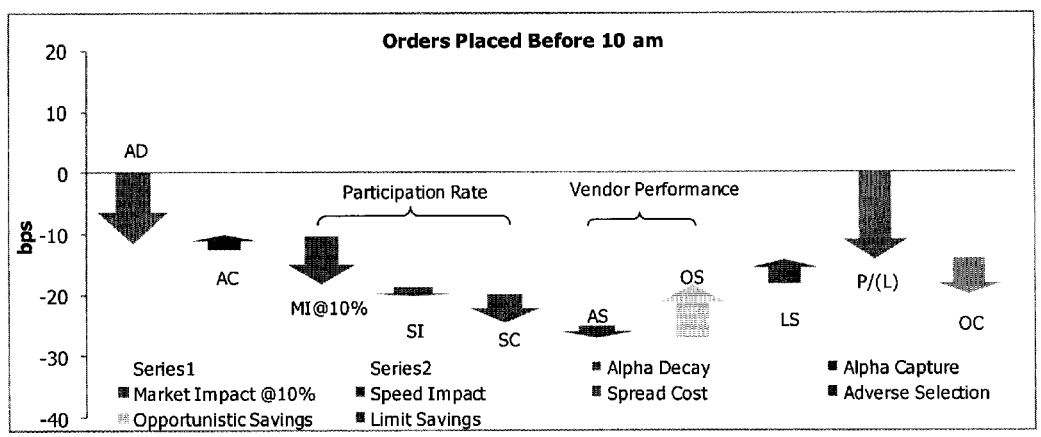
FIG. 54 illustrates various parameters related to orders placed before 10 a.m.
Figure 55:
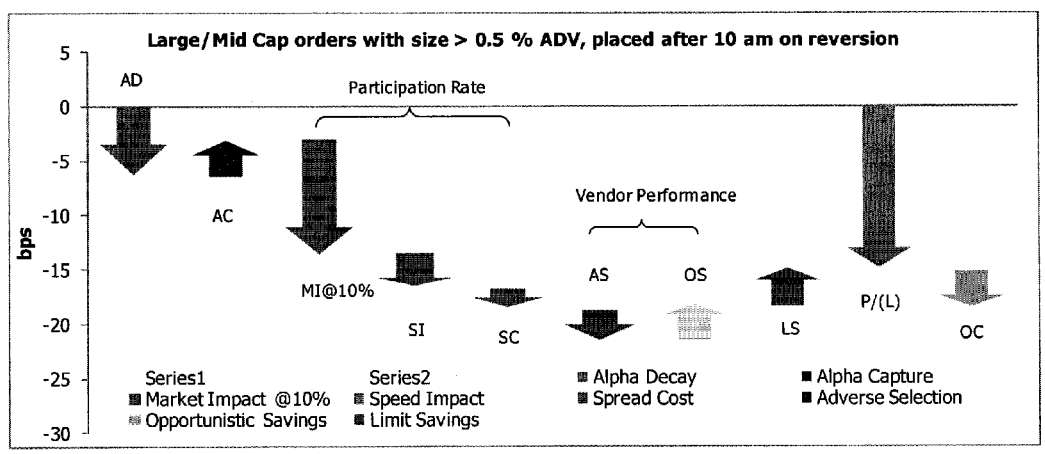
FIG. 55 illustrates various parameters related to large/mid cap orders with size greater than 0.5% ADV, placed after 10 a.m. on reversion.
Figure 56:
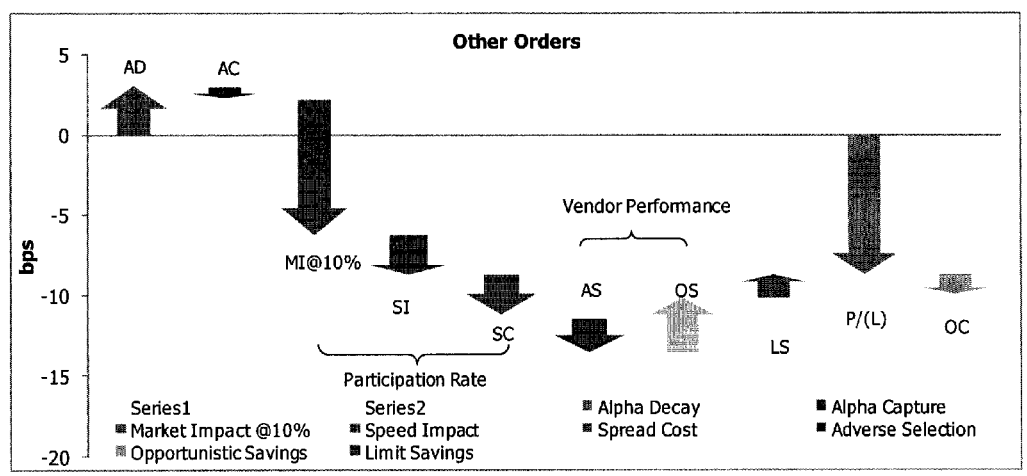
FIG. 56 illustrates various parameters related to other orders.

In an exemplary embodiment, an algorithm switching engine's opportunistic savings more than compensate for adverse selection costs. Market impact costs are more than compensated by savings from alpha capture for the trade profiles associated with significant alpha decay. The oppportunity costs associated with the incompletion of limit orders are compensated by the limit savings for most orders. See FIGS. 54-56.

TABLE 22

Value-weighted Profit/(Loss) Decomposition (bps)

| | | Participation Rate | | | Vendor Performance | | Limit Price | | |
|---|---|---|---|---|---|---|---|---|---|
| Market | | + | | | | | | | Clean |
| Alpha Decay | + Alpha Capture | Market Impact@ 10% | + Speed Impact | + Spread Cost | + Adverse Selection | + Opportunistic Savings | + Limit Savings | = Profit/(Loss) | Up Opportunity Cost |
| Orders placed before 10 am | | | | | | | | | |
| −12.3 | 2.2 | −8.5 | −1.9 | −4.2 | −2.4 | 8.7 | 4.3 | −14.1 | −6.1 |
| Large/Mid Cap orders with size > 0.5% ADV, placed after 10 am on reversion | | | | | | | | | |
| −6.4 | 3.4 | −10.5 | −3.1 | −2.1 | −2.9 | 3.4 | 3.2 | −15.0 | −3.4 |
| Other orders | | | | | | | | | |
| 3.1 | −0.8 | −8.5 | −2.6 | −2.6 | −2.3 | 3.5 | 1.3 | −8.9 | −1.1 |

Figure 57:
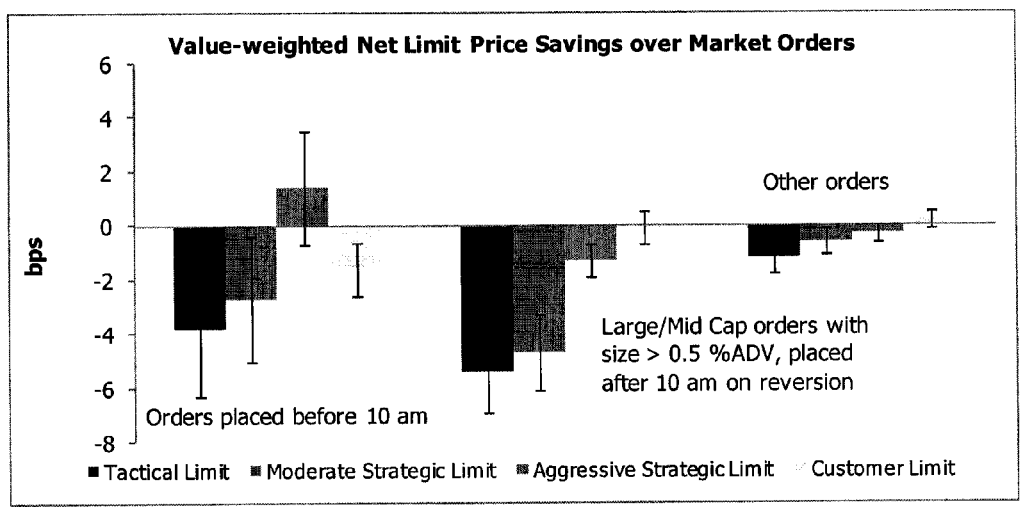
FIG. 57 illustrates value-weighted net limit price savings over market orders.

The imposition of a limit price generates overall net savings over a market order which can be measured by subtracting the opportunity cost from the limit savings. In FIG. 57 and the following Table the net savings achieved with the customer limit price are compared against the potential net savings from alternate limit price strategies. Three alternatives are considered: a tactical limit price of 20 bps above the NBBO on entry, a moderate strategic limit that accounts for two times the impact of the execution, and an aggressive strategic limit which accounts for 4 times the impact of the execution.

These exemplary results show that for orders with no significant alpha decay, the limit price chosen by the trader is the most appropriate. For profiles associated with the strongest alpha decays, an aggressive strategic limit price or market orders appear to be the most adequate.

TABLE 23

Value-weighted Limit Price Savings (bps)

|  | # |  | Mean | Std. Error |
|---|---|---|---|---|
| Orders placed before 10 am | 146 | Tactical Limit | −3.8 | 2.5 |
|  |  | Moderate Strategic Limit | −2.7 | 2.3 |
|  |  | Aggressive Strategic Limit | 1.4 | 2.1 |
|  |  | Customer Limit | −1.6 | 1.0 |
| Large/Mid Cap orders with size > 0.5% ADV, placed after 10 am on revision | 228 | Tactical Limit | −5.4 | 1.5 |
|  |  | Moderate Strategic Limit | −4.7 | 1.4 |
|  |  | Aggressive Strategic Limit | −1.3 | 0.6 |
|  |  | Customer Limit | −0.1 | 0.6 |
| Other orders | 708 | Tactical Limit | −1.2 | 0.6 |
|  |  | Moderate Strategic Limit | −0.6 | 0.5 |
|  |  | Aggressive Strategic Limit | −0.2 | 0.3 |
|  |  | Customer Limit | 0.2 | 0.3 |

Exemplary Profit/(Loss) Analysis Decomposition

Let $S_{exec}$ be the number of shares executed and $P_{exec}$ the average execution price for an order with arrival price equal to $P_{arrival}$. The Implementation shortfall (IS) can be broken down into its main components as follows:

$$\ln\left(\frac{P_{exec}}{P_{arrival}}\right) = \underbrace{\ln\left(\frac{PWP_{10}}{P_{arrival}}\right) - MI\left(\frac{S_{PWP_{10}}}{ADV}\right)}_{\text{Alpha}(10\%)} +$$

$$\underbrace{\left[\ln\left(\frac{P_{exec}}{PWP\_lim}\right) - \left(MI\left(\frac{S_{exec}}{ADV}\right) - MI\left(\frac{S_{PWP}}{ADV}\right)\right)\right]}_{AS/OS} +$$

$$\underbrace{MI\left(\frac{S_{exec}}{ADV}, r=10\%\right)}_{MI(10\%)} + \underbrace{\left[\ln\left(\frac{PWP}{PWP_{10}}\right) - \left(MI\left(\frac{S_{PWP}}{ADV}\right) - MI\left(\frac{S_{PWP_{20}}}{ADV}\right)\right)\right]}_{\text{Alpha Capture}} +$$

$$\underbrace{\left[MI\left(\frac{S_{exec}}{ADV}, r=Ru\right) - MI\left(\frac{S_{exec}}{ADV}, r=10\%\right)\right]}_{\text{Speed Impact}} + \underbrace{\ln\left(\frac{PWP\_lim}{PWP}\right)}_{\text{Limit Savings}}$$

PWP is the participation weighted average price, calculated as the VWAP for the time period starting at order arrival until the time that is required to complete the order at the selected participation rate. $S_{PWP}$ is the number of shares executed in this same PWP evaluation time window. The PWP benchmark is adjusted for the half-spread and for the customer limit price.

MI is the market impact function, estimated using a model calibrated to the Engine's historical performance.

The tracking error TE represents the net difference between adverse selection (AS) and opportunistic savings (OS).

AS and OS refer to disproportionate executions at, respectively, unfavorable and favorable prices points due to variations in participation rates before substantial price movements.

Short-term underlying alpha is measured as the difference between the arrival price and the 10% PWP net of the market impact of the shares executed in the 10% PWP execution window.

Speed Effect is the net market impact cost of the selected speed, measured as the difference between the market impact at the corresponding participation rate and the market impact at 10%.

Alpha capture is the cost of the selected speed in terms of capturing deterioration in alpha. This is measured by the tracking error between the PWP at the chosen participation rate and the PWP at the 10% benchmark, adjusted for the differential market impact of the two speed levels.

The Limit savings may be weighted against the cost of executing any unfilled shares due to the price limit. One may assume the order completion (clean-up) will occur after the reversion period at an execution price that accounts for the market impact of the execution of this residual.

While certain specific exemplary embodiments of the invention have been described herein for illustrative purposes, the invention is not limited to the specific details, representative devices, and illustrative examples shown and described herein. As will be understood by those skilled in the art, various modifications may be made without departing from the spirit or scope of the invention defined by the appended claims and their equivalents.

We claim:

1. A method comprising:
    (a) receiving electronic data describing an executed trading order in a market traded security and related trade execution data;
    (b) calculating, by an automated programmed computer, one or more components of execution costs associated with execution of said executed trading order, said one or more components comprising at least one of alpha loss and alpha capture; and
    (c) transmitting data sufficient to describe said one or more components of execution costs associated with execution of said executed trading order;
    wherein said computer comprises one or more processors.

2. A method as in claim 1, wherein said data sufficient to describe said one or more components of execution costs is received by a user terminal and displayed via a graphical user interface.

3. A method as in claim 1, wherein said graphical user interface displays said data sufficient to describe said one or more components of execution costs in a format that shows values of one or more of said components.

4. A method as in claim 1, wherein said graphical user interface displays said data sufficient to describe said one or more components of execution costs in a format that shows relative values of two or more of said components.

5. A method as in claim 1, wherein said one or more components of execution costs associated with execution of said executed trading order comprise market impact.

6. A method as in claim 1, wherein said one or more components of execution costs associated with execution of said executed trading order comprise adverse selection.

7. A method as in claim 1, wherein said one or more components of execution costs associated with execution of said executed trading order comprise opportunistic savings.

8. A method as in claim 1, wherein said one or more components of execution costs associated with execution of said executed trading order comprise speed impact.

9. A method as in claim 1, wherein said one or more components of execution costs associated with execution of said executed trading order comprise limit savings.

10. A method as in claim 1, wherein said one or more components of execution costs associated with execution of said executed trading order comprise opportunity cost.

11. A method as in claim 1, wherein said one or more components of execution costs associated with execution of said executed trading order comprise spread.

12. A method as in claim 1, wherein said one or more components of execution costs associated with execution of said executed trading order comprise profit/loss.

13. A method comprising:
   (a) receiving electronic data describing an executed trading order in a market traded security and related trade execution data;
   (b) calculating, by an automated programmed computer, cost effect of one or more trade decision factors associated with execution of said executed trading order, wherein said one or more trade decision factors comprise at least one of choice of algorithm and choice of broker; and
   (c) transmitting data sufficient to describe said cost effect of one or more trade decision factors associated with execution of said executed trading order;
   wherein said computer comprises one or more processors.

14. A method as in claim 13, wherein said one or more trade decision factors associated with execution of said executed trading order comprise limit price.

15. A method as in claim 13, wherein said one or more trade decision factors associated with execution of said executed trading order comprise level of aggression.

16. A method as in claim 13, wherein said one or more trade decision factors associated with execution of said executed trading order comprise participation rate.

17. A method as in claim 13, wherein said one or more trade decision factors associated with execution of said executed trading order comprise speed of execution.

18. A method as in claim 13, wherein said one or more trade decision factors associated with execution of said executed trading order comprise choice of manual versus automated execution.

19. A method as in claim 13, wherein said one or more trade decision factors associated with execution of said executed trading order comprise choice of trading strategy.

20. A method comprising:
   (a) receiving electronic data describing an executed order in a market traded security and related trade execution data;
   (b) calculating, by an automated programmed computer, a decomposition of execution of said executed limit order into at least a first group of components and a second group of components, said first group of components being related to algorithm performance and said second group of components being related to trader-input parameters for said executed order, wherein said trader-input parameters comprise at least one of level of aggression parameters and limit order parameters; and
   (c) transmitting data sufficient to describe said first group of components and said second group of components;
   wherein said computer comprises one or more processors.

21. A method as in claim 20, wherein said trader-input parameters comprise trading speed.

22. A method as in claim 20, wherein said trader-input parameters comprise participation rate.

23. A method as in claim 20, wherein said data sufficient to describe said first group of components and said second group of components is received by a user terminal and displayed via a graphical user interface.

24. A method as in claim 23, wherein said graphical user interface displays said data describing said first group of components and said second group of components in a format that shows relative values of two or more components in said first group of components and said second group of components.

25. A method as in claim 24, wherein said graphical user interface displays relative values of choices of participation rate and limit price.

26. A method as in claim 24, wherein said graphical user interface displays relative values of selected speed and benchmark speed level.

27. A method as in claim 24, wherein said graphical user interface displays relative values of market impact and alpha capture.

28. A method as in claim 24, wherein said graphical user interface displays relative values of limit price savings and opportunity costs.

29. A method comprising:
   (a) receiving electronic data describing an executed trading order in a market traded security and related trade execution data;
   (b) calculating, by an automated programmed computer, one or more components of implementation shortfall associated with execution of said executed trading order, wherein said one or more components of implementation shortfall comprise speed of execution and participation rates; and
   (c) transmitting data sufficient to describe said one or more components of implementation shortfall associated with execution of said executed trading order;
   wherein said computer comprises one or more processors.

30. A method comprising:
   (a) receiving electronic data describing an executed trading order in a market traded security and related trade execution data;
   (b) calculating, by an automated programmed computer, one or more components of profit/loss associated with execution of said executed trading order, wherein said one or more components of profit/loss comprise speed impact and market impact; and
   (c) transmitting data sufficient to describe said one or more components of profit/loss associated with execution of said executed trading order;
   wherein said computer comprises one or more processors.

31. A method comprising:
   (a) receiving electronic data describing an executed trading order in a market traded security and related trade execution data;
   (b) calculating, by an automated programmed computer, one or more components of execution outcome associated with execution of said executed trading order, wherein said one or more components of execution outcome comprise adverse selection and opportunistic savings; and
   (c) transmitting data sufficient to describe said one or more components of execution outcome associated with execution of said executed trading order;
   wherein said computer comprises one or more processors.

* * * * *